US011604367B2

(12) United States Patent
Tzvieli et al.

(10) Patent No.: US 11,604,367 B2
(45) Date of Patent: Mar. 14, 2023

(54) SMARTGLASSES WITH BENDABLE TEMPLES

(71) Applicant: Facense Ltd., Kiryat Tivon (IL)

(72) Inventors: Arie Tzvieli, Berkeley, CA (US); Ari M Frank, Haifa (IL); Tal Thieberger-Navon, Kiryat Tivon (IL); Ori Tzvieli, Berkeley, CA (US); Gil Thieberger, Kiryat Tivon (IL)

(73) Assignee: Facense Ltd., Kiryat Tivon (IL)

( * ) Notice: Subject to any disclaimer, the term of this patent is extended or adjusted under 35 U.S.C. 154(b) by 146 days.

(21) Appl. No.: 17/155,812

(22) Filed: Jan. 22, 2021

(65) Prior Publication Data

US 2021/0318558 A1 Oct. 14, 2021

Related U.S. Application Data

(60) Provisional application No. 63/122,961, filed on Dec. 9, 2020, provisional application No. 63/113,846, filed
(Continued)

(51) Int. Cl.
*G02C 11/00* (2006.01)
*G02B 27/01* (2006.01)
*G02C 5/14* (2006.01)

(52) U.S. Cl.
CPC .......... *G02C 11/10* (2013.01); *G02B 27/0176* (2013.01); *G02C 5/143* (2013.01); *G02C 5/146* (2013.01); *G02B 2027/0178* (2013.01)

(58) Field of Classification Search
CPC ........ G02B 2027/0178; G02B 27/0176; G02B 27/017; G02B 27/01; G02C 11/10;
(Continued)

(56) References Cited

U.S. PATENT DOCUMENTS 6,118,882 A 9/2000 Haynes
6,349,001 B1 2/2002 Spitzer
(Continued)

FOREIGN PATENT DOCUMENTS

WO WO2019181150 A1 9/2019

OTHER PUBLICATIONS

U.S. Appl. No. 10/037,084, filed Jul. 31, 2018, Joo.
(Continued)

*Primary Examiner* — William R Alexander
(74) *Attorney, Agent, or Firm* — Active Knowledge Ltd.

(57) ABSTRACT

A novel design for untethered smartglasses with wireless connectivity in which electronic components and electric wiring are mounted in a manner than enables at least a portion of temples of the smartglasses to be bent around the ear to improve the smartglasses' fit. In one embodiment, the smartglasses include a front element that supports lenses and two temples, coupled to the front element through hinges that enable folding and unfolding. At least one of the temples includes: a first portion coupled to the front element with first electronic components, a second portion coupled to the first portion with electric wires, and a third portion coupled to the second portion with second electronic components. The second portion is designed to be bent around a human ear to improve the smartglasses' fit, and the first and third portions are not designed to be bent to improve the smartglasses' fit.

18 Claims, 20 Drawing Sheets

Related U.S. Application Data on Nov. 14, 2020, provisional application No. 63/048,638, filed on Jul. 6, 2020, provisional application No. 63/024,471, filed on May 13, 2020, provisional application No. 63/006,827, filed on Apr. 8, 2020.

(58) Field of Classification Search
CPC .......... G02C 11/00; G02C 5/143; G02C 5/14; G02C 5/146
USPC ........................................................ 351/114
See application file for complete search history.

(56) References Cited

U.S. PATENT DOCUMENTS

| | | | |
|---|---|---|---|
| 7,874,666 B2 | 1/2011 | Xu | |
| 8,593,795 B1 | 11/2013 | Chi | |
| 8,814,691 B2 | 8/2014 | Haddick et al. | |
| 9,031,273 B2 | 5/2015 | Dong et al. | |
| 9,075,249 B2 | 7/2015 | Heinrich et al. | |
| 9,164,284 B2 | 10/2015 | Olsson et al. | |
| 9,217,882 B2 | 12/2015 | Sugihara | |
| 9,482,882 B1 | 11/2016 | Hanover et al. | |
| 9,989,771 B2 | 6/2018 | Kamakura | |
| 2008/0008344 A1 | 1/2008 | Wakabayashi et al. | |
| 2009/0182688 A1 | 7/2009 | van der Zwan et al. | |
| 2015/0049295 A1* | 2/2015 | Larson | B29C 45/1671 264/129 |
| 2017/0095157 A1 | 4/2017 | Tzvieli et al. | |
| 2017/0231490 A1 | 8/2017 | Toth et al. | |
| 2017/0367651 A1 | 12/2017 | Tzvieli et al. | |
| 2018/0335650 A1 | 7/2018 | Howell | |
| 2019/0033623 A1 | 1/2019 | Howell | |
| 2019/0196228 A1* | 6/2019 | Moore | G02B 27/0176 |
| 2019/0313915 A1 | 10/2019 | Tzvieli et al. | |
| 2020/0225511 A1* | 7/2020 | Blum | G02B 27/017 |
| 2020/0264454 A1* | 8/2020 | Mackenzie | A61B 5/6803 |
| 2020/0355944 A1* | 11/2020 | Jouard | G02C 11/10 |
| 2021/0026157 A1* | 1/2021 | Muramatsu | G02C 11/10 |
| 2021/0103146 A1* | 4/2021 | Travers | G02C 5/22 |
| 2021/0294122 A1* | 9/2021 | Feng | G02C 11/10 |

OTHER PUBLICATIONS

U.S. Appl. No. 10/176,783, filed Jan. 8, 2019, Travers et al.
U.S. Appl. No. 10/191,289, filed Jan. 29, 2019, Bhardwaj et al.
U.S. Appl. No. 10/268,276, filed Apr. 23, 2019, Fisher et al.
U.S. Appl. No. 10/551,920, filed Feb. 4, 2020, Joo.
U.S. Appl. No. 10/555,106, filed Feb. 4, 2020, Mehra.
U.S. Appl. No. 10/564,433, filed Feb. 18, 2020, Lee et al.
Amft, Oliver. "Smart eyeglasses, e-textiles, and the future of wearable computing." Advances in Science and Technology. vol. 100. Trans Tech Publications Ltd, 2017.
Amft, Oliver, et al. "Making regular eyeglasses smart." IEEE Pervasive Computing 14.3 (2015): 32-43.
Seneviratne, Suranga, et al. "A survey of wearable devices and challenges." IEEE Communications Surveys & Tutorials 19.4 (2017): 2573-2620.
International search report, PCT/IB2020/060196, dated Feb. 7, 2021.
Written opinion of the international searching authority, PCT/IB2020/060196, dated Feb. 7, 2021.

\* cited by examiner

SMARTGLASSES WITH BENDABLE TEMPLES

CROSS-REFERENCE TO RELATED APPLICATIONS

This application claims priority to U.S. Provisional Patent Application No. 63/006,827, filed Apr. 8, 2020, U.S. Provisional Patent Application No. 63/024,471, filed May 13, 2020, U.S. Provisional Patent Application No. 63/048,638, filed Jul. 6, 2020, U.S. Provisional Patent Application No. 63/113,846, filed Nov. 14, 2020, and U.S. Provisional Patent Application No. 63/122,961 filed 9 Dec. 2020.

BACKGROUND

Eyeglasses have been used for many years, and materials for eyeglasses frames, such as various plastic materials and metal materials, are well-known in the art. Examples of well-known materials used in plastic eyeglasses frames include cellulose acetate, cellulose acetate propionate, and blended nylon. Examples of well-known materials used in metal eyeglasses frames include aluminum, stainless steel, titanium, and monel.

Many of the well-known materials for eyeglasses frames enable someone fitting the eyeglasses, such as an optician, to bend the frame around the human ear to fit the frame by applying pressure, sometime after heating the frame with an eyeglass frame heater, also known as eyeglass frame warmer or blow dryer (all referred to herein as a "blower"). However, all prior art smartglasses frames having electronic components both in front of and behind the ear do not enable the optician to bend the frame around the ear when fitting, because such bending could harm the electronic components that are not designed to be bent. Therefore, there is a need for a new mechanical design for smartglasses that will enable bending the smartglasses frame around the ear when fitting the smartglasses.

SUMMARY

Some embodiments described herein involve a novel design for smartglasses in which electronic components and electric wiring are mounted in a manner than enables at least a portion of temples of the smartglasses to be bent around the ear to improve the smartglasses' fit. The novel design of smartglasses described herein involves smartglasses that are untethered and operate with wireless connectivity (e.g., to connect with a server in the cloud and/or with wireless devices such as smartphones). These properties make the smartglasses suitable for prolonged usage. Being untethered makes can also make the smartglasses more comfortable to wear and use. The wireless communication enables offloading of at least some of the processing of data collected by the smartglasses and/or presented by them to remote processors (e.g., servers in the cloud and/or other mobile devices like smartphones). This means that the processing power (and power needs) on the smartglasses can be reduced, which makes it possible to operate them with lighter batteries. The following are descriptions of some embodiments of such smartglasses. References to "smartglasses" below are intend to include smartglasses that are untethered and/or have wireless connectivity.

One aspect of this disclosure involves untethered smartglasses with wireless connectivity that include a front element that is configured to support lenses and two temples coupled to the front element through hinges that enable folding and unfolding. At least one of the temples includes three portions: a first portion, coupled to the front element, comprising first electronic components, a second portion, coupled to the first portion, comprising electric wires, a third portion, coupled to the second portion, comprising second electronic components. The second portion is designed to be bent around a human ear to improve the untethered smartglasses' fit, and the first and third portions are not designed to be bent to improve the untethered smartglasses' fit. Optionally, the second electronic components comprise a battery, and the first and third portions, which are not designed to be bent, are stiffer than the second portion that is designed to be bent to improve the untethered smartglasses' fit.

In one embodiment, the first electronic components are mounted in a first hollow mechanical structure, the electric wires are mounted in a second hollow mechanical structure, and dominant materials of the first and second hollow mechanical structures are different.

In another embodiment, the electric wires are mounted in a first hollow mechanical structure, the second electronic components are mounted in a second hollow mechanical structure, and dominant materials of the first and second hollow mechanical structures are different.

In yet another embodiment, the first electronic components are mounted in a first hollow mechanical structure, the electric wires are mounted in a second hollow mechanical structure, the second electronic components are mounted in a third hollow mechanical structure, and a dominant material of the second hollow mechanical structure is different from a dominant material of the first and third hollow mechanical structures.

In still another embodiment, the first electronic components, the second electronic components, and the electric wires are mounted in a hollow mechanical structure that is made of material comprising at least one of: cellulose acetate, cellulose acetate propionate, and blended nylon.

Some embodiments described herein involve smartglasses in which the temples may be warmed in order to assist in their bending, to obtain a better fit. In one embodiment, the first electronic components, the second electronic components, and the electric wires are mounted in a hollow mechanical structure that is made of a material designed to be bent after being warmed. At second portion, the hollow mechanical structure is thinner than it is at each of the first and third portions. Being thinner at the second portion makes it easier to bend the hollow mechanical structure at the second portion compared to effort involved in bending the hollow mechanical structure at each of the first and third portions.

In another embodiment, the first electronic components, the second electronic components, and the electric wires are mounted in a hollow mechanical structure that is made of a material designed to be bent after being warmed, and the first and third portions also comprise strengthening bars to prevent accidental bending, while the second portion does not include a strengthening bar.

In still another embodiment, the first electronic components, the second electronic components, and the electric wires are mounted in a hollow mechanical structure that is made of metal. The hollow mechanical structure spans the first, second, and third portions, and the hollow mechanical structure is thinner in the second portion than it is in each of the first and third portions. Optionally, being thinner in the second portion makes it easier to bend the hollow mechanical structure at the second portion compared to effort of bending the hollow mechanical structure at each of the first and third portions. Optionally, the hollow mechanical structure is at least twice as thin in the second portion than it is in each of the first and third portions. Optionally, the hollow mechanical structure is made of material comprising at least one of: aluminum, stainless steel, titanium, and monel.

Another aspect of this disclosure involves untethered smartglasses with wireless connectivity that include a front element that is configured to support lenses and first electronic components and two temples, each coupled to the front element through a hinge that enables folding and unfolding. At least one of the temples includes first and second portions. The first portion, which is coupled to the front element, includes electric wires. A section of the first portion is designed to be bent around a human ear (of the person wearing the smartglasses) to improve the untethered smartglasses' fit. The second portion, which is coupled to the first portion, includes second electronic components. The second portion is not designed to be bent to improve the untethered smartglasses' fit.

In one example, the electric wires are mounted in a first hollow mechanical structure, the second electronic components are mounted in a second hollow mechanical structure, and dominant materials of the first and second hollow mechanical structures are different. In another example, the first electronic components comprise a microphone, a contact photoplethysmography device in a nose pad of the front element, and a temperature sensor. In another example, the first electronic components comprise an inward-facing sensor configured to measure a person wearing the untethered smartglasses, and the first portion is flexible.

BRIEF DESCRIPTION OF THE DRAWINGS

The embodiments are herein described by way of example only, with reference to the following drawings.

DETAILED DESCRIPTION

Figure 1A:
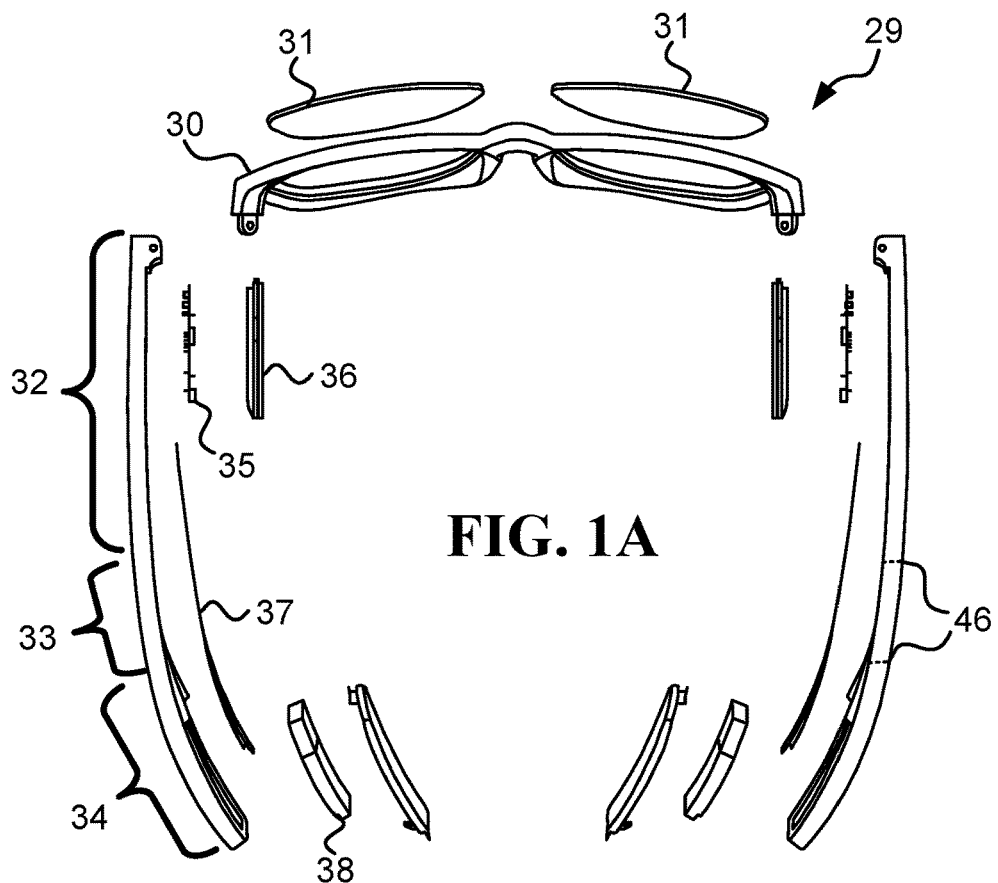
FIG. 1A illustrates an embodiment of untethered smartglasses with wireless connectivity having a novel design that enables bending a temple around the ear.

As smartglasses become more prevalent, there is a growing need to make them comfortable and fashionable, in order for them to gain acceptance and be widely used in day-to-day life. For this, the smartglasses need to be adjustable in order to be comfortable during long periods of use, and to account for the weight of additional components such as electronic components, wiring, and/or batteries required to enable the desired "smart" functionality of the smartglasses.

To this end, some embodiments described herein, involve a novel design for smartglasses, in which electronic components and electric wiring are mounted in a manner than enables at least a portion of temples of the smartglasses to be bent around the ear to improve the smartglasses' fit. The novel design of smartglasses described herein involves smartglasses that are untethered and operate with wireless connectivity (e.g., to connect with server in the cloud and/or to wireless devices such as smartphones). These properties make the smartglasses suitable for prolonged usage. Being untethered makes the smartglasses more comfortable. The wireless communication enables offloading of at least some of the processing of data collected by the smartglasses and/or presented by them to remote processors (e.g., servers in the cloud and/or other mobile devices like smartphones). This means that the processing power (and power needs) on the smartglasses can be reduced, which enables to operate the smartglasses with lighter batteries. The following are descriptions of some embodiments of such smartglasses. References to "smartglasses" below are intend to include smartglasses that are untethered and/or have wireless connectivity.

In one embodiment, untethered smartglasses with wireless connectivity include at least the following: a front element configured to support lenses, and two temples coupled to the front element through hinges that enable folding and unfolding (of the temples). Optionally, the temples may include electronic components and/or electric wires.

In one embodiment, at least one of the temples includes at least three portions, as follows: a first portion, coupled to the front element, which includes first electronic components; a second portion, coupled to the first portion, which includes electric wires; and a third portion, coupled to the second portion, which includes second electronic components. The second portion of the temple is designed to be bent around a human ear to improve the untethered smartglasses' fit (on the wearer's head), and the first and third portions are not designed to be bent to improve the untethered smartglasses' fit. Optionally, the first and third portions, which are not designed to be bent, are stiffer than the second portion that is designed to be bent to improve the untethered smartglasses' fit. Optionally, the second electronic components comprise a battery. Optionally, the smartglasses may include a modular weight designed to be connected to the third portion in order to balance weight of the front element.

It is noted that the temples may include more than three portions without limiting the scope of the embodiments, and sentences of the form of "portion X coupled to portion Y" also cover indirect connections between the portions, which means that the temple may include an additional portion or additional portions between the first, second and third portions.

In one embodiment, both temples comprise the first, second and third portions, and the difference between weights of the two temples is less than 20% (of the heavier of the two temples). Optionally, the difference between weights of batteries in the third portions of the two temples is less than 20% (of the heavier of the two batteries).

FIG. 1A illustrates one embodiment of untethered smartglasses with wireless connectivity having the novel design described above. Smartglasses 29, illustrated in FIG. 1A, have a temple comprising three portions, as described above, with a portion 33 that is designed to be bent around a human ear to improve the smartglasses' fit to the wearer. The smartglasses 29 include a front element 30 configured to support lenses 31; two temples (also known as "side arms") coupled to the front element 30. Each of the temples includes the following: (i) a first portion 32, coupled to the front element 30, comprising first electronic components (35, 36), (ii) a second portion 33, coupled to the first portion 32, comprising electric wires 37, and (iii) a third portion 34, coupled to the second portion 33, comprising second electronic components 38. Although FIG. 1A illustrates the reference numerals only on the left side of the frame, the right side of the frame is similar to the left temple in this specific example. In other examples the right and left sides of the frame may include different components.

The first portion 32 and the third portion 34 include rigid electronic components (35, 36, 38) that are not designed to be bent (e.g., by an optician) to fit the smartglasses 29 to the wearer, while the second portion 33 includes flexible electric wires 37, and optionally additional flexible electronic components, which are designed to be bent around the ear to improve the smartglasses' fit. Optionally, the electric wires 37 are elongated to include slack to prevent damage to the electric wires 37, and/or or to components to which they are connected, as a result of the electric wires 37 being bent.

Some examples of rigid electronic components that may be utilized in some embodiments (and may be part of the first and/or second electronic components mentioned above) include, but are not limited to, the following: printed circuit boards (PCBs), components rigidly attached to PCBs, processors, memory modules, communication modules that may operate in various protocols to enable wireless connectivity (e.g., WiFi, bluetooth, celluar, Zigbee, etc.), various sensors, and batteries. The electric wires utilized in some embodiments described herein may be any type of electric wire known in the art to be used to provide power to and/or from electronic components and/or to transmit data between electronic components.

Figure 34A:
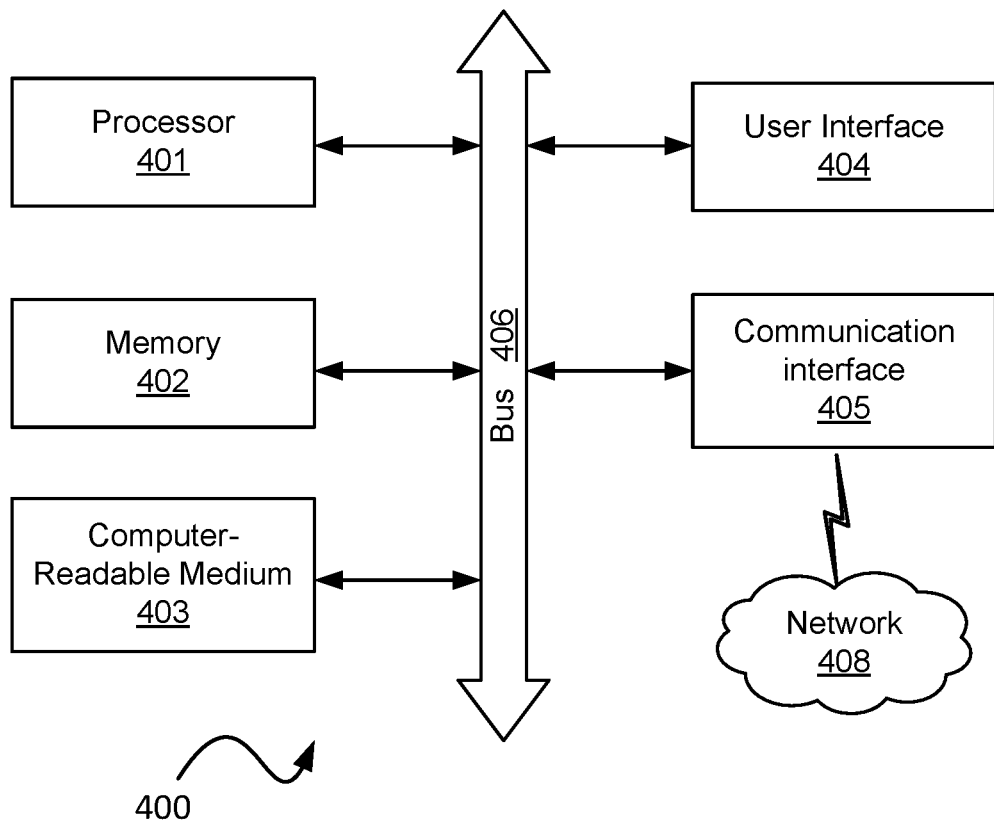
FIG. 34A and FIG. 34B are schematic illustrations of possible embodiments for computers.
Figure 34B:
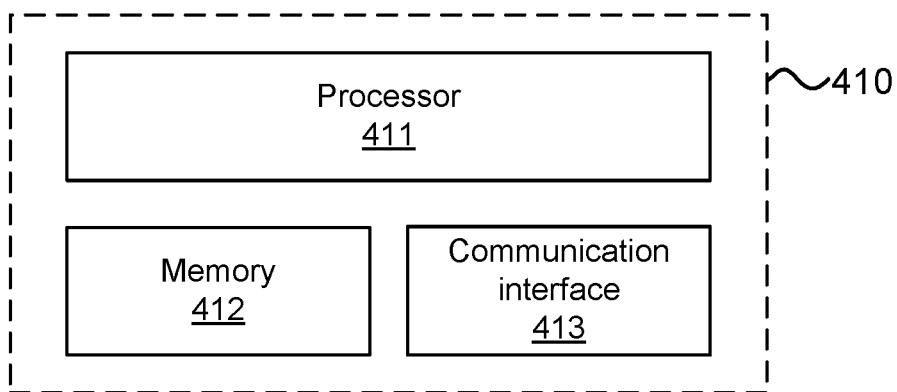

In some embodiments, an electronic component may be a form of a computer described herein, such as an embodiment of a computer illustrated in FIG. 34A or FIG. 34B.

Mounting electronic components and/or electric wires may be done by using hollow mechanical structures in parts of the smartglasses frames'. In some embodiments, the first electronic components are mounted in a first hollow mechanical structure, the electric wires are mounted in a second hollow mechanical structure, and dominant materials of the first and second hollow mechanical structures are different.

Herein, a "dominant material" of a structure is a material that either accounts for a larger proportion of the mass of the structure than any other material that is used in the structure, and/or affects the mechanical properties of the structure more than other materials used in the structure. The term "hollow mechanical structure" refers to a section of the outer frame of the smartglasses. Optionally, the second hollow mechanical structure is made of an elongated structure, such as a tube or other shape having just two openings at its ends, and the wires are wired in the second hollow mechanical structure. In one embodiment, at least half of the second hollow mechanical structure is made of a well-known material used in the eyeglasses industry for eyeglasses frames, such as a plastic frame material and/or a metal frame material. In one example, a dominant material of the first hollow mechanical structure is plastic that is not designed to be bent to improve the smartglasses' fit, and a dominant material of the second hollow mechanical structure is metal designed to be bent to improve the smartglasses' fit.

Different configurations of hollow mechanical structures may be utilized in different embodiments. In one embodiment, the electric wires are mounted in a first hollow mechanical structure, the second electronic components are mounted in a second hollow mechanical structure, and dominant materials of the first and second hollow mechanical structures are different.

In another embodiment, the first electronic components are mounted in a first hollow mechanical structure, the electric wires are mounted in a second hollow mechanical structure, the second electronic components are mounted in a third hollow mechanical structure, and a dominant material of the second hollow mechanical structure is different from a dominant material of the first and third hollow mechanical structures. Manufacturing the three portions from the same material may give the frame a more uniform look. Manufacturing the three portions from two or three different materials may provide usability advantages, and may help the optician to better notice where the smartglasses frame is to be bent. Different colors may also be used for the different hollowed mechanical structures. Optionally, the second hollow mechanical structure is colored with a different color than the first and third hollow mechanical structures. Using a different color for the second hollow mechanical structure may further help the optician to better notice where the smartglasses frame is to be bent.

The following are some examples of materials that may be used for hollow mechanical structures in different embodiments.

In one embodiment, the first electronic components, the second electronic components, and the electric wires are mounted in a hollow mechanical structure that is made of material comprising at least one of: cellulose acetate, cellulose acetate propionate, and blended nylon.

In another embodiment, the first electronic components, the second electronic components, and the electric wires are mounted in a hollow mechanical structure that is made of a material designed to be bent after being warmed. Optionally, at the second portion, the hollow mechanical structure is thinner than it is at each of the first and third portions. Being thinner at the second portion can make it easier to bend the hollow mechanical structure at the second portion, compared to the effort involved in bending the hollow mechanical structure at each of the first and third portions.

In yet another embodiment, the first electronic components, the second electronic components, and the electric wires are mounted in a hollow mechanical structure that is made of a material designed to be bent after being warmed, and the first and third portions comprise strengthening bars to prevent accidental bending, while the second portion does not include a strengthening bar. For example, a strengthening bar may be made of a material that is less sensitive to deforming when heated than the material from which the hollow mechanical structure that houses the electric wires is made from.

Metal is another material that may be utilized to construct smartglasses' frames. In some embodiments, the first electronic components, the second electronic components, and the electric wires are mounted in a hollow mechanical structure that is made of metal. Optionally, the hollow mechanical structure is made of material comprising at least one of: aluminum, stainless steel, titanium, and monel. Optionally, the hollow mechanical structure spans the first, second, and third portions, i.e., the hollow mechanical structure may be viewed as comprising at least three portions which are non-overlapping. Optionally, different portions of the hollow mechanical structure may have different properties. In one example, the hollow mechanical structure is thinner in the second portion compared to its width in each of in the first and third portions. Being thinner in the second portion may convey an advantage, in some embodiments, of making it easier to bend the hollow mechanical structure at the second portion compared to effort of bending the hollow mechanical structure at each of the first and third portions. In one example, the hollow mechanical structure is at least twice as thin in the second portion compared to its width in each of the first and third portions.

Bending the second portion may involve heating it prior to it being bent (e.g., using a blower). In some embodiments, the first and/or second electronic components may include a battery. In such cases, measures may need to be taken in order to ensure that electronic components (such as the batteries) are not harmed when the second portion is heated. For example, thermal insulation may be placed around at least a part of the first portion and/or around at least a part of the third portion in order to protect these components from the hot air produced by the blower.

In one embodiment, the second portion may be configured to be heated before being bent, and/or components in the first and/or third portions may be more sensitive to heat than the second portion the smartglasses. Optionally, the most heat-sensitive electrical component stored in the second portion is less sensitive to heat than the most heat-sensitive electrical component stored in the first or third portions. Optionally, the smartglasses may include thermal insulation that covers at least a portion of a battery, from among the first and/or second electronic components, which reduces thermal conduction from the second portion to the first and/or second electronic components stored in the first and/or third portion, respectively. In one example, the second electronic components include a battery, and thermal insulation is placed to reduce thermal conduction from the second portion to the battery stored in the third portion. In this example, the thermal insulation may cover an end of the battery located closer to the second portion, and does not cover the opposite end of the battery that is located towards the end of the temple that is not connected to the front element.

Figure 1B:
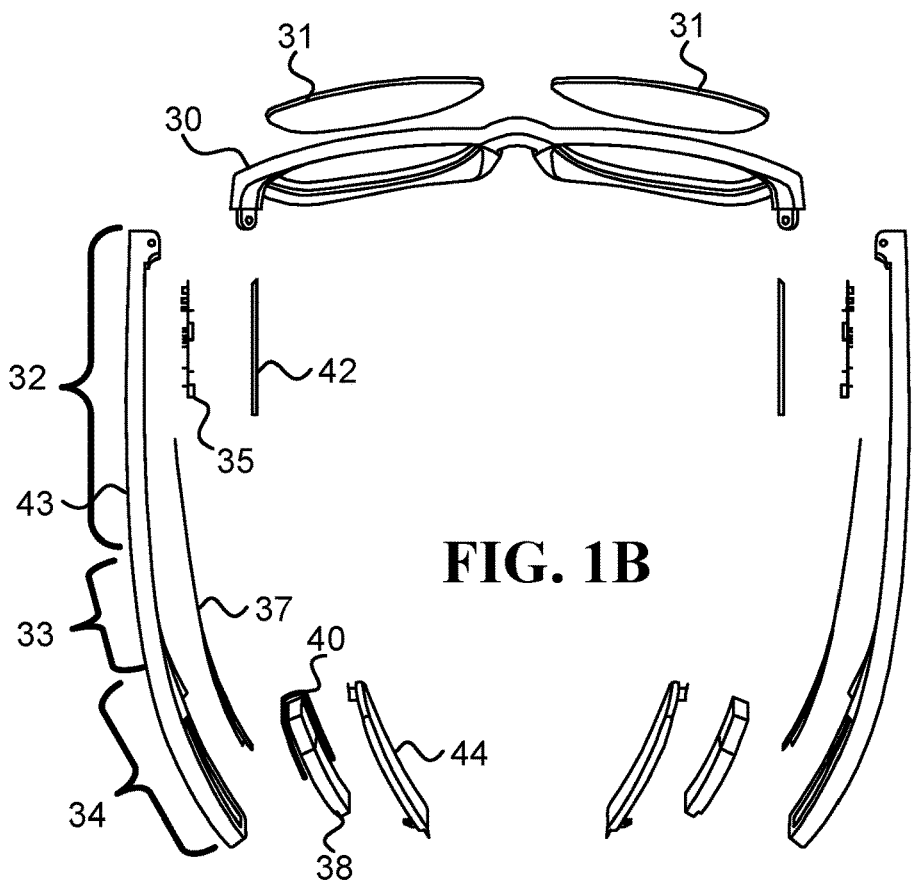
FIG. 1B illustrates hollow mechanical structures used to mount the electronic components and wires in an embodiment of untethered smartglasses with wireless connectivity.

An example of the use of thermal insulation is provided in FIG. 1B, which illustrates thermal insulation 40, also known as heat insulation, that protects the battery 38 by reducing thermal conduction from the second portion to the battery stored in the third portion. Optionally, the thermal insulation 40 does not cover the opposite side of the battery 38 in order to enable heat dissipation from the battery. For example, the thermal insulation 40 covers approximately the half of the battery 38 that is located closer to the second portion 33.

Access to the first and/or second electronic components may be enabled by using dismountable covers (e.g., which can snap or slide in and out of place). In one embodiment, the smartglasses include a first dismountable cover that is placed over the first electronic components, and a second dismountable cover that is placed over the second electronic components. Optionally, the electric wires are wired in the second portion without having a dismountable cover placed over the second portion.

FIG. 1B illustrates one embodiment of the hollow mechanical structures used to mount the electronic components and wires. Hollow mechanical structure 43, which in this case is made of the same material for the three portions (32, 33, 34), includes a dismountable cover 42 for the first electronic components 35, and a dismountable cover 44 for the second electronic components 38 and. The electric wires 37 are wired in the hollow mechanical structure 43, without having a dismountable cover similar to covers 42 and 44. Wiring the electric wires 37 in the hollow mechanical structure 43, without having a dismountable cover, may provide the advantage of improving the mechanical durability of the second portion 33 to bending.

The hollow mechanical structure 43 may have different designs for its dismountable cover(s), such as (i) using a single dismountable cover for the three portions, (ii) using different dismountable covers for each of the portions 32, 33, and 34, or (iii) inserting one or more of the electronic components and/or the electric wires inside the hollow mechanical structure without having a cover for one or more of the portions. It is noted that although the dismountable covers are illustrated as being connected to the inner side of the frame, they can also be applied from the outer side of the frame. For example, some people may find it attractive to have a transparent cover from the outside.

Improving the fit of the smartglasses to their wearer may involve bending a temple, and in particular, bending the second portion, around the wearer's ear. Additionally or alternatively, in some embodiments, the temple may be bent inwards or outwards in order to improve the fit (e.g., by making the smartglasses' grip strong or weaker on the wearer's skull). In one embodiment, the second portion is designed to be bent inwards, towards the skull of a person wearing the smartglasses, to improve the smartglasses' fit.

Figure 1C:
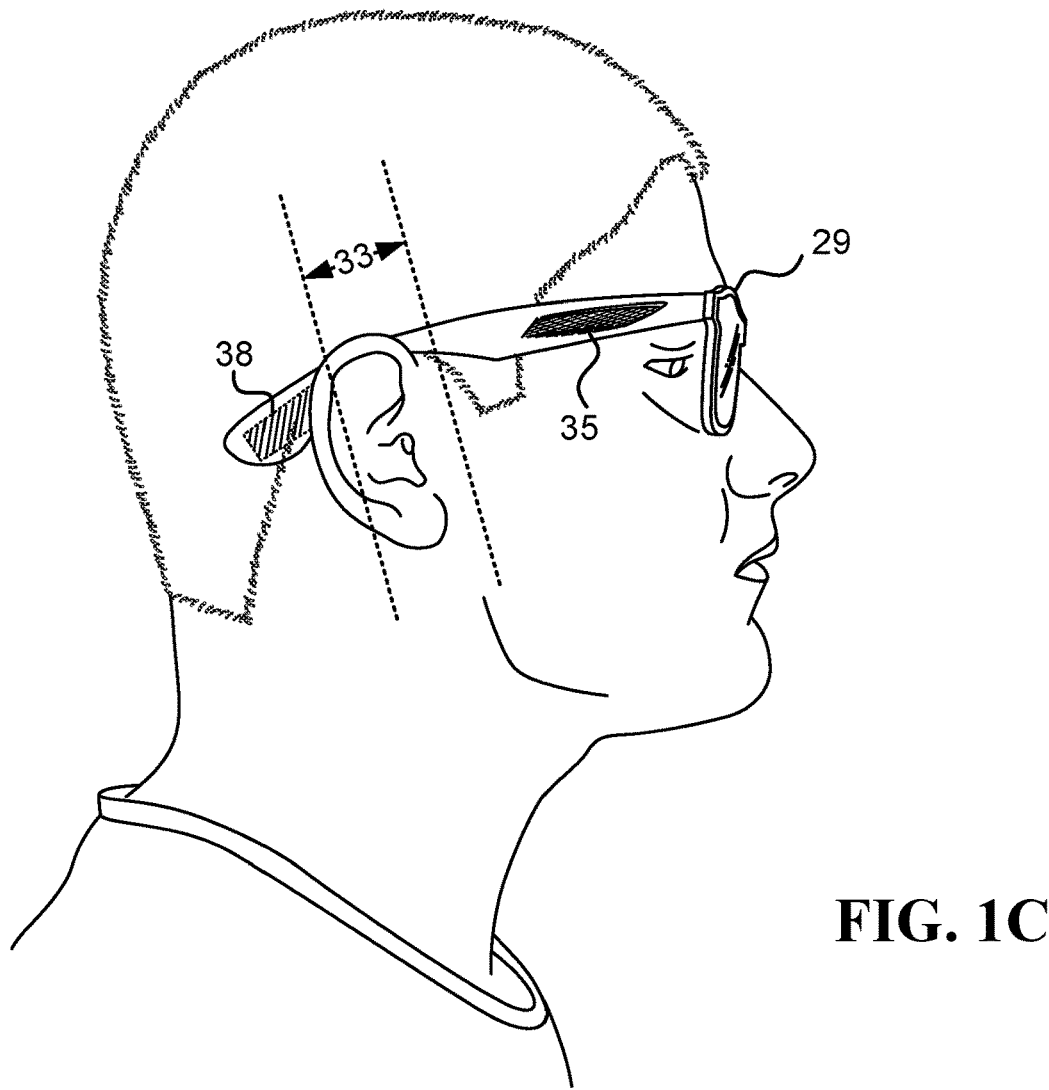
FIG. 1C illustrates an embodiment of smartglasses worn by a user.

FIG. 1C illustrates one embodiment of smartglasses 29 worn by a user. The smartglasses 29 include the first electronic components 35 that are not designed to be bent by an optician in order to improve the smartglasses' fit on the wearer, the second portion 33 (marked by the dotted lines) that is designed to be bent by the optician in order to improve the smartglasses' fit to the wearer (and at least includes electric wires), and the second electronic components 38 (such as a battery) that are also not designed to be bent by the optician in order to improve the smartglasses' fit to the wearer. Bending the second portion 33 may be done in different directions and/or orientations (e.g., over the ear and/or towards the skull).

In some embodiments, the smartglasses' frames may include markings (e.g., using a different color or texture), which designate boundaries within which the temples should be bent. In one example, the second portion is marked by markings showing boundaries of where it is safe to apply pressure to bend the second portion for fitting the smartglasses to its wearer. Such markings are illustrated in FIG. 1A, where the smartglasses 29 also include markings 46 showing boundaries of where to apply the pressure while bending the frame. These markings 46 may help an optician to ensure he/she does not harm the smartglasses when adjusting the frame to better fit the wearer.

Some embodiments of smartglasses may include electronic components coupled to the front end of the smartglasses. There can be various reasons for having electronic components in the front element. In some cases, sensors may be used to measure signals more accessible from the front, such as physiological signals of the user and/or images of the front of user's face. In some cases, having electronic components on the front element can reduce the amount of electronics on the temples, giving more flexibility when it comes to the smartglasses' design. This may be appealing to some users who may like features such as slim temples that look like they come from regular eyeglasses, in contrast to the prior art smartglasses that have thick temples. Other users mays desire titanium frames having flexible temples that are more comfortable to wear. However, none of the prior art smartglasses offer flexible temples because they all store rigid electronic components in the glasses' temples (side arms) in front of the wearer's temples.

In one embodiment, untethered smartglasses with wireless connectivity include at least a front element configured to support lenses and first electronic components and two temples, each coupled to the front element through a hinge that enables folding and unfolding. In this embodiment, at least one of the temples includes two portions: a first portion, coupled to the front element, comprising electric wires, and a second portion, coupled to the first portion, comprising second electronic components. At least a section of the first portion is designed to be bent around a human ear to improve the untethered smartglasses' fit, while the second portion is not designed to be bent to improve the untethered smartglasses' fit. Optionally, the section of the first portion comprises a flexible battery. For example, the flexible battery may be a flexible zinc-air battery or a flexible zinc-ion battery.

In one embodiment of the smartglasses described above, the electric wires are mounted in a first hollow mechanical structure, the second electronic components are mounted in a second hollow mechanical structure, and dominant materials of the first and second hollow mechanical structures are different. Optionally, at least one of the first and second hollow mechanical structures is made of a well-known material used in the eyeglasses industry for eyeglasses frames, such as a plastic frame material and/or a metal frame material. In one example, a dominant material of the first hollow mechanical structure is metal designed to be bent to improve the smartglasses' fit, and a dominant material of the second hollow mechanical structure is plastic that is not designed to be bent to improve the smartglasses' fit.

Various electronic components may be coupled to the front element of these smartglasses. In one embodiment, the first electronic components comprise a microphone, a contact photoplethysmography device in a nose pad of the front element, and a temperature sensor. In one example, the temperature sensor may be a contact temperature sensor, which may be located adjacent to the PPG sensor, or in the other nose pad. In another example, the temperature sensor may be a non-contact temperature sensor, such as a thermopile pointed at the forehead or at an area of skin around an eye of the wearer.

In another embodiment, the first electronic components comprise an inward-facing sensor configured to measure a person wearing the smartglasses, and the first portion is flexible. Examples of inward-facing sensors configured to measure the person wearing the smartglasses are sensors used for imaging of the person and/or sensors used for eye tracking.

Figure 2:
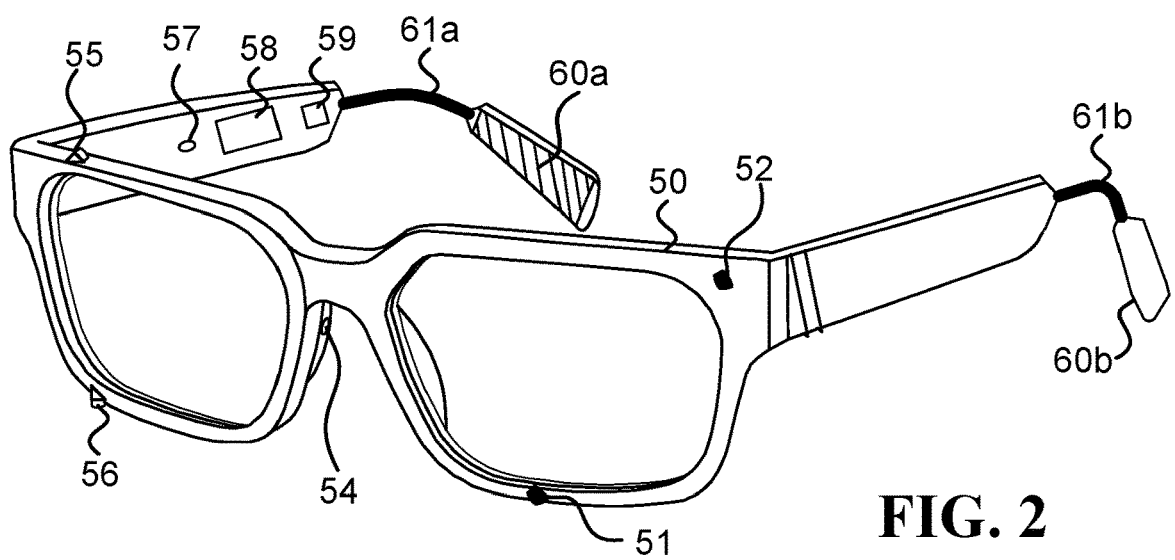
FIG. 2 illustrates an embodiment of smartglasses that include batteries located behind the ears.

FIG. 2 illustrates one embodiment of smartglasses 50 that include batteries (60a, 60b) located behind the ears (when the smartglasses are worn), and various sensors located in front of the ears, such as a microphone 51, an outward-facing camera 52, a contact PPG sensor 54, an inward-facing camera 55, a downward-facing camera 56, a microphone 57, a thermal camera 58, and an inertial measurement unit 59. In one example, the electronic components located in front of the ear are mounted in first hollow mechanical structures made of plastic that is formed utilizing a mold, the electric wires above the ears are mounted in second hollow mechanical structures (61a and 61b) made of a relatively flexible metal (such as titanium tubes), and the electronic components located behind the ears (such as batteries) are mounted in third hollow mechanical structures made of plastic and rubber formed utilizing molds. The combination of using a relatively flexible material for the portions above the ears, and using stiffer materials for the portions before and after the ears, results in novel untethered smartglasses frame that can be easily fitted to a person wearing the untethered smartglasses, without compromising the mechanical protection provided to the electronic components that are not designed to be bent.

The following are terms and considerations that may be relevant to embodiments described in this disclosure.

Herein the terms "photoplethysmogram signal", "photoplethysmographic signal", "photoplethysmography signal", and other similar variations are interchangeable and refer to the same type of signal. A photoplethysmogram signal may be referred to as a "PPG signal", or an "iPPG signal" when specifically referring to a PPG signal obtained from a camera. The terms "photoplethysmography device", "photoplethysmographic device", "photoplethysmogram device", and other similar variations are also interchangeable and refer to the same type of device that measures a signal from which it is possible to extract the photoplethysmogram signal. The photoplethysmography device may be referred to as "PPG device".

Sentences in the form of "a sensor configured to measure a signal indicative of a photoplethysmogram signal" refer to at least one of: (i) a contact PPG device, such as a pulse oximeter that illuminates the skin and measures changes in light absorption, where the changes in light absorption are indicative of the PPG signal, and (ii) a non-contact camera that captures images of the skin, where a computer extracts the PPG signal from the images using an imaging photoplethysmography (iPPG) technique. Other names known in the art for iPPG include: remote photoplethysmography (rPPG), remote photoplethysmographic imaging, remote imaging photoplethysmography, remote-PPG, multi-site photoplethysmography (MPPG), camera-based blood perfusion, camera-based hemoglobin concentration, and camera-based blood flow. Additional names known in the art for iPPG from facial images include: facial hemoglobin concentration map, facial hemoglobin concentration changes, dynamic hemoglobin concentration/information extraction, facial blood flow map, facial blood flow changes, facial blood pulsation, facial blood perfusion, and transdermal optical imaging.

A PPG signal is often obtained by using a pulse oximeter, which illuminates the skin and measures changes in light absorption. Another possibility for obtaining the PPG signal is using an imaging photoplethysmography (iPPG) device. As opposed to contact PPG devices, iPPG does not require contact with the skin and is obtained by a non-contact sensor, such as a video camera.

A time series of values measured by a PPG device, which is indicative of blood flow changes due to pulse waves, is typically referred to as a waveform (or PPG waveform to indicate it is obtained with a PPG device). Analysis of PPG signals usually includes the following steps: filtration of a PPG signal (such as applying bandpass filtering and/or heuristic filtering), extraction of feature values from fiducial points in the PPG signal (and in some cases may also include extraction of feature values from non-fiducial points in the PPG signal), and analysis of the feature values.

One type of features that is often used when performing calculations involving PPG signals involves fiducial points related to the waveforms of the PPG signal and/or to functions thereof (such as various derivatives of the PPG signal). There are many known techniques to identify the fiducial points in the PPG signal, and to extract the feature values. Examples of features that can be extracted from the PPG signal, together with schematic illustrations of the feature locations on the PPG signal, can be found in the following four publications and their references: (i) Charlton, Peter H., et al. "Assessing mental stress from the photoplethysmogram: a numerical study." Physiological measurement 39.5 (2018): 054001; (ii) Ahn, Jae Mok. "New aging index using signal features of both photoplethysmograms and acceleration plethysmograms." Healthcare informatics research 23.1 (2017): 53-59; (iii) Peltokangas, Mikko, et al. "Parameters extracted from arterial pulse waves as markers of atherosclerotic changes: performance and repeatability." IEEE journal of biomedical and health informatics 22.3 (2017): 750-757; and (iv) Peralta, Elena, et al. "Optimal fiducial points for pulse rate variability analysis from forehead and finger photoplethysmographic signals." Physiological measurement 40.2 (2019): 025007. Although these four references describe manual feature selection, the features may be selected using any appropriate feature engineering technique, including using automated feature engineering tools.

Unless there is a specific reference to a specific derivative of the PPG signal, phrases of the form of "based on the PPG signal" refer to the PPG signal and any derivative thereof. Algorithms for filtration of the PPG signal (and/or the images in the case of iPPG), extraction of feature values from fiducial points in the PPG signal, and analysis of the feature values extracted from the PPG signal are well known in the art, and can be found for example in the following references: (i) Allen, John. "Photoplethysmography and its application in clinical physiological measurement." Physiological measurement 28.3 (2007); (ii) Elgendi, Mohamed. "On the analysis of fingertip photoplethysmogram signals." Current cardiology reviews 8.1 (2012); (iii) Holton, Benjamin D., et al. "Signal recovery in imaging photoplethysmography." Physiological measurement 34.11 (2013), (iv) Sun, Yu, and Nitish Thakor. "Photoplethysmography revisited: from contact to noncontact, from point to imaging." IEEE Transactions on Biomedical Engineering 63.3 (2015), (v) Kumar, Mayank, Ashok Veeraraghavan, and Ashutosh Sabharwal. "DistancePPG: Robust non-contact vital signs monitoring using a camera." Biomedical optics express 6.5 (2015), and (vi) Wang, Wenjin, et al. "Algorithmic principles of remote PPG." IEEE Transactions on Biomedical Engineering 64.7 (2016).

In the case of iPPG, the input comprises images having multiple pixels. The images from which the iPPG signal and/or hemoglobin concentration patterns are extracted may undergo various preprocessing to improve the signal, such as color space transformation, blind source separation using algorithms such as independent component analysis (ICA) or principal component analysis (PCA), and various filtering techniques, such as detrending, bandpass filtering, and/or continuous wavelet transform (CWT). Various preprocessing techniques known in the art that may assist in extracting iPPG signals from images are discussed in Zaunseder et al. (2018), "Cardiovascular assessment by imaging photoplethysmography—a review", Biomedical Engineering 63(5), 617-634.

Various embodiments described herein involve calculations based on machine learning approaches. Herein, the terms "machine learning approach" and/or "machine learning based approaches" refer to learning from examples using one or more approaches. Examples of machine learning approaches include: decision tree learning, association rule learning, regression models, nearest neighbors classifiers, artificial neural networks, deep learning, inductive logic programming, support vector machines, clustering, Bayesian networks, reinforcement learning, representation learning, similarity and metric learning, sparse dictionary learning, genetic algorithms, rule-based machine learning, and/or learning classifier systems. Herein, a "machine learning-based model" is a model trained using one or more machine learning approaches.

Herein, "feature values" (also known as feature vector, feature data, numerical features, and inputs) may be considered input to a computer that utilizes a model to perform the calculation of a value (e.g., an output, "target value", or label) based on the input. It is to be noted that the terms "feature" and "feature value" may be used interchangeably when the context of their use is clear. However, a "feature" typically refers to a certain type of value, and represents a property, while "feature value" is the value of the property with a certain instance (i.e., the value of the feature in a certain sample).

In addition to feature values generated based on measurements taken by sensors mentioned in a specific embodiment, at least some feature values utilized by a computer of the specific embodiment may be generated based on additional sources of data that were not specifically mentioned in the specific embodiment. Some examples of such additional sources of data include: contextual information, information about the user being, measurements of the environment, and values of physiological signals of the user obtained by other sensors.

Sentences in the form of "inward-facing head-mounted camera" refer to a camera configured to be worn on a user's head and to remain pointed at the region it captures (sometimes referred to as ROI), which is on the user's face, also when the user's head makes angular and lateral movements. A head-mounted camera (which may be inward-facing and/or outward-facing) may be physically coupled to a frame worn on the user's head, may be physically coupled to eyeglasses using a clip-on mechanism (configured to be attached to and detached from the eyeglasses), may be physically coupled to a hat or a helmet, or may be mounted to the user's head using any other known device that keeps the camera in a fixed position relative to the user's head.

The term "smartglasses" refers to any type of a device that resembles eyeglasses, which includes a frame configured to be worn on a user's head and electronics to operate one or more sensors.

The term "visible-light camera" refers to a non-contact device designed to detect at least some of the visible spectrum, such as a video camera with optical lenses and CMOS or CCD sensor; visible-light camera may be sensitive to near-infrared wavelengths below 1050 nanometer. The term "thermal camera" refers to a non-contact device that measures electromagnetic radiation having wavelengths longer than 2500 nanometer (nm) and does not touch the region it measures. A thermal camera may include one sensing element (pixel), or multiple sensing elements that are also referred to herein as "sensing pixels", "pixels", and/or focal-plane array (FPA). A thermal camera may be based on an uncooled thermal sensor, such as a thermopile sensor, a microbolometer sensor (where microbolometer refers to any type of a bolometer sensor and its equivalents), a pyroelectric sensor, or a ferroelectric sensor.

A reference to a "camera" herein may relate to various types of devices. In one example, a camera may be a visible-light camera. In another example, a camera may capture light in the ultra-violet range. In another example, a camera may capture near-infrared radiation (e.g., wavelengths between 750 and 2000 nm). And in still another example, a camera may be a thermal camera.

The term "temperature sensor" refers to a device that measures temperature and/or temperature change. The temperature sensor may be a contact thermometer (such as a thermistor, a thermocouple), and/or a non-contact thermal cameras (such as a thermopile sensor, a microbolometer sensor, or a cooled infrared sensor). Some examples of temperature sensors useful to measure skin temperature include: thermistors, thermocouples, thermoelectic effect, thermopiles, microbolometers, and pyroelectric sensors. Some examples of temperature sensors useful to measure environment temperature include: thermistors, resistance temperature detectors, thermocouples; thermopiles, and semiconductor-based sensors.

The term "movement sensor" refers to a sensor comprising one or more of the following components: a 3-axis gyroscope, a 3-axis accelerometer, and a magnetometer. The movement sensor may also include a sensor that measures barometric pressure.

The term "acoustic sensor" refers to a device that converts sound waves into an electrical signal. The acoustic sensor may be a microphone, such as a dynamic microphone, a piezoelectric microphone, a fiber-optic microphone, a Micro-Electrical-Mechanical System (MEMS) microphone, and/or other known sensors that measure sound waves.

Herein, the term "blood pressure" is indicative of one or more of the following: the systolic blood pressure of the user, the diastolic blood pressure of the user, and the mean arterial pressure (MAP) of the user. It is specifically noted that the term "blood pressure" is not limited to the systolic and diastolic blood pressure pair.

The terms "substance intake" or "intake of substances" refer to any type of food, beverage, medications, drugs, smoking/inhaling, and any combination thereof.

US Patent Application 2019/0223737A1, which is herein incorporated by reference in its entirety and is a previous patent application of the Applicant of this invention, discusses and illustrates in paragraphs 0040-0049, together with their associated drawings, various examples of head-mounted systems equipped with head-mounted cameras, which can be adapted to be utilized with some of the embodiments herein. For example, these paragraphs illustrate various inward-facing head-mounted cameras coupled to an eyeglasses frame, illustrate cameras that capture regions on the periorbital areas, illustrate an optional computer that may include a processor, memory, a battery and/or a communication module, illustrate inward-facing head-mounted cameras coupled to an augmented reality devices, illustrate head-mounted cameras coupled to a virtual reality device, illustrate head-mounted cameras coupled to a sunglasses frame, illustrate cameras configured to capture various regions, such as the forehead, the upper lip, the cheeks, and sides of the nose, illustrate inward-facing head-mounted cameras mounted to protruding arms, illustrate various inward-facing head-mounted cameras having multi-pixel sensors (FPA sensors) configured to capture various regions, illustrate head-mounted cameras that are physically coupled to a frame using a clip-on device configured to be attached/detached from a pair of eyeglasses in order to secure/release the device to/from the eyeglasses, illustrate a clip-on device holds at least an inward-facing camera, a processor, a battery, and a wireless communication module, illustrate right and left clip-on devices configured to be attached behind an eyeglasses frame, illustrate a single-unit clip-on device configured to be attached behind an eyeglasses frame, and illustrate right and left clip-on devices configured to be attached/detached from an eyeglasses frame and having protruding arms to hold the inward-facing head-mounted cameras.

It is noted that the elliptic and other shapes of the regions captured by cameras and other sensing devices (such as PSOG) in some of the drawings are just for illustration purposes, and the actual shapes of the regions are usually not as illustrated. Furthermore, illustrations and discussions of a camera represent one or more cameras, where each camera may have the same field of view (FOV) and/or different FOVs. A camera includes multiple sensing elements, and the illustrated region captured by the camera usually refers to the total region captured by the camera, which is made of multiple regions that are respectively captured by the different sensing elements. The positions of the cameras in the figures are just for illustration, and the cameras may be placed at other positions.

Various embodiments described herein involve a head-mounted system (HMS) that may be connected, using wires and/or wirelessly, with a device carried by the user and/or a non-wearable device. The HMS may include a battery, a computer, sensors, and a transceiver.

FIG. 34A and FIG. 34B are schematic illustrations of possible embodiments for computers (400, 410) that are able to realize one or more of the embodiments discussed herein that include a "computer". The computer (400, 410) may be implemented in various ways, such as, but not limited to, a microcontroller, a computer on a chip, a system-on-chip (SoC), a system-on-module (SoM), a processor with its required peripherals, a server computer, and/or any other computer form capable of executing a set of computer instructions. Further, references to a computer or a processor include any collection of one or more computers and/or processors (which may be at different locations) that individually or jointly execute one or more sets of computer instructions. This means that the singular term "computer" is intended to imply one or more computers, which jointly perform the functions attributed to "the computer". In particular, some functions attributed to the computer may be performed by a computer on a wearable device (e.g., smartglasses) and/or a computer of the user (e.g., smartphone), while other functions may be performed on a remote computer, such as a cloud-based server.

The computer 400 includes one or more of the following components: processor 401, memory 402, computer readable medium 403, user interface 404, communication interface 405, and bus 406. The computer 410 includes one or more of the following components: processor 411, memory 412, and communication interface 413.

Functionality of various embodiments may be implemented in hardware, software, firmware, or any combination thereof. If implemented at least in part in software, implementing the functionality may involve a computer program that includes one or more instructions or code stored or transmitted on a computer-readable medium and executed by one or more processors. Computer-readable media may include computer-readable storage media, which corresponds to a tangible medium such as data storage media, and/or communication media including any medium that facilitates transfer of a computer program from one place to another. Computer-readable medium may be any media that can be accessed by one or more computers to retrieve instructions, code, data, and/or data structures for implementation of the described embodiments. A computer program product may include a computer-readable medium. In one example, the computer-readable medium 403 may include one or more of the following: RAM, ROM, EEPROM, optical storage, magnetic storage, biologic storage, flash memory, or any other medium that can store computer readable data.

A computer program (also known as a program, software, software application, script, program code, or code) can be written in any form of programming language, including compiled or interpreted languages, declarative or procedural languages. The program can be deployed in any form, including as a standalone program or as a module, component, subroutine, object, or another unit suitable for use in a computing environment. A computer program may correspond to a file in a file system, may be stored in a portion of a file that holds other programs or data, and/or may be stored in one or more files that may be dedicated to the program. A computer program may be deployed to be executed on one or more computers that are located at one or more sites that may be interconnected by a communication network.

Computer-readable medium may include a single medium and/or multiple media (e.g., a centralized or distributed database, and/or associated caches and servers) that store one or more sets of instructions. In various embodiments, a computer program, and/or portions of a computer program, may be stored on a non-transitory computer-readable medium, and may be updated and/or downloaded via a communication network, such as the Internet. Optionally, the computer program may be downloaded from a central repository, such as Apple App Store and/or Google Play. Optionally, the computer program may be downloaded from a repository, such as an open source and/or community run repository (e.g., GitHub).

At least some of the methods described herein are "computer-implemented methods" that are implemented on a computer, such as the computer (400, 410), by executing instructions on the processor (401, 411). Additionally, at least some of these instructions may be stored on a non-transitory computer-readable medium.

As used herein, references to "one embodiment" (and its variations) mean that the feature being referred to may be included in at least one embodiment of the invention. Separate references to embodiments may refer to the same embodiment, may illustrate different aspects of an embodiment, and/or may refer to different embodiments.

Sentences in the form of "X is indicative of Y" mean that X includes information correlated with Y, up to the case where X equals Y. Sentences in the form of "provide/receive an indication (of whether X happened)" may refer to any indication method.

The word "most" of something is defined as above 51% of the something (including 100% of the something). Both a "portion" of something and a "region" of something refer to a value between a fraction of the something and 100% of the something. The word "region" refers to an open-ended claim language, and a camera said to capture a specific region on the face may capture just a small part of the specific region, the entire specific region, and/or a portion of the specific region together with additional region(s). The phrase "based on" indicates an open-ended claim language, and is to be interpreted as "based, at least in part, on". Additionally, stating that a value is calculated "based on X" and following that, in a certain embodiment, that the value is calculated "also based on Y", means that in the certain embodiment, the value is calculated based on X and Y. Variations of the terms "utilize" and "use" indicate an open-ended claim language, such that sentences in the form of "detecting X utilizing Y" are intended to mean "detecting X utilizing at least Y", and sentences in the form of "use X to calculate Y" are intended to mean "calculate Y based on X".

The terms "first", "second" and so forth are to be interpreted merely as ordinal designations, and shall not be limited in themselves. A predetermined value is a fixed value and/or a value determined any time before performing a calculation that utilizes the predetermined value. When appropriate, the word "value" may indicate a "predetermined value". The word "threshold" indicates a "predetermined threshold", which means that the value of the threshold, and/or the logic used to determine whether the threshold is reached, is known before start performing computations to determine whether the threshold is reached.

The embodiments of the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the order of steps of the methods, or to details of implementation of the devices, set in the description, drawings, or examples. Moreover, individual blocks illustrated in the figures may be functional in nature and therefore may not necessarily correspond to discrete hardware elements.

Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the embodiments. Accordingly, this disclosure is intended to embrace all such alternatives, modifications, and variations that fall within the spirit and scope of the appended claims and their equivalents.

The remainder of this disclosure includes descriptions of various embodiments of head-mounted systems. Some of these systems may be implemented using untethered smart-glasses with wireless connectivity, such as embodiments described further above and/or illustrated in FIG. 1A to FIG. 1C or FIG. 2.

Figure 3A:
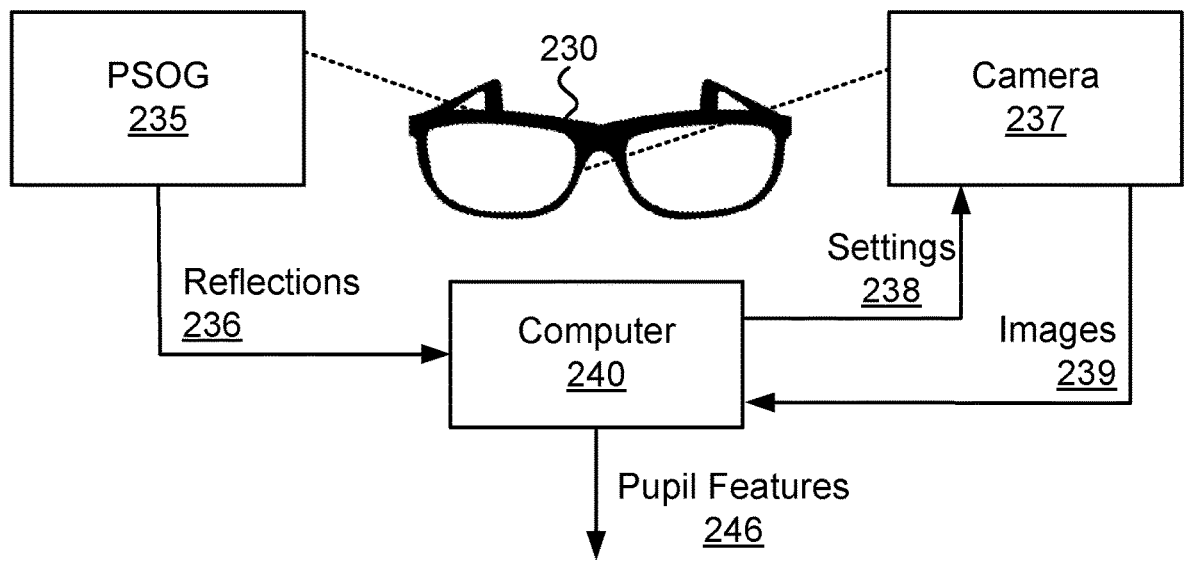
FIG. 3A illustrates an embodiment of an eye tracking system.

FIG. 3A illustrates an embodiment of an eye tracking system. In some embodiments, the system includes at least a photosensor-oculography device (PSOG) 235 that emits light and to measures reflections 236 of the light from an eye of a user, a camera 237 that captures images 239 of the eye of a user, and a computer 240 that utilizes the reflections 236 and the images 239 to perform operations involved in tracking the eye of the user. It is noted that a phrase such as "images of the eye" is to be interpreted as images of at least portions of the eye and/or the eyelid.

In one embodiment, the computer 240 is configured to calculate values indicative of eye movement velocity (EMV) based on the reflections 236 measured by the PSOG 235, and utilize the values to determine settings 238 that control how data is read from the camera 237. Optionally, the computer 240 reads data from the camera 237 at a higher bitrate when the values are indicative of the EMV being below a threshold compared to a lower bitrate at which data is read from the camera 237 when the values are indicative of the EMV being above the threshold. Additionally or alternatively, the computer 240 may calculate pupil features 246, based on the images 239, at a higher rate when the values are indicative of the EMV being below a threshold compared to when the values are indicative of the EMV being above the threshold The term "oculography" as used herein refers to measuring eye position and/or eye movements of either one eye or both eyes (monocular or binocular). When supported by the system, oculography may also measure other eye parameters, such as pupil diameter and/or extent of blinking.

The terms "photosensor-oculography" and "photosensor-oculography device" (PSOG) as used herein refer to measuring eye position and/or eye movements (or equivalents thereof), of either one eye or both eyes, based on the principle of emitting light and capturing the reflected light from the user's eye surface and/or eyelid with discrete photosensors. Alternative terms known in the art for PSOG include PS-OG, photoelectric-technique, infrared-oculography, infrared-reflectance-oculography, limbus-reflection-technique, and eye tracking based on steering a beam through MEMS. The following reference, which is incorporated herein by reference, provides a review of PSOG techniques: Rigas, Ioannis, Hayes Raffle, and Oleg V. Komogortsev "Photosensor oculography: Survey and parametric analysis of designs using model-based simulation" IEEE Transactions on Human-Machine Systems 99 (2018): 1-12.

The term "discrete photosensors" refers to very-low resolution light detectors that are relatively low cost and low power, such as photosensitive sensors, photodetectors, photodiodes, Light Emitting Diodes (LEDs) having a bi-directional characteristic with the ability to emit the light and to measure reflections, single detectors, split detectors, four-quadrant detectors, position-sensitive detectors, photo reflective sensors (for modules combining both the emitter and receiver), sensors with less than a thousand sensing pixels on the same substrate (i.e., the term discrete photosensor is not limited to a single-pixel photosensor), and arrays with direct wire connections to each pixel supporting parallel readout. The definition of discrete photosensors explicitly excludes camera sensors having thousands/millions of pixels that are equipped with suitable optics for so many pixels, such as CCD and CMOS video camera sensors having thousands/millions of pixels.

PSOG, as defined herein, may also be implemented using a scanning light beam. For example, U.S. Pat. No. 10,317, 672 and U.S. patent applications 2018/0210547, 2019/ 0204912, and 2019/0204913 to AdHawk Microsystems describe a version of PSOG that is based on steering a light beam using a microelectromechanical system (MEMS) onto a surface of the eye, and detecting light reflected from features of the eye with one or more photosensors. In another example, US patent application 2020/0285307 to Microsoft Technology Licensing LLC describes another version of PSOG that is based on steering a light beam using MEMS and through a display module assembly onto the eye, and detecting the reflections with one or more photodetectors. In still another example, the thesis Zhao, Hongfan "Micro-Scanning Mirror based Eye-tracking Technology" (2020) describes still another version of PSOG that is based on a scanning-micro-mirror to scan a laser beam on the eyeball, and a linear array photodetector to detect the light reflected from the eyeball.

Sentences in the form of "calculate Y based on the reflections measured by the PSOG" are to be interpreted in the context of the structure and operation of the PSOG. For example, when the PSOG includes multiple light sources and multiple discrete photosensors, the reflections are indicative of which light source is emitting at a given time and intensities of the corresponding measured reflections due to those emissions. In a second example, the PSOG includes a scanning light beam and multiple discrete photosensors, and the reflections are indicative of the directions of the scanning light beam and the corresponding reflections measured by the photosensors. In a third example, the reflections are indicative of one or more of the following eye parameters calculated by the PSOG: eye position, eye movement, eye movement velocity, upper and/or lower eyelid position, and blinking.

The term "video-oculography" (VOG) as used herein refers to measuring eye position and/or eye movements (or equivalents thereof), of either one eye or both eyes, based on processing of images captured by one or more video cameras. Alternative terms known in the art for video-oculography include "video-based eye-tracker", "video based eye-gaze tracking", "Infrared OcculoGraphy", "video-nystagmography", and "infrared video in electronystagmography". The following references, which are incorporated herein by reference, provide reviews of video-oculography techniques and their usages: (i) Tonsen, Marc, Chris Kay Baumann, and Kai Dierkes "A High-Level Description and Performance Evaluation of Pupil Invisible" arXiv preprint arXiv:2009.00508 (2020), (ii) Cristina, Stefania, and Kenneth P Camilleri "Unobtrusive and pervasive video-based eye-gaze tracking" Image and Vision Computing 74 (2018): 21-40, and (iii) Brunyé, Tad T., et al. "A review of eye tracking for understanding and improving diagnostic interpretation" Cognitive research: principles and implications 4.1 (2019): 1-16.

In some embodiments, the VOG camera captures intensities, such as the cameras used by the above VOG references, and the images captured by the camera represent the intensities measured by the pixels. In alternative embodiments, the VOG camera may be an event camera (also known as a neuromorphic camera, silicon retina, or dynamic vision sensor) that outputs data comprising pixel-level brightness changes. The pixel of the event camera operate independently and asynchronously, and report changes in brightness as they occur. When the camera is an event camera, the word "images" in sentences in the form of "a camera configured to capture images (of the eye)" refer to data captured by the camera, such as (i) images reconstructed based on events reported by the event camera, such as disclosed by U.S. Pat. No. 10,466,779 that is incorporated herein by reference, (ii) events converted into synchronous dense, image-like representations, which can be processed by traditional machine learning methods developed for standard cameras, such as disclosed by Messikommer, Nico, et al. "Event-based Asynchronous Sparse Convolutional Networks" arXiv preprint arXiv:2003.09148 (2020), and/or (iii) images comprising both intensities and events, such as disclosed by U.S. Pat. No. 10,466,779 and/or by the reference Angelopoulos, Anastasios N., et al. "Event Based, Near Eye Gaze Tracking Beyond 10,000 Hz" arXiv preprint arXiv:2004.03577 (2020), which are incorporated herein by reference.

The one or more emitting components of the VOG and/or PSOG systems (e.g., LEDs, lasers) may be coupled to the head-mounted system at various positions suitable to emit light to the wearer's eyes, such as: emitters embedded in a head-mounted frame, emitters embedded in the smartglasses' temples, emitters embedded in a display (e.g., a microLED display with IR emitters located in front of the eye, such as disclosed in U.S. patent application 2020/ 0335032), and/or emitters configured to direct their light to the eye through a waveguide (e.g., emitters coupled to an augmented reality display module waveguide located in front of the eyes, such as disclosed in U.S. patent application 2020/0285307). The one or more sensing components of the VOG and/or PSOG systems (e.g., photosensors, cameras) may be coupled to the head-mounted system at various positions suitable to receive light reflected from the eye, such as: photosensors embedded in a head-mounted frame, photosensors embedded in the smartglasses' temples, photosensors embedded in a display located in front of the eye, and/or photosensors configured to receive the reflected light from a waveguide (e.g., photosensors coupled to an augmented reality display module waveguide located in front of the eyes).

When tracking the eye positions at the same rate, PSOG consumes significantly less power than VOG, and thus PSOG is considered low-power relative to VOG. The reference Rigas, Ioannis, Hayes Raffle, and Oleg V. Komogortsev "Hybrid ps-v technique: A novel sensor fusion approach for fast mobile eye-tracking with sensor-shift aware correction" IEEE Sensors Journal 17.24 (2017): 8356-8366, (referred to herein as Rigas 2017, and is incorporated herein by reference), discloses a system combining VOG and PSOG, which is able to calibrate sensor shifts affecting the PSOG models based on the accurate results of the VOG. Although the hybrid eye tracker of Rigas 2017 reduced the power consumption significantly, the reduction is not sufficient for a lightweight HMS, and as a result both the authors of Rigas 2017, and all the other authors of the publications citing Rigas 2017, directed their efforts towards developing a standalone PSOG (without VOG) that is robust to sensor shifts. Three examples of the current research directions following Rigas 2017 include (i) Zemblys, Raimondas, and Oleg Komogortsev "Making stand-alone PS-OG technology tolerant to the equipment shifts" Proceedings of the 7th Workshop on Pervasive Eye Tracking and Mobile Eye-Based Interaction, 2018, (ii) Katrychuk, Dmytro, Henry K. Griffith, and Oleg V. Komogortsev "Power-efficient and shift-robust eye-tracking sensor for portable VR headsets" Proceedings of the 11th ACM Symposium on Eye Tracking Research & Applications, 2019, and (iii) Li, Richard, et al. "Optical Gaze Tracking with Spatially-Sparse Single-Pixel Detectors" arXiv preprint arXiv:2009.06875 (2020). However, the inventors of this invention do not overwhelmingly agree with the current trend of aspiring to a standalone PSOG (which is also taken by the above cited references discussing PSOG with MEMS scanning beam). The inventors believe it is better to further optimize the power consumption and/or the hardware architecture and operation of the combined VOG and PSOG system, as described below.

Some of the disclosed embodiments combine VOG and PSOG in two main ways. The first way is to operate the PSOG essentially independently from the VOG, and to use the high-rate low-power PSOG measurements to optimize the performance of the lower-rate higher-power VOG system. And the second way is to use the more accurate VOG to correct errors in the PSOG, while optimizing the operation of the VOG based on the PSOG measurements, in order to improve the performances of known methods (such as Rigas 2017) to make them suitable for wireless HMS.

In one embodiment, a sensor fusion algorithm for combining the VOG and PSOG measurements includes the following steps: In step 1, the computer receives images from the head-mounted camera, and determines the eye position based on at least one of the images. The computer may also determine gaze based on images of both eyes. The gaze may be relative to the frame used to mount the cameras, relative to the user's head, and/or relative to other suitable coordinates known in the art.

In step 2, the computer calculates one or more values related to the eye based on the reflections. In one example, the reflections include identification of the light source emitting the light and intensities of the corresponding measured reflections measured by the PSOG, and calculates one or more values related to the eye, such as eye position, eye movement, and/or eye movement velocity. Usually, the PSOG measurements have lower latency and lower accuracy compared to the VOG measurements.

And in step 3, the computer fuses the VOG and PSOG measurements for at least one of (i) calibrating the PSOG models based on the VOG results, and (ii) improving the accuracy of the higher-frequency lower-accuracy PSOG results based on the lower-frequency higher-accuracy VOG results. Examples of known algorithms, useful for sensor fusion that combines the VOG and PSOG measurements, include Kalman filter, Bayesian network, and convolutional neural network. The fused measurements may also be used to predict future values related to the eye, such as a future eye position or a future gaze direction. In some examples, these future values are used for foveated rendering, for setting the camera's windowing parameters, for setting the camera's timings of capturing images, and/or for setting the camera's smart binning parameters.

In one embodiment, the camera 237 and the computer 240 are head-mounted, the PSOG 235 is more power-efficient than the camera 237, and the threshold is 40°/second. The eye tracking system illustrated in FIG. 3A can save power by reducing the bitrate at which the data is read from the camera 237 when the values calculated based on the reflections 236 are indicative of the EMV exceeding the threshold. In one example, the PSOG 235 consumes below 1 mW while VOG (using the camera 237) consumes above 100 mW for eye tracking at the same rate. Because the higher the bitrate read from the camera 237 the more power consumed by the VOG system, using the PSOG 235 to trigger reading the camera 237 when the values are indicative of the EMV being below the threshold should reduce the power consumption of the system. Examples of values for the threshold may be around 40°/second (i.e., angular speed of the eye of 40° per second), to cover normal smooth pursuits the threshold may be up to 30°/second, and the threshold may be around 100°/second to cover fast smooth pursuits combined with catch-up saccades.

Figure 3B:
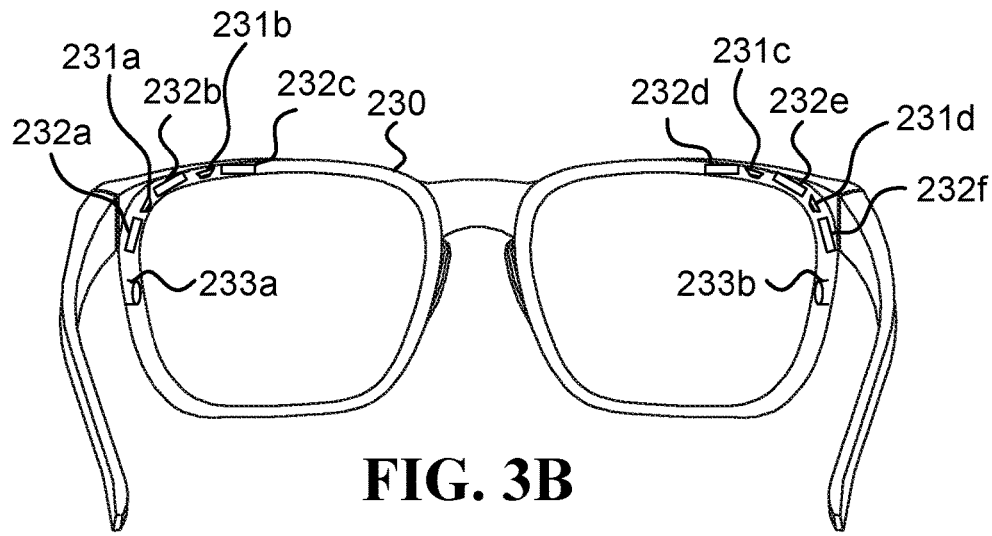
FIG. 3B illustrates an embodiment of an eye tracking system that tracks both eyes, which utilizes multiple light sources and detectors to track each eye.

In another embodiment, the camera 237 may belong to a non-head-mounted battery-operated mobile device, the computer 240 may include, in this embodiment, a head-mounted computer and a non-head-mounted computer, which are configured to communicate over a wireless communication channel. In this embodiment, reducing the bitrate at which the data is read from the camera 237 when the values are indicative of the EMV exceeding the threshold may reduce power consumption of the non-head-mounted device. Such a scenario is illustrated in FIG. 3D, where the camera 237 is embedded in a non-head-mounted battery-operated mobile device (a smartphone 244), while the PSOG 235 is part of a head-mounted device (smartglasses 243). Thus, in this example references to "the computer 240" may refer to a head-mounted computer 241a (e.g., a processor of the smartglasses 243) and/or a non-head-mounted computer 241b (e.g., a processor in the smartphone 244).

The computer 240 may utilize, in some embodiments, the values indicative of the EMV, to detect eye fixations, smooth pursuit eye movements, and/or saccades, and to read the data from the camera 237 at different bitrates during the eye fixations, the smooth pursuit, and the saccades. Optionally, average bitrates at which the data is read from the camera 237 during the eye fixations and the smooth pursuit eye movements are at least three times greater than an average bitrate at which the data is read from the camera 237 during saccades.

Different eye tracking parameters may bring different values in different scenarios/experiments. These differences can help the system to save power by using the EMV to set the computer to read the data from the camera at different bitrates during eye fixation, smooth pursuits, and saccades. For example, when a researcher is interested in spatial attention, eye tracking data during a smooth pursuit may be more valuable than eye tracking data during fixation, and thus the system can save power by reading the data from the camera at a higher bitrate during smooth pursuits versus the bitrate at which data is read during eye fixations. And when the researcher is more interested in generating a heat map representing visual attention, then eye tracking data obtained during a fixation may be more valuable than eye tracking data obtained during a smooth pursuit, and the system may read the data from the camera at a higher bitrate during fixations versus the bitrate at which data is read during smooth pursuits.

Extensive eye movements can be indicative of unrest of the user. In one embodiment, the computer 240 sums durations during which the EMV exceeded the threshold, and responsive to the sum reaching a second threshold, commands a user interface to present a calming message to the user (e.g., by displaying text with the message to the user or playing to the message via headphones worn by the user). In one example, the calming message may include an instruction to close the eyes and relax, or be a message that comes from a digital therapist application that is run in order to help the user to relax.

Images captured during extensive eye movements can be less useful than images captured while the eye is not moving very fast. In one embodiment, the computer 240 is configured to set timing of the camera 237 to capture above 80% of the images 239 when the values are indicative of the EMV being below the threshold. In one example, when having the EMV be above the threshold indicates saccades, and on average, images captured when there are no saccades are sharper than images captured during saccades.

Data that includes both PSOG and VOG can be used to train models for power-efficient eye tracking. In one embodiment, the computer 240 is configured to: calculate eye positions and/or eye movements based on analysis of the images 239 (image-based positions), generate labels based on the image-based positions, generate feature values based on the reflections, and provide the labels and feature values to train a machine learning-based model for detecting eye positions and/or eye movements based on the reflections.

PSOG, as the term is used herein, may involve utilization of one or more light sources and/or one or more detectors, such as discrete photosensors, that detect reflections of the light emitted from the one or more light sources (and possibly external light sources too).

Figure 3C:
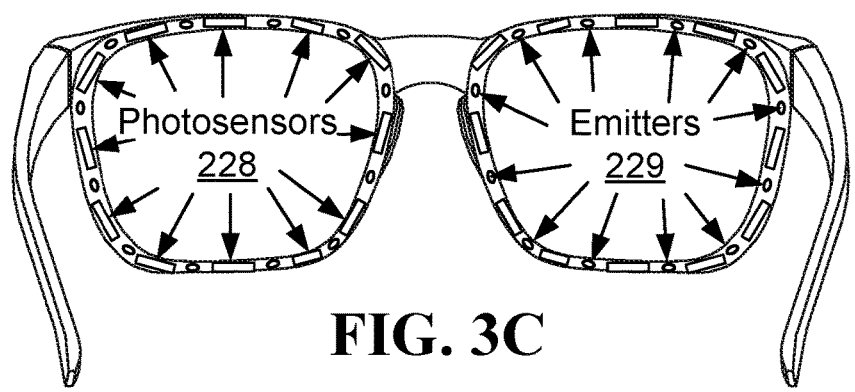
FIG. 3C illustrates smartglasses with a photosensor-oculography device (PSOG) that utilizes multiple light sources and multiple detectors.
Figure 3D:
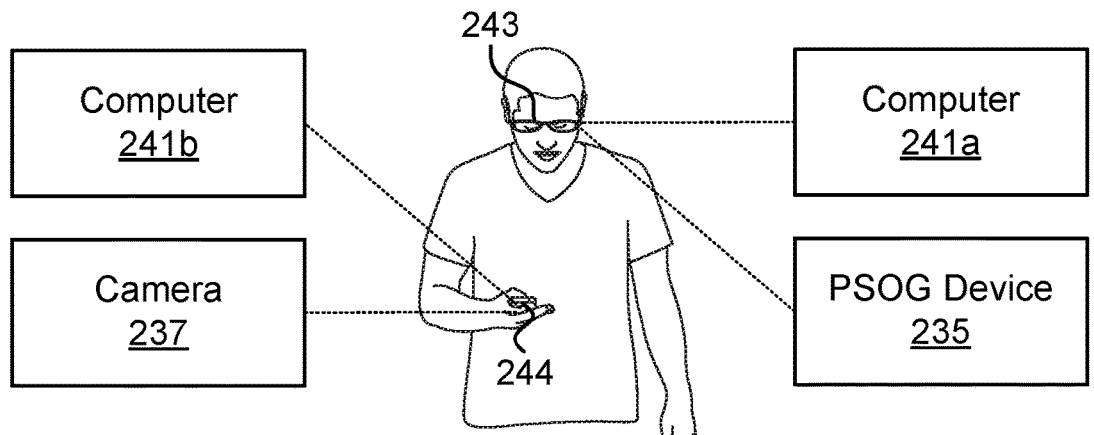
FIG. 3D illustrates an embodiment of an eye tracking system that includes a camera belonging to a non-head-mounted battery-operated mobile device.

FIG. 3C illustrates smartglasses with PSOG that utilizes multiple light sources and multiple detectors. Coupled to the frame of the smartglasses, around each of the lenses are multiple photosensors 228 and multiple light sources (emitters 229), which are interleaved between the photosensors 228. It is to be noted that the emitters and photosensors are present on the frame around both lenses, but for the sake of clarity the photosensors 228 are designated on the left side and the emitters 229 are designated on the right side.

In one embodiment, the PSOG 235 includes: at least two light sources configured to emit the light, and at least three discrete photosensors configured to measure the reflections. Optionally, the discrete photosensors are spread over more than 2 cm. Herein, a "photosensitive sensor" refers to a sensor suitable to measure amount of light reaching the sensor (according to one or more of the disclosed embodiments). Examples of photosensitive sensors include photodiodes, photodetectors, photosensors, active-pixel sensors, CMOS sensors, and CCD sensors. A photosensitive sensor may be utilized just to measure light, or have a bi-directional characteristic with the ability to emit light and to measure reflections, as further described below.

In another embodiment, the PSOG 235 comprises at least two Light Emitting Diodes (LEDs) having a bi-directional characteristic with the ability to emit the light and to measure the reflections. An LED is sensitive to wavelengths equal to or shorter than the predominant wavelength it emits. The LED provides illumination when a forward voltage is applied to its electrical terminals, and acts as photo detector/photodiode for example by the following three steps: (i) apply a reverse voltage pulse for a short duration, (ii) discharge the LED's capacitance immediately afterwards, and (iii) measure the voltage across the LED to determine how much discharge of capacitance took place after a certain time. This technique is well known in the art and is further explained in publications such as (A) Akşit, Kaan, Jan Kautz, and David Luebke "Gaze-Sensing LEDs for Head Mounted Displays" arXiv preprint arXiv:2003.08499 (2020), and (B) Dietz, Paul, William Yerazunis, and Darren Leigh "Very low-cost sensing and communication using bidirectional LEDs" International Conference on Ubiquitous Computing, Springer, Berlin, Heidelberg, 2003.

FIG. 3B illustrates an embodiment of an eye tracking system that tracks both eyes, which utilizes multiple light sources and detectors to track each eye. The illustrated system includes smartglasses 230 that have PSOG can VOG to track both eyes. Tracking of the left eye is done utilizing a PSOG that includes multiple light sources (emitters 231a and 231b in the figure) as well as multiple detectors (photosensors 232a, 232b, and 232c). Additionally, video camera 233a may be utilized to capture images of the left eye, which can be used to determine positions and/or movements of the left eye. In a similar fashion, tracking the right eye is done in this embodiment utilizing another PSOG that includes additional light sources (emitters 231c and 231d in the figure) as well as additional multiple detectors (photosensors 232d, 232e, and 232f) and an additional video camera 233b that may be utilized to capture images of the right eye.

Knowing positions and/or movements of both eyes can be utilized to estimate the gaze of the user. In one embodiment, the eye tracking system includes an additional PSOG (e.g., as illustrated in FIG. _3.1B_). In this embodiment, the computer 240 is further configured to calculate gaze direction based on the reflections measured by the PSOG 235 and the additional PSOG.

Light sources may be utilized in different ways in order to conserve power and/or improve quality of images taken by the eye tracking system. In one embodiment, the computer 240 is configured to command the PSOG 235 to emit light with a higher intensity while the images 239 are being taken, compared to the average intensity of light emitted by the PSOG 235 during measurement of the reflections 236 while the images 239 are not being taken. In another embodiment, in which the PSOG 235 comprises multiple light sources configured to emit the light, for most measurements of the reflections 236, the PSOG 235 emits light from a single light source at a time, and for most of the images 239 that are captured, the PSOG 235 emits light from multiple light sources during the exposure time of the camera 237.

In one embodiment, the computer 240 utilizes at least one of photosensitive sensors utilized by the PSOG 235 to detect a flickering timing of ambient light, and set the camera 237 to capture the images 239 as a function of the flickering timing. For example, when capturing images during more light flickering periods improves the quality of the captured images, the computer may operate the camera according to the flickering timings in order to capture more images during the flickering periods.

In one embodiment, the PSOG 235 is mounted to a smartglasses frame comprising progressive ophthalmic lenses, and the computer is further configured to: receive an indication that the user is characterized as diabetic, detect, based on the values indicative of the EMV, shortening of averaged fixation periods, and command a user interface to suggest to the user to check his/her blood sugar level. The shortening of the averaged fixation periods may be indicative of diabetic retinopathy.

In another embodiment, the PSOG 235 is mounted to a smartglasses frame comprising progressive ophthalmic lenses, and the computer 240 is further configured to: receive an indication that the user suffers from dry eye syndrome, detect, based on the values indicative of the EMV, shortening of averaged fixation periods, and command a user interface to suggest to the user to treat the dry eye condition. The shortening of the averaged fixation periods may be indicative of the eye being too dry The following method may be used by systems modeled according to FIG. 3A. The steps described below may be performed by running a computer program having instructions for implementing the method. Optionally, the instructions may be stored on a computer-readable medium, which may optionally be a non-transitory computer-readable medium. In response to execution by a system including a processor and memory, the instructions cause the system to perform the following steps:

In Step 1, emitting light and measuring reflections of the light from an eye of a user by a photosensor-oculography device (PSOG).

In Step 2, capturing images of the eye by a camera.

In Step 3, calculating values indicative of eye movement velocity (EMV) based on the reflections.

And in Step 4, reading data from the camera at a higher bitrate when the values are indicative of the EMV being below a threshold compared to when the values are indicative of the EMV being above the threshold.

In one embodiment, the method may optionally include the following steps: detecting, based on the values indicative of the EMV, eye fixations, smooth pursuit eye movements, and saccades, and reading the data from the camera at different bitrates during the eye fixations, the smooth pursuit, and the saccades. Optionally, average bitrates at which the data is read from the camera during the eye fixations and the smooth pursuit eye movements are at least three times greater than an average bitrate at which the data is read from the camera during saccades.

In another embodiment, the method may optionally include the following steps: calculating eye positions and/or eye movements based on analysis of the images (image-based positions), generating labels based on the image-based positions, generating feature values based on the reflections, and providing the labels and feature values to train a machine learning-based model for detecting eye positions and/or eye movements based on the reflections.

This paragraph discloses claims that the Applicant may file in a continuation-in-part (CIP) patent application. 1. An eye tracking system comprising: a photosensor-oculography device (PSOG) configured to emit light and to measure reflections of the light from an eye of a user; a camera configured to capture images of the eye; and a computer configured to: calculate values indicative of eye movement velocity (EMV) based on the reflections measured by the PSOG; and read data from the camera at a higher bitrate when the values are indicative of the EMV being below a threshold compared to when the values are indicative of the EMV being above the threshold. 2.

The eye tracking system of claim 1, wherein the camera and the computer are head-mounted, the PSOG is more power-efficient than the camera, and the threshold is 40°/second; whereby the eye-tracking system saves power by reducing the bitrate at which the data is read from the camera when the values are indicative of the EMV exceeding the threshold. 3. The eye tracking system of claim 1, wherein the computer is further configured to detect, based on the values indicative of the EMV, eye fixations, smooth pursuit eye movements, and saccades, and to read the data from the camera at different bitrates during the eye fixations, the smooth pursuit, and the saccades; and wherein average bitrates at which the data is read from the camera during the eye fixations and the smooth pursuit eye movements are at least three times greater than an average bitrate at which the data is read from the camera during saccades. 4. The eye tracking system of claim 1, wherein the camera belongs to a non-head-mounted battery-operated mobile device, the computer comprises a head-mounted computer and a non-head-mounted computer, which are configured to communicate over a wireless communication channel, and reducing the bitrate at which the data is read from the camera when the values are indicative of the EMV exceeding the threshold reduces power consumption of the non-head-mounted device. 5. The eye tracking system of claim 1, wherein the computer is further configured to sum durations during which the EMV exceeded the threshold, and responsive to the sum reaching a second threshold, command a user interface to present a calming message to the user. 6. The eye tracking system of claim 1, wherein the computer is further configured to: calculate eye positions and/or eye movements based on analysis of the images (image-based positions), generate labels based on the image-based positions, generate feature values based on the reflections, and provide the labels and feature values to train a machine learning-based model for detecting eye positions and/or eye movements based on the reflections. 7.

The eye tracking system of claim 1, further comprising another PSOG configured to emit light and to measure reflections of the light from the other eye of the user, and the computer is further configured to calculate gaze direction based on the reflections measured by the PSOG and the another PSOG. 8. The eye tracking system of claim 1, wherein the computer is further configured to set timing of the camera to capture above 80% of the images when the values are indicative of the EMV being below the threshold; whereby the EMV above the threshold indicates saccades, and on average, images captured when there are no saccades are sharper than images captured during saccades. 9. The eye tracking system of claim 1, wherein the PSOG comprises: at least two light sources configured to emit the light, and at least three discrete photosensors configured to measure the reflections; wherein the discrete photosensors are spread over more than 2 cm. 10. The eye tracking system of claim 1, wherein the PSOG comprises at least two Light Emitting Diodes (LEDs) having a bi-directional characteristic with the ability to emit the light and to measure the reflections. 11. The eye tracking system of claim 1, wherein the computer is further configured to command the PSOG to emit light with a higher intensity while the images are being taken, compared to average intensity of light emitted by the PSOG during measurement of the reflections while the images are not being taken. 12. The eye tracking system of claim 1, wherein the PSOG comprises multiple light sources configured to emit the light; wherein, for most measurements of the reflections, the PSOG is configured to emit light from a single light source at a time, and for most of the images that are captured, the PSOG is configured to emit light from multiple light sources during exposure time of the camera. 13. The eye tracking system of claim 1, wherein the computer is further configured to utilize at least one of photosensitive sensors utilized by the PSOG to detect a flickering timing of ambient light, and set the camera to capture the images as a function of the flickering timing. 14. The eye tracking system of claim 1, wherein the PSOG is mounted to a smartglasses frame comprising progressive ophthalmic lenses, and the computer is further configured to: receive an indication that the user is characterized as diabetic, detect, based on the values indicative of the EMV, shortening of averaged fixation periods, and command a user interface to suggest to the user to check his/her blood sugar level; whereby the shortening of the averaged fixation periods may be indicative of diabetic retinopathy. 15. The eye tracking system of claim 1, wherein the PSOG is mounted to a smartglasses frame comprising progressive ophthalmic lenses, and the computer is further configured to: receive an indication that the user suffers from dry eye syndrome, detect, based on the values indicative of the EMV, shortening of averaged fixation periods, and command a user interface to suggest to the user to treat the dry eye condition; whereby the shortening of the averaged fixation periods may be indicative of the eye being too dry. 16. A method comprising: emitting light and measuring reflections of the light from an eye of a user by a photosensor-oculography device (PSOG); capturing images of the eye by a camera; calculating values indicative of eye movement velocity (EMV) based on the reflections; and reading data from the camera at a higher bitrate when the values are indicative of the EMV being below a threshold compared to when the values are indicative of the EMV being above the threshold.

17. The method of claim 16, further comprising detecting, based on the values indicative of the EMV, eye fixations, smooth pursuit eye movements, and saccades, and reading the data from the camera at different bitrates during the eye fixations, the smooth pursuit, and the saccades; wherein average bitrates at which the data is read from the camera during the eye fixations and the smooth pursuit eye movements are at least three times greater than an average bitrate at which the data is read from the camera during saccades.

18. The method of claim 16, further comprising calculating eye positions and/or eye movements based on analysis of the images (image-based positions), generating labels based on the image-based positions, generating feature values based on the reflections, and providing the labels and feature values to train a machine learning-based model for detecting eye positions and/or eye movements based on the reflections.

19. A non-transitory computer readable medium storing one or more computer programs configured to cause a processor based system to execute steps comprising: emitting light and measuring reflections of the light from an eye of a user by a photosensor-oculography device (PSOG); capturing images of the eye by a camera; calculating values indicative of eye movement velocity (EMV) based on the reflections; and reading data from the camera at a higher bitrate when the values are indicative of the EMV being below a threshold compared to when the values are indicative of the EMV being above the threshold.

20. The non-transitory computer readable medium of claim 19, further comprising detecting, based on the values indicative of the EMV, eye fixations, smooth pursuit eye movements, and saccades, and reading the data from the camera at different bitrates during the eye fixations, the smooth pursuit, and the saccades; wherein average bitrates at which the data is read from the camera during the eye fixations and the smooth pursuit eye movements are greater than an average bitrate at which the data is read from the camera during saccades.

Utilization of PSOG in eye tracking systems, e.g., as illustrated in FIG. 3A can be useful for saving power. In particular, PSOG may be a useful type of device for a battery operated head-mounted systems that are expected to be as low-power as possible. However, in most cases the measurements obtained with the PSOG are insufficient for accurately calculating the pupil diameter from its reflections, thus head-mounted systems will often include a camera-based system, which consumes more power than the PSOG, and is used for calculating the pupil diameter based on images. By being selective regarding when to calculate the pupil diameter based on the images, such as at times in which knowing the pupil diameter is more meaningful (i.e., not during saccadic movements), such systems may save power.

In one embodiment, an eye tracking system includes at least the PSOG 235, which is configured to emit light and to measure the reflections 236 of the light from an eye of a user, the camera 237, which configured to capture the images 239 of the eye, and the computer 240 that is configured to calculate values indicative of eye movement velocity (EMV) based on the reflections measured by the PSOG, and to calculate pupil features 246, based on the images, at a higher rate when the values are indicative of the EMV being below a threshold compared to when the values are indicative of the EMV being above the threshold. Optionally, the pupil features 246 comprise at least one of: a pupil center location, a pupil contour, a pupil diameter, glint location, a glint-pupil vector, a Haar-like feature, a result of an ellipse fitting approach, and a result of pupil edge filtering.

Pupil features for VOG, such as the aforementioned, are well known in the art, and discussed for example in the reference Fuhl, Wolfgang, et al. "Pupil detection for head-mounted eye tracking in the wild: an evaluation of the state of the art" Machine Vision and Applications 27.8 (2016): 1275-1288.

In one embodiment, the computer 240 is configured to calculate the pupil features 246 during eye fixations at a rate that is at least three times higher than a rate at which the pupil features are calculated during saccades.

In one embodiment, the camera 237 belongs to a non-head-mounted battery-operated mobile device, and the computer 240 comprises a head-mounted computer and a non-head-mounted computer, which are configured to communicate over a wireless communication channel. Optionally, reducing the rate at which the pupil features are calculated when the values are indicative of the EMV exceeding the threshold saves power for the non-head-mounted device. For example, the head-mounted computer may be embedded in smartglasses, the non-head-mounted computer may be embedded in a mobile phone, the camera may be the front-facing camera of the mobile phone, the mobile phone may run an eye tracker, the wireless communication channel may be Bluetooth Low Energy, and the threshold the EMV may be selected to exclude saccades. FIG. 3D illustrates such an embodiment. This example reduces the power consumption of running the eye tracker on the mobile phone by making it unnecessary for the mobile phone's eye tracker to attempt to calculate pupil features during saccades. One example of a mobile phone eye tracker, which can be adapted to save power by refraining from analyzing images taken during saccades, is the multi-layer feed-forward convolutional neural network eye tracker disclosed in the reference Valliappan, Nachiappan, et al. "Accelerating eye movement research via accurate and affordable smartphone eye tracking" Nature communications (2020).

In one embodiment, the camera 237 is an inward-facing head-mounted camera, and the computer 240 is further configured to utilize the values indicative of the EMV in order to operate the camera at a higher frame rate when the values are indicative of the EMV being below the threshold compared to when the values are indicative of the EMV exceeding the threshold.

In one embodiment, the eye tracking system includes another PSOG configured to emit light and to measure reflections of the light from the other eye of the user, and the computer is further configured to calculate gaze direction based on the reflections measured by the PSOG and the another PSOG.

In one embodiment, the computer 240 is further configured to set timing of the camera 237 to capture above 80% of the images when the values are indicative of the EMV being below the threshold. Optionally, an EMV is above the threshold indicates saccades, and on average, images captured when there are no saccades are sharper than images captured during saccades.

In another embodiment, the computer 240 is further configured to identify saccades based on the values, and to utilize identifications of saccades for timing the camera to capture above 80% of the images when there are no saccades. Optionally, on average, images captured when there are no saccades are sharper than images captured during saccades.

In yet another embodiment, the computer 240 is further configured to identify saccades based on the values, and calculate the pupil diameter, based on the images, at a higher rate during periods without saccades compared to saccadic periods. Optionally, there is less visual processing during saccades and therefore it is less valuable to measure changes in pupil diameter during saccades.

In one embodiment, due to optical design of the camera 237 and location of the camera relative to the eye, images of the pupil are sharper when a gaze direction of the user is in a first direction compared to when the gaze direction of the user is in a second direction. In this embodiment, the computer 240 is further configured to calculate eye position based on the reflections 236, and to save power by calculating the pupil features more frequently based on images taken while the gaze direction is in the first direction compared to images taken while the gaze direction is in the second direction.

In one embodiment, the PSOG comprises: at least two light sources configured to emit the light, and at least three discrete photosensors configured to measure the reflections; wherein the discrete photosensors are spread over more than 2 cm.

In another embodiment, the PSOG comprises at least two Light Emitting Diodes (LEDs) having a bi-directional characteristic with the ability to emit the light and to measure the reflections.

In one embodiment, the camera 237 utilizes a sensor comprising more than 100 pixels, the camera 237 further comprises a lens, and the camera's sensor plane is tilted by more than 2° relative to the camera's lens plane, according to the Scheimpflug principle in order to capture sharper images.

In one embodiment, the computer 240 is further configured to calculate eye position based on the reflections 236 at a rate that is at least ten times higher than a rate at which the pupil features are calculated based on the images 239. This difference in the rate of calculating the eye position based on the reflections versus the rate of the calculating the pupil features based on the images further may further reduce the power consumption of the eye tracking system.

In some embodiments, timing the periods during which the light is emitted by the PSOG 235 according to the flickering timing of the ambient light improves the signal-to-noise ratio of the measured reflections, which improves the computer's ability to calculate the eye-related data based on the reflections measured by the PSOG 235. In one embodiment, the computer 260 is further configured to utilize at least one of photosensitive sensors utilized by the PSOG 235 to detect a flickering timing of ambient light, and adjust periods during which the light is emitted by the PSOG 235 according to the flickering timing of the ambient light. Optionally, the periods during which the light is emitted are timed to coincide with periods between the flickering of the ambient light. Optionally, the periods during which the light is emitted are timed to coincide with periods of low intensity ambient light from a flickering ambient light source.

In one embodiment, the computer 240 is further configured to sum durations during which the EMV exceeded the threshold, and responsive to the sum reaching a second threshold, command a user interface to present a calming message to the user.

The following method may be used by systems modeled according to FIG. 3A. The steps described below may be performed by running a computer program having instructions for implementing the method. Optionally, the instructions may be stored on a computer-readable medium, which may optionally be a non-transitory computer-readable medium. In response to execution by a system including a processor and memory, the instructions cause the system to perform the following steps:

In Step 1, emitting light and measuring reflections of the light from an eye of a user by a photosensor-oculography device (PSOG).

In Step 2, capturing images of the eye by a camera.

In Step 3, calculating values indicative of eye movement velocity (EMV) based on the reflections.

And in Step 4, calculating pupil features, based on the images, at a higher rate when the values are indicative of the EMV being below a threshold compared to when the values are indicative of the EMV being above the threshold.

In one embodiment, Step 4 involves calculating pupil features during eye fixations at a rate that is at least three times higher than a rate at which the pupil features are calculated during saccades.

In one embodiment, the method may optionally include a step of utilizing the EMV in order to operate the camera at a higher frame rate when the values are indicative of the EMV being below the threshold compared to when the values are indicative of the EMV exceeding the threshold.

In one embodiment, the method optionally includes a step of setting timing of the camera to capture above 80% of the images when the values are indicative of the EMV being below the threshold. The EMV being above the threshold may be indicative of saccades, and on average, images captured when there are no saccades are sharper than images captured during saccades.

In one embodiment, the method optionally includes a step of identifying saccades based on the values, and utilizing identifications of the saccades for timing the camera to capture above 80% of the images when there are no saccades. Optionally, on average, images captured when there are no saccades are sharper than images captured during saccades.

In one embodiment, the method optionally includes a step of identifying saccades based on the values, and calculating the pupil diameter, based on the images, at a higher rate during periods without saccades compared to saccadic periods. Optionally, there is less visual processing during saccades and therefore it is less valuable to measure changes in pupil diameter during saccades.

This paragraph discloses claims that the Applicant may file in a continuation-in-part (CIP) patent application. 1. An eye tracking system comprising: a photosensor-oculography device (PSOG) configured to emit light and to measure reflections of the light from an eye of a user; a camera configured to capture images of the eye; and a computer configured to: calculate values indicative of eye movement velocity (EMV) based on the reflections measured by the PSOG; and calculate pupil features, based on the images, at a higher rate when the values are indicative of the EMV being below a threshold compared to when the values are indicative of the EMV being above the threshold. 2. The eye tracking system of claim 1, wherein the pupil features comprise at least one of: pupil center location, a pupil contour, a pupil diameter, glint location, a glint-pupil vector, a Haar-like feature, a result of an ellipse fitting approach, and a result of pupil edge filtering; and wherein the computer is configured to calculate the pupil features during eye fixations at a rate that is at least three times higher than a rate at which the pupil features are calculated during saccades. 3. The eye tracking system of claim 1, wherein the computer is further configured to set timing of the camera to capture above 80% of the images when the values are indicative of the EMV being below the threshold; whereby the EMV above the threshold indicates saccades, and on average, images captured when there are no saccades are sharper than images captured during saccades. 4. The eye tracking system of claim 1, wherein the computer is further configured to identify saccades based on the values, and to utilize identifications of the saccades for timing the camera to capture above 80% of the images when there are no saccades; whereby, on average, images captured when there are no saccades are sharper than images captured during saccades. 5. The eye tracking system of claim 1, wherein the computer is further configured to identify saccades based on the values, and to calculate a pupil diameter, based on the images, at a higher rate during periods without saccades compared to saccadic periods; whereby there is less visual processing during saccades and therefore it is less valuable to measure changes in pupil diameter during saccades. 6. The eye tracking system of claim 1, wherein, due to optical design of the camera and location of the camera relative to the eye, images of the pupil are sharper when a gaze direction of the user is in a first direction compared to when the gaze direction of the user is in a second direction; and the computer is further configured to calculate eye position based on the reflections, and to save power by calculating the pupil features more frequently based on images taken while the gaze direction is in the first direction compared to images taken while the gaze direction is in the second direction. 7.

The eye tracking system of claim 1, wherein the camera belongs to a non-head-mounted battery-operated mobile device, and the computer comprises a head-mounted computer and a non-head-mounted computer, which are configured to communicate over a wireless communication channel; whereby reducing the rate at which the pupil features are calculated when the values are indicative of the EMV exceeding the threshold saves power for the non-head-mounted device. 8. The eye tracking system of claim 1, wherein the camera is an inward-facing head-mounted camera, and the computer is further configured to utilize the EMV in order to operate the camera at a higher frame rate when the values are indicative of the EMV being below the threshold compared to when the values are indicative of the EMV exceeding the threshold; and further comprising another PSOG configured to emit light and to measure reflections of the light from the other eye of the user, and the computer is further configured to calculate gaze direction based on the reflections measured by the PSOG and the another PSOG. 9. The eye tracking system of claim 1, wherein the PSOG comprises: at least two light sources configured to emit the light, and at least three discrete photosensors configured to measure the reflections; wherein the discrete photosensors are spread over more than 2 cm; and wherein the camera utilizes a sensor comprising more than 100 pixels, the camera further comprises a lens, and the camera's sensor plane is tilted by more than 2° relative to the camera's lens plane, according to the Scheimpflug principle in order to capture a sharper image. 10. The eye tracking system of claim 1, wherein the PSOG comprises at least two Light Emitting Diodes (LEDs) having a bi-directional characteristic with the ability to emit the light and to measure the reflections; and wherein the computer is further configured to calculate eye position based on the reflections at a rate that is at least ten times higher than a rate at which the pupil features are calculated based on the images. 11. The eye tracking system of claim 1, wherein the computer is further configured to command the PSOG to emit light with a higher intensity while the images are being taken, compared to the average intensity of light emitted by the PSOG during measurement of the reflections while the images are not being taken. 12. The eye tracking system of claim 1, wherein the PSOG comprises multiple light sources configured to emit the light; wherein, for most measurements of the reflections, the PSOG is configured to emit light from a single light source at a time, and for most of the images that are captured, the PSOG is configured to emit light from multiple light sources during the exposure time of the camera. 13. The eye tracking system of claim 1, wherein the computer is further configured to utilize at least one of photosensitive sensors utilized by the PSOG to detect a flickering timing of ambient light, and adjust periods during which the light is emitted according to the flickering timing of the ambient light, such that most periods during which the light is emitted are timed to coincide with periods between the flickering of the ambient light. 14. The eye tracking system of claim 1, wherein the computer is further configured to sum durations during which the EMV exceeded the threshold, and responsive to the sum reaching a second threshold, command a user interface to present a calming message to the user. 15.

A method comprising: emitting light and measuring reflections of the light from an eye of a user by a photosensor-oculography device (PSOG); capturing images of the eye by a camera; calculating values indicative of eye movement velocity (EMV) based on the reflections; and calculating pupil features, based on the images, at a higher rate when the values are indicative of the EMV being below a threshold compared to when the values are indicative of the EMV being above the threshold. 16. The method of claim 15, wherein the pupil features are calculated during eye fixations at a rate that is at least three times higher than a rate at which the pupil features are calculated during saccades. 17. The method of claim 15, further comprising utilizing the EMV in order to operate the camera at a higher frame rate when the values are indicative of the EMV being below the threshold compared to when the values are indicative of the EMV exceeding the threshold. 18. The method of claim 15, further comprising setting timing of the camera to capture above 80% of the images when the values are indicative of the EMV being below the threshold; whereby the EMV being above the threshold may be indicative of saccades, and on average, images captured when there are no saccades are sharper than images captured during saccades. 19.

The method of claim 15, further comprising identifying saccades based on the values, and calculating the pupil diameter, based on the images, at a higher rate during periods without saccades compared to saccadic periods; whereby there is less visual processing during saccades and therefore it is less valuable to measure changes in pupil diameter during saccades. 20. A non-transitory computer readable medium storing one or more computer programs configured to cause a processor based system to execute steps comprising: emitting light and measuring reflections of the light from an eye of a user by a photosensor-oculography device (PSOG); capturing images of the eye by a camera; calculating values indicative of eye movement velocity (EMV) based on the reflections; and calculating pupil features, based on the images, at a higher rate when the values are indicative of the EMV being below a threshold compared to when the values are indicative of the EMV being above the threshold.

Figure 4:
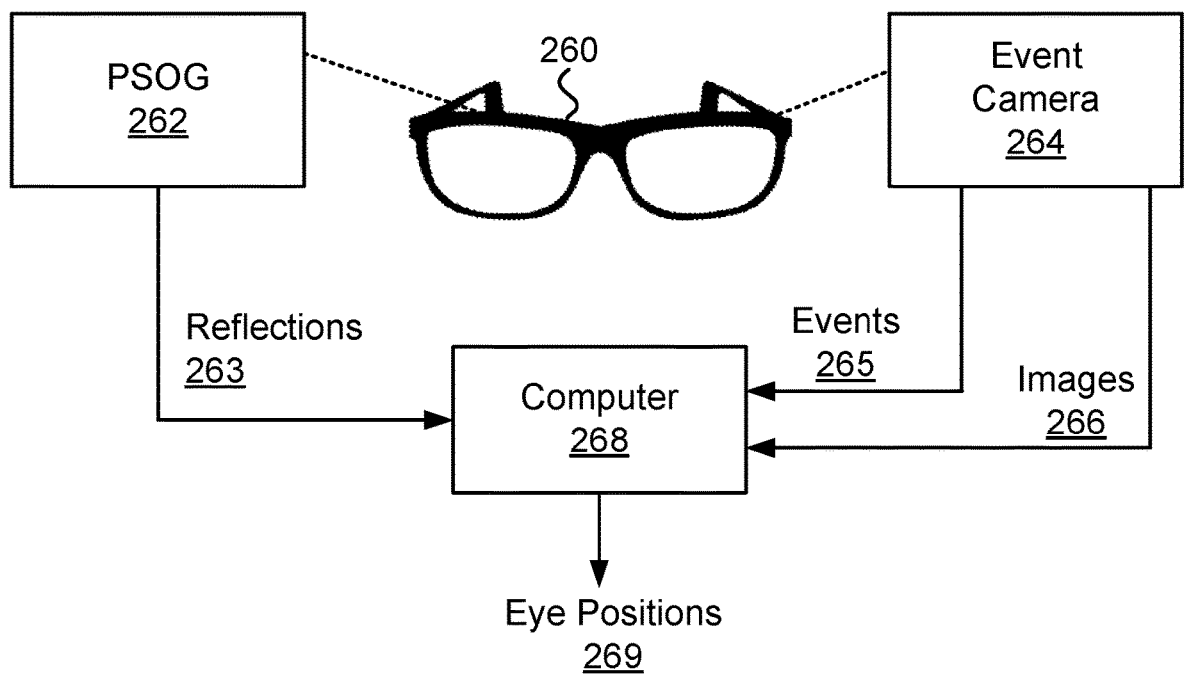
FIG. 4 illustrates an embodiment of an eye tracking system that utilizes an event camera.

FIG. 4 illustrates an embodiment of an eye tracking system that utilizes an event camera. In some embodiments, the system includes at least a photosensor-oculography device (PSOG 262), which is configured to emit light and to measure reflections 263 of the light from an eye of a user, an event camera 264 configured to capture the eye and to provide events 265, and a computer 268 that calculate positions of the eye (eye positions 269) based on the events 265 and the reflections 263. Optionally, the light emitted by the PSOG 260 is in a first spectrum band, the event camera 264 is configured to capture the eye at a second spectrum band, and the first and second spectrum bands are disjoint. In one embodiment, for the first and second spectrum bands to be disjoint, the event camera is equipped with a filter that attenuates more than 95%, more than 98%, or more than 99.9% of the first spectrum band. In another embodiment, the light emitted by the PSOG 260 is in a first spectrum band, and the event camera is equipped with a filter that attenuates more than 98% of the first spectrum band.

In one embodiment, the computer 268 operates the event camera 264 in a normal mode during eye movements faster than a threshold, and operates the event camera 264 in a low-power mode during fixations or refrains from processing the events 265 during the fixations. Optionally, the computer 268 calculates the eye positions 269 based on the reflections 263 during the fixations.

In one embodiment, the computer 268 operates the PSOG 262 in a normal mode during fixations, and detects when the eye movements reach the threshold based on the reflections 263. Optionally, the computer 268 operates the PSOG 262 in a low-power mode during eye movements faster than the threshold, and calculates the eye positions 269 based on the events 265 during the eye movements that are faster than the threshold.

In some embodiments, the total power consumed by the event camera is higher than the total power consumed by the PSOG. Therefore, the eye tracker can save power by measuring the eye movements based on the PSOG (possibly without the events) when the eye movements are slower than the threshold, and measuring the eye movements based on the events (possibly without the PSOG) when the eye movements are faster than the threshold. The threshold for the eye movements may be selected according to one or more of the following considerations: (i) performances, accuracy, and/or delay of the PSOG as a function of the eye movement velocity, (ii) performances, accuracy, and/or delay of the event camera as a function of the eye movement velocity, and (iii) power consumption of the PSOG vs power consumption of the event camera as a function of the eye movement velocity to be tracked. For example, the threshold for the eye movements may be 100°/second for a system that operates the PSOG at a relatively low frequency that is not designed to measure saccades. Alternatively, the threshold for the eye movements may be 400°/second for a system that operates the PSOG at a higher frequency that enables it to measure normal saccades.

In some embodiments, the computer may utilize the events 254 to incrementally update eye positions calculated based on the reflections 264.

In one embodiment, a fusion algorithm that utilizes the events to incrementally update eye positions calculated based on the reflections includes the following steps: In step 1, set an initial eye position based on the reflections; In step 2, receive events and calculate updated eye positions by adding shifts obtained from the events to the initial eye position until new reflections are received. And in step 3, go back to step 1 to set the initial eye position based on the new reflections.

In one embodiment, the event camera is able to measure changes at a much higher rate compared to the PSOG. Thus, the eye tracker fills eye positions from the event camera between at least some of the eye positions from the PSOG. Optionally, the computer is further configured to calculate based on the reflections a stream of main eye positions, and to calculate based on the events intermediate streams of eye positions which are located between at least some of the main eye positions. Optionally, average delay between eye positions in the intermediate streams is much shorter than average delay between the main eye positions.

In one embodiment, the event camera 264 is head-mounted, and a first range of eye positions trackable from the reflections 263 is broader than a second range of eye positions trackable from the events 265. Optionally, the computer 268 calculates the eye positions 269 based on the reflections 263 when the eye positions are outside the second range.

In another embodiment, the computer 268 calculates eye positions and/or eye movements based on analysis of the events (event-based positions), generates labels based on the event-based positions, generates feature values based on the reflections, and provides the labels and feature values to train a machine learning-based model for detecting eye positions and/or eye movements based on the reflections.

In one embodiment, the event camera 264 captures frame images 266 of the eye at a rate that is significantly lower than a rate at which the reflections 263 are measured by the PSOG 262. Optionally, the computer 268 processes the events 265, the reflections 263, and the frame images 266 concurrently.

Concurrent processing of events and frame images captured by an event camera is described for example in the reference Angelopoulos, Anastasios N., et al. "Event Based, Near Eye Gaze Tracking Beyond 10,000 Hz" arXiv preprint arXiv:2004.03577 (2020). Adding the PSOG-based eye positions (which are not incremental updates like the events) improves the robustness of the model and may enable the event camera to lower the rate of capturing the frame images. One example for the significantly lower frame rate includes a system with a camera that captures the frame images at a rate of 5 Hz combined with a PSOG that operates at a rate of 1,000 Hz.

In one embodiment, the computer 268 operates the event camera 264 in a normal mode during eye movements faster than a threshold, while eyelids covering the eye are open, and operates the event camera 264 in a low-power mode while the eyelids are closed or refrains from processing the events 265 while the eyelids are closed. Optionally, the computer 268 detects opening of the eyelids based on the reflections 263.

In one embodiment, the computer 268 utilizes the eye positions 269, which are calculated based on the events 265 and the reflections 263, for calibration in calculations of eye positions based on the reflections 263. Optionally, calculating eye positions based on the reflections 263 consumes less power compared to calculating eye positions based on the events 265.

The following method may be used by systems modeled according to FIG. 4. The steps described below may be performed by running a computer program having instructions for implementing the method. Optionally, the instructions may be stored on a computer-readable medium, which may optionally be a non-transitory computer-readable medium. In response to execution by a system including a processor and memory, the instructions cause the system to perform the following steps:

In Step 1, emitting light and measuring reflections of the light from an eye of a user by a photosensor-oculography device (PSOG).

In Step 2, capturing the eye and providing events by an event camera.

And in Step 3, calculating positions of the eye (eye positions) based on the events and the reflections.

In one embodiment, the method may optionally include a step involving utilizing the events to incrementally update eye positions calculated based on the reflections.

In one embodiment, the method may optionally include the following steps: calculating based on the reflections a stream of main eye positions, and calculating based on the events intermediate streams of eye positions which are located between at least some of the main eye positions. Optionally, average delay between eye positions in the intermediate streams is much shorter than average delay between the main eye positions.

In one embodiment, a first range of eye positions trackable from the reflections is broader than a second range of eye positions trackable from the events, and the method includes a step of calculating the eye positions based on the reflections when the eye positions are outside the second range.

In one embodiment, the method may optionally include the following steps: calculating eye positions and/or eye movements based on analysis of the events (event-based positions), generating labels based on the event-based positions, generating feature values based on the reflections, and providing the labels and feature values to train a machine learning-based model for detecting eye positions and/or eye movements based on the reflections.

In one embodiment, the method may optionally a step of capturing, by the event camera, frame images of the eye at a rate that is significantly lower than a rate at which the reflections are measured by the PSOG. Optionally, processing the events, the reflections, and the frame images is done concurrently.

In one embodiment, the method may optionally include the following steps: operating the event camera in a normal mode during saccades, operating the event camera in a low-power mode during fixations or refraining from processing the events during the fixations, and calculating the eye positions during the fixations based on the reflections.

In one embodiment, the method may optionally involve operating the event camera in a normal mode during saccades, operating the event camera in a low-power mode while the eyelids are closed or refraining from processing the events while the eyelids are closed, and detecting opening of the eyelids based on the reflections.

This paragraph discloses claims that the Applicant may file in a continuation-in-part (CIP) patent application. 1. An eye tracking system, comprising: a photosensor-oculography device (PSOG) configured to emit light and to measure reflections of the light from an eye of a user; an event camera configured to capture the eye and to provide events; and a computer configured to calculate positions of the eye (eye positions) based on the events and the reflections measured by the PSOG. 2. The eye tracking system of claim 1, wherein the light emitted by the PSOG is in a first spectrum band, the event camera is configured to capture the eye at a second spectrum band, and the first and second spectrum bands are disjoint. 3. The eye tracking system of claim 1, wherein the light emitted by the PSOG is in a first spectrum band, and the event camera is equipped with a filter that attenuates more than 98% of the first spectrum band. 4. The eye tracking system of claim 1, wherein the computer is further configured to operate the event camera in a normal mode during eye movements faster than a threshold, to operate the event camera in a low-power mode during fixations or refrain from processing the events during the fixations, and to calculate the eye positions based on the reflections during the fixations. 5. The eye tracking system of claim 4, wherein the computer is further configured to operate the PSOG in a normal mode during fixations, to detect the eye movements reaching the threshold based on the reflections, to operate the PSOG in a low-power mode during eye movements faster than the threshold, and to calculate the eye positions based on the events during the eye movements that are faster than the threshold. 6. The eye tracking system of claim 1, wherein the event camera is head-mounted, and a first range of eye positions trackable from the reflections is broader than a second range of eye positions trackable from the events, and the computer is configured to calculate the eye positions based on the reflections when the eye positions are outside the second range. 7. The eye tracking system of claim 1, wherein the computer is further configured to utilize the events to incrementally update eye positions calculated based on the reflections. 8. The eye tracking system of claim 1, wherein the computer is further configured to calculate based on the reflections a stream of main eye positions, and to calculate based on the events intermediate streams of eye positions which are located between at least some of the main eye positions; whereby, on an average, time that elapses between calculation of consecutive eye positions in the intermediate streams is much shorter than average time that elapses between calculation of consecutive eye positions from among the main eye positions. 9. The eye tracking system of claim 1, wherein the computer is further configured to: calculate eye positions and/or eye movements based on analysis of the events (event-based positions), generate labels based on the event-based positions, generate feature values based on the reflections, and provide the labels and feature values to train a machine learning-based model for detecting eye positions and/or eye movements based on the reflections. 10.

The eye tracking system of claim 1, wherein the event camera is further configured to capture frame images of the eye at a rate that is significantly lower than a rate at which the reflections are measured by the PSOG, and the computer is further configured to process the events, the reflections, and the frame images concurrently. 11.

The eye tracking system of claim 1, wherein the computer is further configured to operate the event camera in a normal mode during eye movements faster than a threshold while eyelids covering the eye are open, to operate the event camera in a low-power mode while the eyelids are closed or refrain from processing the events while the eyelids are closed, and to detect opening of the eyelids based on the reflections. 12. The eye tracking system of claim 1, wherein the computer is further configured to utilize the eye positions calculated based on the events and the reflections for calibration in calculations of eye positions based on the reflections; whereby calculating eye positions based on the reflections consumes less power compared to calculating eye positions based on the events. 13. A method comprising: emitting light and measuring reflections of the light from an eye of a user by a photosensor-oculography device (PSOG); capturing the eye and providing events by an event camera; and calculating positions of the eye (eye positions) based on the events and the reflections. 14. The method of claim 13, further comprising operating the event camera in a normal mode during saccades, operating the event camera in a low-power mode during fixations or refraining from processing the events during the fixations, and calculating the eye positions during the fixations based on the reflections. 15. The method of claim 13, further comprising operating the event camera in a normal mode during saccades, operating the event camera in a low-power mode while the eyelids are closed or refraining from processing the events while the eyelids are closed, and detecting opening of the eyelids based on the reflections. 16. The method of claim 13, wherein a first range of eye positions trackable from the reflections is broader than a second range of eye positions trackable from the events, and further comprising calculating the eye positions based on the reflections when the eye positions are outside the second range. 17. The method of claim 13, further comprising utilizing the events to incrementally update eye positions calculated based on the reflections. 18. The method of claim 13, further comprising calculating based on the reflections a stream of main eye positions, and calculating based on the events intermediate streams of eye positions which are located between at least some of the main eye positions; whereby average delay between eye positions in the intermediate streams is much shorter than average delay between the main eye positions. 19.

The method of claim 13, further comprising calculating eye positions and/or eye movements based on analysis of the events (event-based positions), generating labels based on the event-based positions, generating feature values based on the reflections, and providing the labels and feature values to train a machine learning-based model for detecting eye positions and/or eye movements based on the reflections. 20. A non-transitory computer readable medium storing one or more computer programs configured to cause a processor based system to execute steps comprising:

emitting light and measuring reflections of the light from an eye of a user by a photosensor-oculography device (PSOG); capturing the eye and providing events by an event camera; and calculating positions of the eye (eye positions) based on the events and the reflections.

Figure 5:
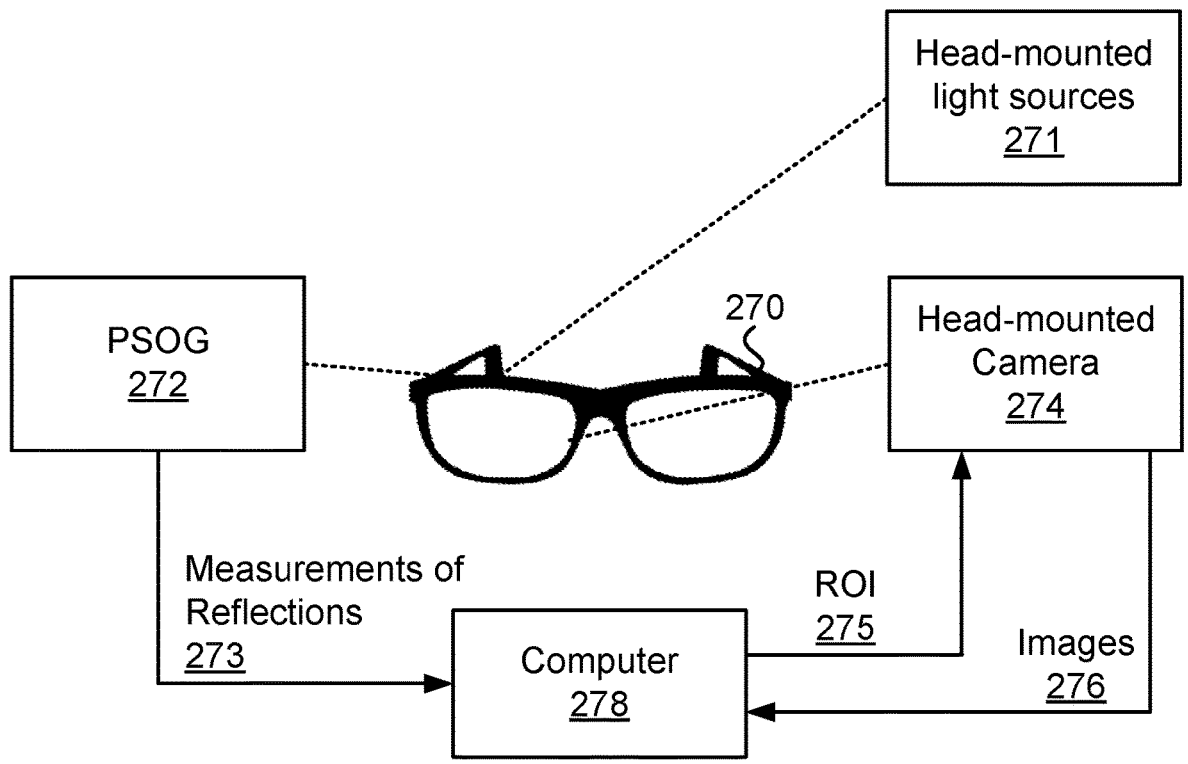
FIG. 5 illustrates an embodiment of an eye tracking system that includes PSOG and a head-mounted camera.

FIG. 5 illustrates an embodiment of an eye tracking system that includes at least a photosensor-oculography device (PSOG) 272 configured to emit light and to measure reflections of the light from an eye of a user, a head-mounted camera 274 configured to capture images 276 of the eye utilizing a sensor that supports changing of its region of interest (ROI), and a computer 278. The computer 278 calculates a position of the eye (referred to herein as an "eye position") based on measurements 273 of the reflections. The computer 278 then utilizes the eye position to place ROI 275 around pixels covering the eye's pupil, and read the ROI 275 from the camera 274. For example, by receiving images 276. Optionally, the ROI 275 covers less than 25% of the sensor's field-of-view.

In CMOS-based camera sensors, the term "region of interest" (ROI) may also be known as: window of interest readout, windowing, sub-windowing, region of interest readout, programmable region of interest, area of interest, partial readout window, random pixel access, and direct pixel addressing. In CCD-based camera sensors, the term region of interest may also be known as partial scanning. For "a sensor that supports changing of its ROI", the ROI is a feature that allows reading only a portion of the pixels, and by that increasing the readout speed of the ROI, and optionally also reducing the camera's duty cycle. Some sensors also allow multiple ROI readouts in order to simplify the operation of multiple windowing. Sentences in the form of "set the ROI according to a subset of pixels", "to place the ROI around pixels covering an object", or "to place the ROI around pixels covering pupil of the eye" refer to setting the coordinates of the ROI to cover the "subset of pixels", "pixels covering an object", or "pupil of the eye", respectively.

In one embodiment, utilization of the eye position to place the ROI 275 around pixels covering the eye's pupil comprises selecting, based on the eye position, a subset of pixels covering less than half of the sensor's field-of-view, and setting the ROI 275 according to the subset.

Figure 6:
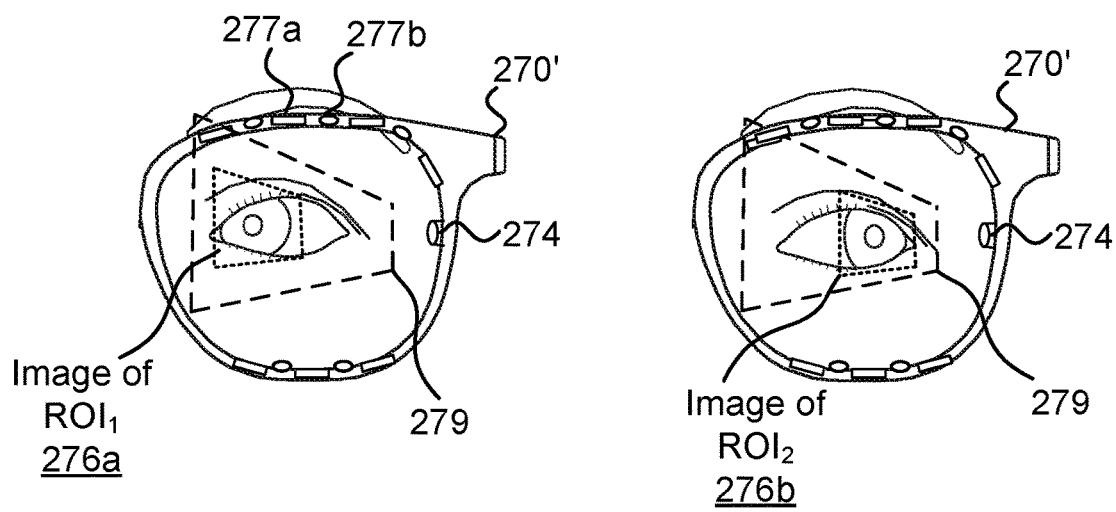
FIG. 6 illustrates utilization of PSOG to set a region of interest (ROI) of a camera used in an eye tracking system.

FIG. 6 illustrates utilization of a PSOG to set the ROI of the camera. The Figure illustrates a portion 270' of smart-glasses 270, which includes the camera 274 as well as PSOG that includes multiple photosensor detectors and light sources positioned on the eyeglasses frame around the lens, such as photosensor detector 277a and light source 277b. The full field-of-view of the camera 274 is illustrated as the region 279. The computer 278 can utilize the measurements 273 of the reflections to determine the position of the pupil. The image on the left illustrates a scenario in which the pupil is on the left, and the computer 278 places ROI$_1$ to cover the pupil with a first subset of pixels that produce an image of ROI$_1$ 276a. On the right, the pupil is at the other side of the eye, and the computer 278 places an ROI$_2$ to cover the pupil in this position using a second subset of the pixels of the camera 274, and this second subset produces an image of ROI$_2$ 276b.

In one embodiment, the computer 278 is further configured to (i) utilize the eye position to select advantageous features before capturing the images, (ii) set the ROI 275 to cover the advantageous features, and (iii) provide properties of said advantageous features to an image-based eye tracker. Optionally, the advantageous features comprise data indicative of at least one of the following: pupil location, iris location, limbus location, and which glints are expected to appear on the cornea from the camera's point of view.

In one embodiment, the image-based eye tracker comprises a limbus-based eye tracker and a glint-based eye tracker, switching between utilization of these two trackers is performed automatically based on the advantageous features that were selected, and a metric for selecting the advantageous features comprises at least one of expected accuracy to be obtained from analyzing the advantageous features and expected required processing power to capture and/or analyze the advantageous features.

Different positions of the eye expose to the camera different parts of the eye from different angles, which causes different features to have different quality levels for the VOG. The eyelid position and the lighting conditions also affect the efficiency and accuracy of VOG. Therefore, the computer can utilize the PSOG's data (such as eye position, eyelid position, illumination) to select the advantageous features before capturing the image, then set the ROI to capture the advantageous features, and then provide the properties of said advantageous features to the VOG tracker. The metric for selecting the advantageous features may depend on the expected accuracy to be obtained from analyzing the features (the higher the accuracy the better the feature is), and/or the expected required processing power to capture and/or analyze the feature (the lower the processing power the better the feature is).

Glints are usually used by VOG. For example, VOG may calculate the gaze from the pupil-glint vectors, which are the relative distances between the centers of the pupil and one or more corneal reflections. The number of glints depends on the number of light sources, and one example of an eye tracking process can be divided into two stages (i) analyzing the images to locate features, such as the glints and the pupil centers, and (ii) estimating the gaze based on the detected features.

In one embodiment, the eye tracking system also includes head-mounted light sources 271, which are configured that emit light that generates glints on the eye. In this embodiment, the computer 278 is further configured to (i) utilize the eye position to select a subset of the light sources that are expected to generate one or more glints on the cornea, and (ii) operate the subset of the light sources at a higher intensity compared to the rest of the light sources. The subset of the light sources is selected based on the PSOG's eye position, such that when the eye position changes, the subset of the light sources may change accordingly. It is noted that operating the subset of the light sources at a higher intensity compared to the rest of the light sources also refers to not operating the rest of the light sources.

In another embodiment, the eye tracking system also includes head-mounted light sources 271, which are configured to emit light that generates glints on the eye. In this embodiment, the computer 278 is further configured to (i) calculate positions of the eyelids based on the reflections, (ii) utilize the positions of the eyelids to select a subset of the light sources that are expected to generate one or more glints on an area of the cornea not covered by the eyelids, and (iii) operate the subset of the light sources at a higher intensity compared to the rest of the light sources. The subset of the light sources is selected based on the PSOG's eye position, such that when the eye position changes, the subset of the light sources may change accordingly.

In still another embodiment, the eye tracking system also includes head-mounted light sources 271, which are configured to emit light that generates glints on the eye. In this embodiment, the computer 278 is further configured to (i) calculate positions of the eyelids based on the reflections, (ii) utilize the positions of the eyelids to select a subset of the light sources that are not expected to suffer interference from the eyelids and/or eyelashes, and/or expected to have a minimal interference from the eyelids and/or eyelashes, and (iii) operate the subset of the light sources at a higher intensity compared to the rest of the light sources. In some embodiments, the arrangement of the light sources and their operation (not all the light sources must emit light all the time) have a strong effect on the glints. For example, different light sources may suffer from interferences by the upper and/or lower eyelids as a function of the eyelid positions (which can block the light the light sources emit). The most suitable light sources to emit the light depend on both the eye tracking system setup (which includes considerations such as the location of the camera, the locations of the light sources, and the locations of the photosensors) and the properties of the user (which includes considerations such as the anatomical shape of eyelids, ethnicity, and age). Therefore, taking in account said considerations can have a significant impact on the performances of the eye tracker.

In one embodiment, the computer 278 is further configured to (i) calculate positions of the eyelids based on the reflections, (ii) operate a glint-based eye tracker, and (iii) utilize the eye position and the positions of the eyelids to set the ROI around the cornea, such that the ROI covers an area that is not greater than two times the area of the eye that is not covered by the eyelids. In another embodiment, the computer 278 is further configured to operate a glint-based eye tracker, and to utilize the eye position to set the ROI around the cornea, such that the ROI covers an area that is not greater than two times the area of a square that surrounds the iris tightly. By knowing the location of the camera, the locations of the light sources, and the PSOG's eye position, the computer is able to estimate the locations of the glints on the cornea, and to set the ROI to be around the cornea. Optionally, the properties of the ROI are fed into the glint-based eye tracker that process the ROI in a similar manner to processing cropped images together with their cropping parameters.

In one embodiment, the computer 278 is further configured to operate an eye tracker that is based on detecting pupil contour, and to utilize the eye position to set the ROI around the iris, such that the ROI covers an area that is not greater than two times the area of a square that surrounds the iris tightly.

In another embodiment, the computer 278 is further configured to: operate an eye tracker that is based on detecting pupil contour, estimate location of the pupil based on the eye position, and utilize the eye position to set the ROI around the pupil, such that the ROI covers an area that is not greater than two times the area of the eye that is not covered by the eyelids.

In one embodiment, the computer 278 is further configured to (i) extract a set of eyelid positions based on analyzing the images, and (ii) provide labels that are based on the set of eyelid positions, and corresponding feature values that are based on the emitted light and the reflections, to train a model for calculating eyelid position based on the reflections.

In one embodiment, the computer 278 is further configured to: calculate a correlation between a current image and a previous image having the same ROI and eye position, retrieve a previous calculated pupil feature when the correlation exceeds a threshold, or calculate a new value for the pupil feature based on the current image when the correlation is below the threshold.

The following method may be used by systems modeled according to FIG. 5. The steps described below may be performed by running a computer program having instructions for implementing the method. Optionally, the instructions may be stored on a computer-readable medium, which may optionally be a non-transitory computer-readable medium. In response to execution by a system including a processor and memory, the instructions cause the system to perform the following steps:

In Step 1, emitting light and measuring reflections of the light from an eye of a user by a photosensor-oculography device (PSOG).

In Step 2, capturing images of the eye by a head-mounted camera that utilizes a sensor that supports changing of its region of interest (ROI).

In Step 3, calculating, based on the reflections, a position of the eye (eye position).

In Step 4, utilizing the eye position for placing the ROI around pixels covering the eye's pupil.

And in Step 5, reading the ROI from the camera.

In one embodiment, the method may optionally include a step of utilizing the eye position to select advantageous features before capturing the images, setting the ROI to cover the advantageous features, and providing properties of said advantageous features to an image-based eye tracker. Optionally, the advantageous features comprise data indicative of at least one of the following: pupil location, iris location, limbus location, and which glints are expected to appear on the cornea from the camera's point of view.

In one embodiment, the method may optionally include the following steps: (i) utilizing the eye position for selecting a subset of head-mounted light sources that are expected to generate one or more glints on the cornea, and (ii)

operating the subset of the head-mounted light sources at a higher intensity compared to the rest of the light sources that are configured to emit light toward the eye.

In one embodiment, the method may optionally include the following steps: (i) calculating positions of the eyelids based on the reflections, (ii) utilizing the positions of the eyelids for selecting a subset of the light sources that are expected to generate one or more glints on an area of the cornea not covered by the eyelids, and (ii) operating the subset of the light sources at a higher intensity compared to the rest of the light sources that are configured to emit light toward the eye.

In one embodiment, the method may optionally include the following steps: (i) calculating positions of the eyelids based on the reflections, (ii) operating a glint-based eye tracker, and (iii) utilizing the eye position and the positions of the eyelids for setting the ROI around the cornea, such that the ROI covers an area that is not greater than two times the area of the eye that is not covered by the eyelids.

This paragraph discloses claims that the Applicant may file in a continuation-in-part (CIP) patent application. 1. An eye tracking system comprising: a photosensor-oculography device (PSOG) configured to emit light and to measure reflections of the light from an eye of a user; a head-mounted camera configured to capture images of the eye utilizing a sensor that supports changing of its region of interest (ROI); and a computer configured to: calculate a position of the eye (eye position) based on the reflections measured by the PSOG; utilize the eye position to place the ROI around pixels covering the eye's pupil; and read the ROI from the camera. 2. The eye tracking system of claim 1, wherein the ROI covers less than 25% of the sensor's field-of-view. 3. The eye tracking system of claim 1, wherein utilization of the eye position to place the ROI around pixels covering the eye's pupil comprises selecting, based on the eye position, a subset of pixels covering less than half of the sensor's field-of-view, and setting the ROI according to the subset. 4. The eye tracking system of claim 1, wherein the computer is further configured to: utilize the eye position to select advantageous features before capturing the images, set the ROI to cover the advantageous features, and provide properties of said advantageous features to an image-based eye tracker; whereby the advantageous features comprise data indicative of at least one of the following: pupil location, iris location, limbus location, and which glints are expected to appear on the cornea from the camera's point of view. 5. The eye tracking system of claim 4, wherein the image-based eye tracker comprises a limbus-based eye tracker and a glint-based eye tracker, switching between utilization of these two trackers is performed automatically based on the advantageous features that were selected, and a metric for selecting the advantageous features comprises at least one of expected accuracy to be obtained from analyzing the advantageous features and expected required processing power to capture and/or analyze the advantageous features. 6. The eye tracking system of claim 1, further comprising head-mounted light sources configured to emit light that generates glints on the eye; and wherein the computer is further configured to: utilize the eye position to select a subset of the light sources that are expected to generate one or more glints on the cornea, and operate the subset of the light sources at a higher intensity compared to the rest of the light sources. 7. The eye tracking system of claim 1, further comprising head-mounted light sources configured to emit light that generates glints on the eye; and wherein the computer is further configured to (i) calculate positions of the eyelids based on the reflections, (ii) utilize the positions of the eyelids to select a subset of the light sources that are expected to generate one or more glints on an area of the cornea not covered by the eyelids, and (iii) operate the subset of the light sources at a higher intensity compared to the rest of the light sources. 8. The eye tracking system of claim 1, further comprising head-mounted light sources configured to emit light that generates glints on the eye; and wherein the computer is further configured to (i) calculate positions of the eyelids based on the reflections, (ii) utilize the positions of the eyelids to select a subset of the light sources that are not expected to interfere with the eyelids and/or eyelashes, and/or expected to have a minimal interference with the eyelids and/or eyelashes, and (iii) operate the subset of the light sources at a higher intensity compared to the rest of the light sources. 9. The eye tracking system of claim 1, wherein the computer is further configured to: calculate positions of the eyelids based on the reflections, operate a glint-based eye tracker, and utilize the eye position and the positions of the eyelids to set the ROI around the cornea, such that the ROI covers an area that is not greater than two times the area of the eye that is not covered by the eyelids. 10. The eye tracking system of claim 1, wherein the computer is further configured to operate a glint-based eye tracker, and to utilize the eye position to set the ROI around the cornea, such that the ROI covers an area that is not greater than two times the area of a square that surrounds the iris tightly. 11. The eye tracking system of claim 1, wherein the computer is further configured to operate an eye tracker that is based on detecting pupil contour, and to utilize the eye position to set the ROI around the iris, such that the ROI covers an area that is not greater than two times the area of a square that surrounds the iris tightly. 12. The eye tracking system of claim 1, wherein the computer is further configured to: operate an eye tracker that is based on detecting pupil contour, estimate location of the pupil based on the eye position, and utilize the eye position to set the ROI around the pupil, such that the ROI covers an area that is not greater than two times the area of the eye that is not covered by the eyelids. 13. The eye tracking system of claim 1, wherein the computer is further configured to: (i) extract a set of eyelid positions based on analyzing the images, and (ii) provide labels that are based on the set of eyelid positions, and corresponding feature values that are based on the emitted light and the reflections, to train a model for calculating eyelid position based on the reflections. 14. The eye tracking system of claim 1, wherein the computer is further configured to: calculate a correlation between a current image and a previous image having the same ROI and eye position, retrieve a previous calculated pupil feature when the correlation exceeds a threshold, or calculate a new value for the pupil feature based on the current image when the correlation is below the threshold. 15. A method comprising: emitting light and measuring reflections of the light from an eye of a user by a photosensor-oculography device (PSOG); capturing images of the eye by a head-mounted camera that utilizes a sensor that supports changing of its region of interest (ROI); calculating, based on the reflections, a position of the eye (eye position); utilizing the eye position for placing the ROI around pixels covering the eye's pupil; and reading the ROI from the camera. 16.

The method of claim 15, further comprising utilizing the eye position to select advantageous features before capturing the images, setting the ROI to cover the advantageous features, and providing properties of said advantageous features to an image-based eye tracker; whereby the advantageous features comprise data indicative of at least one of the following: pupil location, iris location, limbus location, and which glints are expected to appear on the cornea from the camera's point of view. 17. The method of claim 15, further comprising utilizing the eye position for selecting a subset of head-mounted light sources that are expected to generate one or more glints on the cornea, and operating the subset of the head-mounted light sources at a higher intensity compared to the rest of the light sources that are configured to emit light toward the eye. 18. The method of claim 15, further comprising calculating positions of the eyelids based on the reflections, utilizing the positions of the eyelids for selecting a subset of the light sources that are expected to generate one or more glints on an area of the cornea not covered by the eyelids, and operating the subset of the light sources at a higher intensity compared to the rest of the light sources that are configured to emit light toward the eye. 19. The method of claim 15, further comprising calculating positions of the eyelids based on the reflections, operating a glint-based eye tracker, and utilizing the eye position and the positions of the eyelids for setting the ROI around the cornea, such that the ROI covers an area that is not greater than two times the area of the eye that is not covered by the eyelids. 20. A non-transitory computer readable medium storing one or more computer programs configured to cause a processor based system to execute steps comprising: emitting light and measuring reflections of the light from an eye of a user by a photosensor-oculography device (PSOG); capturing images of the eye by a head-mounted camera that utilizes a sensor that supports changing of its region of interest (ROI); calculating, based on the reflections, a position of the eye (eye position); utilizing the eye position for placing the ROI around pixels covering the eye's pupil; and reading the ROI from the camera.

Figure 7:
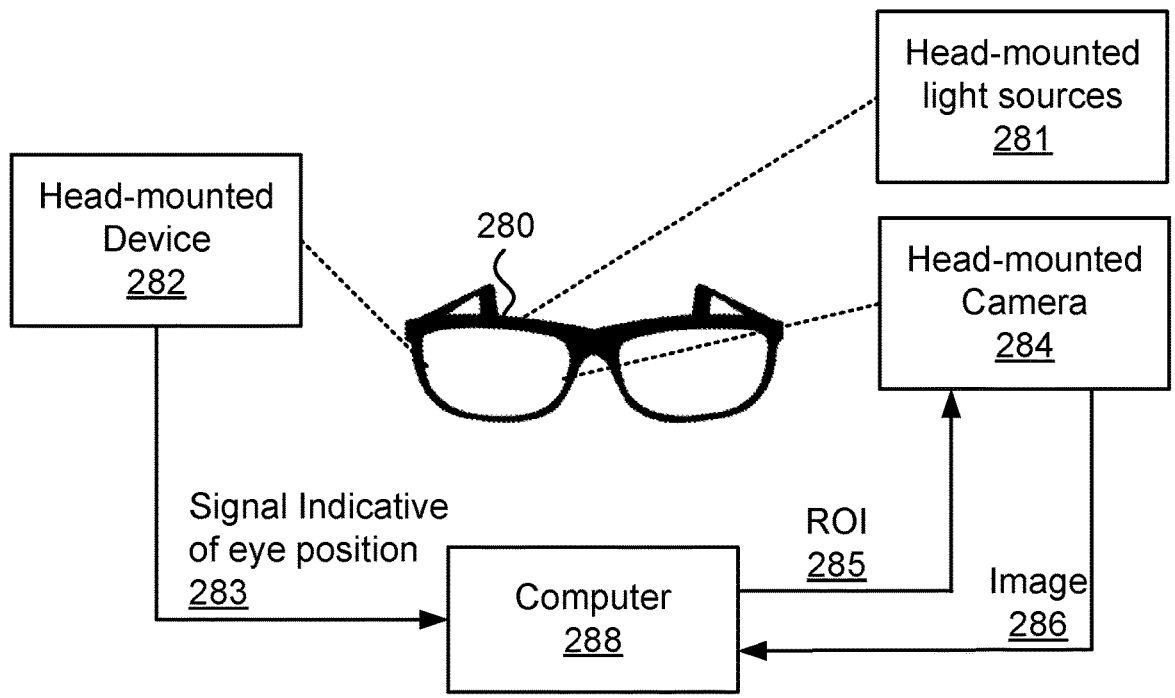
FIG. 7 illustrates an embodiment of an eye tracking system that includes a head-mounted device that measures a signal indicative eye position and a head-mounted camera that supports changing of its ROI.

FIG. 7 illustrates an embodiment of an eye tracking system that includes at least a head-mounted device 282 configured to measure a signal indicative of a position of an eye of a user (this position is referred to herein as "eye position"), a head-mounted camera 284 configured to capture image 286 of the eye utilizing a sensor that supports changing of its region of interest (ROI), and a computer 288. The computer 288 calculates the eye position based on measurements 283 of the signal, which is measured by the head-mounted device 282. The computer 288 then utilizes the eye position to place ROI 285 around pixels covering the eye's pupil, and read the ROI 285 from the camera 284. For example, by receiving the image 286. Optionally, the ROI 285 covers less than 30% of the sensor's field-of-view.

In one embodiment, the computer 288 is further configured to utilize the eye position to select advantageous features before capturing the image, set the ROI 285 to cover the advantageous features, and provide properties of said advantageous features to an image-based eye tracker. Optionally, the advantageous features comprise data indicative of at least one of the following: pupil location, iris location, limbus location, and which glints are expected to appear on the cornea from the camera's point of view.

In another embodiment, the eye tracking system includes head-mounted light sources 281, which are configured to emit light that generates glints on the eye. In this embodiment, the computer 288 is further configured to utilize the eye position to select a subset of the light sources that are expected to generate one or more glints on the cornea, and operate the subset of the light sources at a higher intensity compared to the rest of the light sources.

In still another embodiment, the computer 288 is further configured to: operate an eye tracker that is based on detecting pupil contour, and to utilize the eye position to set the ROI around the iris, such that the ROI covers an area that is not greater than two times the area of a square that surrounds the iris tightly.

Various types of devices may be utilized to generate the signal indicative of the eye position.

In one embodiment, the head-mounted device 282 comprises an electrooculography device, and the signal is electrical potential between electrodes placed close to the eye. Thus, the resulting hybrid EOG-camera eye tracking system of this embodiment calculates the eye position based on the electrical potential between the electrodes placed close to the eye.

In another embodiment, the head-mounted device 282 comprises an electromyography device, and the signal is electrical potential generated by muscle cells. Thus, the resulting hybrid EMG-camera eye tracking system of this embodiment calculates the eye position based on the electrical potential generated by the muscle cells.

In yet another embodiment, the head-mounted device 282 comprises an optical flow sensor, the signal is optical flow and/or visual motion, and the eye position is calculated based on an optical flow algorithm. The optical flow sensor may be an image sensor configured to measure optical flow and/or visual motion, and the motion of the eye is calculated based on an optical flow algorithm.

In still another embodiment, the head-mounted device 282 comprises wherein the device comprises a range sensor, and the signal is range between the range sensor and the eye. Thus, the resulting hybrid range-camera eye tracking system of this embodiment calculates the eye position based on the range between the range sensor and the eye. A range sensor may be a sensor configured to detect the presence of nearby objects without physical contact, such as a Doppler sensor, a passive optical sensor, an infrared sensor, a radar, and a sensor that measures time of flight. Since the eyeball is not perfectly spherical, the proximity between the range sensor at a fixed distance from the user's skull and the portion of the eyeball in the sensor's direct line-of-sight changes with eye movement. For example, the cornea is raised relative to the sclera, thus a shorter detected range may indicate that the cornea is in the sensor's direct line-of-sight.

And in yet another embodiment, the head-mounted device 282 may comprise PSOG configured to emit light and to measure reflections of the light from the eye, and the eye position is calculated based on the reflections.

The following method may be used by systems modeled according to FIG. 7. The steps described below may be performed by running a computer program having instructions for implementing the method. Optionally, the instructions may be stored on a computer-readable medium, which may optionally be a non-transitory computer-readable medium. In response to execution by a system including a processor and memory, the instructions cause the system to perform the following steps:

In Step 1, measuring, by a head-mounted device, a signal indicative of a position of an eye of a user (eye position).

In Step 2, capturing an image of the eye by a head-mounted camera that utilizes a sensor that supports changing of its region of interest (ROI).

In Step 3, calculating the eye position based on the signal.

In Step 4, utilizing the eye position for placing the ROI around pixels covering pupil of the eye.

And in Step 5 reading the ROI from the camera.

This paragraph discloses claims that the Applicant may file in a continuation-in-part (CIP) patent application. 1. An eye tracking system comprising: a head-mounted device configured to measure a signal indicative of a position of an eye of a user (eye position); a head-mounted camera configured to capture an image of the eye utilizing a sensor that supports changing of its region of interest (ROI); and a computer configured to: calculate the eye position based on the signal; utilize the eye position to place the ROI around pixels covering pupil of the eye; and read the ROI from the camera. 2. The eye tracking system of claim 1, wherein the ROI covers less than 30% of the sensor's field-of-view. 3. The eye tracking system of claim 1, wherein the device comprises an electrooculography device, and the signal is electrical potential between electrodes placed close to the eye. 4. The eye tracking system of claim 3, wherein the computer is further configured to utilize the eye position to select advantageous features before capturing the image, set the ROI to cover the advantageous features, and provide properties of said advantageous features to an image-based eye tracker; whereby the advantageous features comprise data indicative of at least one of the following: pupil location, iris location, limbus location, and which glints are expected to appear on the cornea from the camera's point of view. 5. The eye tracking system of claim 3, further comprising head-mounted light sources configured to emit light that generates glints on the eye; and wherein the computer is further configured to utilize the eye position to select a subset of the light sources that are expected to generate one or more glints on the cornea, and operate the subset of the light sources at a higher intensity compared to the rest of the light sources. 6. The eye tracking system of claim 3, wherein the computer is further configured to: operate an eye tracker that is based on detecting pupil contour, and to utilize the eye position to set the ROI around the iris, such that the ROI covers an area that is not greater than two times the area of a square that surrounds the iris tightly. 7. The eye tracking system of claim 1, wherein the device comprises an electromyography device, and the signal is electrical potential generated by muscle cells. 8. The eye tracking system of claim 7, wherein the computer is further configured to utilize the eye position to select advantageous features before capturing the image, set the ROI to cover the advantageous features, and provide properties of said advantageous features to an image-based eye tracker; whereby the advantageous features comprise data indicative of at least one of the following: pupil location, iris location, limbus location, and which glints are expected to appear on the cornea from the camera's point of view. 9. The eye tracking system of claim 7, further comprising head-mounted light sources configured to emit light that generates glints on the eye; and wherein the computer is further configured to utilize the eye position to select a subset of the light sources that are expected to generate one or more glints on the cornea, and operate the subset of the light sources at a higher intensity compared to the rest of the light sources. 10. The eye tracking system of claim 7, wherein the computer is further configured to: operate an eye tracker that is based on detecting pupil contour, and to utilize the eye position to set the ROI around the iris, such that the ROI covers an area that is not greater than two times the area of a square that surrounds the iris tightly. 11.

The eye tracking system of claim 1, wherein the device comprises an optical flow sensor, the signal is optical flow and/or visual motion, and the eye position is calculated based on an optical flow algorithm. 12. The eye tracking system of claim 11, wherein the computer is further configured to utilize the eye position to select advantageous features before capturing the image, set the ROI to cover the advantageous features, and provide properties of said advantageous features to an image-based eye tracker; whereby the advantageous features comprise data indicative of at least one of the following: pupil location, iris location, limbus location, and which glints are expected to appear on the cornea from the camera's point of view. 13. The eye tracking system of claim 11, further comprising head-mounted light sources configured to emit light that generates glints on the eye; and wherein the computer is further configured to utilize the eye position to select a subset of the light sources that are expected to generate one or more glints on the cornea, and operate the subset of the light sources at a higher intensity compared to the rest of the light sources. 14. The eye tracking system of claim 11, wherein the computer is further configured to: operate an eye tracker that is based on detecting pupil contour, and to utilize the eye position to set the ROI around the iris, such that the ROI covers an area that is not greater than two times the area of a square that surrounds the iris tightly. 15. The eye tracking system of claim 1, wherein the device comprises a range sensor, and the signal is range between the range sensor and the eye. 16. The eye tracking system of claim 15, wherein the computer is further configured to utilize the eye position to select advantageous features before capturing the image, set the ROI to cover the advantageous features, and provide properties of said advantageous features to an image-based eye tracker; whereby the advantageous features comprise data indicative of at least one of the following: pupil location, iris location, limbus location, and which glints are expected to appear on the cornea from the camera's point of view. 17. The eye tracking system of claim 15, further comprising head-mounted light sources configured to emit light that generates glints on the eye; and wherein the computer is further configured to utilize the eye position to select a subset of the light sources that are expected to generate one or more glints on the cornea, and operate the subset of the light sources at a higher intensity compared to the rest of the light sources. 18. The eye tracking system of claim 15, wherein the computer is further configured to: operate an eye tracker that is based on detecting pupil contour, and to utilize the eye position to set the ROI around the iris, such that the ROI covers an area that is not greater than two times the area of a square that surrounds the iris tightly. 19. A method comprising: measuring, by a head-mounted device, a signal indicative of a position of an eye of a user (eye position); capturing an image of the eye by a head-mounted camera that utilizes a sensor that supports changing of its region of interest (ROI); calculating the eye position based on the signal; utilizing the eye position for placing the ROI around pixels covering pupil of the eye; and reading the ROI from the camera. 20. A non-transitory computer readable medium storing one or more computer programs configured to cause a processor based system to execute steps comprising: measuring, by a head-mounted device, a signal indicative of a position of an eye of a user (eye position); capturing an image of the eye by a head-mounted camera that utilizes a sensor that supports changing of its region of interest (ROI); calculating the eye position based on the signal; utilizing the eye position for placing the ROI around pixels covering pupil of the eye; and reading the ROI from the camera.

Figure 8:
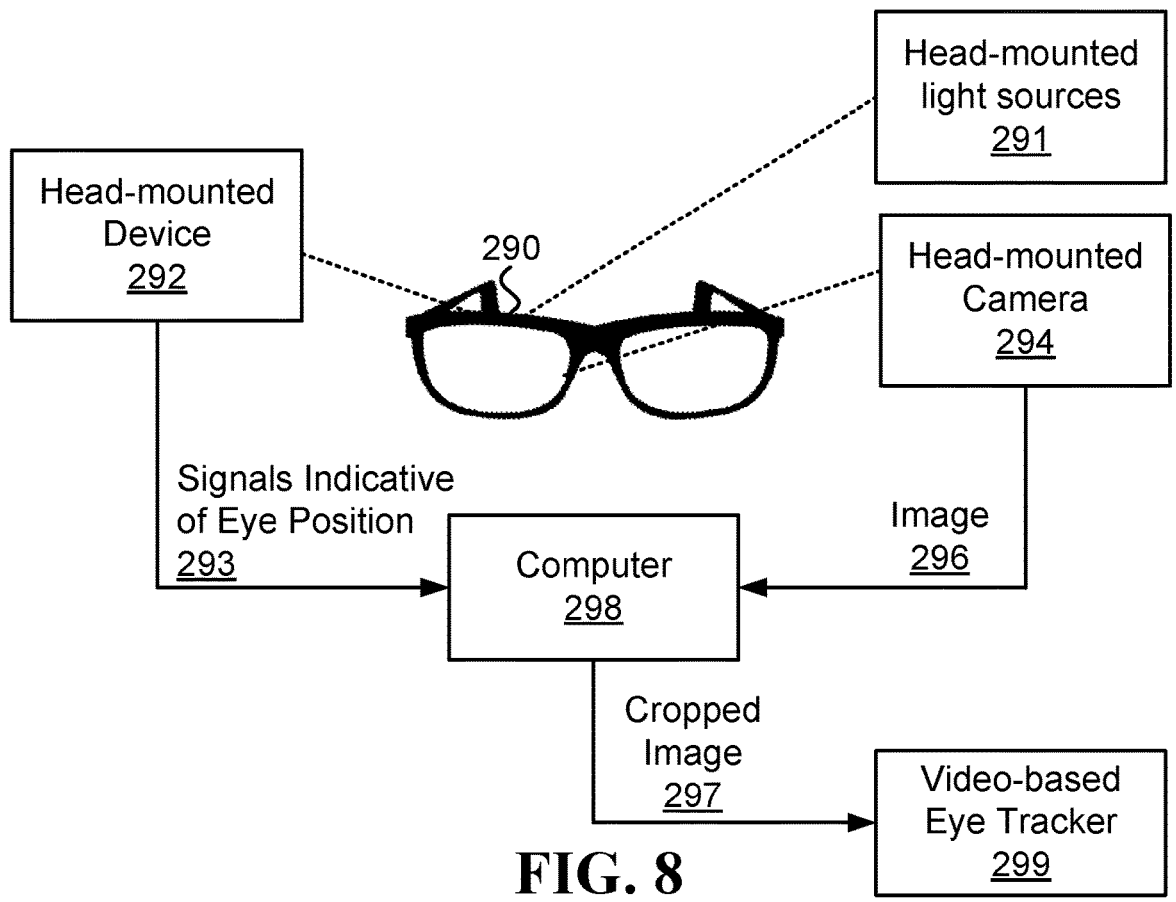
FIG. 8 illustrates an embodiment of an eye tracking system that crops images taken by a head-mounted camera according to eye position.

FIG. 8 illustrates an embodiment of an eye tracking system that includes at least a head-mounted device 292 configured to measure a signal indicative of a position of an eye of a user (this position referred to herein as "eye position"), a head-mounted camera 294 configured to capture image 296 of the eye, and a computer 298. The computer 298 calculates the eye position based on measurements 293 of the signal measured by the head-mounted device 292. The computer 288 then utilizes the eye position to crop the image 296 around the pupil and to provide the cropped image 297 to a video-based eye tracker 299. Optionally, the size of the cropped image 297 is less than a third of the size of its respective uncropped image (the image 296). Optionally, the cropped image 297 covers an area that is not greater than two times the area of a square that surrounds the iris tightly.

In one embodiment, the video-based eye tracker 299 is configured to calculate, based on the cropped image 297, at least one of pupil diameter and pupillary response. The term "pupillary response" refers to at least one of dilation response (widening of the pupil, also known as pupil dilation) and constriction response (narrowing of the pupil).

In some embodiments, the eye tracking system includes head-mounted light sources configured to emit light that generates glints on the eye (which can be useful for eye tracking purposes). Optionally, the computer 290 is further configured to utilize the eye position to select a subset of the head-mounted light sources 291 that are expected to generate one or more glints on the cornea, and operate the subset of the light sources at a higher intensity compared to the rest of the head-mounted light sources 291. Optionally, the computer 290 is further configured to (i) calculate positions of the eyelids based on the reflections, (ii) utilize the positions of the eyelids to select a subset of the light sources that are expected to generate one or more glints on an area of the cornea not covered by the eyelids, and (iii) operate the subset of the light sources at a higher intensity compared to the rest of the light sources.

In one embodiment, the head-mounted device 292 comprises a photosensor-oculography device (PSOG), the signal is reflections of light emitted by the PSOG towards the eye, and calculating the eye position based on the signal (using the measurements 293) is performed at a rate that is at least ten times higher than the rate at which images are captured by the head-mounted camera 294. Optionally the system further includes another PSOG configured to emit light and to measure reflections of the light from the other eye of the user, and further includes another head-mounted camera configured to capture an image of at least a portion of the other eye of the user, wherein the cameras are part of a video oculography system.

In another embodiment, the head-mounted device 292 comprises an electrooculography device, the signal is electrical potential between electrodes placed close to the eye, and calculating the eye position based on the signal (using the measurements 293) is performed at a rate that is at least ten times higher than the rate at which images are captured by the head-mounted camera 294.

In yet another embodiment, the head-mounted device 292 comprises an electromyography device, the signal is electrical potential generated by muscle cells, and calculating the eye position based on the signal is performed at a rate that is at least ten times higher than the rate at which images are captured by the head-mounted camera 294.

In still another embodiment, the head-mounted device 292 comprises an optical flow sensor, the signal is optical flow and/or visual motion, the eye position is calculated based on an optical flow algorithm, and calculating the eye position based on the signal is performed at a rate that is at least ten times higher than the rate at which images are captured by the head-mounted camera 294.

And in yet another embodiment, the head-mounted device 292 comprises a range sensor, the signal is range between the range sensor and the eye, and calculating the eye position based on the signal is performed at a rate that is at least ten times higher than the rate at which images are captured by the head-mounted camera 294.

The following method may be used by systems modeled according to FIG. 8. The steps described below may be performed by running a computer program having instructions for implementing the method. Optionally, the instructions may be stored on a computer-readable medium, which may optionally be a non-transitory computer-readable medium. In response to execution by a system including a processor and memory, the instructions cause the system to perform the following steps:

In Step 1, measuring, by a head-mounted device, a signal indicative of a position of an eye of a user (eye position).

In Step 2, capturing an image of the eye by a head-mounted camera.

In Step 3, calculating the eye position based on the signal.

In Step 4, utilizing the eye position for cropping the image around the pupil.

And in Step 5, providing the cropped image to a video-based eye tracker.

In one embodiment, the device comprises a photosensor-oculography device (PSOG), the signal is reflections of light emitted by the PSOG towards the eye, and calculating the eye position in Step 3 based on the signal is performed at a rate that is at least ten times higher than the rate of capturing images by the camera.

In one embodiment, the device comprises an electrooculography device, the signal is electrical potential between electrodes placed close to the eye, and calculating the eye position in Step 3 on the signal is performed at a rate that is at least ten times higher than the rate of capturing images by the camera.

In one embodiment, the device comprises an electromyography device, the signal is electrical potential generated by muscle cells, and calculating the eye position based on the signal is performed at a rate that is at least ten times higher than the rate of capturing images by the camera.

This paragraph discloses claims that the Applicant may file in a continuation-in-part (CIP) patent application. 1. An eye tracking system comprising: a head-mounted device configured to measure a signal indicative of a position of an eye of a user (eye position); a head-mounted camera configured to capture an image of the eye; and a computer configured to: calculate the eye position based on the signal; utilize the eye position to crop the image around the pupil; and provide the cropped image to a video-based eye tracker. 2. The eye tracking system of claim 1, wherein the size of the cropped image is less than a third of the size of its respective uncropped image. 3. The eye tracking system of claim 1, wherein the cropped image covers an area that is not greater than two times the area of a square that surrounds the iris tightly. 4. The eye tracking system of claim 1, wherein the video-based eye tracker is configured to calculate, based on the cropped image, at least one of pupil diameter and pupillary response. 5. The eye tracking system of claim 1, wherein the device comprises a photosensor-oculography device (PSOG), the signal is reflections of light emitted by the PSOG towards the eye, and calculating the eye position based on the signal is performed at a rate that is at least ten times higher than the rate at which images are captured by the head-mounted camera. 6. The eye tracking system of claim 5, further comprising head-mounted light sources configured to emit light that generates glints on the eye; and wherein the computer is further configured to utilize the eye position to select a subset of the light sources that are expected to generate one or more glints on the cornea, and operate the subset of the light sources at a higher intensity compared to the rest of the light sources. 7. The eye tracking system of claim 5, further comprising head-mounted light sources configured to emit light that generates glints on the eye; and wherein the computer is further configured to (i) calculate positions of the eyelids based on the reflections, (ii) utilize the positions of the eyelids to select a subset of the light sources that are expected to generate one or more glints on an area of the cornea not covered by the eyelids, and (iii) operate the subset of the light sources at a higher intensity compared to the rest of the light sources. 8. The eye tracking system of claim 1, wherein the device comprises an electrooculography device, the signal is electrical potential between electrodes placed close to the eye, and calculating the eye position based on the signal is performed at a rate that is at least ten times higher than the rate at which images are captured by the head-mounted camera. 9. The eye tracking system of claim 8, further comprising head-mounted light sources configured to emit light that generates glints on the eye; and wherein the computer is further configured to utilize the eye position to select a subset of the light sources that are expected to generate one or more glints on the cornea, and operate the subset of the light sources at a higher intensity compared to the rest of the light sources. 10. The eye tracking system of claim 1, wherein the device comprises an electromyography device, the signal is electrical potential generated by muscle cells, and calculating the eye position based on the signal is performed at a rate that is at least ten times higher than the rate at which images are captured by the head-mounted camera. 11. The eye tracking system of claim 10, further comprising head-mounted light sources configured to emit light that generates glints on the eye; and wherein the computer is further configured to utilize the eye position to select a subset of the light sources that are expected to generate one or more glints on the cornea, and operate the subset of the light sources at a higher intensity compared to the rest of the light sources. 12. The eye tracking system of claim 1, wherein the device comprises an optical flow sensor, the signal is optical flow and/or visual motion, the eye position is calculated based on an optical flow algorithm, and calculating the eye position based on the signal is performed at a rate that is at least ten times higher than the rate at which images are captured by the head-mounted camera. 13. The eye tracking system of claim 12, further comprising head-mounted light sources configured to emit light that generates glints on the eye; and wherein the computer is further configured to utilize the eye position to select a subset of the light sources that are expected to generate one or more glints on the cornea, and operate the subset of the light sources at a higher intensity compared to the rest of the light sources. 14. The eye tracking system of claim 1, wherein the device comprises a range sensor, the signal is range between the range sensor and the eye, and calculating the eye position based on the signal is performed at a rate that is at least ten times higher than the rate at which images are captured by the head-mounted camera. 15. The eye tracking system of claim 14, further comprising head-mounted light sources configured to emit light that generates glints on the eye; and wherein the computer is further configured to utilize the eye position to select a subset of the light sources that are expected to generate one or more glints on the cornea, and operate the subset of the light sources at a higher intensity compared to the rest of the light sources. 16. A method comprising: measuring, by a head-mounted device, a signal indicative of a position of an eye of a user (eye position); capturing an image of the eye by a head-mounted camera; calculating the eye position based on the signal; utilizing the eye position for cropping the image around the pupil; and providing the cropped image to a video-based eye tracker. 17. The method of claim 16, wherein the device comprises a photosensor-oculography device (PSOG), the signal is reflections of light emitted by the PSOG towards the eye, and calculating the eye position based on the signal is performed at a rate that is at least ten times higher than the rate at which images are captured by the head-mounted camera. 18. The method of claim 16, wherein the device comprises an electrooculography device, the signal is electrical potential between electrodes placed close to the eye, and calculating the eye position based on the signal is performed at a rate that is at least ten times higher than the rate at which images are captured by the head-mounted camera. 19. The method of claim 16, wherein the device comprises an electromyography device, the signal is electrical potential generated by muscle cells, and calculating the eye position based on the signal is performed at a rate that is at least ten times higher than the rate at which images are captured by the head-mounted camera. 20. A non-transitory computer readable medium storing one or more computer programs configured to cause a processor based system to execute steps comprising: measuring, by a head-mounted device, a signal indicative of a position of an eye of a user (eye position); capturing an image of the eye by a head-mounted camera; calculating the eye position based on the signal; utilizing the eye position for cropping the image around the pupil; and providing the cropped image to a video-based eye tracker.

Figure 9A:
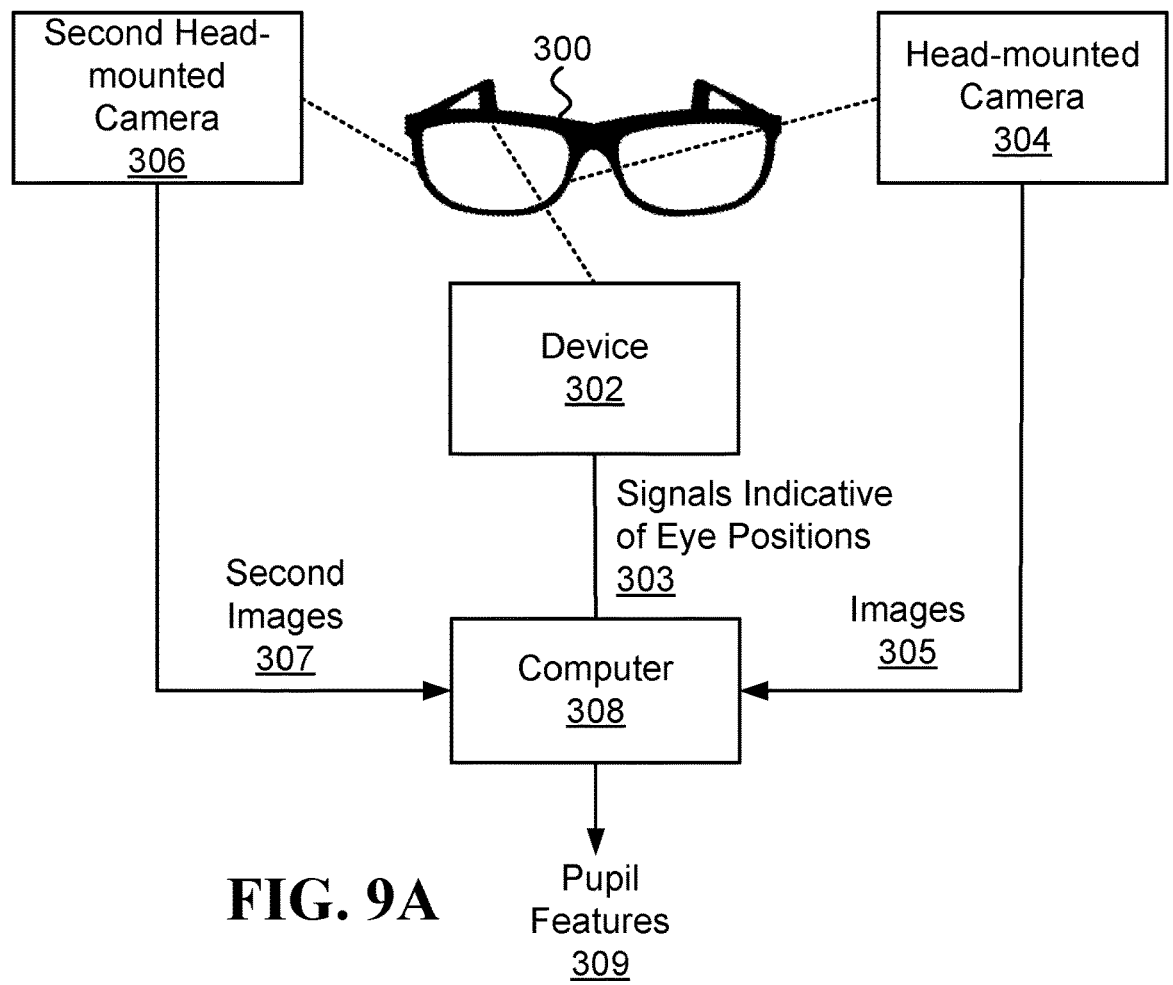
FIG. 9A illustrates an embodiment of an eye tracking system that includes multiple devices capable of tracking different ranges of eye positions.

FIG. 9A illustrates an embodiment of an eye tracking system that includes at least a head-mounted device 302, a head-mounted camera 294, and a computer 298. Optionally, one or more of these components of the eye tracking system may be coupled to frames of smartglasses 300. The head-mounted device 302 is configured to measure signals 303, which are indicative of positions of an eye of a user (these positions are referred to herein as "eye positions. The head-mounted camera 294 is configured to capture images 305 of the eye. Optionally, a first range of eye positions trackable from the images 305 is narrower than a second range of eye positions trackable from the signals 303.

In one embodiment, the computer 308 is configured to calculate eye positions based on the signals 303, and read the images 305 from the head-mounted camera 304 in a manner that depends to the eye positions that are calculated from the signals 303. In one example, the images are read from the head-mounted camera 304 at a first bitrate when the eye positions fall within the first range. The computer 298 may refrain from reading any images from the head-mounted camera 304, or read the images 305 from the head-mounted camera 304 at a second bitrate that is less than half the first bitrate, when the eye positions fall outside the first range.

Figure 9B:
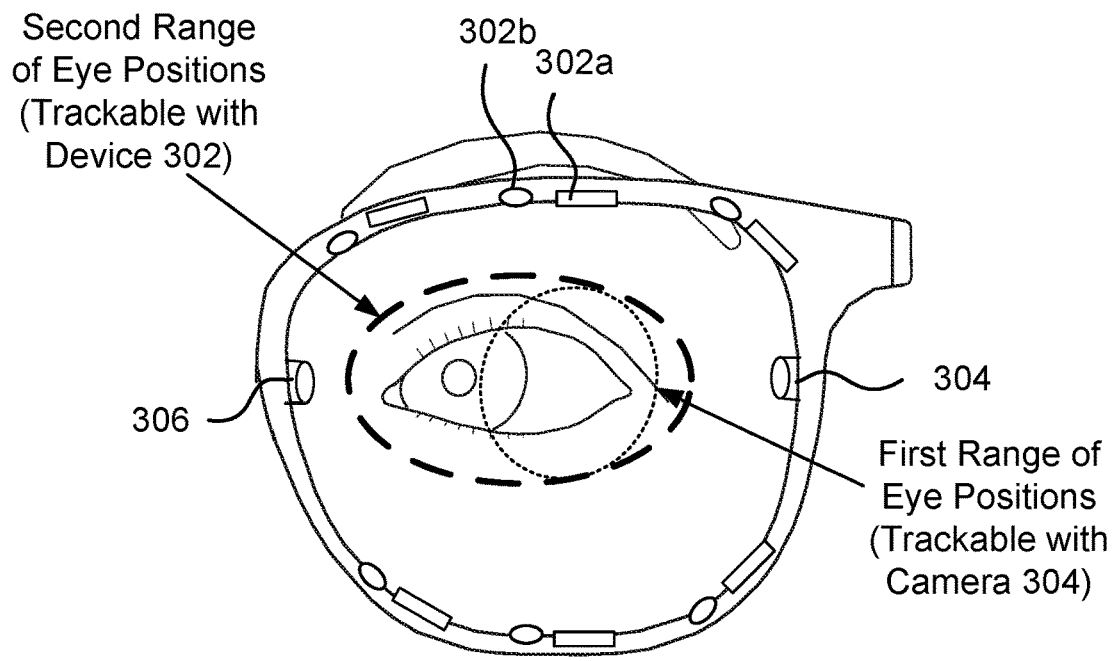
FIG. 9B illustrates different regions of eye positions trackable with different devices.

FIG. 9B illustrates different regions of eye positions trackable with different devices mentioned herein. In this example, the head-mounted device 302 is a PSOG device that includes multiple photosensor detectors (such as photosensor detector 302a) and multiple light sources (such as light source 203a) disposed on a frame of smartglasses around the lens. The figure illustrates a first range of eye positions that is trackable using the images 305 taken by the head-mounted camera 304 which falls within a second range of eye positions that is trackable using reflections measured with the PSOG device. As illustrated in this figure, the second range is wider than the first range, and certain eye positions are within the second range but are not within the first range.

In one embodiment, the computer 308 is further configured to calculate the eye positions based on the signals 303 at a rate that is at least ten times higher than a rate at which the images 305 are captured by the head-mounted camera 304, and to command the head-mounted camera 304 to operate in a low-power mode for a longer percent of time while the eye positions fall outside the first range compared to a percent of time it operates in low-power mode while the eye positions fall within the first range. In normal operation, the computer 308 may command the head-mounted camera 304 to operate in the low-power during at least some of the times the eye is in a position that falls outside the first range (e.g., an eye position that falls in the second range but not in the first range). The computer 308 may command the head-mounted camera to exit the low-power mode when the eye is at a position that is in the vicinity of the first range of eye positions. This may optimize the power consumption by allowing the camera 304 to remain in the low-power mode when the eye is not at a suitable position for the camera 304 to provide useful images, and/or when the user and or the eye are in a situation in which there is a reduced need for the camera's images. It is noted that if the head-mounted camera 304 has its own computer to decide when to operate in low-power mode, then the computer 308 referred to in this paragraph comprises two or more computers: one in the head-mounted camera 304 and another that operates the head-mounted camera 304 in addition to operating other components.

In one embodiment, the eye tracking system illustrated in FIG. 9 includes a second head-mounted camera 306, which is configured to capture a second set of images 307 of the eye from a different position than the head-mounted camera 304. For example, the second head-mounted camera 306 may be positioned on the opposite side of the eye, compared to the side the head-mounted camera 304 is positioned. Optionally, the computer 308 further configured to read the second set of images 307 from the second head-mounted camera 306 at a higher bitrate when the eye positions fall outside the first range compared to when the eye positions fall within the first range.

In one embodiment, the computer 308 is further configured to command the head-mounted camera 304 to operate in a low-power mode for a longer percent of time while the eye positions fall outside the first range compared to a percent of time it operates in the low-power mode while the eye positions fall within the first range. In this embodiment, the computer 308 is also configured to command the second head-mounted camera 306 to operate in a low-power mode for a longer percent of time while the eye positions fall within the first range compared to a percent of time it operates in the low-power mode while the eye positions fall outside the first range. In one example, a right camera is located to the right of the eye and a left camera is located to the left of the eye. The right camera is better positioned to capture images of the user's pupil when the eye looks to the right, and the left camera is better positioned to capture images of the user's pupil when the eye looks to the left. The position of the eye is calculated based on measurements of the device 302, and the eye tracking system utilizes the better positioned camera to capture the images.

In one embodiment, the head-mounted camera 304 and the second head-mounted camera 306 are connected to the computer 308 over a bus that does not have sufficient bandwidth to transfer images from both cameras at a maximum bitrate at which the computer is capable of reading from each camera. In this embodiment, the head-mounted camera 304 and the second head-mounted camera 306 are positioned at least 2 cm apart horizontally.

In one embodiment, the computer 308 is further configured to read the second set of images 307 from the second head-mounted camera 306 at a higher bitrate when the eye positions fall outside the first range compared to when the eye positions fall within the first range. Optionally, upon detecting a sensor shift above a threshold (e.g., based on analysis of the images 305, the images 307, and/or the signals 303), the computer 308 is further configured to update a lookup table configured to select which of the head-mounted cameras to utilize for capturing the images.

In one embodiment, the eye positions that fall outside the first range span at least 20° of the eye's field of view. Optionally, in this embodiment, the computer 308 calculates the eye positions based on the signals 303 at a rate that is at least ten times higher than a rate at which the images 305 are captured by the head-mounted camera 304. In one example, the eye is the right eye of the user, the head-mounted camera 304 is located to the right of the lateral canthus of the eye, and eye positions in vicinity of the medial canthus of the eye are outside the first range. For example, the eye positions in vicinity of the medial canthus, which are outside the first range, may span between 10° and 50° of the eye's field of view.

In one embodiment, the head-mounted camera 304 is capable of tilting and/or shifting its sensor relative to its optics according to the Scheimpflug principle. Optionally, the computer 308 is further configured to command the head-mounted camera 304 to perform the tilting and/or shifting according to the eye positions, such that the tilting and/or shifting assist is positioning the images 305 to capture the pupil of the eye.

Various types of devices may be utilized to generate the signals 303 indicative of the eye positions.

In some embodiments, designing the PSOG to have a wider tracking range compared to the VOG leads to a cost reduction. It may also lead to a weight reduction by enabling the system to capture each eye with a single camera located closer to the face than it could have been located had the camera had to capture a wider range of eye positions. In addition, the computer saves power by lowering utilization of the head-mounted camera when the eye is at the second eye position compared to the utilization of the head-mounted camera when the eye is at the first eye position.

In one embodiment, the head-mounted device 302 comprises a photosensor-oculography device (PSOG), and the signals 303 are reflections of light emitted by the PSOG towards the eye.

In one embodiment, the calibration of a PSOG model (which is used to identify eye positions based on measurements of reflections) for the first range of eye positions is done based on image taken in the first range of eye positions, and the calibration of the PSOG model for the second range of eye positions is extrapolated based on the changes made to the first range of eye positions. Optionally, the PSOG model is calibrated for the second range in the factory, or with a non-head-mounted VOG when the system has clear lenses that do not disturb the ability of the non-head-mounted VOG to collect the ground truth measurements required to calibrate the PSOG model.

In one embodiment, the computer 308 is further configured to generate feature values based on data comprising the reflections and the images 305, and to utilize a model to calculate the eye positions based on the feature values.

In one embodiment, the computer 308 is further configured to (i) extract a set of eyelid positions based on analyzing the images 305, and (ii) provide labels that are based on the set of eyelid positions, and corresponding feature values that are based on the emitted light and the reflections, to train a model for calculating eyelid position based on the reflections.

In one embodiment, the head-mounted device 302 comprises an electrooculography device, and the signals 303 are electrical potentials between electrodes placed close to the eye.

In another embodiment, the head-mounted device 302 comprises an electromyography device, and the signals 303 are electrical potentials generated by muscle cells.

In yet another embodiment, the head-mounted device 302 comprises an optical flow sensor, the signals 303 are optical flow and/or visual motion, and the eye positions are calculated based on an optical flow algorithm.

In still another embodiment, the head-mounted device comprises range sensors, and the signals are ranges between the range sensors and the eye.

The following method may be used by systems modeled according to FIG. 9A. The steps described below may be performed by running a computer program having instructions for implementing the method. Optionally, the instructions may be stored on a computer-readable medium, which may optionally be a non-transitory computer-readable medium. In response to execution by a system including a processor and memory, the instructions cause the system to perform the following steps:

In Step 1, measuring, by a head-mounted device, signals indicative of positions of an eye of a user (eye positions).

In Step 2, capturing images of the eye by a head-mounted camera; whereby a first range of eye positions trackable from the images is narrower than a second range of eye positions trackable from the signals.

In Step 3, calculating eye positions based on the signals.

In Step 4, reading the images from the camera at a first bitrate when the eye positions fall within the first range.

And in Step 5, refraining from reading the images from the camera, or reading the images from the camera at a second bitrate that is less than half the first bitrate, when the eye positions fall outside the first range.

In one embodiment, the method optionally includes a step of commanding the head-mounted camera to operate in a low-power mode for a longer percent of time while the eye positions fall outside the first range compared to a percent of time it operates in low-power mode while the eye positions fall within the first range.

In one embodiment, the method optionally includes the following steps: capturing, by a second head-mounted camera, a second set of images of the eye from a different position than the head-mounted camera; and reading the second set of images from the second head-mounted camera at a higher bitrate when the eye positions fall outside the first range compared to when the eye positions fall within the first range.

This paragraph discloses claims that the Applicant may file in a continuation-in-part (CIP) patent application. 1. An eye tracking system comprising: a head-mounted device configured to measure signals indicative of positions of an eye of a user (eye positions); a head-mounted camera configured to capture images of the eye; whereby a first range of eye positions trackable from the images is narrower than a second range of eye positions trackable from the signals; and a computer configured to: calculate eye positions based on the signals; read the images from the head-mounted camera at a first bitrate when the eye positions fall within the first range; and refrain from reading any images from the head-mounted camera, or read the images from the head-mounted camera at a second bitrate that is less than half the first bitrate, when the eye positions fall outside the first range. 2. The eye tracking system of claim 1, wherein the computer is further configured to calculate the eye positions based on the signals at a rate that is at least ten times higher than a rate at which the images are captured by the head-mounted camera, and to command the head-mounted camera to operate in a low-power mode for a longer percent of time while the eye positions fall outside the first range compared to a percent of time it operates in low-power mode while the eye positions fall within the first range. 3. The eye tracking system of claim 1, further comprising a second head-mounted camera configured to capture a second set of images of the eye from a different position than the head-mounted camera; and wherein the computer is further configured to read the second set of images from the second head-mounted camera at a higher bitrate when the eye positions fall outside the first range compared to when the eye positions fall within the first range. 4. The eye tracking system of claim 3, wherein the computer is further configured to command the head-mounted camera to operate in a low-power mode for a longer percent of time while the eye positions fall outside the first range compared to a percent of time it operates in the low-power mode while the eye positions fall within the first range; and wherein the computer is further configured to command the second head-mounted camera to operate in a low-power mode for a longer percent of time while the eye positions fall within the first range compared to a percent of time it operates in the low-power mode while the eye positions fall outside the first range. 5. The eye tracking system of claim 3, wherein the head-mounted camera and the second head-mounted camera are connected to the computer over a bus that does not have sufficient bandwidth to transfer images from both cameras at a maximum bitrate at which the computer is capable of reading from each camera; and wherein the head-mounted camera and the second head-mounted camera are positioned at least 2 cm apart horizontally. 6. The eye tracking system of claim 1, wherein the eye positions that fall outside the first range span at least 20° of the eye's field of view; and wherein the computer is further configured to calculate the eye positions based on the signals at a rate that is at least ten times higher than a rate at which the images are captured by the head-mounted camera. 7. The eye tracking system of claim 6, wherein the eye is the right eye of the user, the head-mounted camera is located to the right of the lateral canthus of the eye, and eye positions in vicinity of the medial canthus of the eye are outside the first range. 8. The eye tracking system of claim 1, wherein the head-mounted camera is capable of tilting and/or shifting its sensor relative to its optics according to the Scheimpflug principle; and the computer is further configured to command the head-mounted camera to perform the tilting and/or shifting according to the eye positions. 9. The eye tracking system of claim 1, wherein the head-mounted device comprises a photosensor-oculography device (PSOG), and the signals are reflections of light emitted by the PSOG towards the eye. 10. The eye tracking system of claim 9, further comprising a second head-mounted camera configured to capture a second set of images of the eye from a different position than the head-mounted camera; wherein the computer is further configured to read the second set of images from the second camera at a higher bitrate when the eye positions fall outside the first range compared to when the eye positions fall within the first range; and wherein upon detecting a sensor shift above a threshold, the computer is further configured to update a lookup table configured to select which of the head-mounted cameras to utilize for capturing the images. 11. The eye tracking system of claim 9, wherein the computer is further configured to generate feature values based on data comprising the reflections and the images, and to utilize a model to calculate the eye positions based on the feature values. 12. The eye tracking system of claim 9, wherein the computer is further configured to (i) extract a set of eyelid positions based on analyzing the images, and (ii) provide labels that are based on the set of eyelid positions, and corresponding feature values that are based on the emitted light and the reflections, to train a model for calculating eyelid position based on the reflections. 13. The eye tracking system of claim 1, wherein the head-mounted device comprises an electrooculography device, and the signals are electrical potentials between electrodes placed close to the eye. 14. The eye tracking system of claim 1, wherein the head-mounted device comprises an electromyography device, and the signals are electrical potentials generated by muscle cells. 15. The eye tracking system of claim 1, wherein the head-mounted device comprises an optical flow sensor, the signals are optical flow and/or visual motion, and the eye positions are calculated based on an optical flow algorithm. 16. The eye tracking system of claim 1, wherein the head-mounted device comprises range sensors, and the signals are ranges between the range sensors and the eye. 17. A method comprising: measuring, by a head-mounted device, signals indicative of positions of an eye of a user (eye positions); capturing images of the eye by a head-mounted camera; whereby a first range of eye positions trackable from the images is narrower than a second range of eye positions trackable from the signals; calculating eye positions based on the signals; reading the images from the head-mounted camera at a first bitrate when the eye positions fall within the first range; and refraining from reading the images from the head-mounted camera, or reading the images from the head-mounted camera at a second bitrate that is less than half the first bitrate, when the eye positions fall outside the first range. 18.

The method of claim 17, further comprising commanding the head-mounted camera to operate in a low-power mode for a longer percent of time while the eye positions fall outside the first range compared to a percent of time it operates in low-power mode while the eye positions fall within the first range. 19. The method of claim 17, further comprising capturing, by a second head-mounted camera, a second set of images of the eye from a different position than the head-mounted camera; and reading the second set of images from the second head-mounted camera at a higher bitrate when the eye positions fall outside the first range compared to when the eye positions fall within the first range. 20. A non-transitory computer readable medium storing one or more computer programs configured to cause a processor based system to execute steps comprising: measuring, by a head-mounted device, signals indicative of positions of an eye of a user (eye positions); capturing images of the eye by a head-mounted camera; whereby a first range of eye positions trackable from the images is narrower than a second range of eye positions trackable from the signals; calculating eye positions based on the signals; reading the images from the head-mounted camera at a first bitrate when the eye positions fall within the first range; and refraining from reading the images from the head-mounted camera, or reading the images from the head-mounted camera at a second bitrate that is less than half the first bitrate, when the eye positions fall outside the first range.

In some embodiments, the computer 308 may calculate pupil features from the images 305. Optionally, the head-mounted camera 304 is better positioned to capture images of the user's pupil when the eye positions fall within a certain range compared to when the eye positions fall outside the certain range. In one example the certain range is the first range illustrated in FIG. 9B. Optionally, the computer 308 calculates, at a first average rate, pupil features based on images captured when the eye positions fall within the certain range. The computer 308 also refrains from calculating pupil features, or calculates pupil features at a second average rate that is less than half the first average rate, based on images captured when the eye positions fall outside the certain range.

There are various pupil features that may be calculated based on images, which are known in the art. Some example of the pupil features that may be calculated include the following: pupil center location, a pupil contour, a pupil diameter, glint location, a glint-pupil vector, a Haar-like feature, a result of an ellipse fitting approach, and a result of pupil edge filtering.

In one example, the eye positions that fall outside the certain range span at least 20° of the eye's field of view. In another example, the eye positions that fall outside the certain range span at least 40° of the eye's field of view, and the first average rate is at least ten times the second average rate.

In one embodiment, the eye tracking system includes the second head-mounted camera 306, configured to capture a second set of images of the eye from a different position than the head-mounted camera. Optionally, the computer 308 is further configured to calculate pupil features based on the second set of images at a higher bitrate when the eye positions fall outside the certain range compared to when the eye positions fall within the certain range.

The computer 308 may optionally command the head-mounted camera 304 to operate in a low-power mode for a longer percent of time while the eye positions fall outside the certain range compared to a percent of time it operates in the low-power mode while the eye positions fall within the certain range. Similarly, the computer 308 may command the second head-mounted camera 306 to operate in a low-power mode for a longer percent of time while the eye positions fall within the certain range compared to a percent of time it operates in the low-power mode while the eye positions fall outside the certain range.

In one embodiment, the head-mounted camera 304 and the second head-mounted camera 306 are connected to the computer 308 over a bus that does not have sufficient bandwidth to transfer images from both cameras at a maximum bitrate at which the computer is capable of reading from each camera. Optionally, the head-mounted camera 304 and the second head-mounted camera 306 are positioned at least 2 cm apart horizontally.

In one embodiment, calculating the eye positions based on the signals is performed at a rate that is at least ten times higher than a rate at which the images are captured by the head-mounted camera, and the computer is further configured to command the head-mounted camera to operate in a low-power mode for a longer percent of time while the eye positions fall outside the certain range compared to a percent of time it operates in low-power mode while the eye positions fall within the certain range.

The following is an additional embodiment of a method that may be used by systems modeled according to FIG. 9A. The steps described below may be performed by running a computer program having instructions for implementing the method. Optionally, the instructions may be stored on a computer-readable medium, which may optionally be a non-transitory computer-readable medium. In response to execution by a system including a processor and memory, the instructions cause the system to perform the following steps:

In Step 1, measuring, by a head-mounted device, signals indicative of positions of an eye of a user (eye positions).

In Step 2, capturing images of the eye by a head-mounted camera.

In Step 3, calculating the eye positions based on the signals. The head-mounted camera is better positioned to capture images of the user's pupil when the eye positions fall within a certain range compared to when the eye positions fall outside the certain range.

In Step 4, calculating, at a first average rate, pupil features based on images captured when the eye positions fall within the certain range.

And in Step 5, refraining from calculating pupil features, or calculating pupil features at a second average rate that is less than half the first average rate, based on images captured when the eye positions fall outside the certain range.

In one embodiment, the method may optionally include the following steps: capturing, by a second head-mounted camera, a second set of images of the eye from a different position than the head-mounted camera, and calculating pupil features based on the second set of images at a higher bitrate when the eye positions fall outside the certain range compared to when the eye positions fall within the certain range. Optionally, the method may include a step of commanding the head-mounted camera to operate in a low-power mode for a longer percent of time while the eye positions fall outside the certain range compared to a percent of time it operates in the low-power mode while the eye positions fall within the certain range. Optionally, the method may include a step of commanding the second head-mounted camera to operate in a low-power mode for a longer percent of time while the eye positions fall within the certain range compared to a percent of time it operates in the low-power mode while the eye positions fall outside the certain range.

In one embodiment, calculating of the eye positions based on the signals in Step 3 is performed at a rate that is at least ten times higher than rate of capturing the images by the head-mounted camera in Step 2. Optionally, the method includes a step of commanding the head-mounted camera to operate in a low-power mode for a longer percent of time while the eye positions fall outside the certain range compared to a percent of time it operates in low-power mode while the eye positions fall within the certain range.

This paragraph discloses claims that the Applicant may file in a continuation-in-part (CIP) patent application. 1. An eye tracking system comprising: a head-mounted device configured to measure signals indicative of positions of an eye of a user (eye positions); a head-mounted camera configured to capture images of the eye; and a computer configured to: calculate the eye positions based on the signals; whereby the head-mounted camera is better positioned to capture images of the user's pupil when the eye positions fall within a certain range compared to when the eye positions fall outside the certain range; calculate, at a first average rate, pupil features based on images captured when the eye positions fall within the certain range; and refrain from calculating pupil features, or calculate pupil features at a second average rate that is less than half the first average rate, based on images captured when the eye positions fall outside the certain range. 2. The eye tracking system of claim 1, further comprising a second head-mounted camera configured to capture a second set of images of the eye from a different position than the head-mounted camera; and wherein the computer is further configured to calculate pupil features based on the second set of images at a higher bitrate when the eye positions fall outside the certain range compared to when the eye positions fall within the certain range. 3. The eye tracking system of claim 2, wherein the computer is further configured to command the head-mounted camera to operate in a low-power mode for a longer percent of time while the eye positions fall outside the certain range compared to a percent of time it operates in the low-power mode while the eye positions fall within the certain range; and wherein the computer is further configured to command the second head-mounted camera to operate in a low-power mode for a longer percent of time while the eye positions fall within the certain range compared to a percent of time it operates in the low-power mode while the eye positions fall outside the certain range. 4. The eye tracking system of claim 2, wherein the head-mounted camera and the second head-mounted camera are connected to the computer over a bus that does not have sufficient bandwidth to transfer images from both cameras at a maximum bitrate at which the computer is capable of reading from each camera; and wherein the head-mounted camera and the second head-mounted camera are positioned at least 2 cm apart horizontally. 5. The eye tracking system of claim 1, wherein the eye positions that fall outside the certain range span at least 20° of the eye's field of view, and the pupil features comprise at least one of: pupil center location, a pupil contour, a pupil diameter, glint location, a glint-pupil vector, a Haar-like feature, a result of an ellipse fitting approach, and a result of pupil edge filtering. 6. The eye tracking system of claim 1, wherein the eye positions that fall outside the certain range span at least 40° of the eye's field of view, and the first average rate is at least ten times the second average rate. 7. The eye tracking system of claim 1, wherein calculating the eye positions based on the signals is performed at a rate that is at least ten times higher than a rate at which the images are captured by the head-mounted camera, and the computer is further configured to command the head-mounted camera to operate in a low-power mode for a longer percent of time while the eye positions fall outside the certain range compared to a percent of time it operates in low-power mode while the eye positions fall within the certain range. 8. The eye tracking system of claim 1, wherein the head-mounted device comprises a photosensor-oculography device (PSOG), and the signals are reflections of light emitted by the PSOG towards the eye. 9. The eye tracking system of claim 8, further comprising a second head-mounted camera configured to capture a second set of images of the eye from a different position than the head-mounted camera; and wherein upon detecting a sensor shift above a threshold, the computer is further configured to update a lookup table configured to select which of the head-mounted cameras to utilize for capturing the images. 10. The eye tracking system of claim 8, wherein the computer is further configured to generate feature values based on data comprising the reflections and the images, and to utilize a model to calculate the eye positions based on the feature values. 11.

The eye tracking system of claim 8, wherein the computer is further configured to (i) extract a set of eyelid positions based on analyzing the images, and (ii) provide labels that are based on the set of eyelid positions, and corresponding feature values that are based on the emitted light and the reflections, to train a model for calculating eyelid position based on the reflections. 12. The eye tracking system of claim 1, wherein the head-mounted device comprises an electrooculography device, and the signals are electrical potentials between electrodes placed close to the eye. 13. The eye tracking system of claim 1, wherein the head-mounted device comprises an electromyography device, and the signals are electrical potentials generated by muscle cells. 14.

The eye tracking system of claim 1, wherein the head-mounted device comprises an optical flow sensor, the signals are optical flow and/or visual motion, and the eye positions are calculated based on an optical flow algorithm. 15. The eye tracking system of claim 1, wherein the head-mounted device comprises range sensors, and the signals are ranges between the range sensors and the eye. 16. A method comprising: measuring, by a head-mounted device, signals indicative of positions of an eye of a user (eye positions); capturing images of the eye by a head-mounted camera; calculating the eye positions based on the signals; whereby the head-mounted camera is better positioned to capture images of the user's pupil when the eye positions fall within a certain range compared to when the eye positions fall outside the certain range; calculating, at a first average rate, pupil features based on images captured when the eye positions fall within the certain range; and refraining from calculating pupil features, or calculating pupil features at a second average rate that is less than half the first average rate, based on images captured when the eye positions fall outside the certain range. 17. The method of claim 16, further comprising capturing, by a second head-mounted camera, a second set of images of the eye from a different position than the head-mounted camera, and calculating pupil features based on the second set of images at a higher bitrate when the eye positions fall outside the certain range compared to when the eye positions fall within the certain range. 18.

The method of claim 17, further comprising commanding the head-mounted camera to operate in a low-power mode for a longer percent of time while the eye positions fall outside the certain range compared to a percent of time it operates in the low-power mode while the eye positions fall within the certain range; and further comprising commanding the second head-mounted camera to operate in a low-power mode for a longer percent of time while the eye positions fall within the certain range compared to a percent of time it operates in the low-power mode while the eye positions fall outside the certain range. 19. The method of claim 16, wherein the calculating of the eye positions based on the signals is performed at a rate that is at least ten times higher than rate of capturing the images by the head-mounted camera, and further comprising commanding the head-mounted camera to operate in a low-power mode for a longer percent of time while the eye positions fall outside the certain range compared to a percent of time it operates in low-power mode while the eye positions fall within the certain range. 20. A non-transitory computer readable medium storing one or more computer programs configured to cause a processor based system to execute steps comprising: measuring, by a head-mounted device, signals indicative of positions of an eye of a user (eye positions); capturing images of the eye by a head-mounted camera; calculating the eye positions based on the signals; whereby the head-mounted camera is better positioned to capture images of the user's pupil when the eye positions fall within a certain range compared to when the eye positions fall outside the certain range; calculating, at a first average rate, pupil features based on images captured when the eye positions fall within the certain range; and refraining from calculating pupil features, or calculating pupil features at a second average rate that is less than half the first average rate, based on images captured when the eye positions fall outside the certain range.

The normal eye blinking rate varies according to the task performed, and is on average between of 4 and 17 blinks/minute, with an average duration of a blink between 100 ms and 400 ms. Eye blinking affects the performance of video-based eye trackers that cannot track the limbus and/or the pupil when occluded by the eyelid. In addition, when the eye is partially occluded by the eyelid at the beginning and end of the blink, gaze point estimation accuracy may decrease. Moreover, depending on the eyelid position, there may be areas in the image that are useless for eye tracking, such as areas covered by the eyelid; these areas can be cropped from the image before feeding it to the VOG's image processer, and/or not read from the head-mounted camera sensor by setting the sensor's ROI readout according to the eyelid position. Because battery operated head-mounted systems usually strive to save power, and because devices such as PSOG are more power efficient than VOG, detecting the eyelid position using devices such as PSOG and then timing the image capturing and/or adjusting the image size according to the visible portion of the eye, can save power.

Figure 10:
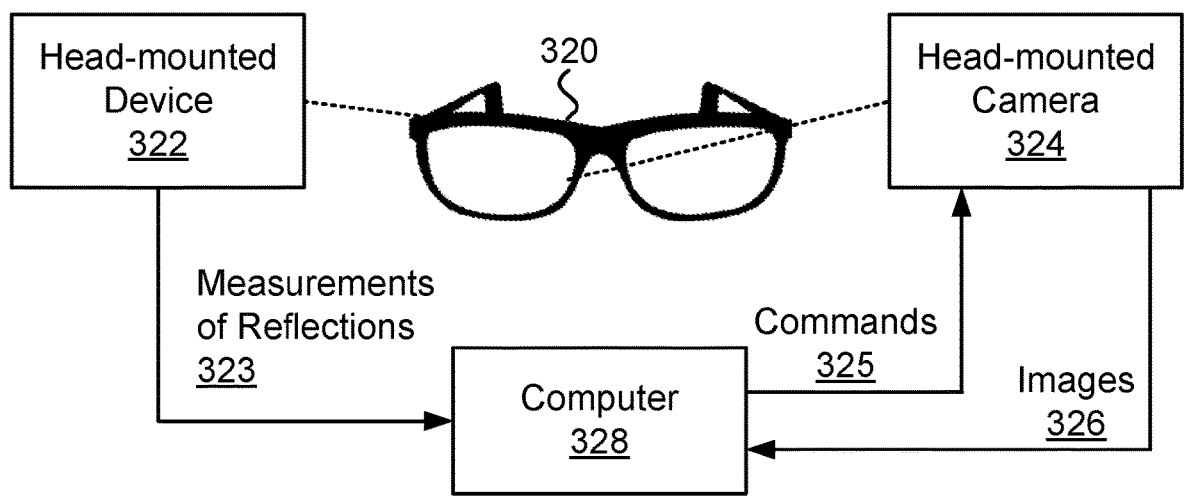
FIG. 10 illustrates an embodiment of an eye tracking system that is configured to operate a camera according to eyelid position.

FIG. 10 illustrates an embodiment of an eye tracking system that is configured to operate a camera according to eyelid position. The eye tracking system includes at least an inward-facing head-mounted camera 324, a head-mounted device 322, and a computer 328. Optionally, one or more of these components is coupled to the frame of smartglasses 320.

The head-mounted camera 324 is configured to capture images 326 of an eye of the user. The head-mounted device 322 is configured to emit electromagnetic waves towards the eye, and to measure reflections of the electromagnetic waves from the eye. An average rate at which the reflections are measured is at least ten times an average rate at which the images 326 are captured.

The computer 328 is configured to: detect, based on the reflections (through analysis of measurements 323 of the reflections), a position of at least one of the following: the upper and lower eyelids covering the eye (this position is referred to herein as "eyelid position"). The computer 328 is configured to operate the head-mounted camera 324 according to the eyelid position in a manner that (i) increases, in the captured images, areas depicting the iris, and (ii) decreases, in the captured images, areas depicting at least one of the eyelids.

Figure 11A:
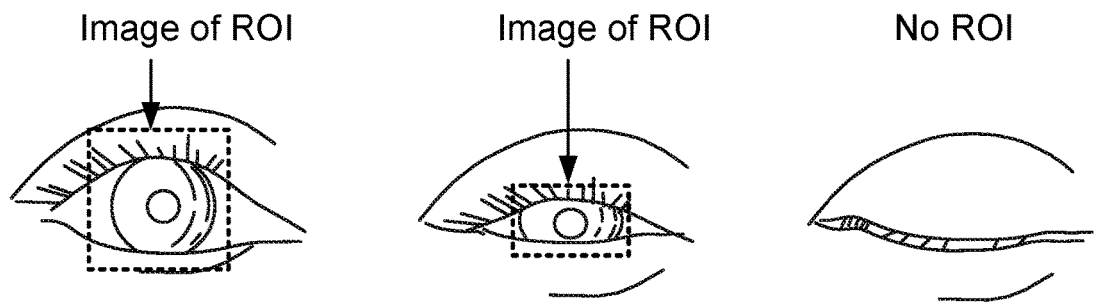
FIG. 11A illustrates setting different sizes of an ROI based on the eyelid position.

In one embodiment, the head-mounted camera 324 utilizes a sensor that supports changing of its region of interest (ROI), and the computer 328 is further configured to utilize the eyelid position to set the ROI around a portion of the eye that is not covered by the at least one of the upper and lower eyelids. One example of setting the ROI around a portion of the eye that is not covered by the eyelids is to select a rectangle having a height that is a bit longer than the maximum distance between the upper and lower eyelids. Optionally, the ROI covers less than half the sensor's field-of-view. Optionally, the computer 328 is configured to set the ROI such that the size of the ROI is proportional to percent of the eyeball covered by the eyelid. The proportion may be implemented in steps, such as having 2-6 predefined sizes for the ROI, which depend on the eyelid position. Alternatively, the proportion may be finer, such that the more the at least one of upper and lower eyelids covers the eyeball the smaller the size of the ROI. FIG. 11A illustrates setting different sizes of the ROI based on the eyelid position (with no ROI being set when the eye is shut).

In one embodiment, the computer 328 is further configured to calculate a level of tiredness based on the eyelid position, and to adjust a frequency at which the images 326 are captured based on the level of tiredness. For example, while using an entertainment application, the computer may reduce the frequency at which the images are captured as the user becomes more tired because it may be assumed that the user's responses become slower. In another example, while using a driver safety application, the computer may increase the frequency at which the images are captured as the user becomes more tired.

In one embodiment, the computer 328 is further configured to detect a raising of the upper eyelid based on the measurements 323 of the reflections, and to increase frame rate of the camera 324 during the time the upper eyelid is raised above a threshold. Raising of the upper eyelid may indicate an emotional response comprising an expression of surprise, which may be worth monitoring.

In one embodiment, the computer 328 is further configured to detect a raising of the lower eyelid based on the reflections, and to increase frame rate of the camera 324 during the time the lower eyelid is raised above a threshold. Raising of the lower eyelid may indicate an emotional response comprising an expression of anger, which may be worth monitoring.

Figure 11B:
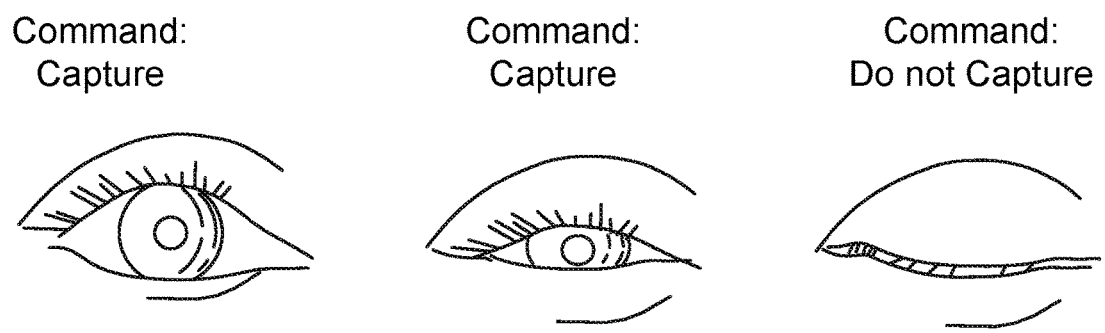
FIG. 11B illustrates sending commands by a computer to capture images based on eyelid position.

In one embodiment, in order to operate the camera according to the eyelid position the computer is configured to refrain from commanding the camera to capture the images during blinks and/or while the eye is closed. Such a scenario is illustrated in FIG. 11B, which shows cases when commands to capture images are sent by the computer (when the eye is open), and when a command is not sent (when the eye is shut).

In one embodiment, the computer 328 is further configured to perform the following steps to train a machine learning-based model that is used for detecting the eyelid position based on the reflections: extract eyelid positions by analyzing the images (image-based positions), generate labels based on the image-based positions, generate feature values based on the reflections, and provide the labels and feature values to train the machine learning-based model for detecting the eyelid position based on the reflections.

In one embodiment, the computer 328 is further configured to perform the following steps to train a machine learning-based model that is used for detecting the eyelid position based on the reflections: receive photos from a camera belonging to a non-head-mounted device, extract eyelid positions by analyzing the photos (photo-based positions), generate labels based on the photo-based positions, generate feature values based on the reflections, and provide the labels and feature values to train the machine learning-based model for detecting the eyelid position based on the reflections.

In one embodiment, the computer 328 comprises a head-mounted computer and a non-head-mounted computer that are configured to communicate over a wireless communication channel, the non-head-mounted computer is configured to train the model, and the head-mounted computer is configured to use the trained model for detecting the eyelid position based on reflections.

Various types of devices may be utilized to generate the measurements 323 of the reflections from the eye.

In one embodiment, the head-mounted device 322 comprises a photosensor-oculography device (PSOG) configured to measure reflections of light emitted by the PSOG towards the eye. Optionally, the PSOG may include near-infrared (NIR), since NIR reflectance of the eyelid is different from the NIR reflectance of the eye, and the NIR reflectance of the eyelashes is different from the NIR reflectance of the skin. Thus, when the head-mounted device is PSOG, movements of the eyelid change the measured NIR reflections, and by that enable the PSOG to detect the eyelid position.

In one embodiment, the head-mounted device 322 comprises an optical flow sensor that measures optical flow and/or visual motion, and the eyelid position is calculated based on an optical flow algorithm.

In one embodiment, the head-mounted device 322 comprises range sensors configured to measure ranges between the range sensors and the eye. Measurements of the range sensors are affected by the eyelid position.

The following is an additional embodiment of a method that may be used by systems modeled according to FIG. 10. The steps described below may be performed by running a computer program having instructions for implementing the method. Optionally, the instructions may be stored on a computer-readable medium, which may optionally be a non-transitory computer-readable medium. In response to execution by a system including a processor and memory, the instructions cause the system to perform the following steps:

In Step 1, capturing images of an eye by an inward-facing head-mounted camera.

In Step 2, emitting, by a head-mounted device, electromagnetic waves towards the eye, and measuring reflections of the electromagnetic waves from the eye. Optionally, an average rate of measuring the reflections is at least ten times average rate of capturing the images.

In Step 3, detecting, based on the reflections, position of at least one of upper and lower eyelids covering the eye (eyelid position).

And in Step 4 operating the camera according to the eyelid position in a manner that (i) increases, in the captured images, areas depicting the iris, and (ii) decreases, in the captured images, areas depicting at least one of the eyelids.

In one embodiment, the camera utilizes a sensor that supports changing of its region of interest (ROI), and the method optionally includes a step of utilizing the eyelid position to set the ROI around a portion of the eye that is not covered by the at least one of upper and lower eyelids.

In one embodiment, the method optionally includes a step of calculating a level of tiredness based on the eyelid position, and adjusting a frequency at which the images are captured based on the level of tiredness.

In one embodiment, the method optionally includes the following steps that are performed in order to train a machine learning-based model that is used for detecting the eyelid position based on the reflections: extracting eyelid positions by analyzing the images (image-based positions); generating labels based on the image-based positions; generating feature values based on the reflections; and providing the labels and feature values to train the machine learning-based model for detecting the eyelid position based on the reflections.

In one embodiment, the method optionally includes the following steps that are performed in order to a machine learning-based model that is used for detecting the eyelid position based on the reflections: receiving photos from a camera belonging to a non-head-mounted device, extracting eyelid positions by analyzing the photos (photo-based positions), generating labels based on the photo-based positions, generating feature values based on the reflections, and providing the labels and feature values to train the machine learning-based model for detecting the eyelid position based on the reflections.

This paragraph discloses claims that the Applicant may file in a continuation-in-part (CIP) patent application. 1. An eye tracking system configured to operate a camera according to eyelid position, comprising: an inward-facing head-mounted camera configured to capture images of an eye; a head-mounted device configured to emit electromagnetic waves towards the eye, and to measure reflections of the electromagnetic waves from the eye; wherein an average rate at which the reflections are measured is at least ten times an average rate at which the images are captured; and a computer configured to: detect, based on the reflections, a position of at least one of the upper and lower eyelids covering the eye (eyelid position); and operate the camera according to the eyelid position in a manner that (i) increases, in the captured images, areas depicting the iris, and (ii) decreases, in the captured images, areas depicting the at least one of the upper and lower eyelids. 2. The eye tracking system of claim 1, wherein the camera utilizes a sensor that supports changing of its region of interest (ROI), and the computer is further configured to utilize the eyelid position to set the ROI around a portion of the eye that is not covered by the at least one of upper and lower eyelids. 3. The eye tracking system of claim 2, wherein the ROI covers less than half the sensor's field-of-view. 4. The eye tracking system of claim 2, wherein the computer is configured to set the ROI such that the size of the ROI is proportional to percent of the eyeball covered by the eyelid. 5. The eye tracking system of claim 2, wherein the computer is further configured to calculate a level of tiredness based on the eyelid position, and to adjust a frequency at which the images are captured based on the level of tiredness. 6. The eye tracking system of claim 2, wherein the computer is further configured to detect a raising of the upper eyelid based on the reflections, and to increase frame rate of the camera during the time the upper eyelid is raised above a threshold. 7. The eye tracking system of claim 2, wherein the computer is further configured to detect a raising of the lower eyelid based on the reflections, and to increase frame rate of the camera during the time the lower eyelid is raised above a threshold. 8. The eye tracking system of claim 1, wherein in order to operate the camera according to the eyelid position the computer is configured to refrain from commanding the camera to capture the images during blinks and/or while the eye is closed. 9. The eye tracking system of claim 1, wherein the computer is further configured to perform the following steps to train a machine learning-based model that is used for detecting the eyelid position based on the reflections: extract eyelid positions by analyzing the images (image based positions), generate labels based on the image-based positions, generate feature values based on the reflections, and provide the labels and feature values to train the machine learning-based model for detecting the eyelid position based on the reflections. 10. The eye tracking system of claim 1, wherein the computer is further configured to perform the following steps to train a machine learning-based model that is used for detecting the eyelid position based on the reflections: receive photos from a camera belonging to a non-head-mounted device, extract eyelid positions by analyzing the photos (photo-based positions), generate labels based on the photo-based positions, generate feature values based on the reflections, and provide the labels and feature values to train the machine learning-based model for detecting the eyelid position based on the reflections. 11. The eye tracking system of claim 10, wherein the computer comprises a head-mounted computer and a non-head-mounted computer that are configured to communicate over a wireless communication channel, the non-head-mounted computer is configured to train the model, and the head-mounted computer is configured to use the trained model for detecting the eyelid position based on reflections. 12. The eye tracking system of claim 1, wherein the head-mounted device comprises a photosensor-oculography device (PSOG) configured to measure reflections of light emitted by the PSOG towards the eye. 13. The eye tracking system of claim 1, wherein the head-mounted device comprises an optical flow sensor configured to measure optical flow and/or visual motion, and the eyelid position is calculated based on an optical flow algorithm. 14. The eye tracking system of claim 1, wherein the head-mounted device comprises range sensors configured to measure ranges between the range sensors and the eye; whereby measurements of the range sensors are affected by the eyelid position. 15. A method comprising: capturing images of an eye by an inward-facing head-mounted camera; emitting, by a head-mounted device, electromagnetic waves towards the eye, and measuring reflections of the electromagnetic waves from the eye; wherein average rate of measuring the reflections is at least ten times average rate of capturing the images; detecting, based on the reflections, a position of at least one of the upper and lower eyelids covering the eye (eyelid position); and operating the camera according to the eyelid position in a manner that (i) increases, in the captured images, areas depicting the iris, and (ii) decreases, in the captured images, areas depicting the at least one of the upper and lower eyelids. 16.

The method of claim 15, wherein the camera utilizes a sensor that supports changing of its region of interest (ROI), and further comprising utilizing the eyelid position to set the ROI around a portion of the eye that is not covered by the at least one of upper and lower eyelids. 17. The method of claim 16, further comprising calculating a level of tiredness based on the eyelid position, and adjusting a frequency at which the images are captured based on the level of tiredness. 18. The method of claim 15, further comprising performing the following steps to train a machine learning-based model that is used for detecting the eyelid position based on the reflections: extracting eyelid positions by analyzing the images (image-based positions); generating labels based on the image-based positions; generating feature values based on the reflections; and providing the labels and feature values to train the machine learning-based model for detecting the eyelid position based on the reflections. 19. The method of claim 15, further comprising performing the following steps to train a machine learning-based model that is used for detecting the eyelid position based on the reflections: receiving photos from a camera belonging to a non-head-mounted device, extracting eyelid positions by analyzing the photos (photo-based positions), generating labels based on the photo-based positions, generating feature values based on the reflections, and providing the labels and feature values to train the machine learning-based model for detecting the eyelid position based on the reflections. 20. A non-transitory computer readable medium storing one or more computer programs configured to cause a processor based system to execute steps comprising: capturing images of an eye by an inward-facing head-mounted camera; emitting, by a head-mounted device, electromagnetic waves towards the eye, and measuring reflections of the electromagnetic waves from the eye; wherein average rate of measuring the reflections is at least ten times average rate of capturing the images; detecting, based on the reflections, a position of at least one of the upper and lower eyelids covering the eye (eyelid position); and operating the camera according to the eyelid position in a manner that (i) increases, in the captured images, areas depicting the iris, and (ii) decreases, in the captured images, areas depicting the at least one of the upper and lower eyelids.

Head-mounted devices for detecting facial expressions by emitting light from multiple light sources towards a region on the user's face, and measuring the reflections of the light from the region utilizing discrete photosensors (i.e., very-low resolution photosensors), are known in the art. For example, (i) the reference Masai, Katsutoshi, et al. "Evaluation of facial expression recognition by a smart eyewear for facial direction changes, repeatability, and positional drift" ACM Transactions on Interactive Intelligent Systems (TiiS) 7.4 (2017): 1-23, which is incorporated herein by reference, discloses a smart eyewear that recognizes the wearer's facial expressions in daily scenarios utilizing head-mounted photo-reflective sensors and machine learning to recognize the wearer's facial expressions, (ii) the reference Suzuki, Katsuhiro, et al. "Recognition and mapping of facial expressions to avatar by embedded photo reflective sensors in head mounted display" 2017 IEEE Virtual Reality (VR), IEEE, 2017, discloses mapping of facial expressions between virtual avatars and head-mounted display (HMD) users, using retro-reflective photoelectric sensors located inside the HMD to measure distances between the sensors and the user's face, (iii) the reference Nakamura, Fumihiko, et al. "Automatic Labeling of Training Data by Vowel Recognition for Mouth Shape Recognition with Optical Sensors Embedded in Head-Mounted Display" ICAT-EGVE, 2019, discloses utilizing photo reflective sensors and position sensitive detectors to detect facial expressions. The Photo reflective sensors, which detect the intensity of reflected light at distances between ~1 mm and 20 mm in this reference, are used to measure the upper lip and the upper cheek. And the position sensitive detectors, which detect the position from which the reflected light is received from distances of between ~10 mm and 200 mm in this reference, are used to measure the lower lip and the cheek, and (iv) the reference Yamashita, Koki, et al. "CheekInput: turning your cheek into an input surface by embedded optical sensors on a head-mounted display" Proceedings of the 23rd ACM Symposium on Virtual Reality Software and Technology, 2017, senses touch gestures by detecting skin deformation using head-mounted photo-reflective sensors attached to onto the bottom front of an eyewear frame to measure distances between the frame and the cheeks.

One problem such systems often encounter, which is not addressed adequately in the prior art, involves in accounting for various interferences that may affect the reflections and introduce errors into detection of facial expressions based on reflections measured by photosensor-based devices. Embodiments described herein address such shortcomings.

Figure 12:
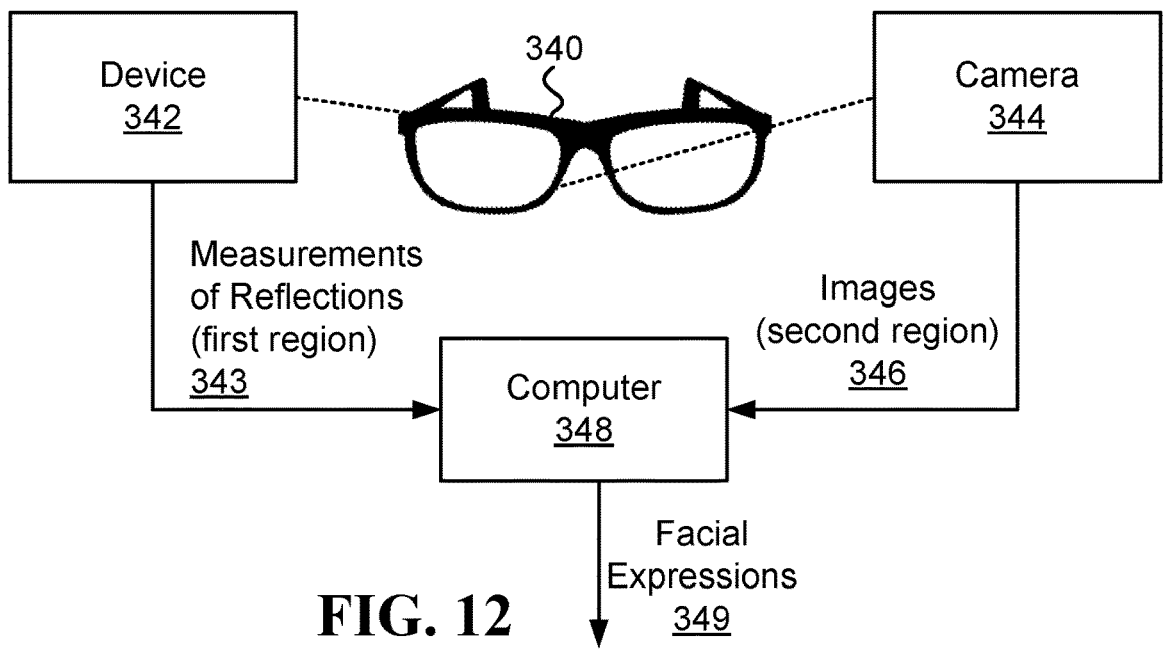
FIG. 12 illustrates an embodiment of a system configured to detect facial expressions.

FIG. 12 illustrates an embodiment of a system configured to detect facial expressions. The system includes at least a head-mounted device 342, a head-mounted camera 344, and a computer 348. Optionally, one or more of these components are coupled to a frame of smartglasses 340.

The head-mounted device 342 comprises (i) light sources configured to emit light towards a first region on a user's face, and (ii) discrete photosensors, spread over more than 2 cm, configured to measure reflections of the light from the first region. The head-mounted camera 344 is configured to capture images 346 of a second region on the face.

It is noted that the region in sentences in the form of "a head-mounted device . . . configured to measure reflections of the light from the first region" refer to one or more regions that may or may not overlap. For example, in a specific embodiment where the device includes a first set of LEDs and photosensors pointed at the eyebrow, and a second set of LEDs and photosensors pointed at the cheek, then the first region includes a first set of possibly overlapping regions on the eyebrow and a second set of possibly overlapping regions on the cheek, all of them referred to as the first region.

In one embodiment, the head-mounted device 342 and the head-mounted camera 344 are fixed to a smartglasses frame 340, at least a portion of the first region is located less than 4 cm from one of the user's eyeballs, the second region is located in a known position relative to the first region, and the first and second regions overlap.

In another embodiment, the head-mounted device 342 and the head-mounted camera 344 are fixed to a smartglasses frame 340, at least a portion of the first region is located less than 2 cm from one of the user's eyeballs, the second region is located in a known position relative to the first region, and the first and second regions do not overlap and have a minimal distance between their boarders below 2 cm.

In one embodiment, the first region comprises a portion of the user's nose, and both the head-mounted device 342 and the head-mounted camera 344 are mounted below the user's eye level.

In another embodiment, the first region comprises a portion of a cheek of the user, and the head-mounted device 344 is mounted below the user's eye level.

Figure 13A:
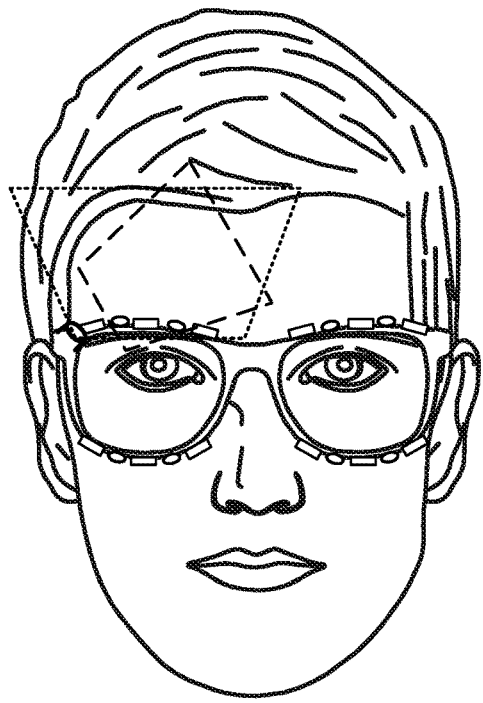
FIG. 13A, FIG. 13B, and FIG. 13C illustrate an embodiment of smartglasses with a system configured to detect facial expressions.
Figure 13B:
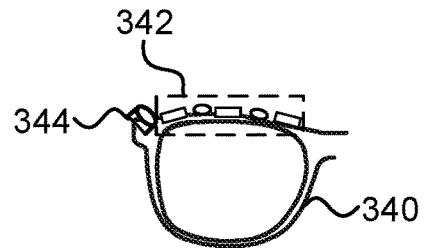
Figure 13C:
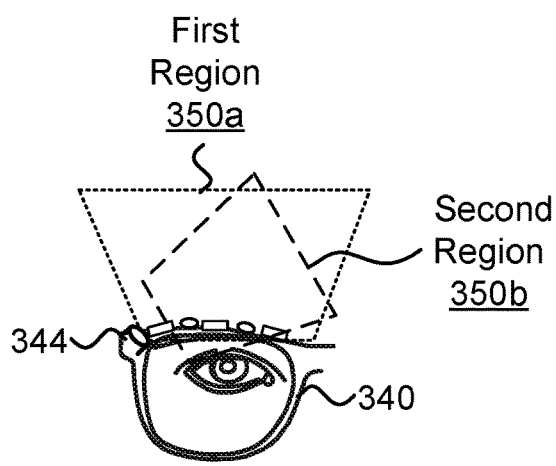

FIG. 13A to FIG. 13C illustrate one embodiment of the system illustrated in FIG. 12, in which the head-mounted device 342 and the head-mounted camera 344 are coupled to the smartglasses 340. The head-mounted device 342 comprises multiple light sources and photodetectors that emit light to a first region 350*a* on the user's forehead. Head-mounted camera 344 captures images of a second region 350*b*.

The computer 344 is configured to: identify, based on the images 346, an extent of presence of hair over a portion of the first region. The computer 344 calculates an effect of the extent on the reflections, and detects facial expressions 349 of the user based on measurements 343 of the reflections and the effect.

The effect of an interference (such as presence of hair, makeup, and/or perspiration) on the reflections may be calculated in various ways. In a first example, the computer already has pre-calculated models suitable for different extents of various interferences, and the method includes detecting the interference based on the images (such as extent of presence of hair over the forehead), and selecting the most suitable model for the detected interference. The model may have various forms, such as (i) a lookup table that maps between combinations of amplitudes of the reflections and facial expressions, (ii) a function that receives a combination of amplitudes of the reflections and outputs a facial expression, and/or (iii) a machine learning based model that was trained on samples comprising combinations of amplitudes of the reflections as feature values and facial expressions as labels. In a second example, the computer (i) extracts from the images both the facial expressions and the interferences, optionally using known methods to classify facial expressions from images and to detect (interfering)

objects in the images, (ii) generates labels from said facial expressions and interferences, (iii) generates feature values from their corresponding reflections that were measured essentially at the same time, and (iv) train a machine learning-based model to detect facial expressions based on the feature values.

In one embodiment, an average rate at which the reflections are measured is at least 50 times higher than an average rate at which the images 346 are captured, and the average rate at which the facial expressions 349 are detected is at least 10 times higher than the average rate at which the images 346 were captured.

In one example, the reflections are measured at an average rate of 50 Hz, the computer 348 processes the reflections and detects the facial expressions 349 at an average rate of 25 Hz based on the reflections (i.e., each calculation of a facial expression based on the reflections is referred to as detection of the facial expression), the images are captured at an average rate of 0.5 Hz, and the computer utilizes the images 349 for calibrations at an average rate of 0.5 Hz for calculations involved in detecting the facial expressions based on the reflections.

In one embodiment, an average rate at which the reflections are measured is at least ten times an average rate at which the images 346 are captured, and the computer 348 is further configured to generate feature values based on data comprising the images 346 and measurements of the reflections, and to utilize a model to calculate, based on the feature values, values indicative of the facial expressions of the user. Optionally, at least some of the feature values may be indicative of extents of various interferences on the reflections.

In one embodiment, at least one of the feature values calculated based on the images 346 is indicative of the effect on the reflections due to the presence of the hair over the portion of the first region. The changes related to the hair (such as hair that covers a portion of the first region, and/or hair that moves over a portion of the first region) may change the colors and topography of the surface that reflects the light measured by the discrete photosensors, and thus affect the detection of the facial expressions based on the reflections. In order to account for these color changes, the computer detects these color changes, optionally by analyzing one or more of the images using an image processing method.

Figure 14:
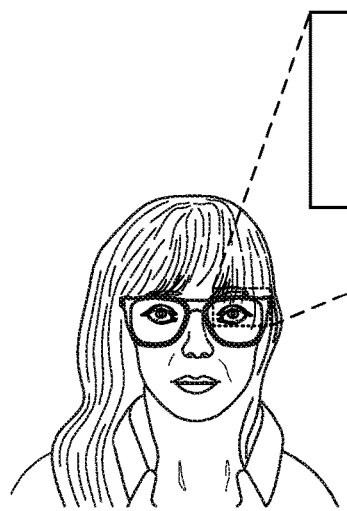
FIG. 14 illustrates a scenario in which hair covers the eyebrow.

FIG. 14 illustrates a scenario in which hair covers the eyebrow (which can affect reflections in the system illustrated in FIG. 13A).

In one embodiment, the computer 348 is further configured to: (i) identify, based on the images, makeup applied over an additional portion of the first region; (ii) calculate an additional effect on the reflections as a result of the makeup; and (iii) utilize the additional effect in the detection of the facial expressions. It is noted that depending on the image processing algorithm, the portion of the first region and the additional portion of the first region may coincide, overlap, or not overlap.

Optionally, the feature values generated by the computer 348 based on the images 346 and the measurements 343 of the reflections comprise a first feature value calculated based on the images 346 which is indicative of the effect on the reflections due to the presence of the hair over the portion of the first region, and a second feature value calculated based on the images 346 which is indicative of the additional effect on the reflections due to the makeup applied to the additional portion of the first region.

Makeup may change the colors and topography of the surface that reflects the light measured by the discrete photosensors, and thus affect the detection of the facial expressions based on the reflections. In order to account for these color changes, the computer detects these color changes, optionally using a known image processing method applied to one or more of the images. Examples of characteristics of the makeup include values indicative of the effect of the makeup on the reflections, and an index representing different makeups applied on the face.

In one embodiment, the computer 348 is further configured to: (i) identify, based on the images, a change in a level of skin wetness at an additional portion of the first region; (ii) calculate an additional effect on the reflections as a result of the change in the level of skin wetness; and (iii) utilize the additional effect in the detection of the facial expressions.

Optionally, the feature values generated by the computer 348 based on the images 346 and the measurements 343 of the reflections comprise a first feature value calculated based on the images which is indicative of the effect on the reflections due to the presence of the hair over the portion of the first region, and a second feature value calculated based on the images which is indicative of the additional effect on the reflections due to the change in a level of skin wetness at the additional portion of the first region.

Events such as perspiration, getting wet in the rain, a change in the environment humidity level, and/or direct wind hitting the user's face, may cause a change in the level of skin wetness, which can affect the colors and topography of the surface that reflects the light measured by the discrete photosensors, and thus affect the detection of the facial expressions based on the reflections. By analyzing the images using an image processing method, the computer can detect the change in the level of skin wetness, and use a value indicative of the level of skin wetness as an input for detecting the facial expressions based on the reflections.

In one embodiment, the computer 348 is further configured to: (i) identify, based on the images, skin infection at an additional portion of the first region; (ii) calculate an additional effect on the reflections as a result of the skin infection; and (iii) utilize the additional effect in the detection of the facial expressions.

Optionally, the feature values generated by the computer 348 based on the images 346 and the measurements 343 of the reflections comprise a first feature value calculated based on the images which is indicative of the effect on the reflections due to the presence of the hair over the portion of the first region, and a second feature value calculated based on the images which is indicative of the additional effect on the reflections due to the skin infection at the additional portion of the first region.

Skin infections, such as acne, may change the colors and topography of the surface that reflects the light measured by the discrete photosensors, and thus affect the detection of the facial expressions based on the reflections. In order to account for these color changes, the computer detects these color changes, optionally using a known image processing method applied to one or more of the images. One example of the data indicative of the skin infection include values indicative of the effect of the skin infection on the reflections.

Different facial expressions deform different parts of the face to different extents, thus the relevancy of different light sources during different facial expressions may be different. In order to save power, the system may operate the more relevant light sources for the specific facial expression more frequently than the less relevant light sources for the specific facial expression. In one embodiment, the computer 348 is further configured to operate the light sources according to first and second different schedules responsive to detecting first and second different facial expressions belonging to the facial expressions.

In one embodiment, the first region comprises a portion of an eyebrow of the user, and both the device and the camera are mounted above the user's eye level. Optionally, in this embodiment, the system further comprises a head-mounted movement sensor configured to measure movements, and the computer 348 is further configured to emit the light at a first average bitrate when the movements are below a threshold, and to emit the light at a second average bitrate, which is higher than the first average bitrate, when the movements are above the threshold.

The reflectance of the eyebrow is different from the skin. For example, the eyebrow may be darker than the skin and have a lower reflectance in IR light than its surrounding skin. As a result, movements of the eyebrow change the measured NIR reflections. Additionally, until some extent, there is usually a relationship between interesting facial expressions and head movements; thus, in order to save power, the system may increase the rate of emitting the light when the head movements reach a threshold.

In one example, the head-mounted device is used to detect when the user expresses a certain facial expression, such as a neutral facial expression, and to collect iPPG signals during that time. This should enable better comparison of iPPG values from different times, and may also result in collecting more accurate signals (depending on the certain facial expression). Optionally, the iPPG is calculated based on images captured while the user expressed a neutral facial expression, and the reflections are used to detect the times the user expresses the neutral facial expression.

The following is an additional embodiment of a method that may be used by systems modeled according to FIG. 12. The steps described below may be performed by running a computer program having instructions for implementing the method. Optionally, the instructions may be stored on a computer-readable medium, which may optionally be a non-transitory computer-readable medium. In response to execution by a system including a processor and memory, the instructions cause the system to perform the following steps:

In Step 1, emitting, by a head-mounted device, light towards a first region on a user's face, and measuring by discrete photosensors reflections of the light from the first region.

In Step 2, capturing, by a head-mounted camera, images of a second region on the face.

In Step 3, identifying, based on the images, extent of presence of hair over a portion of the first region.

In Step 4, calculating an effect of the extent on the reflections.

And in Step 5, detecting facial expressions of the user based on the reflections and the effect.

In one embodiment, the method optionally includes the following steps: generating feature values based on data comprising the images and measurements of the reflections, and utilizing a model for calculating, based on the feature values, values indicative of the facial expressions of the user. Optionally, at least one of the feature values calculated based on the images is indicative of the effect on the reflections due to the presence of the hair over the portion of the first region.

In one embodiment, the method optionally includes the following steps: (i) identifying, based on the images, makeup applied over an additional portion of the first region; (ii) calculating an additional effect on the reflections as a result of the makeup; and (iii) utilizing the additional effect in the detection of the facial expressions.

In one embodiment, the method optionally includes the following steps: generating feature values based on data comprising the images and measurements of the reflections, and utilizing a model for calculating, based on the feature values, values indicative of the facial expressions of the user. Optionally, the feature values comprise a first feature value calculated based on the images which is indicative of the effect on the reflections due to the presence of the hair over the portion of the first region, and a second feature value calculated based on the images which is indicative of the additional effect on the reflections due to the makeup applied to the additional portion of the first region.

This paragraph discloses claims that the Applicant may file in a continuation-in-part (CIP) patent application. 1. A system configured to detect facial expressions, comprising: a head-mounted device comprising (i) light sources configured to emit light towards a first region on a user's face, and (ii) discrete photosensors, spread over more than 2 cm, configured to measure reflections of the light from the first region; a head-mounted camera configured to capture images of a second region on the face; and a computer configured to: identify, based on the images, extent of presence of hair over a portion of the first region; calculate effect of the extent on the reflections; and detect facial expressions of the user based on the reflections and the effect. 2. The system of claim 1, wherein an average rate at which the reflections are measured is at least 50 times higher than an average rate at which the images are captured, and the average rate at which the facial expressions are detected is at least 10 times higher than the average rate at which the images were captured. 3. The system of claim 1, wherein an average rate at which the reflections are measured is at least ten times an average rate at which the images are captured, and the computer is further configured to generate feature values based on data comprising the images and measurements of the reflections, and to utilize a model to calculate, based on the feature values, values indicative of the facial expressions of the user; and wherein at least one of the feature values calculated based on the images is indicative of the effect on the reflections due to the presence of the hair over the portion of the first region. 4.

The system of claim 1, wherein an average rate at which the reflections are measured is at least ten times an average rate at which the images are captured, and the computer is further configured to: (i) identify, based on the images, makeup applied over an additional portion of the first region; (ii) calculate an additional effect on the reflections as a result of the makeup; and (iii) utilize the additional effect in the detection of the facial expressions. 5.

The system of claim 4, wherein the computer is further configured to generate feature values based on data comprising the images and measurements of the reflections, and to utilize a model to calculate, based on the feature values, values indicative of the facial expressions of the user; and wherein the feature values comprise a first feature value calculated based on the images which is indicative of the effect on the reflections due to the presence of the hair over the portion of the first region, and a second feature value calculated based on the images which is indicative of the additional effect on the reflections due to the makeup applied to the additional portion of the first region. 6. The system of claim 1, wherein an average rate at which the reflections are measured is at least ten times an average rate at which the images are captured, and the computer is further configured to: (i) identify, based on the images, a change in a level of skin wetness at an additional portion of the first region; (ii) calculate an additional effect on the reflections as a result of the change in the level of skin wetness; and (iii) utilize the additional effect in the detection of the facial expressions. 7. The system of claim 6, wherein the computer is further configured to generate feature values based on data comprising the images and measurements of the reflections, and to utilize a model to calculate, based on the feature values, values indicative of the facial expressions of the user; and wherein the feature values comprise a first feature value calculated based on the images which is indicative of the effect on the reflections due to the presence of the hair over the portion of the first region, and a second feature value calculated based on the images which is indicative of the additional effect on the reflections due to the change in a level of skin wetness at the additional portion of the first region. 8. The system of claim 1, wherein an average rate at which the reflections are measured is at least ten times an average rate at which the images are captured, and the computer is further configured to: (i) identify, based on the images, skin infection at an additional portion of the first region; (ii) calculate an additional effect on the reflections as a result of the skin infection; and (iii) utilize the additional effect in the detection of the facial expressions. 9. The system of claim 8, wherein the computer is further configured to generate feature values based on data comprising the images and measurements of the reflections, and to utilize a model to calculate, based on the feature values, values indicative of the facial expressions of the user; and wherein the feature values comprise a first feature value calculated based on the images which is indicative of the effect on the reflections due to the presence of the hair over the portion of the first region, and a second feature value calculated based on the images which is indicative of the additional effect on the reflections due to the skin infection at the additional portion of the first region. 10. The system of claim 1, wherein the computer is further configured to operate the light sources according to first and second different schedules responsive to detecting first and second different facial expressions belonging to the facial expressions. 11. The system of claim 1, wherein the device and the camera are fixed to a smartglasses frame, at least a portion of the first region is located less than 4 cm from one of the user's eyeballs, the second region is located in a known position relative to the first region, and the first and second regions overlap. 12. The system of claim 1, wherein the device and the camera are fixed to a smartglasses frame, at least a portion of the first region is located less than 2 cm from one of the user's eyeballs, the second region is located in a known position relative to the first region, and the first and second regions do not overlap and have a minimal distance between their boarders below 2 cm. 13. The system of claim 1, wherein the first region comprises a portion of an eyebrow of the user, and both the device and the camera are mounted above the user's eye level; and wherein the system further comprises a head-mounted movement sensor configured to measure movements, and the computer is further configured to emit the light at a first average bitrate when the movements are below a threshold, and to emit the light at a second average bitrate, which is higher than the first average bitrate, when the movements are above the threshold. 14. The system of claim 1, wherein the first region comprises a portion of the user's nose, and both the device and the camera are mounted below the user's eye level. 15. The system of claim 1, wherein the first region comprises a portion of a cheek of the user, and the device is mounted below the user's eye level. 16. A method comprising: emitting, by a head-mounted device, light towards a first region on a user's face, and measuring by discrete photosensors reflections of the light from the first region; capturing, by a head-mounted camera, images of a second region on the face; identifying, based on the images, extent of presence of hair over a portion of the first region; calculating an effect of the extent on the reflections; and detecting facial expressions of the user based on the reflections and the effect. 17. The method of claim 16, further comprising generating feature values based on data comprising the images and measurements of the reflections, and utilizing a model for calculating, based on the feature values, values indicative of the facial expressions of the user; and wherein at least one of the feature values calculated based on the images is indicative of the effect on the reflections due to the presence of the hair over the portion of the first region. 18. The method of claim 16, further comprising (i) identifying, based on the images, makeup applied over an additional portion of the first region; (ii) calculating an additional effect on the reflections as a result of the makeup; and (iii) utilizing the additional effect in the detection of the facial expressions. 19. The method of claim 18, further comprising generating feature values based on data comprising the images and measurements of the reflections, and utilizing a model for calculating, based on the feature values, values indicative of the facial expressions of the user; and wherein the feature values comprise a first feature value calculated based on the images which is indicative of the effect on the reflections due to the presence of the hair over the portion of the first region, and a second feature value calculated based on the images which is indicative of the additional effect on the reflections due to the makeup applied to the additional portion of the first region. 20. A non-transitory computer readable medium storing one or more computer programs configured to cause a processor based system to execute steps comprising: emitting, by a head-mounted device, light towards a first region on a user's face, and measuring by discrete photosensors reflections of the light from the first region; capturing, by a head-mounted camera, images of a second region on the face; identifying, based on the images, extent of presence of hair over a portion of the first region; calculating an effect of the extent on the reflections; and detecting facial expressions of the user based on the reflections and the effect.

Figure 15:
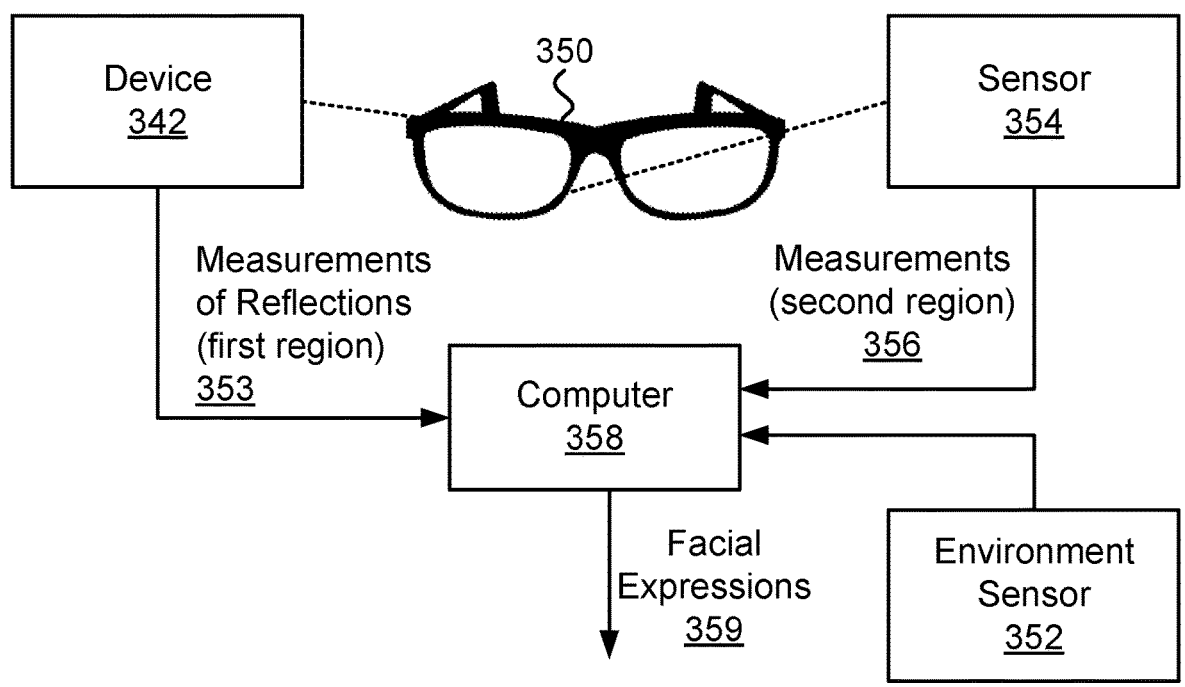
FIG. 15 illustrates an embodiment of a system configured to detect facial expressions while accounting for skin wetness.

FIG. 15 illustrates an embodiment of a system configured to detect facial expressions. The system includes at least the head-mounted device 342, a head-mounted sensor 354, and a computer 358.

In one embodiment, the head-mounted device 342 comprises (i) light sources configured to emit light towards a first region on a user's face, and (ii) discrete photosensors, spread over more than 2 cm, configured to take measurements 353 of reflections of the light from the first region. The head-mounted sensor 354 is configured to take measurements 356 of the second region on the face.

The computer 358 is configured to calculate a level of skin wetness based on the measurements 356, to calculate an effect of the level of skin wetness on the reflections, and to detect facial expressions 359 of the user based on the reflections and the effect.

In one embodiment, the sensor 354 comprises electrodes, the measurements 356 comprise a signal indicative of level of skin conductance, the computer 358 is configured to calculate the level of skin wetness based on the signal, and an average rate at which the reflections are measured is at least ten times higher than an average rate at which the signal is measured. Optionally, the level of skin conductance is indicative of extent of perspiration, and the computer 358 is further configured to utilize a pre-calculated model for estimating the effect of the extent of perspiration on the magnitudes of the reflections. Optionally, the device 342 and the sensor 354 are fixed to a smartglasses frame 350, at least a portion of the first region is located less than 4 cm from one of the user's eyeballs, and the second region is located in a known position relative to the first region.

Figure 16:
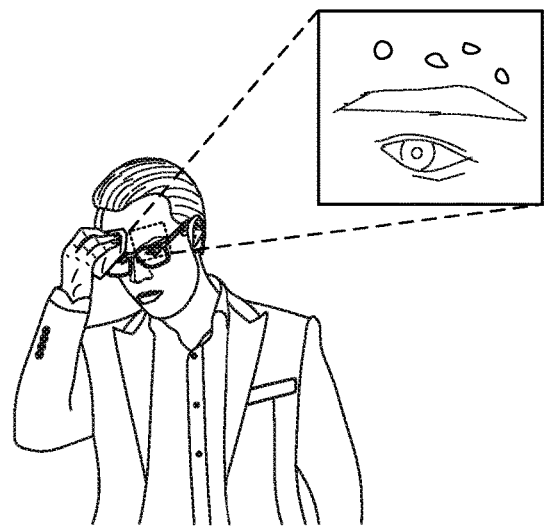
FIG. 16 illustrates a scenario in which skin wetness is above the eyebrow.

FIG. 16 illustrates a scenario in which skin wetness is above the eyebrow (e.g., due to perspiration). Such wetness can affect reflections in the system illustrated in FIG. 15.

Optionally, the first region comprises a portion of the user's nose, and both the device 342 and the sensor 354 are mounted below the user's eye level. Optionally, the first region comprises a portion of a cheek of the user, and the device 342 is mounted below the user's eye level.

In one embodiment, the system further comprises a second head-mounted sensor 352 configured to measure temperature and humidity levels of the environment, and the computer 358 is further configured to refine the calculation of the level of skin wetness based on the temperature and humidity levels.

In one embodiment, the sensor 354 comprises a camera, the measurements 356 comprise images of the second region, the computer 358 is configured to calculate the level of skin wetness based on analyzing the images, and an average rate at which the reflections are measured is at least ten times higher than an average rate at which the images are captured. Optionally, the device 342 and the sensor 354 are fixed to the smartglasses frame 250, such that at least a portion of the first region is located less than 4 cm from one of the user's eyeballs, the second region is located in a known position relative to the first region, and the first and second regions overlap.

In one embodiment, an average rate at which the reflections are measured is at least 10 times higher than an average rate at which the measurements 356 are taken, and the average rate at which the facial expressions are detected is higher than the average rate at which the measurements are taken.

In one embodiment, the computer 358 is further configured to operate the light sources according to first and second different schedules responsive to detecting first and second different facial expressions belonging to the facial expressions.

In one embodiment, the device 342 and the sensor 354 are fixed to a smartglasses frame, at least a portion of the first region is located less than 2 cm from one of the user's eyeballs, the second region is located in a known position relative to the first region, and the first and second regions do not overlap.

The following is an additional embodiment of a method that may be used by systems modeled according to FIG. 15. The steps described below may be performed by running a computer program having instructions for implementing the method. Optionally, the instructions may be stored on a computer-readable medium, which may optionally be a non-transitory computer-readable medium. In response to execution by a system including a processor and memory, the instructions cause the system to perform the following steps:

In Step 1, emitting, by a head-mounted device, light towards a first region on a user's face, and measuring by discrete photosensors reflections of the light from the first region.

In Step 2, taking measurements of a second region on the face by a head-mounted sensor. Optionally, the sensor comprises a camera, the measurements comprise images of the second region, the calculating of level of skin wetness is based on analyzing the images, and an average rate of measuring the reflections is at least ten times higher than an average rate of capturing the images.

In Step 3, calculating level of skin wetness based on the measurements taken in Step 2.

In Step 4, calculating an effect of the level of skin wetness on the reflections.

And in Step 5, detecting facial expressions of the user based on the reflections and the effect. Optionally, an average rate of measuring the reflections is at least 10 times higher than an average rate of taking the measurements, and the average rate of detecting the facial expressions is higher than the average rate of taking the measurements. Optionally, the sensor comprises electrodes, the measurements comprise a signal indicative of level of skin conductance, the calculating of level of skin wetness is based on the signal, and an average rate of measuring the reflections is at least ten times higher than an average rate of measuring the signal.

In one embodiment, the method optionally includes as step of operating the light sources according to first and second different schedules responsive to detecting first and second different facial expressions belonging to the facial expressions.

This paragraph discloses claims that the Applicant may file in a continuation-in-part (CIP) patent application. 1. A system configured to detect facial expressions, comprising: a head-mounted device comprising (i) light sources configured to emit light towards a first region on a user's face, and (ii) discrete photosensors, spread over more than 2 cm, configured to measure reflections of the light from the first region; a head-mounted sensor configured to take measurements of a second region on the face; and a computer configured to: calculate a level of skin wetness based on the measurements; calculate effect of the level of skin wetness on the reflections; and detect facial expressions of the user based on the reflections and the effect. 2. The system of claim 1, wherein the sensor comprises electrodes, the measurements comprise a signal indicative of level of skin conductance, the computer is configured to calculate the level of skin wetness based on the signal, and an average rate at which the reflections are measured is at least ten times higher than an average rate at which the signal is measured. 3. The system of claim 2, wherein the level of skin conductance is indicative of extent of perspiration, and the computer is further configured to utilize a pre-calculated model for estimating the effect of the extent of perspiration on the magnitudes of the reflections. 4. The system of claim 2, wherein the device and the sensor are fixed to a smartglasses frame, at least a portion of the first region is located less than 4 cm from one of the user's eyeballs, and the second region is located in a known position relative to the first region. 5. The system of claim 2, wherein the system further comprises a second head-mounted sensor configured to measure temperature and humidity levels of the environment, and the computer is further configured to refine the calculation of the level of skin wetness based on the temperature and humidity levels. 6. The system of claim 1, wherein the sensor comprises a camera, the measurements comprise images of the second region, the computer is configured to calculate the level of skin wetness based on analyzing the images, and an average rate at which the reflections are measured is at least ten times higher than an average rate at which the images are captured. 7. The system of claim 6, wherein the device and the sensor are fixed to a smartglasses frame, at least a portion of the first region is located less than 4 cm from one of the user's eyeballs, the second region is located in a known position relative to the first region, and the first and second regions overlap. 8. The system of claim 1, wherein an average rate at which the reflections are measured is at least 10 times higher than an average rate at which the measurements are taken, and the average rate at which the facial expressions are detected is higher than the average rate at which the measurements are taken. 9.

The system of claim 1, wherein the computer is further configured to operate the light sources according to first and second different schedules responsive to detecting first and second different facial expressions belonging to the facial expressions. 10. The system of claim 1, wherein the device and the sensor are fixed to a smartglasses frame, at least a portion of the first region is located less than 2 cm from one of the user's eyeballs, the second region is located in a known position relative to the first region, and the first and second regions do not overlap. 11. The system of claim 1, wherein the first region comprises a portion of the user's nose, and both the device and the sensor are mounted below the user's eye level. 12. The system of claim 1, wherein the first region comprises a portion of a cheek of the user, and the device is mounted below the user's eye level. 13. A method comprising: emitting, by a head-mounted device, light towards a first region on a user's face, and measuring by discrete photosensors reflections of the light from the first region; taking measurements of a second region on the face by a head-mounted sensor; calculating a level of skin wetness based on the measurements; calculating an effect of the level of skin wetness on the reflections; and detecting facial expressions of the user based on the reflections and the effect. 14. The method of claim 13, wherein the sensor comprises electrodes, the measurements comprise a signal indicative of level of skin conductance, the calculating of level of skin wetness is based on the signal, and an average rate of measuring the reflections is at least ten times higher than an average rate of measuring the signal. 15.

The method of claim 13, wherein the sensor comprises a camera, the measurements comprise images of the second region, the calculating of level of skin wetness is based on analyzing the images, and an average rate of measuring the reflections is at least ten times higher than an average rate of capturing the images. 16. The method of claim 13, wherein an average rate of measuring the reflections is at least 10 times higher than an average rate of taking the measurements, and the average rate of detecting the facial expressions is higher than the average rate of taking the measurements. 17. The method of claim 13, further comprising operating light sources according to first and second different schedules responsive to detecting first and second different facial expressions belonging to the facial expressions. 18. A non-transitory computer readable medium storing one or more computer programs configured to cause a processor based system to execute steps comprising: emitting, by a head-mounted device, light towards a first region on a user's face, and measuring by discrete photosensors reflections of the light from the first region; taking measurements of a second region on the face by a head-mounted sensor; calculating a level of skin wetness based on the measurements; calculating an effect of the level of skin wetness on the reflections; and detecting facial expressions of the user based on the reflections and the effect. 19. The non-transitory computer readable medium of claim 18, wherein the sensor comprises electrodes, the measurements comprise a signal indicative of level of skin conductance, the calculating of level of skin wetness is based on the signal, and an average rate of measuring the reflections is at least ten times higher than an average rate of measuring the signal. 20. The non-transitory computer readable medium of claim 18, wherein the sensor comprises a camera, the measurements comprise images of the second region, the calculating of level of skin wetness is based on analyzing the images, and an average rate of measuring the reflections is at least ten times higher than an average rate of capturing the images.

Another factor that may interfere with detection of facial expressions and/or facial landmarks is shifting of sensors used for the detections such as PSOG. Such shifts can occur because over the course of the day head-mounted systems (e.g., smartglasses) may move relative to the head (e.g., because they slip) and/or the head-mounted systems may be mounted at slightly different positions when they are put on. Some embodiments described herein account for such variations in position and/or orientation.

Figure 17:
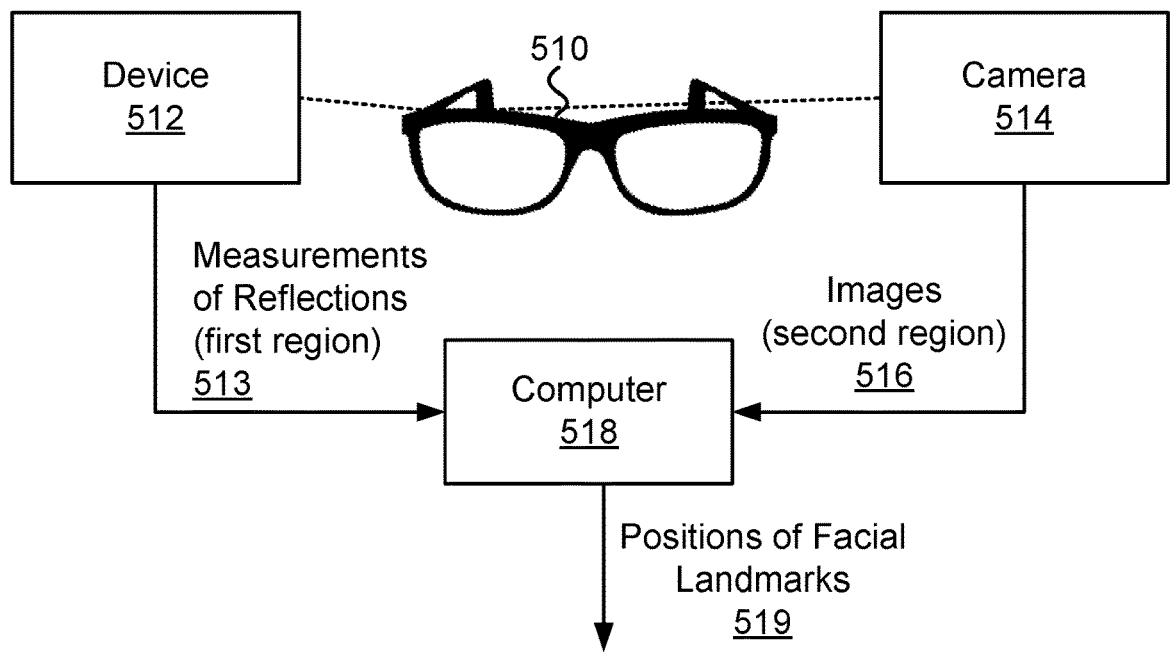
FIG. 17 illustrates an embodiment of a system configured to detect positions of facial landmarks.

FIG. 17 illustrates an embodiment of a system configured to detect positions of facial landmarks. The system includes at least a head-mounted device 512, a camera 514m and a computer 518.

In one embodiment, the head-mounted device 512 includes (i) light sources configured to emit light towards a first region on a user's face, and (ii) discrete photosensors, spread over more than 2 cm, configured to take measurements 513 of reflections of the light from the first region. The head-mounted camera 514 is configured to capture images 516 of a second region on the face.

In one example, the head-mounted device 512 and the head-mounted camera 514 are fixed to a smartglasses frame 510, at least a portion of the first region is located less than 4 cm from one of the user's eyeballs, the second region is located in a known position relative to the first region, and the first and second regions overlap.

In one example, the head-mounted device 512 and the head-mounted camera 514 are fixed to the smartglasses frame 510, at least a portion of the first region is located less than 2 cm from one of the user's eyeballs, the second region is located in a known position relative to the first region, and the first and second regions do not overlap and have a minimal distance between their boarders below 2 cm.

The computer 518 is configured to calculate, based on the images 516, values indicative of a location and/or orientation of the device relative to the face. Optionally, these values may include positions in the images 516 of facial features such as the nose, hairline, and/or boundaries of the face. In one example, the values may include angles and/or sizes of facial features such as the nose, hairline, and/or boundaries of the face. In another example, the values indicative of the location and/or orientation of the device relative to the face are indicative of the change in the location and/or orientation of the device relative to the face.

The computer 518 detects, based on the measurements 513 of the reflections and the values, positions of facial landmarks at an average rate higher than an average rate at which the images 516 are captured. Optionally, the computer 518 is further configured render an avatar representing the user based on the positions of the facial landmarks.

In one embodiment, a shift of the photosensors relative to the face (referred to herein as "sensor-shift") reduces accuracy of detecting the positions of the facial landmarks based on the reflections, the computer 518 utilizes the values to account for errors resulting from the sensor-shift, and an average rate at which the reflections are measured is at least 50 times higher than an average rate at which the images 516 are captured, and the average rate at which the facial landmarks are detected is at least 10 times higher than the average rate at which the images 516 were captured.

Figure 18:
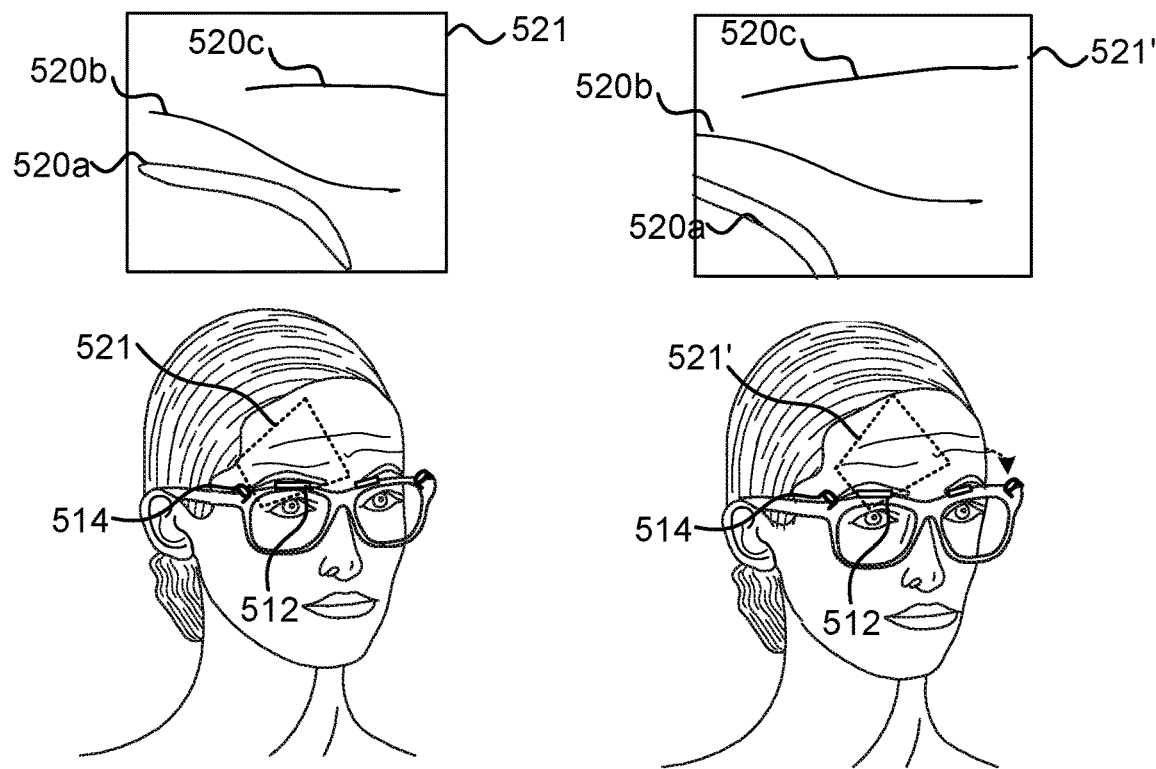
FIG. 18 illustrates effects of sensor-shift.

FIG. 18 illustrates effects of sensor-shift. The figure illustrates differences between images 521 (left) and 521' (right), which include different positions, orientations and/or sizes of various facial features such as the eyebrow 520a, and wrinkles 520b and 520c. Based on differences between the images an occurrence and/or an extent of the sensor-shift can be detected.

In one embodiment, the system includes a device configured to measure values indicative of photoplethysmogram signal (PPG signal) of the user, and wherein the computer 518 is further configured to calculate level of fatigue based on the PPG signal, and to detect the positions of facial landmarks also based on the level of fatigue. In some cases, when the user is tired, the magnitude of the facial movements is reduced compared to when the user is fresh. In addition, the facial expressions expressed while being tired are usually somewhat different than while being fresh. Therefore, taking in account the level of fatigue can improve the accuracy of detecting the positions of the facial landmarks Optionally, the level of fatigue is calculated based on heart rate variability extracted from the PPG signal, and the level of fatigue is used to adjust the facial movements to the user's state.

In addition to accounting for sensor-shift, the computer 518 may also account for other interferences, such as due to the presence of hair, makeup, skin wetness, and/or a skin infection. In some embodiments, the computer 518 is further configured to generate feature values based on data comprising the images and measurements of the reflections, and to utilize a model to calculate, based on the feature values, values indicative of the positions of the facial landmarks Optionally, at least some of the feature values are indicative of extents of one or more of the aforementioned interferences.

In one embodiment, the computer 518 is further configured to: (i) identify, based on the images 516, an extent of presence of hair over a portion of the first region; (ii) calculate an effect on the reflections as a result of the presence of hair; and (iii) utilize the effect in the detection of the positions of the facial landmarks Optionally, the feature values comprise a feature value calculated based on the images which is indicative of the effect on the reflections due to the presence of the hair over the portion of the first region.

In another embodiment, the computer 518 is further configured to: (i) identify, based on the images, makeup applied over a portion of the first region; (ii) calculate an effect on the reflections as a result of the makeup; and (iii) utilize the effect in the detection of the positions of the facial landmarks Optionally, the feature values comprise a feature value calculated based on the images which is indicative of the effect on the reflections due to the makeup applied to the portion of the first region.

In yet another embodiment, the computer 518 is further configured to: (i) identify, based on the images, a change in a level of skin wetness at a portion of the first region; (ii) calculate an effect on the reflections as a result of the change in the level of skin wetness; and (iii) utilize the effect in the detection of the positions of the facial landmarks Optionally, the feature values comprise a feature value calculated based on the images which is indicative of the effect on the reflections due to the change in a level of skin wetness at the portion of the first region.

In still another embodiment, the computer 518 is further configured to: (i) identify, based on the images, skin infection at a portion of the first region; (ii) calculate an effect on the reflections as a result of the skin infection; and (iii) utilize the effect in the detection of the positions of the facial landmarks Optionally, the feature values comprise a feature value calculated based on the images which is indicative of the effect on the reflections due to the skin infection at the portion of the first region.

The following is an additional embodiment of a method that may be used by systems modeled according to FIG. 17. The steps described below may be performed by running a computer program having instructions for implementing the method. Optionally, the instructions may be stored on a computer-readable medium, which may optionally be a non-transitory computer-readable medium. In response to execution by a system including a processor and memory, the instructions cause the system to perform the following steps:

In Step 1, emitting, by a head-mounted device, light towards a first region on a user's face, and measuring by discrete photosensors reflections of the light from the first region.

In Step 2, capturing, by a head-mounted camera, images of a second region on the face.

In Step 3, calculating, based on the images, values indicative of a location and/or orientation of the device relative to the face.

And in Step 4, detecting, based on the reflections and the values, positions of facial landmarks at an average rate higher than an average rate of capturing the images.

In some embodiments, detecting the positions of facial landmarks in Step 4 is done utilizing a machine learning-based approach that involves performing the following: generating feature values based on data comprising the images and measurements of the reflections, and utilizing a model for calculating, based on the feature values, values indicative of the positions of the facial landmarks.

In one embodiment, the method optionally includes steps comprising: (i) identifying, based on the images, an extent of presence of hair over a portion of the first region; (ii) calculating an effect on the reflections as a result of the presence of hair; and (iii) utilizing the effect in the detecting of the positions of the facial landmarks Optionally, the method also includes steps comprising generating feature values based on data comprising the images and measurements of the reflections, and utilizing a model to calculate, based on the feature values, values indicative of the positions of the facial landmarks Optionally, the feature values comprise a feature value calculated based on the images which is indicative of the effect on the reflections due to the presence of the hair over the portion of the first region.

In another embodiment, the method optionally includes steps comprising: (i) identifying, based on the images, makeup applied over a portion of the first region; (ii) calculating an effect on the reflections as a result of the makeup; and (iii) utilizing the effect in the detecting of the positions of the facial landmarks Optionally, the method also includes steps comprising generating feature values based on data comprising the images and measurements of the reflections, and utilizing a model to calculate, based on the feature values, values indicative of the positions of the facial landmarks Optionally, the feature values comprise a feature value calculated based on the images which is indicative of the effect on the reflections due to the makeup applied to the portion of the first region.

In yet another embodiment, the method optionally includes steps comprising: (i) identifying, based on the images, a change in a level of skin wetness at a portion of the first region; (ii) calculating an effect on the reflections as a result of the change in the level of skin wetness; and (iii) utilizing the effect in the detecting of the positions of the facial landmarks Optionally, the method also includes steps comprising generating feature values based on data comprising the images and measurements of the reflections, and utilizing a model to calculate, based on the feature values, values indicative of the positions of the facial landmarks Optionally, the feature values comprise a feature value calculated based on the images which is indicative of the effect on the reflections due to the change in a level of skin wetness at the portion of the first region.

This paragraph discloses claims that the Applicant may file in a continuation-in-part (CIP) patent application. 1. A system configured to detect positions of facial landmarks, comprising: a head-mounted device comprising (i) light sources configured to emit light towards a first region on a user's face, and (ii) discrete photosensors, spread over more than 2 cm, configured to measure reflections of the light from the first region; a head-mounted camera configured to capture images of a second region on the face; and a computer configured to: calculate, based on the images, values indicative of a location and/or orientation of the device relative to the face; and detect, based on the reflections and the values, positions of facial landmarks at an average rate higher than an average rate at which the images are captured. 2. The system of claim 1, wherein a shift of the photosensors relative to the face (sensor-shift) reduces accuracy of detecting the positions of the facial landmarks based on the reflections, the computer utilizes the values to account for errors resulting from the sensor-shift, an average rate at which the reflections are measured is at least 50 times higher than an average rate at which the images are captured, and the average rate at which the facial landmarks are detected is at least 10 times higher than the average rate at which the images were captured. 3. The system of claim 1, further comprising a device configured to measure values indicative of photoplethysmogram signal (PPG signal) of the user, and wherein the computer is further configured to calculate level of fatigue based on the PPG signal, and to detect the positions of facial landmarks also based on the level of fatigue. 4. The system of claim 1, wherein the device and the camera are fixed to a smartglasses frame, at least a portion of the first region is located less than 4 cm from one of the user's eyeballs, the second region is located in a known position relative to the first region, the first and second regions overlap, and the computer is further configured render an avatar representing the user based on the positions of the facial landmarks 5. The system of claim 1, wherein the device and the camera are fixed to a smartglasses frame, at least a portion of the first region is located less than 2 cm from one of the user's eyeballs, the second region is located in a known position relative to the first region, and the first and second regions do not overlap and have a minimal distance between their boarders below 2 cm. 6. The system of claim 1, wherein the computer is further configured to: (i) identify, based on the images, an extent of presence of hair over a portion of the first region; (ii) calculate an effect on the reflections as a result of the presence of hair; and (iii) utilize the effect in the detection of the positions of the facial landmarks. 7 The system of claim 6, wherein the computer is further configured to generate feature values based on data comprising the images and measurements of the reflections, and to utilize a model to calculate, based on the feature values, values indicative of the positions of the facial landmarks; and wherein the feature values comprise a feature value calculated based on the images which is indicative of the effect on the reflections due to the presence of the hair over the portion of the first region. 8. The system of claim 1, wherein the computer is further configured to: (i) identify, based on the images, makeup applied over a portion of the first region; (ii) calculate an effect on the reflections as a result of the makeup; and (iii) utilize the effect in the detection of the positions of the facial landmarks. 9. The system of claim 8, wherein the computer is further configured to generate feature values based on data comprising the images and measurements of the reflections, and to utilize a model to calculate, based on the feature values, values indicative of the positions of the facial landmarks; and wherein the feature values comprise a feature value calculated based on the images which is indicative of the effect on the reflections due to the makeup applied to the portion of the first region. 10. The system of claim 1, wherein the computer is further configured to: (i) identify, based on the images, a change in a level of skin wetness at a portion of the first region; (ii) calculate an effect on the reflections as a result of the change in the level of skin wetness; and (iii) utilize the effect in the detection of the positions of the facial landmarks. 11. The system of claim 10, wherein the computer is further configured to generate feature values based on data comprising the images and measurements of the reflections, and to utilize a model to calculate, based on the feature values, values indicative of the positions of the facial landmarks; and wherein the feature values comprise a feature value calculated based on the images which is indicative of the effect on the reflections due to the change in a level of skin wetness at the portion of the first region. 12. The system of claim 1, wherein the computer is further configured to: (i) identify, based on the images, skin infection at a portion of the first region; (ii) calculate an effect on the reflections as a result of the skin infection; and (iii) utilize the effect in the detection of the positions of the facial landmarks. 13. The system of claim 12, wherein the computer is further configured to generate feature values based on data comprising the images and measurements of the reflections, and to utilize a model to calculate, based on the feature values, values indicative of the positions of the facial landmarks; and wherein the feature values comprise a feature value calculated based on the images which is indicative of the effect on the reflections due to the skin infection at the portion of the first region. 14. A method comprising: emitting, by a head-mounted device, light towards a first region on a user's face, and measuring by discrete photosensors reflections of the light from the first region; capturing, by a head-mounted camera, images of a second region on the face; calculating, based on the images, values indicative of a location and/or orientation of the device relative to the face; and detecting, based on the reflections and the values, positions of facial landmarks at an average rate higher than an average rate of capturing the images. 15. The method of claim 14, further comprising: (i) identifying, based on the images, an extent of presence of hair over a portion of the first region; (ii) calculating an effect on the reflections as a result of the presence of hair; and (iii) utilizing the effect in the detecting of the positions of the facial landmarks. 16. The method of claim 15, further comprising generating feature values based on data comprising the images and measurements of the reflections, and utilizing a model for calculating, based on the feature values, values indicative of the positions of the facial landmarks; and wherein the feature values comprise a feature value calculated based on the images which is indicative of the effect on the reflections due to the presence of the hair over the portion of the first region. 17. The method of claim 14, further comprising: (i) identifying, based on the images, makeup applied over a portion of the first region; (ii) calculating an effect on the reflections as a result of the makeup; and (iii) utilizing the effect in the detecting of the positions of the facial landmarks. 18. The method of claim 14, further comprising: (i) identifying, based on the images, a change in a level of skin wetness at a portion of the first region; (ii) calculating an effect on the reflections as a result of the change in the level of skin wetness; and (iii) utilizing the effect in the detecting of the positions of the facial landmarks. 19. The method of claim 18, further comprising generating feature values based on data comprising the images and measurements of the reflections, and utilizing a model to calculate, based on the feature values, values indicative of the positions of the facial landmarks; and wherein the feature values comprise a feature value calculated based on the images which is indicative of the effect on the reflections due to the change in a level of skin wetness at the portion of the first region. 20. A non-transitory computer readable medium storing one or more computer programs configured to cause a processor based system to execute steps comprising: emitting, by a head-mounted device, light towards a first region on a user's face, and measuring by discrete photosensors reflections of the light from the first region; capturing, by a head-mounted camera, images of a second region on the face; calculating, based on the images, values indicative of a location and/or orientation of the device relative to the face; and detecting, based on the reflections and the values, positions of facial landmarks at an average rate higher than an average rate of capturing the images.

There are many known automated facial expressions analysis systems that operate based on the principles of the Facial Action Coding System (FACS) that enables deconstructing facial expressions into combinations of specific action units (AU) and their temporal segments that produce the expressions. The automated facial expressions analysis systems usually identify key facial landmarks, from which they quantify the facial expressions, the extent of the facial expressions (e.g., large smile vs small smile), and temporal properties of the facial expressions (e.g., a smile for 2 seconds vs a smile for 5 seconds).

When analyzing images of the same user, captured by the electro-optical sensor (such as an inward-facing head-mounted camera or a photosensor-based device), the facial expression data is temporally sparse because the maximum rate of changing of the facial expressions according to a classifier and/or a facial expression finite-state machine (FESM) is lower than the maximum frame rate of the camera. As a result, a head-mounted system can save power by reducing the bitrate at which data is read from the head-mounted camera during times at which the next step of the classifier/FESM is predictable above a predetermined threshold, because the head-mounted camera is expected to stay at the same position relative to the face. When the predictability of the next step of the FESM is below the predetermined threshold, the system may increase the bitrate at which the data is read from the head-mounted camera to detect the (possibly) new state.

Figure 19:
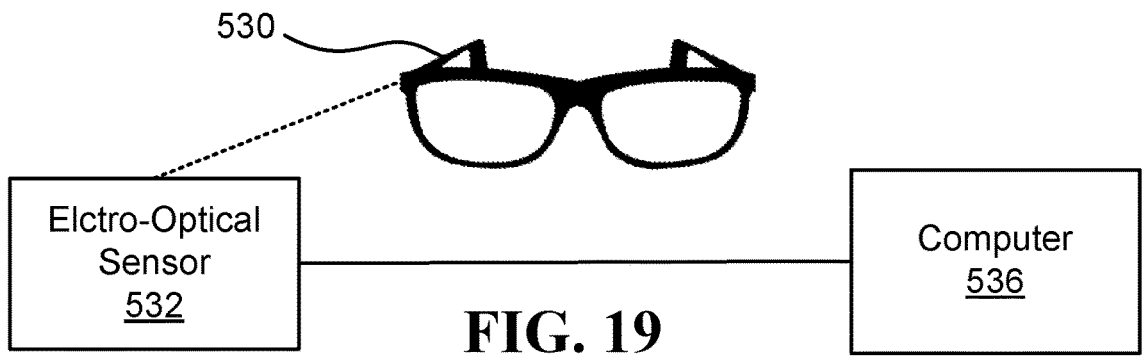
FIG. 19 illustrates an embodiment of a system that can save power by changing the bitrate at which data is read from a head-mounted electro-optical sensor.

FIG. 19 illustrates an embodiment of a system that can save power by changing the bitrate at which data is read from a head-mounted electro-optical sensor, as described above. The system includes at least a non-contact head-mounted electro-optical sensor 532 and a computer 536.

Optionally, the non-contact head-mounted electro-optical sensor 532 is coupled to a smartglasses frame 530.

The sensor 532 is configured to measure reflections from a region on a user's head. Where the reflections are indicative of facial expressions of the user. That is, there is expected to be different reflection patterns detected for at least some different facial expressions.

The computer 534 is configured to detect, based on measurements the reflections, a type of facial expression expressed by the user, which belongs to a group comprising neutral facial expressions and non-neutral facial expressions. The computer 534 then utilizes the type of facial expression to determine how to read data from the electro-optical sensor 532. For example, the computer 534 may read the electro-optical sensor 532 at a first average bitrate ($b_1$) when the user expresses a facial expression from among the neutral facial expressions. The computer 534 may read the electro-optical sensor 532 at a second average bitrate ($b_2$) when the user expresses a facial expression from among the non-neutral facial expressions. In this example, $b_2 > b_1$. Optionally, $b_2$ is at least twice $b_1$. In another example, $b_2$ is at least five times $b_1$.

In one embodiment, the group of facial expression includes transitional facial expressions, and the computer 534 is further configured to read the electro-optical sensor 532 at a third average bitrate ($b_3$) during the transitional facial expressions, wherein $b_3 > b_1$. Optionally, the bitrate during the transitional facial expressions is higher than the bitrate during the non-neutral facial expressions ($b_3 > b_2 > b_1$) in order to help the system to detect the facial expression quickly.

In one embodiment, the electro-optical sensor 532 comprises an inward-facing head-mounted camera configured to provide, based on measurements of the reflections, images of the region on the user's head. Optionally, the computer 534 is configured to lower the bitrate from $b_2$ to $b_1$ by reading the camera using a higher binning value and/or using a smaller region of interest readout.

Binning refers to combining pixel values by the camera, such that the sensor has to read less pixels from the camera because of the reduced resolution. Skipping refers to skipping over certain pixels. Binning and skipping may increase the framerate and optionally also reduce the camera's duty cycle. The sensor may support equal and/or different Horizontal and Vertical binning values and/or skipping values, such as 2H×2V binning that combines 4 pixel values (also referred to as binning value equals 4), or 3H×3V binning that combines 9 pixel values (also referred to as binning value equals 9). Binning may be combined with skipping, such as 3H×9V binning plus 3H×9V skipping.

Figure 20:
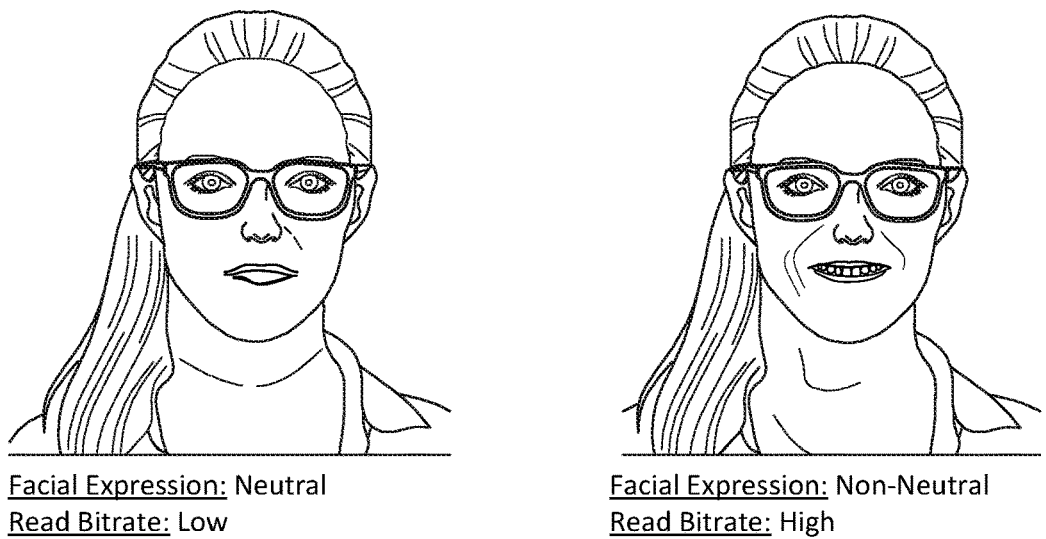
FIG. 20 illustrates scenarios in which data is read of an electro-optical sensor at different bitrates when different facial expressions are detected.

FIG. 20 illustrates scenarios in which data is read of an electro-optical sensor at different bitrates when different facial expressions are detected. The figure illustrates how when a non-neutral expression more images, or images with a higher resolution, are read, compared to the images read when the facial expression is neutral.

In another embodiment, the electro-optical sensor 532 comprises an inward-facing head-mounted camera that is configured to provide, based on measurements of the reflections, images of the region on the user's head. In this embodiment, the computer 534 determines locations of key facial landmarks associated with at least some of the non-neutral facial expressions, and to set the camera's region of interest (ROI) to be around at least some of the key facial landmarks Optionally, the ROI covers less than half of the region. Applying the ROI may reduce the power consumption of the system, and may also improve its performance by enabling to increase the frame rate from the camera.

In yet another embodiment, the electro-optical sensor 532 comprises an inward-facing head-mounted camera that is configured to provide, based on measurements of the reflections, images of the region on the user's head. In this embodiment, the group further comprises transitional facial expressions, and the computer 534 is further configured to determine locations of key facial landmarks associated with a subset of the transitional facial expressions transitioning from the neutral facial expressions, and to set the camera's region of interest (ROI) to be around at least some of said key facial landmarks while the user is in a neutral facial expression from among the neutral facial expressions. Optionally, the ROI covers less than half of the region.

In still another embodiment, the electro-optical sensor 532 comprises an inward-facing head-mounted camera that is configured to provide, based on measurements of the reflections, images of the region on the user's head. In this embodiment, the group further comprises transitional facial expressions, and the computer is further configured to determine locations of key facial landmarks associated with a subset of the transitional facial expressions that occur in transitions between certain non-neutral facial expressions and certain neutral facial expressions, and to set the camera's region of interest (ROI) to be around at least some of said key facial landmarks while the user is in a certain non-neutral facial expression selected from the non-neutral facial expressions. Optionally, the ROI covers less than half of the region.

In still another embodiment, the electro-optical sensor 532 comprises an inward-facing head-mounted camera that is configured to provide, based on measurements of the reflections, images of the region on the user's head. In this embodiment, the group further comprises transitional facial expressions, and the computer 534 is further configured to determine locations of key facial landmarks associated with a subset of the transitional facial expressions that occur in transitions between certain non-neutral facial expressions and other non-neutral facial expressions belonging to the non-neutral facial expressions, and to set the camera's region of interest (ROI) to be around at least some of said key facial landmarks while the user is in a certain non-neutral facial expression selected from the certain non-neutral facial expressions. Optionally, the ROI covers less than half of the region.

In one embodiment, the electro-optical sensor 532 comprises an inward-facing head-mounted camera configured to provide, based on the reflections, images of the region. Optionally, the computer 534 is further configured to perform the following responsive to the user expressing a happy smiling facial expression, from among the non-neutral facial expressions: determine expected locations, in the images, of skin wrinkles at the edges of the user's eyes while expressing the happy smiling facial expression, and to set the camera's region of interest (ROI) to include at least a portion of said expected locations of the skin wrinkles while the user expresses the happy smiling facial expression.

In another embodiment, the electro-optical sensor 532 comprises an inward-facing head-mounted camera configured to provide, based on the reflections, images of the region. Optionally, the computer 534 is further configured to perform the following responsive to the user expressing a smiling facial expression, from among the non-neutral facial expressions: determine expected locations, in the images, of the user's oral commissures while expressing the smiling facial expression, and to set the camera's region of interest (ROI) to include an expected location of at least one of the oral commissures while the user expresses the smiling facial expression.

In still another embodiment, the electro-optical sensor 532 comprises an inward-facing head-mounted camera configured to provide, based on the reflections, images of the region. Optionally, the computer 534 is further configured to perform the following responsive to the user expressing an angry facial expression, from among the non-neutral facial expressions: determine expected locations, in the images, of the user's lips while expressing the angry facial expression, and to set the camera's region of interest (ROI) to be around at least a portion of an expected location of the lips while the user expresses the angry facial expression.

In order to further optimize the performance, the computer 534 may change the locations of the sensor's ROIs, and optionally also the binning of the ROIs, according to the progression of the facial expression being tracked. For example, to infer the extent of a happy smile from the edges of the eyes it may be enough to set specific windows on the skin wrinkles at the edges of the eyes. This is possible with a head-mounted camera because the camera stays at essentially the same position relative to the head, and the wrinkles are at the same locations for the same kind of smile of the same person.

For example, before smiling the computer can lower the image resolution at the edges of the eyes, when the smile begins increase the resolution at the edges of the eyes (optionally as the smile grows the resolution is increased at the edges of the eyes while the resolution is decreased in other regions of the image and/or the face), at the peak of the happiness the computer may further increase the resolution to capture the exact extent of the smile, and when the smile fades the resolution may be reduced. During that time the ROIs are located at the expected locations of the wrinkles, and the resolution is set as needed by the images processing algorithm. For example, just tracking the state of the expression and whether there was a change may require a lower resolution compared to detecting a new state to which the user is transitioning.

In some embodiments, the computer 534 is further configured to detect the type of facial expression utilizing a real-time facial expression finite-state machine that is implemented utilizing at least one of the following: a neural network, a Bayesian network, a rule-based classifier, a support vector machine, a hidden Markov model, a deep learning model, and a deep sparse autoencoder.

The real-time facial expression finite-state machine (FESM) may have different configurations and implementations. The FESM may be implemented explicitly as state machine, or implicitly, for example by one or more Neural Networks, Convolutional Neural Networks, Bayesian Networks, Rule-Based Classifiers, Support Vector Machines, Hidden Markov Models, Deep Learning Models, and Deep Sparse Autoencoders. The key issue in implementing the FESM implicitly is having the ability to provide in real time an indication indicative of the state of the user, which enables the computer to adjust the parameters of the camera as disclosed in this embodiment.

The following is a non-limiting example of a possible implementation of the FESM using a finite-state machine that is a simplified version of a Hidden Markov Model. The electro-optical sensor comprises an inward-facing head-mounted camera configured to provide, based on the reflections, images of the region. The features for the facial expression recognition are extracted using Active Shape Models, and a Support Vector Machine (SVM) classifier performs the facial expression recognition at each state. More specifically, the temporal segmentation may include a FESM with a start state, a set of accept states, and a transition function that may be implemented by a state transition table. Assuming an emotional facial expression starts from a neutral facial expression, transitions to a peak expression, and goes back to the neutral state, then the FESM may have two accept states: neutral and emotional state (referred to as apex). For example, when the accept state is the neutral state, the FESM may accept an input video sequence including a cycle of temporal phases from neutral, onset, apex, and offset to the neutral state. And when an apex is an accept state, the FESM may accept an input video stream for facial expression recognition. The FESM may use various logics for transitions between the states, such as a score between successive frames that counts the number of dynamic features detected in the image (e.g., by Lucas-Kanade's optical flow vectors), and an accumulated score between states (e.g., from neutral to apex state). The feature extraction may be implemented using Active Shape Models to each frame in video sequences, and facial features (fiducial points) may be extracted to represent facial geometry from the Active Shape Models landmarks. The classifier may be based on a SVM (for example with Radial Basis Function kernel), trained with the parameters comprising the displacement of the normalized geometrical features between neutral and apex expression. To recognize the emotions per apex frame, the system may check in video sequences if the current frame is on neutral or apex; if the current state is on neutral, then it saves current features as neutral features and keep up-to-date neutral features during neutral states; if the current state is on apex, the is extracts apex features and creates a new feature vector as relative displacement between neutral and apex features. When meeting an apex state during a single facial expression, the feature vector is fed into the SVM to classify the facial expression, and a final decision for the facial expression in the temporal segment may be determined by the majority of facial expressions counted in the apex states.

In some embodiments, the electro-optical sensor 532 comprises: light sources configured to emit light towards the region, and discrete photosensors, spread over more than 2 cm, configured to measure reflections of the light from the region.

In one embodiment, the computer 534 is further configured to operate the light sources according to first and second different schedules responsive to detecting first and second different facial expressions belonging to the non-neutral facial expressions.

In another embodiment, the computer 534 is further configured to operate the light sources according to a first schedule responsive to detecting a neutral facial expression and to operate the light sources according to a second schedule responsive to detecting a non-neutral facial expression.

The relevancy of different light sources during different facial expressions may be different. In order to save power the system may select the more relevant light sources for the specific facial expression.

In one embodiment, the computer 534 is further configured to receive values indicative of the user's heart rate, and to read the electro-optical sensor at the first average bitrate when the heart rate is below a threshold, and to read the electro-optical sensor at the second average bitrate, which is higher than the first average bitrate, when the heart rate is above the threshold. Many emotional states cause an increase in the heart rate, thus the system may increase the bitrate at which the electro-optical sensor 532 is read in order to improve the accuracy of detecting the facial expressions at the cost of using more power in some configurations.

In one embodiment, the system further comprises a head-mounted movement sensor configured to measure movements, and the computer 534 is further configured to read the electro-optical sensor at the first average bitrate when the movements are below a threshold, and to read the electro-optical sensor 532 at the second average bitrate, which is higher than the first average bitrate, when the movements are above the threshold. Until some extent, there is usually a relationship between interesting facial expressions and head movements; thus, in order to save power, the system may increase the rate of measuring the facial expressions when the head movements reach a threshold.

Figure 21:
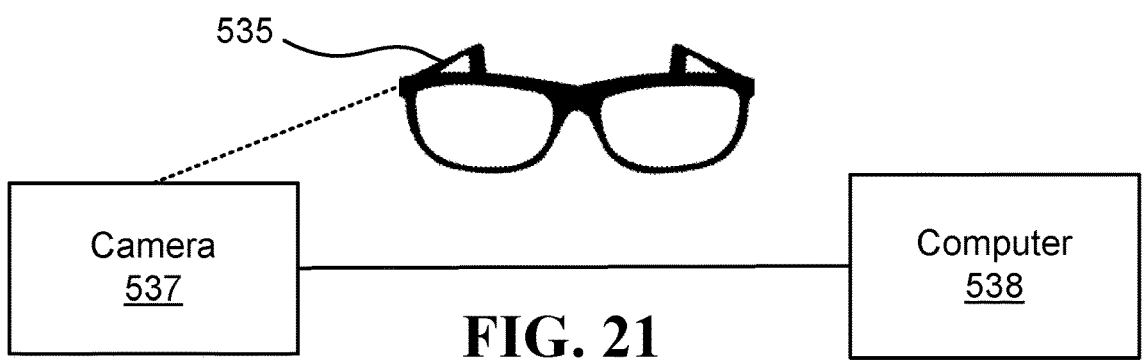
FIG. 21 illustrates an embodiment of a facial expression capturing system that includes an inward-facing head-mounted camera.

FIG. 21 illustrates an embodiment of a facial expression capturing system that includes an inward-facing head-mounted camera 537 configured to capture images of a region on a user's head and a computer 538. Optionally, the camera 537 is coupled to a frame of smartglasses 535.

In one embodiment, the computer 538 is configured to detect, based on the images, a type of facial expression expressed by the user, which belongs to a group comprising neutral facial expressions and non-neutral facial expressions. The computer 538 utilizes a detection of the facial expression to determine how to read images from the camera. Optionally, the computer 538 reads from the camera images having a first average size ($size_1$) when the user expresses a facial expression from among the neutral facial expressions. Optionally, the computer 538 reads from the camera images having a second average size ($size_2$) when the user expresses a facial expression from among the non-neutral facial expressions, where $size_2 > size_1$.

In one embodiment, the group of facial expression further comprises transitional facial expressions, and the computer 538 is further configured to read from the camera images having a third average size ($size_3$) during the transitional facial expressions, wherein $size_3 > size_1$. Optionally, the computer 538 is configured to control resolution of the images utilizing at least one of binning and windowing.

In one embodiment, image size is proportional to color depth, such that the color depth read from the camera 537 when the user expresses a facial expression from among the non-neutral facial expressions is higher compared to the color depth read from the camera 537 when the user expresses a facial expression from among the neutral facial expressions. Optionally, color depth corresponds to either the number of bits used to indicate the color of a single pixel, or the number of bits used for each color component of a single pixel.

The following is an additional embodiment of a method that may be used by systems modeled according to FIG. 19. The steps described below may be performed by running a computer program having instructions for implementing the method. Optionally, the instructions may be stored on a computer-readable medium, which may optionally be a non-transitory computer-readable medium. In response to execution by a system including a processor and memory, the instructions cause the system to perform the following steps:

In Step 1, measuring, by a non-contact head-mounted electro-optical sensor, reflections from a region on a user's head. Optionally, measurements of the reflections are indicative of facial expressions of the user.

In Step 2, detecting, based on the reflections, a type of facial expression expressed by the user, which belongs to a group comprising neutral facial expressions and non-neutral facial expressions.

In Step 3, reading the electro-optical sensor at a first average bitrate ($b_1$) when the user expresses a facial expression from among the neutral facial expressions.

And in Step 4, reading the electro-optical sensor at a second average bitrate ($b_2$) when the user expresses a facial expression from among the non-neutral facial expressions, wherein $b_2 > b_1$.

In one embodiment, the group further comprises transitional facial expressions, and further method optionally includes a step that involves reading the electro-optical sensor at a third average bitrate ($b_3$) during the transitional facial expressions, wherein $b_3 > b_2 > b_1$.

In one embodiment, the electro-optical sensor 532 comprises an inward-facing head-mounted camera that provides images of the region by detecting the reflections, and the method optionally includes a step of lowering the bitrate from $b_2$ to $b_1$ by reading the camera using a higher binning value and/or using a smaller region of interest readout.

In one embodiment, the electro-optical sensor 532 comprises an inward-facing head-mounted camera that provides images of the region by detecting the reflections, and further comprising determining locations of key facial landmarks associated with at least some of the non-neutral facial expressions, and setting the camera's region of interest (ROI) to be around at least some of the key facial landmarks; and wherein the ROI covers less than half of the region.

In one embodiment, the electro-optical sensor 532 comprises an inward-facing head-mounted camera providing images of the region based on the reflections, the group further comprises transitional facial expressions. Optionally, the method includes the following steps: determining locations of key facial landmarks associated with a subset of the transitional facial expressions transitioning from the neutral facial expressions, and setting the camera's region of interest (ROI) to be around at least some of said key facial landmarks while the user is in a neutral facial expression from among the neutral facial expressions. Optionally, the ROI covers less than half of the region.

In one embodiment, the electro-optical sensor 532 comprises an inward-facing head-mounted camera that provides images of the region by detecting the reflections, the group further comprises transitional facial expressions. Optionally, the method includes the following steps: determining locations of key facial landmarks associated with a subset of the transitional facial expressions that occur in transitions between certain non-neutral facial expressions and certain neutral facial expressions, and setting the camera's region of interest (ROI) to be around at least some of said key facial landmarks while the user is in a certain non-neutral facial expression selected from the non-neutral facial expressions. Optionally, the ROI covers less than half of the region.

In one embodiment, the electro-optical sensor 532 comprises an inward-facing head-mounted camera that provides images of the region by detecting the reflections, the group further comprises transitional facial expressions. Optionally, the method includes the following steps: determining locations of key facial landmarks associated with a subset of the transitional facial expressions that occur in transitions between certain non-neutral facial expressions and other non-neutral facial expressions belonging to the non-neutral facial expressions, and setting the camera's region of interest (ROI) to be around at least some of said key facial landmarks while the user is in a certain non-neutral facial expression selected from the certain non-neutral facial expressions. Optionally, the ROI covers less than half of the region.

In one embodiment, the method optionally includes a step of detecting the type of facial expression utilizing a real-time facial expression finite-state machine that is implemented utilizing at least one of the following: a neural network, a Bayesian network, a rule-based classifier, a support vector machine, a hidden Markov model, a deep learning model, and a deep sparse autoencoder.

This paragraph discloses claims that the Applicant may file in a continuation-in-part (CIP) patent application. 1. A system comprising: a non-contact head-mounted electro-optical sensor configured to measure reflections from a region on a user's head; whereby the reflections are indicative of facial expressions of the user; and a computer configured to: detect, based on the reflections, a type of facial expression expressed by the user, which belongs to a group comprising neutral facial expressions and non-neutral facial expressions; read the electro-optical sensor at a first average bitrate (b1) when the user expresses a facial expression from among the neutral facial expressions; and read the electro-optical sensor at a second average bitrate (b2) when the user expresses a facial expression from among the non-neutral facial expressions, wherein b2>b1. 2. The system of claim 1, wherein the group further comprises transitional facial expressions, and the computer is further configured to read the electro-optical sensor at a third average bitrate (b3) during the transitional facial expressions, wherein b3>b1. 3.

The system of claim 1, wherein the electro-optical sensor comprises an inward-facing head-mounted camera configured to provide, based on the reflections, images of the region; and wherein the computer is configured to lower the bitrate from b2 to b1 by reading the camera using a higher binning value and/or using a smaller region of interest readout. 4. The system of claim 1, wherein the electro-optical sensor comprises an inward-facing head-mounted camera configured to provide, based on the reflections, images of the region; and wherein the computer is further configured to determine locations of key facial landmarks associated with at least some of the non-neutral facial expressions, and to set the camera's region of interest (ROI) to be around at least some of the key facial landmarks; and wherein the ROI covers less than half of the region. 5. The system of claim 1, wherein the electro-optical sensor comprises an inward-facing head-mounted camera configured to provide, based on the reflections, images of the region; and wherein the group further comprises transitional facial expressions, and the computer is further configured to determine locations of key facial landmarks associated with a subset of the transitional facial expressions transitioning from the neutral facial expressions, and to set the camera's region of interest (ROI) to be around at least some of said key facial landmarks while the user is in a neutral facial expression from among the neutral facial expressions; and wherein the ROI covers less than half of the region. 6.

The system of claim 1, wherein the electro-optical sensor comprises an inward-facing head-mounted camera configured to provide, based on the reflections, images of the region; and wherein the group further comprises transitional facial expressions, and the computer is further configured to determine locations of key facial landmarks associated with a subset of the transitional facial expressions that occur in transitions between certain non-neutral facial expressions and certain neutral facial expressions, and to set the camera's region of interest (ROI) to be around at least some of said key facial landmarks while the user is in a certain non-neutral facial expression selected from the non-neutral facial expressions; and wherein the ROI covers less than half of the region. 7. The system of claim 1, wherein the electro-optical sensor comprises an inward-facing head-mounted camera configured to provide, based on the reflections, images of the region; and wherein the group further comprises transitional facial expressions, and the computer is further configured to determine locations of key facial landmarks associated with a subset of the transitional facial expressions that occur in transitions between certain non-neutral facial expressions and other non-neutral facial expressions belonging to the non-neutral facial expressions, and to set the camera's region of interest (ROI) to be around at least some of said key facial landmarks while the user is in a certain non-neutral facial expression selected from the certain non-neutral facial expressions; and wherein the ROI covers less than half of the region. 8. The system of claim 1, wherein the electro-optical sensor comprises an inward-facing head-mounted camera configured to provide, based on the reflections, images of the region; and wherein the computer is further configured to perform the following responsive to the user expressing a happy smiling facial expression, from among the non-neutral facial expressions: determine expected locations, in the images, of skin wrinkles at the edges of the user's eyes while expressing the happy smiling facial expression, and to set the camera's region of interest (ROI) to include at least a portion of said expected locations of the skin wrinkles while the user expresses the happy smiling facial expression. 9. The system of claim 1, wherein the electro-optical sensor comprises an inward-facing head-mounted camera configured to provide, based on the reflections, images of the region; and wherein the computer is further configured to perform the following responsive to the user expressing a smiling facial expression, from among the non-neutral facial expressions: determine expected locations, in the images, of the user's oral commissures while expressing the smiling facial expression, and to set the camera's region of interest (ROI) to include an expected location of at least one of the oral commissures while the user expresses the smiling facial expression. 10. The system of claim 1, wherein the electro-optical sensor comprises an inward-facing head-mounted camera configured to provide, based on the reflections, images of the region; and wherein the computer is further configured to perform the following responsive to the user expressing an angry facial expression, from among the non-neutral facial expressions: determine expected locations, in the images, of the user's lips while expressing the angry facial expression, and to set the camera's region of interest (ROI) to be around at least a portion of an expected location of the lips while the user expresses the angry facial expression. 11. The system of claim 1, wherein the computer is further configured to detect the type of facial expression utilizing a real-time facial expression finite-state machine that is implemented utilizing at least one of the following: a neural network, a Bayesian network, a rule-based classifier, a support vector machine, a hidden Markov model, a deep learning model, and a deep sparse autoencoder. 12. The system of claim 1, wherein the electro-optical sensor comprises: light sources configured to emit light towards the region, and discrete photosensors, spread over more than 2 cm, configured to measure reflections of the light from the region. 13. The system of claim 12, wherein the computer is further configured to operate the light sources according to a first schedule responsive to detecting a neutral facial expression and to operate the light sources according to a second schedule responsive to detecting a non-neutral facial expression. 14. A method comprising: measuring, by a non-contact head-mounted electro-optical sensor, reflections from a region on a user's head; whereby the reflections are indicative of facial expressions of the user; detecting, based on the reflections, a type of facial expression expressed by the user, which belongs to a group comprising neutral facial expressions and non-neutral facial expressions; reading the electro-optical sensor at a first average bitrate (b1) when the user expresses a facial expression from among the neutral facial expressions; and reading the electro-optical sensor at a second average bitrate (b2) when the user expresses a facial expression from among the non-neutral facial expressions, wherein b2>b1. 15. The method of claim 14, wherein the electro-optical sensor comprises an inward-facing head-mounted camera that provides images of the region by detecting the reflections, and further comprising determining locations of key facial landmarks associated with at least some of the non-neutral facial expressions, and setting the camera's region of interest (ROI) to be around at least some of the key facial landmarks; and wherein the ROI covers less than half of the region. 16. The method of claim 14, wherein the electro-optical sensor comprises an inward-facing head-mounted camera that provides images of the region by detecting the reflections, the group further comprises transitional facial expressions, and further comprising determining locations of key facial landmarks associated with a subset of the transitional facial expressions transitioning from the neutral facial expressions, and setting the camera's region of interest (ROI) to be around at least some of said key facial landmarks while the user is in a neutral facial expression from among the neutral facial expressions; and wherein the ROI covers less than half of the region. 17. The method of claim 14, wherein the electro-optical sensor comprises an inward-facing head-mounted camera that provides images of the region by detecting the reflections, the group further comprises transitional facial expressions, and further comprising determining locations of key facial landmarks associated with a subset of the transitional facial expressions that occur in transitions between certain non-neutral facial expressions and certain neutral facial expressions, and setting the camera's region of interest (ROI) to be around at least some of said key facial landmarks while the user is in a certain non-neutral facial expression selected from the non-neutral facial expressions; and wherein the ROI covers less than half of the region. 18. The method of claim 14, wherein the electro-optical sensor comprises an inward-facing head-mounted camera that provides images of the region by detecting the reflections, the group further comprises transitional facial expressions, and further comprising determining locations of key facial landmarks associated with a subset of the transitional facial expressions that occur in transitions between certain non-neutral facial expressions and other non-neutral facial expressions belonging to the non-neutral facial expressions, and setting the camera's region of interest (ROI) to be around at least some of said key facial landmarks while the user is in a certain non-neutral facial expression selected from the certain non-neutral facial expressions; and wherein the ROI covers less than half of the region. 19. A facial expression capturing system, comprising: an inward-facing head-mounted camera configured to capture images of a region on a user's head; and a computer configured to: detect, based on the images, a type of facial expression expressed by the user, which belongs to a group comprising neutral facial expressions and non-neutral facial expressions; read from the camera images having a first average size (size1) when the user expresses a facial expression from among the neutral facial expressions; and read from the camera images having a second average size (size2) when the user expresses a facial expression from among the non-neutral facial expressions, wherein size2>size1. 20. The facial expression capturing system of claim 19, wherein the group further comprises transitional facial expressions, and the computer is further configured to read from the camera image having a third average size (size3) during the transitional facial expressions, wherein size3>size1, and to control resolution of the images utilizing at least one of binning and windowing; and wherein image size is proportional to color depth, such that the color depth read from the camera when the user expresses a facial expression from among the non-neutral facial expressions is higher compared to the color depth read from the camera when the user expresses a facial expression from among the neutral facial expressions.

When it comes to tasks like detecting facial expressions, not all the regions on the face are always equally important. Some regions may be more informative and other regions are less informative. Therefore, in some embodiments, camera ROI's can be set around more informative regions to save power, reduce computations, and/or optimize its performances.

Figure 22:
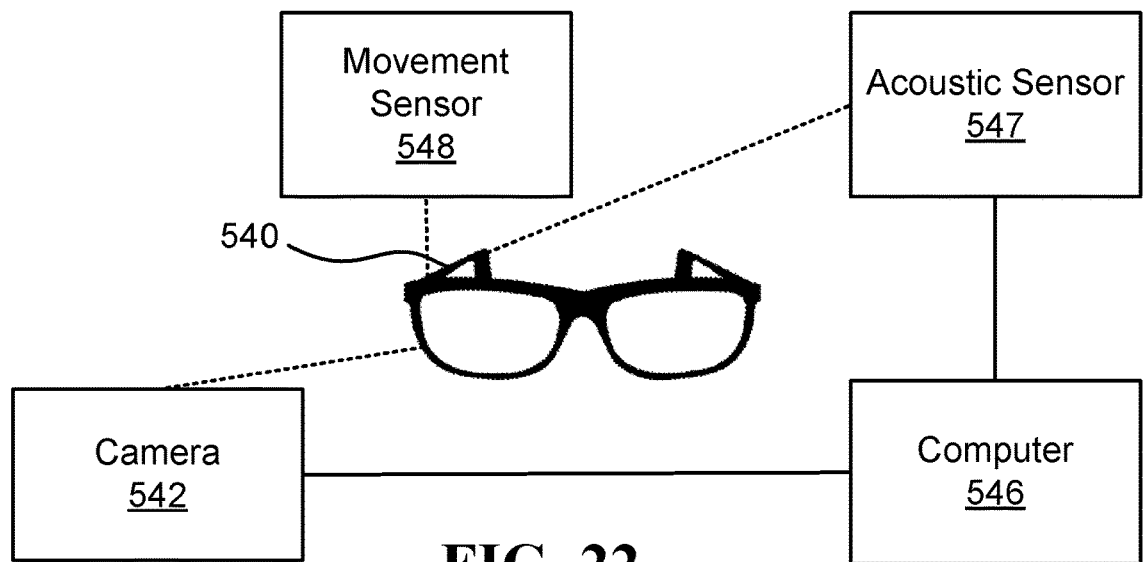
FIG. 22 illustrates an embodiment of a system in which windowing is utilized for efficient capturing of facial landmarks.

FIG. 22 illustrates an embodiment of a system in which windowing is utilized for efficient capturing of facial landmarks. The system includes at least an inward-facing head-mounted camera 542 and a computer 546. The camera 542 is configured to capture images of a region on a user's face utilizing a sensor that supports changing of its region of interest (ROI).

The computer 546 detects, based on the images, a type of facial expression expressed by the user, which belongs to a group comprising first and second facial expressions. The computer 546 then utilizes the detection to set the camera's ROI. Responsive to detecting that the user expresses the first facial expression, the computer 546 reads from the camera 542 a first ROI that covers a first subset of facial landmarks relevant to the first facial expression. Responsive to detecting that the user expresses the second facial expression, the computer 546 reads from the camera 542 a second ROI that covers a second subset of facial landmarks relevant to the second facial expression. The first and second ROIs are different. Optionally, the computer 546 may change ROIs (e.g., increase the ROI to a larger region) after a certain time (e.g., after a certain number of seconds) and/or upon detecting an expression of a different facial expression.

Figure 23:
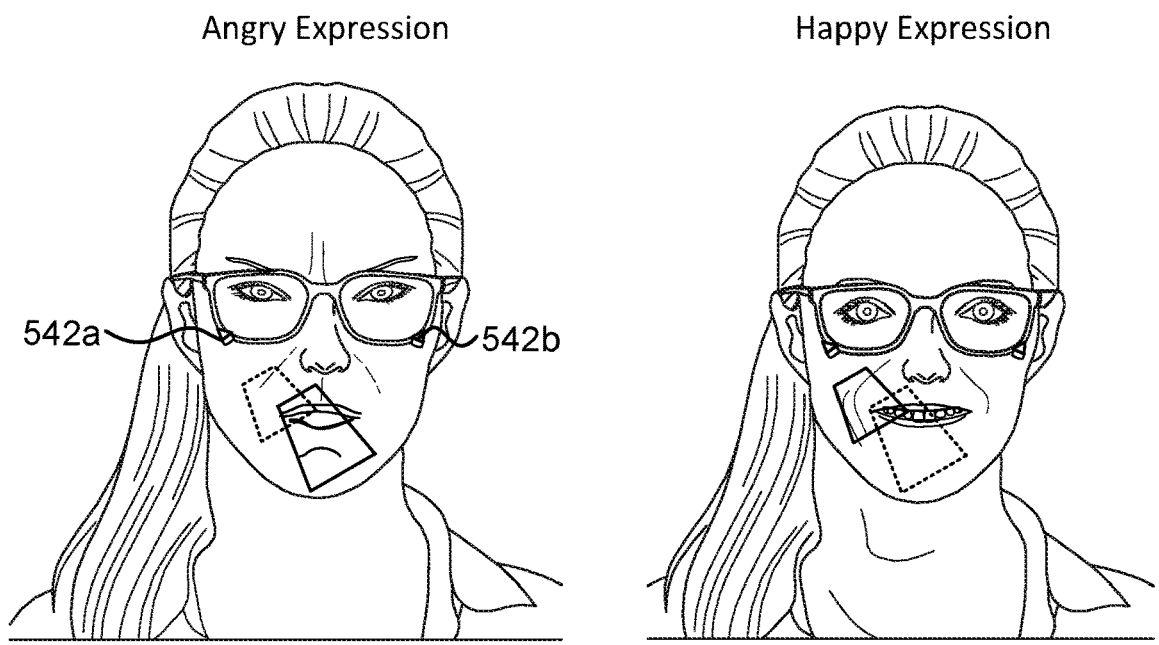
FIG. 23 illustrates a scenario in which different regions on the face have different relevance, depending on the facial expression being detected.

FIG. 23 illustrates a scenario in which different regions on the face have different relevance, depending on the facial expression being detected.

In one embodiment, the computer 546 is further configured to select the first subset as follows: calculate first relevance scores for facial landmarks extracted from a first subset of the images, select a first proper subset of the facial landmarks whose relevance scores reach a first threshold, and set the first ROI to cover the first proper subset of the facial landmarks Optionally, the computer 546 is further configured to select the second subset as follows: calculate second relevance scores for facial landmarks extracted from a second subset of the images, select a second proper subset of the facial landmarks whose relevance scores reach a second threshold, and set the second ROI to cover the second proper subset of the facial landmarks.

In another embodiment, the computer 546 is further configured to select the first and second ROIs based on a pre-calculated function and/or a lookup table that maps between types of facial expressions and their corresponding ROIs.

In some embodiments, total power consumed from head-mounted components (e.g., various cameras utilized to capture images of the face) for a process of rendering an avatar based on the first and second ROIs is lower than total power that would have been consumed from the head-mounted components for a process of rendering the avatar based on images of the region. In one embodiment, the selection of the ROIs takes in account both the accuracy of the rendered avatar and the power consumed by the head-mounted components in the process of rendering the avatar. Optionally, a first ROI that take significantly less power and results in a slightly less accurate avatar may receive a higher relevance score than a second ROI that take significantly more power that the first ROI and results in just a bit more accurate avatar.

In one embodiment, the computer 546 is further configured to read from the camera 542 a third ROI that covers a third subset of the facial landmarks, which is a proper subset of the first subset of facial landmarks, responsive to detecting that the user expresses the first facial expression for more than a predetermined duration. Optionally, the computer 546 is further configured to select the third subset as follows: calculate relevance score for each of the first subset of facial landmarks, select a proper subset of the first subset of facial landmarks whose relevance scores reach a threshold, and set the third ROI to cover the proper subset of the facial landmarks.

In one embodiment, the computer 546 is further configured to reduce the framerate of reading the first ROI from the camera 542 responsive to detecting that the user expresses the first facial expression for more than a predetermined duration.

In one embodiment, each of the first and second ROIs covers less than half of the region. Optionally, the computer 546 is further configured to detect changes in locations of the facial landmarks in the first and second subsets due to facial movements and/or movements of the camera relative to the face, and to update each of the first and second ROIs according to the changes.

In one embodiment, the sensor (used by the camera 542) further supports at least two different binning values for at least two different ROIs, respectively, and the computer 546 is further configured to (i) select, based on performance metrics of facial expression analysis configured to detect the type of facial expression expressed by the user, first and second resolutions for the first and second ROIs, respectively, and (ii) set different binning values for the first and second ROIs according to the first and second resolutions.

In one embodiment, the sensor (used by the camera 542) further supports changing its binning value, and the computer 546 is further configured to calculate relevance scores for facial landmarks extracted from overlapping sub-regions having at least two different binning values. Optionally, the sub-regions are subsets of the region, and a relevance score per facial landmark at a binning value increases as accuracy of facial expression detection based on the facial landmark at the binning value increases and power consumption used for the facial expression detection decreases. Optionally, the binning values are set according to a function that optimizes the relevance scores.

Optionally, the computer 546 is configured to increase the relevance scores in proportion to an expected magnitude of movement of the facial landmarks, in order to prefer a higher binning for facial expressions causing larger movements of their respective facial landmarks.

In some embodiments, the camera 542 is physically coupled to a frame 540 configured to be worn on the user's head (e.g., a frame of smartglasses), the camera 542 is located less than 15 cm away from the user's face, and the computer 546 is further configured to render an avatar of the user based on data read from the sensor.

In some embodiments, the system illustrated in FIG. 22 may reduce the power consumption of its head-mounted components by checking the quality of predictions of locations of facial landmarks using a model, and if the locations of the facial landmarks are closer than a threshold to their expected locations, then bitrate of reading the camera is reduced. Optionally, the computer 546 is further configured to identify that the locations of the facial landmarks are not closer than the threshold to their expected locations, and then increase the bitrate of reading from the camera.

In one embodiment, the system illustrated in FIG. 22 further comprises a head-mounted acoustic sensor 547 configured to take audio recordings of the user and a head-mounted movement sensor 548 configured to measure movements of the user's head. Optionally, the computer 546 is further configured to (i) generate feature values based on data read from the camera, the audio recordings, and the movements, and (ii) utilize a machine learning-based model to render an avatar of the user based on the feature values.

In one example, the model was trained based on the following simultaneously taken measurements of the user: previous audio recordings, previous movements, and previous data read from the camera. It is noted that the data read from the camera refers to images captured by the camera, wherein the images may be of the region or of a proper subset of the region captured by reading ROIs from the camera.

The following is an additional embodiment of a method that may be used by systems modeled according to FIG. 22. The steps described below may be performed by running a computer program having instructions for implementing the method. Optionally, the instructions may be stored on a computer-readable medium, which may optionally be a non-transitory computer-readable medium. In response to execution by a system including a processor and memory, the instructions cause the system to perform the following steps:

In Step 1, capturing images of a region on a user's face utilizing an inward-facing head-mounted camera comprising a sensor that supports changing of its region of interest (ROI).

In Step 2, detecting, based on the images, a type of facial expression expressed by the user, which belongs to a group comprising first and second facial expressions.

In Step 3, responsive to detecting that the user expresses the first facial expression, reading from the camera a first ROI that covers a first subset of facial landmarks relevant to the first facial expression.

And In Step 4, responsive to detecting that the user expresses the second facial expression, reading from the camera a second ROI that covers a second subset of facial landmarks relevant to the second facial expression; wherein the first and second ROIs are different.

In one embodiment, the method described above optionally includes the following steps: calculating first relevance scores for facial landmarks extracted from a first subset of the images, selecting a first proper subset of the facial landmarks whose relevance scores reach a first threshold, and setting the first ROI to cover the first proper subset of the facial landmarks.

In one embodiment, the method described above optionally includes the following step: reading from the camera a third ROI that covers a proper subset of the first subset of facial landmarks, responsive to detecting that the user expresses the first facial expression for more than a predetermined duration.

In one embodiment, the sensor (used by the camera taking the images in Step 1) further supports at least two different binning values for at least two different ROIs, respectively. Optionally, in this embodiment, the method includes the following steps: comprising (i) selecting, based on performance metrics of facial expression analysis for detecting the type of facial expression expressed by the user, first and second resolutions for the first and second ROIs, respectively, and (ii) setting different binning values for the first and second ROIs according to the first and second resolutions.

In one embodiment, a head-mounted acoustic sensor is utilized to take audio recordings of the user and a head-mounted movement sensor is utilized to measure movements of the user's head. Optionally, in this embodiment, the method described above includes the following steps: (i) generating feature values based on data read from the camera, the audio recordings, and the movements, and (ii) utilizing a machine learning-based model for rendering an avatar of the user based on the feature values.

This paragraph discloses claims that the Applicant may file in a continuation-in-part (CIP) patent application. 1. A system configured to utilize windowing for efficient capturing of facial landmarks, comprising: an inward-facing head-mounted camera configured to capture images of a region on a user's face utilizing a sensor that supports changing of its region of interest (ROI); and a computer configured to: detect, based on the images, a type of facial expression expressed by the user, which belongs to a group comprising first and second facial expressions; responsive to detecting that the user expresses the first facial expression, read from the camera a first ROI that covers a first subset of facial landmarks relevant to the first facial expression; and responsive to detecting that the user expresses the second facial expression, read from the camera a second ROI that covers a second subset of facial landmarks relevant to the second facial expression; wherein the first and second ROIs are different. 2. The system of claim 1, wherein the computer is further configured to select the first subset as follows: calculate first relevance scores for facial landmarks extracted from a first subset of the images, select a first proper subset of the facial landmarks whose relevance scores reach a first threshold, and set the first ROI to cover the first proper subset of the facial landmarks. 3. The system of claim 2, wherein the computer is further configured to select the second subset as follows: calculate second relevance scores for facial landmarks extracted from a second subset of the images, select a second proper subset of the facial landmarks whose relevance scores reach a second threshold, and set the second ROI to cover the second proper subset of the facial landmarks. 4. The system of claim 1, wherein the computer is further configured to select the first and second ROIs based on a pre-calculated function and/or a lookup table that maps between types of facial expressions and their corresponding ROIs. 5. The system of claim 1, wherein total power consumed from head-mounted components for a process of rendering an avatar based on the first and second ROIs is lower than total power that would have been consumed from the head-mounted components for a process of rendering the avatar based on images of the region. 6. The system of claim 1, wherein the computer is further configured to read from the camera a third ROI that covers a third subset of the facial landmarks, which is a proper subset of the first subset of facial landmarks, responsive to detecting that the user expresses the first facial expression for more than a predetermined duration. 7. The system of claim 6, wherein the computer is further configured to select the third subset as follows: calculate relevance score for each of the first subset of facial landmarks, select a proper subset of the first subset of facial landmarks whose relevance scores reach a threshold, and set the third ROI to cover the proper subset of the facial landmarks. 8. The system of claim 1, wherein the computer is further configured to reduce the framerate of reading the first ROI from the camera responsive to detecting that the user expresses the first facial expression for more than a predetermined duration. 9. The system of claim 1, wherein each of the first and second ROIs covers less than half of the region; and wherein the computer is further configured to detect changes in locations of the facial landmarks in the first and second subsets due to facial movements and/or movements of the camera relative to the face, and to update each of the first and second ROIs according to the changes. 10. The system of claim 1, wherein the sensor further supports at least two different binning values for at least two different ROIs, respectively, and the computer is further configured to (i) select, based on performance metrics of facial expression analysis configured to detect the type of facial expression expressed by the user, first and second resolutions for the first and second ROIs, respectively, and (ii) set different binning values for the first and second ROIs according to the first and second resolutions. 11. The system of claim 1, wherein the sensor further supports changing its binning value, wherein the computer is further configured to calculate relevance scores for facial landmarks extracted from overlapping sub-regions having at least two different binning values; wherein the sub-regions are subsets of the region, and a relevance score per facial landmark at a binning value increases as accuracy of facial expression detection based on the facial landmark at the binning value increases and power consumption used for the facial expression detection decreases; and set the binning values according to a function that optimizes the relevance scores. 12. The system of claim 11, wherein the computer is configured to increase the relevance scores in proportion to an expected magnitude of movement of the facial landmarks, in order to prefer a higher binning for facial expressions causing larger movements of their respective facial landmarks. 13. The system of claim 1, wherein the camera is physically coupled to a frame configured to be worn on the user's head, the camera is located less than 15 cm away from the user's face, and the computer is further configured to render an avatar of the user based on data read from the sensor. 14. The system of claim 13, wherein the system is further configured to reduce power consumption of its head-mounted components by checking quality of predictions of locations of facial landmarks using a model, and if the locations of the facial landmarks are closer than a threshold to their expected locations, then bitrate of reading the camera is reduced. 15. The system of claim 14, wherein the computer is further configured to identify that the locations of the facial landmarks are not closer than the threshold to their expected locations, and then increase the bitrate of reading from the camera. 16. The system of claim 1, wherein the system further comprises a head-mounted acoustic sensor configured to take audio recordings of the user and a head-mounted movement sensor configured to measure movements of the user's head; and the computer is further configured to (i) generate feature values based on data read from the camera, the audio recordings, and the movements, and (ii) utilize a machine learning-based model to render an avatar of the user based on the feature values. 17. A method comprising: capturing images of a region on a user's face utilizing an inward-facing head-mounted camera comprising a sensor that supports changing of its region of interest (ROI); detecting, based on the images, a type of facial expression expressed by the user, which belongs to a group comprising first and second facial expressions; responsive to detecting that the user expresses the first facial expression, reading from the camera a first ROI that covers a first subset of facial landmarks relevant to the first facial expression; and responsive to detecting that the user expresses the second facial expression, reading from the camera a second ROI that covers a second subset of facial landmarks relevant to the second facial expression; wherein the first and second ROIs are different. 18. The method of claim 17, further comprising: calculating first relevance scores for facial landmarks extracted from a first subset of the images, selecting a first proper subset of the facial landmarks whose relevance scores reach a first threshold, and setting the first ROI to cover the first proper subset of the facial landmarks. 19.

The method of claim 17, wherein the sensor further supports at least two different binning values for at least two different ROIs, respectively; and further comprising (i) selecting, based on performance metrics of facial expression analysis for detecting the type of facial expression expressed by the user, first and second resolutions for the first and second ROIs, respectively, and (ii) setting different binning values for the first and second ROIs according to the first and second resolutions. 20. A non-transitory computer readable medium storing one or more computer programs configured to cause a processor based system to execute steps comprising: capturing images of a region on a user's face utilizing an inward-facing head-mounted camera comprising a sensor that supports changing of its region of interest (ROI); detecting, based on the images, a type of facial expression expressed by the user, which belongs to a group comprising first and second facial expressions; responsive to detecting that the user expresses the first facial expression, reading from the camera a first ROI that covers a first subset of facial landmarks relevant to the first facial expression; and responsive to detecting that the user expresses the second facial expression, reading from the camera a second ROI that covers a second subset of facial landmarks relevant to the second facial expression; wherein the first and second ROIs are different.

In some embodiments, a system utilizes detection of facial movements to set an ROI of an inward-facing head-mounted camera. This system includes at least the computer 546 and the inward-facing head-mounted camera 542, which is configured to capture images of a region on a user's head utilizing a sensor that supports changing of its region of interest (ROI). In one embodiment, the computer 546 is configured to perform the following: detect, in a first subset of the images taken by the camera 542, a first sub-region in which changes due to a first facial movement reach a first threshold, and read from the camera 542 a first ROI that captures at least a portion of the first sub-region. At a later time (e.g., one or more seconds after the first ROI was read), the computer 546 detects, in a second subset of the images taken by the camera 542, a second sub-region in which changes due to a second facial movement reach a second threshold, and read from the camera 542 a second ROI that captures at least a portion of the second sub-region. Optionally, the first and second ROIs are different. Optionally, each of the first and second ROIs covers less than half of the region.

Figure 24:
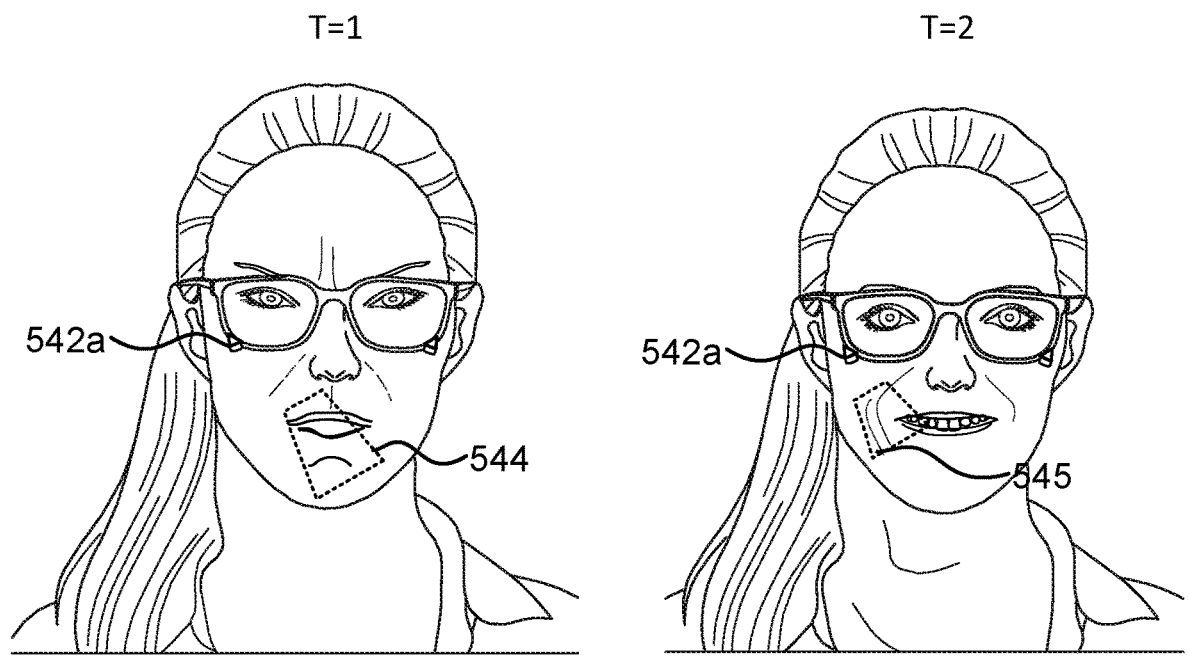
FIG. 24 illustrates different ROIs that are read from a camera at different times, when different facial movement is detected.

FIG. 24 illustrates different ROIs (544 and 545) that are read at different times when different facial movement is detected.

In one embodiment, the computer 546 is further configured to detect the first and second facial movements based on at least one of: an optical flow method, and Lucas-Kanade optical flow method.

In one embodiment, responsive to detecting facial movements below a third threshold for more than a predetermined duration, the computer 546 reduces the camera's framerate. For example, the system may reduce the camera's framerate from 5 frame per second (fps) to 1 fps when the user watch a movie while expressing a neutral facial expression. In another embodiment, responsive to detecting facial movements above a third threshold for more than a predetermined duration, the computer 546 increases the camera's framerate. For example, the system may increase the camera's framerate from 5 fps to 10 fps when the user speaks, because speaking increases the facial movements.

In some embodiments, the sensor utilized by the camera 542 further supports changing its binning value, and the computer 546 reads the first and second ROIs with different binning values. Additionally or alternatively, the computer 546 may calculate relevance scores for facial expression analysis on at least two resolutions of the first ROI with two different binning values, and set the binning values according to a function that optimizes the relevance scores. Optionally, a relevance score at a binning value is proportional to accuracy of facial expression detection based on the ROI at the binning value, and inversely-proportional to reduction in image resolution as a result of applying the binning.

In some embodiments, the sensor utilized by the camera 542 further supports changing its binning value, and the computer 546 sets a binning value according to a function of a magnitude of the facial movement. For example, in some cases the computer 546 may increase the binning value as a magnitude of the facial movement increases, in order to prefer a higher binning for larger facial movements.

In one embodiment, the computer 546 is further configured to detect a change in location of the first sub-region, and to update the first ROI according to the change.

In one embodiment, the computer 546 selects the portion of the first sub-region as follows. The computer 546 calculates first relevance scores for facial landmarks extracted from the first subset of the images, selects a first proper subset of facial landmarks whose relevance scores reach a first threshold, and sets the portion of the first sub-region to cover the first proper subset of the facial landmarks Optionally, the 546 selects the portion of the second sub-region as follows. The computer 546 calculates second relevance scores for facial landmarks extracted from the second subset of the images, selects a second proper subset of facial landmarks whose relevance scores reach a second threshold, and sets the portion of the second sub-region to cover the second proper subset of the facial landmarks.

In one embodiment, the computer 546 selects the first and second ROIs based on a pre-calculated function and/or a lookup table that maps between facial movements and their corresponding ROIs.

In one embodiment, total power consumed from head-mounted components for a process of rendering an avatar based on data read from the first and second ROIs is lower than total power that would have been consumed from the head-mounted components for a process of rendering the avatar based on images of the region.

In one embodiment, the camera 542 is physically coupled to a frame configured to be worn on the user's head (such as the frame of the smartglasses 540), the camera 542 is located less than 15 cm away from the user's face, and the computer 546 is further configured to render an avatar of the user based on data read from the sensor of the camera 542.

In one example, the system is further configured to reduce power consumption of its head-mounted components by checking quality of rendering the avatar using a model, and if the quality reaches a threshold then bitrate of reading the camera 542 is reduced.

In another example, the computer 546 is further configured to identify that the quality does not reach the threshold, and then increase the bitrate of reading from the camera.

In one embodiment, the system further comprises a head-mounted acoustic sensor 547 configured to take audio recordings of the user and a head-mounted movement sensor 548 configured to measure movements of the user's head. In this embodiment, the computer 546 is further configured to (i) generate feature values based on data read from the camera, the audio recordings, and the movements, and (ii) utilize a machine learning-based model to render an avatar of the user based on the feature values.

The following is an additional embodiment of a method that may be used by systems modeled according to FIG. 22. The steps described below may be performed by running a computer program having instructions for implementing the method. Optionally, the instructions may be stored on a computer-readable medium, which may optionally be a non-transitory computer-readable medium. In response to execution by a system including a processor and memory, the instructions cause the system to perform the following steps:

In Step 1, capturing images of a region on a user's face utilizing an inward-facing head-mounted camera comprising a sensor that supports changing of its region of interest (ROI).

In Step 2, detecting, based on a first subset of the images, a first sub-region in which changes due to a first facial movement reach a first threshold.

In Step 3, reading from the camera a first ROI that captures at least a portion of the first sub-region.

In Step 4, detecting, based on a second subset of the images, a second sub-region in which changes due to a second facial movement reach a second threshold.

And in Step 5, reading from the camera a second ROI that captures at least a portion of the second sub-region. Optionally, the first and second ROIs are different.

In one embodiment, the sensor of the camera further supports changing its binning value, and the method optionally includes a step of reading the first and second ROIs with different binning values.

In one embodiment, the sensor of the camera further supports changing its binning value, and the method optionally includes steps of calculating relevance scores for facial expression analysis on at least two resolutions of the first ROI with two different binning values, and setting the binning values according to a function that optimizes the relevance scores. Optionally, a relevance score at a binning value is proportional to accuracy of facial expression detection based on the ROI at the binning value, and inversely-proportional to reduction in image resolution as a result of applying the binning.

In one embodiment, the sensor of the camera further supports changing its binning value, and method optionally involves a step of setting a binning value according to a function of a magnitude of the facial movement.

This paragraph discloses claims that the Applicant may file in a continuation-in-part (CIP) patent application. 1. A system comprising: an inward-facing head-mounted camera configured to capture images of a region on a user's head utilizing a sensor that supports changing of its region of interest (ROI); and a computer configured to: detect, in a first subset of the images, a first sub-region in which changes due to a first facial movement reach a first threshold; read from the camera a first ROI that captures at least a portion of the first sub-region; detect, in a second subset of the images, a second sub-region in which changes due to a second facial movement reach a second threshold; and read from the camera a second ROI that captures at least a portion of the second sub-region; wherein the first and second ROIs are different. 2. The system of claim 1, wherein the computer is further configured to detect the first and second facial movements based on at least one of: an optical flow method, and Lucas-Kanade optical flow method; and wherein responsive to detecting facial movements below a third threshold for more than a predetermined duration, the computer is further configured to reduce the camera's framerate. 3. The system of claim 1, wherein the computer is further configured to detect the first and second facial movements based on at least one of: an optical flow method, and Lucas-Kanade optical flow method; and wherein responsive to detecting facial movements above a third threshold for more than a predetermined duration, the computer is further configured to increase the camera's framerate. 4. The system of claim 1, wherein each of the first and second ROIs covers less than half of the region, the sensor further supports changing its binning value, and the computer is further configured to read the first and second ROIs with different binning values. 5.

The system of claim 1, wherein the sensor further supports changing its binning value, and the computer is further configured to calculate relevance scores for facial expression analysis on at least two resolutions of the first ROI with two different binning values, and to set the binning values according to a function that optimizes the relevance scores; wherein a relevance score at a binning value is proportional to accuracy of facial expression detection based on the ROI at the binning value, and inversely-proportional to reduction in image resolution as a result of applying the binning. 6. The system of claim 1, wherein the sensor further supports changing its binning value, and the computer is further configured to set a binning value according to a function of a magnitude of the facial movement. 7. The system of claim 1, wherein the computer is further configured to detect a change in location of the first sub-region, and to update the first ROI according to the change. 8. The system of claim 1, wherein the computer is further configured to select the portion of the first sub-region as follows: calculate first relevance scores for facial landmarks extracted from the first subset of the images, select a first proper subset of facial landmarks whose relevance scores reach a first threshold, and set the portion of the first sub-region to cover the first proper subset of the facial landmarks. 9 The system of claim 8, wherein the computer is further configured to select the portion of the second sub-region as follows: calculate second relevance scores for facial landmarks extracted from the second subset of the images, select a second proper subset of facial landmarks whose relevance scores reach a second threshold, and set the portion of the second sub-region to cover the second proper subset of the facial landmarks. 10. The system of claim 1, wherein the computer is further configured to select the first and second ROIs based on a pre-calculated function and/or a lookup table that maps between facial movements and their corresponding ROIs. 11. The system of claim 1, wherein total power consumed from head-mounted components for a process of rendering an avatar based on data read from the first and second ROIs is lower than total power that would have been consumed from the head-mounted components for a process of rendering the avatar based on images of the region. 12. The system of claim 1, wherein the camera is physically coupled to a frame configured to be worn on the user's head, the camera is located less than 15 cm away from the user's face, and the computer is further configured to render an avatar of the user based on data read from the sensor. 13. The system of claim 12, wherein the system is further configured to reduce power consumption of its head-mounted components by checking quality of rendering the avatar using a model, and if the quality reaches a threshold then bitrate of reading the camera is reduced. 14. The system of claim 13, wherein the computer is further configured to identify that the quality does not reach the threshold, and then increase the bitrate of reading from the camera. 15.

The system of claim 1, wherein the system further comprises a head-mounted acoustic sensor configured to take audio recordings of the user and a head-mounted movement sensor configured to measure movements of the user's head; and the computer is further configured to (i) generate feature values based on data read from the camera, the audio recordings, and the movements, and (ii) utilize a machine learning based model to render an avatar of the user based on the feature values. 16. A method comprising: capturing images of a region on a user's face utilizing an inward-facing head-mounted camera comprising a sensor that supports changing of its region of interest (ROI); detecting, based on a first subset of the images, a first sub-region in which changes due to a first facial movement reach a first threshold; reading from the camera a first ROI that captures at least a portion of the first sub-region; detecting, based on a second subset of the images, a second sub-region in which changes due to a second facial movement reach a second threshold; and reading from the camera a second ROI that captures at least a portion of the second sub-region; wherein the first and second ROIs are different. 17. The method of claim 16, wherein the sensor further supports changing its binning value, and further comprising reading the first and second ROIs with different binning values. 18. The method of claim 16, wherein the sensor further supports changing its binning value, and further comprising calculating relevance scores for facial expression analysis on at least two resolutions of the first ROI with two different binning values, and setting the binning values according to a function that optimizes the relevance scores; wherein a relevance score at a binning value is proportional to accuracy of facial expression detection based on the ROI at the binning value, and inversely-proportional to reduction in image resolution as a result of applying the binning. 19. The method of claim 16, wherein the sensor further supports changing its binning value, and further comprising setting a binning value according to a function of a magnitude of the facial movement. 20. A non-transitory computer readable medium storing one or more computer programs configured to cause a processor based system to execute steps comprising: capturing images of a region on a user's face utilizing an inward-facing head-mounted camera comprising a sensor that supports changing of its region of interest (ROI); detecting, based on a first subset of the images, a first sub-region in which changes due to a first facial movement reach a first threshold; reading from the camera a first ROI that captures at least a portion of the first sub-region; detecting, based on a second subset of the images, a second sub-region in which changes due to a second facial movement reach a second threshold; and reading from the camera a second ROI that captures at least a portion of the second sub-region; wherein the first and second ROIs are different.

Figure 25:
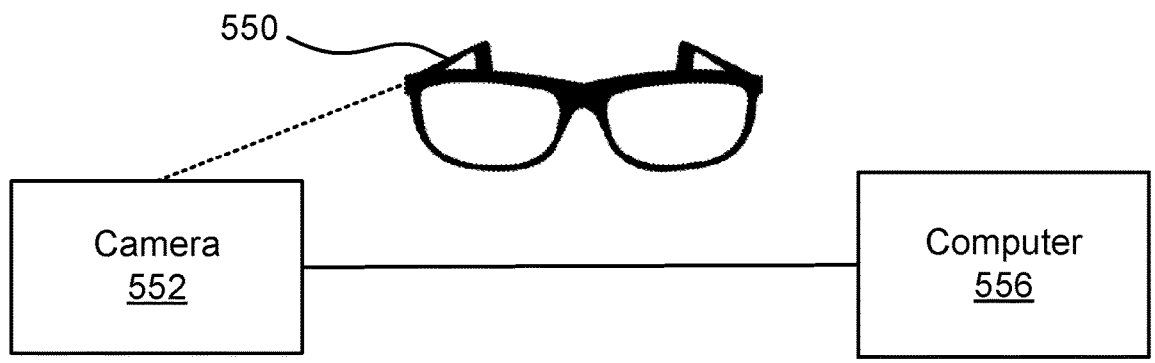
FIG. 25 illustrates an embodiment of a system configured to utilize windowing for efficient capturing of imaging photoplethysmogram (iPPG) signals.

FIG. 25 illustrates an embodiment of a system configured to utilize windowing for efficient capturing of imaging photoplethysmogram signals (iPPG signals). The system includes at least an inward-facing head-mounted camera 552, and a computer 556. The camera 552 is configured to capture images of a region comprising skin on a user's head utilizing a sensor that supports changing of its region of interest (ROI). In one embodiment, the computer 556 is configured to calculate quality scores for iPPG signals extracted from windows in the images and select a proper subset of the iPPG signals whose quality scores reach a threshold. The computer 556 then reads from the camera 552 at least one ROI that covers one or more of the windows from which the proper subset of the iPPG signals are extracted. The at least one ROI read from the camera covers below 75% of the region. And in one embodiment, the at least one ROI read from the camera 552 may cover even below 10% of the region's area.

Herein, a sentence of the form "an ROI that covers below x % of the region" means that the ROI covers less than X % of the area of the region. Thus, for example the aforementioned at least one ROI that are read from the camera cover less than 75% of the area of the region comprising skin on the user's head which is captured by the camera 552 if all sensing elements of the sensor are read (without restricting the reading to sensing elements that cover the windows).

Figure 26:
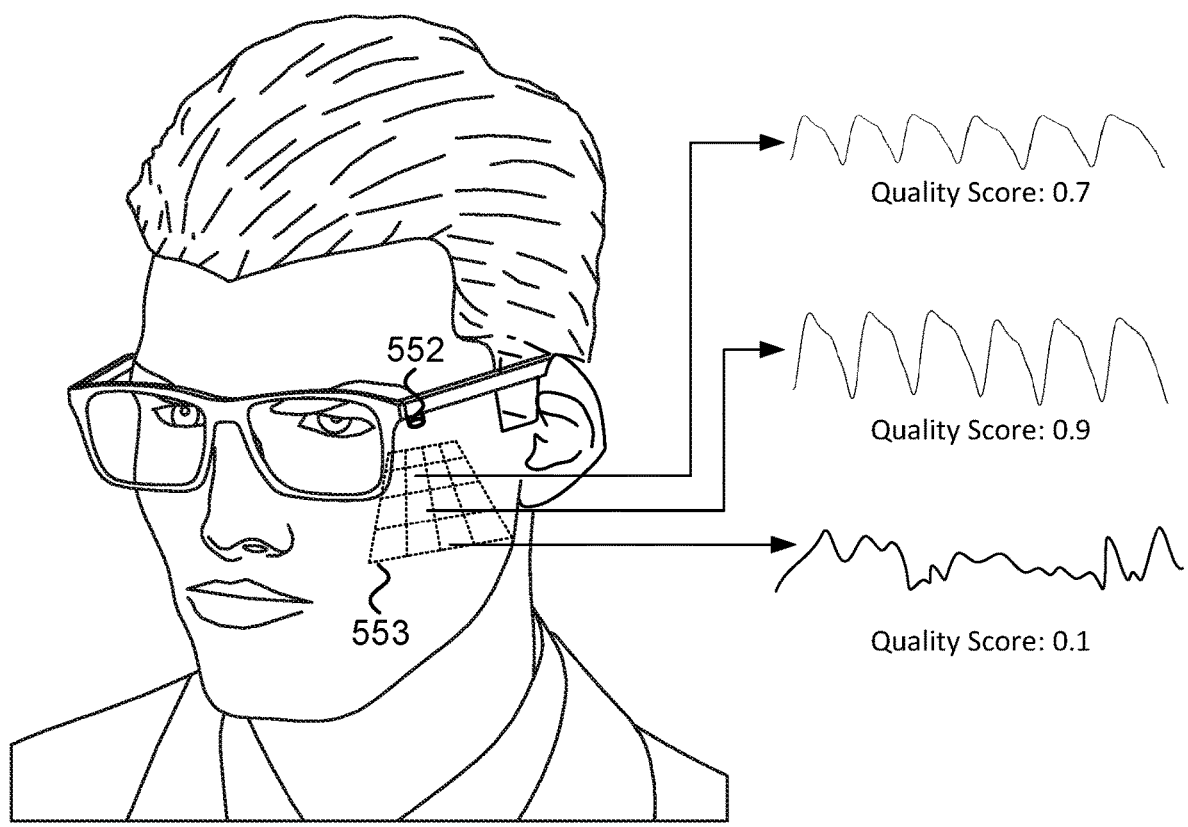
FIG. 26 illustrates different iPPG signals extracted from images of a region on the face.

FIG. 26 illustrates different iPPG signals extracted from images of the region 553.

In some embodiments, the quality scores for the iPPG signals are proportional to the ratio AC/DC, where the AC component represents absorption of the pulsatile arterial blood, and the DC component represents the overall light absorption of the tissue, venous blood, and non-pulsatile arterial blood.

The quality scores for the iPPG signals may be calculated using various known and/or novel methods, such as signal-to-noise level, waveform morphology analysis, and/or machine learning-based approaches. The publication Li, Qiao, and Gari D. Clifford "Dynamic time warping and machine learning for signal quality assessment of pulsatile signals" Physiological measurement (2012), describes a multilayer perceptron neural network that combines several individual signal quality metrics and physiological context, which is applicable to the this embodiment. For example, one method for calculating the quality scores for the iPPG signals includes the following steps: Step 1, calculating an iPPG beat template (e.g., by averaging beats in a predefined window); Step 2, applying dynamic time warping to the iPPG beat; Step 3, calculating signal quality metrics for each iPPG beat, for example by applying one or more of direct matching (for each beat, calculate correlation coefficient with the iPPG beat template), linear resampling (selected each beat between two fiducial points, linearly stretch or compress the beat to the length of the iPPG beat template, and calculate the correlation coefficient), dynamic time warping (resample the beat to length of the iPPG beat template, and calculate the correlation coefficient), and clipping detection (determiner periods of saturation to a maximum or a minimum value within each beat, determine the smallest fluctuation to be ignored, and calculate the percentage of the beat that is not clipped); And step 4, fusing the signal quality information for a decision, such as (i) a simple heuristic fusion of the signal quality metrics, or (ii) a machine learning-based approach for quality estimation, such as feeding a multi-layer perceptron neural network with feature values comprising the signal quality metrics, the simple heuristic fusion, and the number of beats detected within the window.

In some embodiments, the quality scores for the iPPG signals may be calculated using a machine learning-based approach that utilizes at least one of the following signal quality metrics as feature values: correlation of the iPPG signals with an iPPG beat template, correlation of the iPPG signals with an iPPG beat template after linearly stretching or compressing to the length of the iPPG beat template, correlation of a resampled dynamic time warping version the iPPG signals with an iPPG beat template, percentage of the iPPG signals that are not clipped, and signal-to-noise ratios of the iPPG signals.

Another known method for calculating the quality scores for the iPPG signals is based on the idea that a PPG signal has a fundamental frequency of oscillation equal to the pulse rate, and the spectral power of the PPG signal is concentrated in a small frequency band around the pulse rate. The spectral power of the noise is distributed over the passband of the bandpass filter, such as [0:5 Hz,5 Hz]. And the quality scores for the iPPG signals can include a factor estimated as a ratio of (the power of the recorded signal around the pulse rate) to (the power of the noise in the passband of the bandpass filter).

In some embodiments, the quality scores for the iPPG signals are calculated based on a ratio of power of the iPPG signals around the pulse rate to power of the noise in a passband of a bandpass filter used in the calculation of the iPPG signals.

Smart ROI selection for iPPG is known in the art, as can be found, for example, in the following two publications: (i) Feng, Litong, et al. "Dynamic ROI based on K-means for remote photoplethysmography" 2015 IEEE International Conference on Acoustics, Speech and Signal Processing (ICASSP), and (ii) Bobbia, Serge, et al. "Real-time temporal superpixels for unsupervised remote photoplethysmography" Proceedings of the IEEE Conference on Computer Vision and Pattern Recognition Workshops. 2018.

In some embodiments, the sensor of the camera 552 further supports changing its binning value, and the computer 556 is further configured to: apply at least two different binning values to at least one of the windows, calculate at least two quality scores for iPPG signals extracted from the at least one of the windows when the at least two different binning values were applied, respectively, select a binning value with a corresponding quality score that is maximal, and read from the camera at least one of the at least one ROI according to the binning value. Optionally, using binning with the selected binning value reduces at least in half the time it takes the computer to read the camera compared to reading the at least one ROI in full resolution.

Binning can decrease the reading time from the camera 552, which may enable it to be in low-power mode for a longer duration. In one example, the camera 552 supports different binning values for different ROIs in an image, and setting of the binning values according to the function that optimizes the quality scores comprises setting at least two different binning values for at least two ROIs in the same image. In another example, the camera 552 supports a single binning value for an image, and ROIs with different binning values are captured serially by the camera.

In one embodiment, the computer 556 is further configured to read from the camera 552 the at least one ROI at an average frame rate higher than a maximal frame rate at which full-resolution images can be read from the camera. In one example, the computer 556 reads from the camera the at least one ROI at an average frame rate that is more than double the maximal frame rate at which full-resolution images can be read from the camera 552.

In one embodiment, the at least one ROI comprises multiple ROIs, the sensor supports setting multiple ROIs, and the multiple ROIs are captured simultaneously by the camera.

In another embodiment, the at least one ROI comprises multiple ROIs, and the multiple ROIs are captured serially by the camera 552.

In one embodiment, the windows are selected to cover an area expected to undergo a detectable change in hemoglobin concentration due to a certain physiological response. Optionally, the computer 556 is further configured to select two different proper subsets of the iPPG signals for two different physiological responses, and to utilize two different ROIs to cover the two different windows from which the two different proper subsets of the iPPG signals are extracted.

Different physiological responses may manifest via changes to blood flow in different areas. For example, for a certain person, a migraine may be manifested via changes to blood flow on the forehead, while a stroke may be manifested via changes to blood flow on both the forehead and a cheek. Therefore, when calculating the iPPG signals for detecting the migraine the computer may select a first subset of the ROIs distributed over the forehead, and for detecting the stroke, the computer may select a second subset of the ROIs distributed over the forehead and the cheek.

The following is an additional embodiment of a method that may be used by systems modeled according to FIG. 25. The steps described below may be performed by running a computer program having instructions for implementing the method. Optionally, the instructions may be stored on a computer-readable medium, which may optionally be a non-transitory computer-readable medium. In response to execution by a system including a processor and memory, the instructions cause the system to perform the following steps:

In Step 1, capturing images of a region comprising skin on a user's head utilizing an inward-facing head-mounted camera comprising a sensor that supports changing of its region of interest (ROI).

In Step 2, calculating quality scores for iPPG signals extracted from windows in the images. Optionally, the windows are selected to cover an area expected to undergo a detectable change in hemoglobin concentration due to a certain physiological response.

In Step 3, selecting a proper subset of the iPPG signals whose quality scores reach a threshold.

And in Step 4, reading from the camera at least one ROI that covers one or more of the windows from which the proper subset of the iPPG signals are extracted. Optionally, the at least one ROI read from the camera covers below 75% of the region's area.

In one embodiment, the method above optionally includes the following steps: calculating the quality scores for the iPPG signals using a machine learning-based approach that utilizes at least one of the following signal quality metrics as feature values: correlation of the iPPG signals with an iPPG beat template, correlation of the iPPG signals with an iPPG beat template after linearly stretching or compressing to the length of the iPPG beat template, correlation of a resampled dynamic time warping version the iPPG signals with an iPPG beat template, percentage of the iPPG signals that are not clipped, and signal-to-noise ratios of the iPPG signals.

In one embodiment, the sensor further supports changing its binning value, and the method optionally includes steps involving: applying at least two different binning values to at least one of the windows, calculating at least two quality scores for iPPG signals extracted from the at least one of the windows when the at least two different binning values were applied, respectively, selecting a binning value with a corresponding quality score that is maximal, and reading from the camera at least one of the at least one ROI according to the binning value.

In one embodiment, the method optionally includes a step of reading from the camera the at least one ROI at an average frame rate higher than a maximal frame rate at which full-resolution images can be read from the camera.

In one embodiment, two different proper subsets of the iPPG signals are selected, for two different physiological responses, and two different ROIs are utilized to cover the two different windows from which the two different proper subsets of the iPPG signals are extracted.

This paragraph discloses claims that the Applicant may file in a continuation-in-part (CIP) patent application. 1. A system configured to utilize windowing for efficient capturing of imaging photoplethysmogram signals (iPPG signals), comprising: an inward-facing head-mounted camera configured to capture images of a region comprising skin on a user's head utilizing a sensor that supports changing of its region of interest (ROI); and a computer configured to: calculate quality scores for iPPG signals extracted from windows in the images; select a proper subset of the iPPG signals whose quality scores reach a threshold; and read from the camera at least one ROI that covers one or more of the windows from which the proper subset of the iPPG signals are extracted; wherein the at least one ROI read from the camera covers below 75% of the region's area. 2. The system of claim 1, wherein the quality scores for the iPPG signals are proportional to the ratio AC/DC, where the AC component represents absorption of the pulsatile arterial blood, and the DC component represents the overall light absorption of the tissue, venous blood, and non-pulsatile arterial blood. 3. The system of claim 1, wherein the quality scores for the iPPG signals are calculated using a machine learning-based approach that utilizes at least one of the following signal quality metrics as feature values: correlation of the iPPG signals with an iPPG beat template, correlation of the iPPG signals with an iPPG beat template after linearly stretching or compressing to the length of the iPPG beat template, correlation of a resampled dynamic time warping version the iPPG signals with an iPPG beat template, percentage of the iPPG signals that are not clipped, and signal-to-noise ratios of the iPPG signals. 4. The system of claim 1, wherein the quality scores for the iPPG signals are calculated based on a ratio of power of the iPPG signals around the pulse rate to power of the noise in a passband of a bandpass filter used in the calculation of the iPPG signals. 5. The system of claim 1, wherein the at least one ROI read from the camera covers below 10% of the region's area. 6. The system of claim 1, wherein the computer is further configured to read from the camera the at least one ROI at an average frame rate higher than a maximal frame rate at which full-resolution images can be read from the camera. 7. The system of claim 1, wherein the sensor further supports changing its binning value, and the computer is further configured to: apply at least two different binning values to at least one of the windows, calculate at least two quality scores for iPPG signals extracted from the at least one of the windows when the at least two different binning values were applied, respectively, select a binning value with a corresponding quality score that is maximal, and read from the camera at least one of the at least one ROI according to the binning value. 8. The system of claim 7, wherein using binning with the selected binning value reduces at least in half the time it takes the computer to read the camera compared to reading the at least one ROI in full resolution. 9. The system of claim 1, wherein the at least one ROI comprises multiple ROIs, the sensor supports setting multiple ROIs, and the multiple ROIs are captured simultaneously by the camera. 10. The system of claim 1, wherein the at least one ROI comprises multiple ROIs, and the multiple ROIs are captured serially by the camera. 11. The system of claim 1, wherein the windows are selected to cover an area expected to undergo a detectable change in hemoglobin concentration due to a certain physiological response. 12. The system of claim 11, wherein the computer is further configured to select two different proper subsets of the iPPG signals for two different physiological responses, and to utilize two different ROIs to cover the two different windows from which the two different proper subsets of the iPPG signals are extracted. 13. A method comprising: capturing images of a region comprising skin on a user's head utilizing an inward-facing head-mounted camera comprising a sensor that supports changing of its region of interest (ROI); calculating quality scores for iPPG signals extracted from windows in the images; selecting a proper subset of the iPPG signals whose quality scores reach a threshold; and reading from the camera at least one ROI that covers one or more of the windows from which the proper subset of the iPPG signals are extracted; wherein the at least one ROI read from the camera covers below 75% of the region's area. 14. The method of claim 13, further comprising calculating the quality scores for the iPPG signals using a machine learning-based approach that utilizes at least one of the following signal quality metrics as feature values: correlation of the iPPG signals with an iPPG beat template, correlation of the iPPG signals with an iPPG beat template after linearly stretching or compressing to the length of the iPPG beat template, correlation of a resampled dynamic time warping version the iPPG signals with an iPPG beat template, percentage of the iPPG signals that are not clipped, and signal-to-noise ratios of the iPPG signals. 15. The method of claim 13, further comprising reading from the camera the at least one ROI at an average frame rate higher than a maximal frame rate at which full-resolution images can be read from the camera. 16. The method of claim 13, wherein the sensor further supports changing its binning value, and further comprising: applying at least two different binning values to at least one of the windows, calculating at least two quality scores for iPPG signals extracted from the at least one of the windows when the at least two different binning values were applied, respectively, selecting a binning value with a corresponding quality score that is maximal, and reading from the camera at least one of the at least one ROI according to the binning value. 17. The method of claim 13, wherein the windows are selected to cover an area expected to undergo a detectable change in hemoglobin concentration due to a certain physiological response. 18. The method of claim 17, wherein the computer is further configured to select two different proper subsets of the iPPG signals for two different physiological responses, and to utilize two different ROIs to cover the two different windows from which the two different proper subsets of the iPPG signals are extracted. 19. A non-transitory computer readable medium storing one or more computer programs configured to cause a processor based system to execute steps comprising: capturing images of a region comprising skin on a user's head utilizing an inward-facing head-mounted camera comprising a sensor that supports changing of its region of interest (ROI); calculating quality scores for iPPG signals extracted from windows in the images; selecting a proper subset of the iPPG signals whose quality scores reach a threshold; and reading from the camera at least one ROI that covers one or more of the windows from which the proper subset of the iPPG signals are extracted; wherein the at least one ROI read from the camera covers below 75% of the region's area. 20. The non-transitory computer readable medium of claim 19, wherein the sensor further supports changing its binning value, and further comprising: applying at least two different binning values to at least one of the windows, calculating at least two quality scores for iPPG signals extracted from the at least one of the windows when the at least two different binning values were applied, respectively, selecting a binning value with a corresponding quality score that is maximal, and reading from the camera at least one of the at least one ROI according to the binning value.

Put the simplest way, and without limiting the disclosed embodiments, the most basic iPPG calculation computes a Discrete Fourier Transform (DFT) of the pixel values, followed by a band-pass filter. Since the DFT takes a limited number of samples in a limited sampling window, it is like multiplying the original signal by a box function that is zero everywhere outside of the sampling window. Multiplication in the time domain translates into convolution in the Fourier domain, thus the DFT returns the spectrum of the original signal convolved with a sinc function, which significantly reduces the sparsity of the original signal. This means that not all the images provide the same amount of information to the iPPG calculation. Some images are captured at times that make them more informative for the iPPG calculation (referred to as advantageous timings), while other images are captured at times that make them less informative for the iPPG calculation. However, if the system could capture the images asynchronously according to the frequency of the iPPG signal to be recovered, then the output of the DFT would have shorter sinc tails, which would improve its reconstruction.

For example, for some iPPG calculations, images captured at times of the following fiducial points are more informative than images captured at other times: the systolic notch (which is the minimum at the PPG signal onset), the systolic peak (which is the maximum of the PPG signal), and in some cases also the dicrotic notch and/or the diastolic peak (which is the first local maximum of the PPG signal after the dicrotic notch and before 0.8 of the duration of the cardiac cycle). Additionally or alternatively, for some iPPG calculations based on the derivatives of the PPG signal, it may be beneficial to capture the images at times optimized for one or more of the following fiducial points in the first and/or second derivatives of the PPG signal: the maximum slope peak in systolic of the velocity photoplethysmogram (VPG), the local minima slope in systolic of VPG, the global minima slope in systolic of VPG, the maximum slope peak in diastolic of VPG, the maximum of the acceleration photoplethysmogram (APG), and the minimum of the APG.

Knowing the advantageous timings for capturing the images that are more informative for the iPPG calculation can reduce the power consumption significantly, by both reducing the average frame rate and reducing the amount of image processing calculations. In one embodiment, the advantageous timings are detected based on analyzing measurements of a contact PPG device (having lower noise than the images), and are then used by the computer to operate the camera in an asynchronous mode instead of at the usual fixed frame rate. It is noted that "advantageous timings" refers to a group that includes significantly more timings that are more informative than the averaged fixed rate sample for the PPG calculation versus timings that are less informative than the averaged fixed rate sample for the PPG calculation. Optionally, the advantageous timings may include just the best sampling timings for the PPG calculation.

Figure 27:
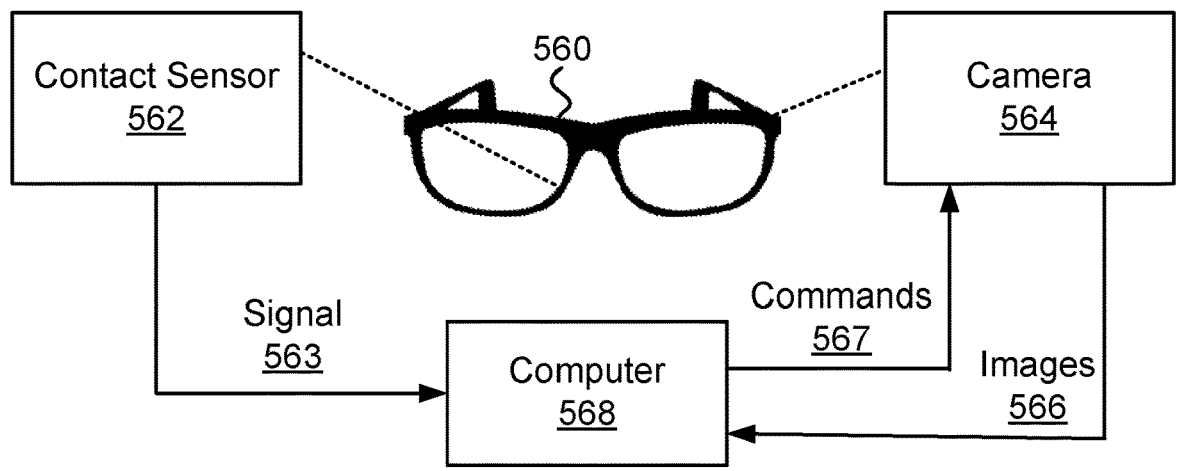
FIG. 27 illustrates an embodiment of a system configured to operate a camera asynchronously.

FIG. 27 illustrates an embodiment of a system configured to operate a camera asynchronously. The system includes at least a camera 564, which is configured to capture images of a region comprising skin on a user's head, and a contact sensor 563, which is configured to measure a signal 563 indicative of cardiac activity of the user. The system also includes a computer 568 that detects, based on the signal 563, advantageous timings 565 to capture the images for a purpose of extracting imaging photoplethysmogram signals (iPPG signals) from the images, and issues commands 567 to the camera to capture the images 566 according to the advantageous timings 565.

Figure 28:
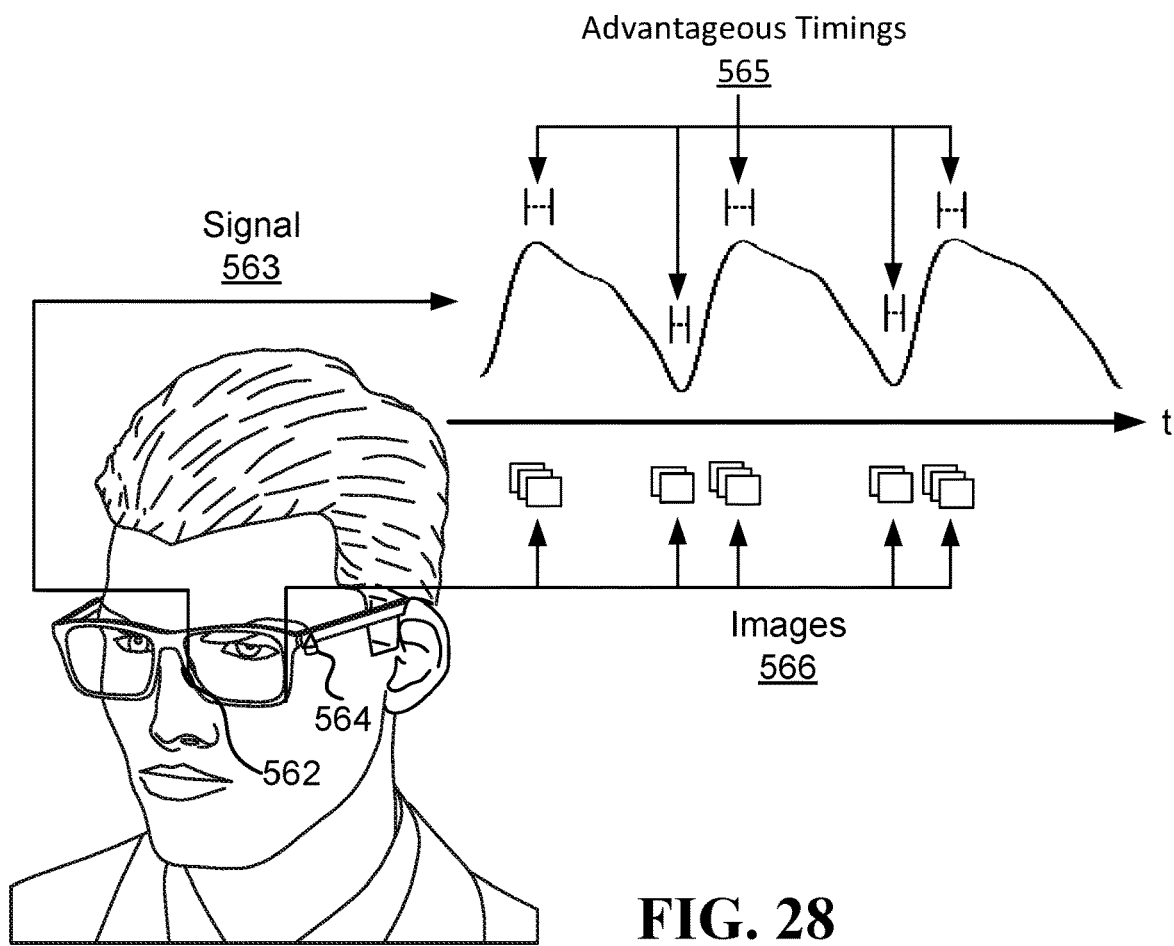
FIG. 28 illustrates utilizing a PPG signal measured by a contact PPG device to select advantageous timings to capture images with a camera in order to extract an iPPG signal.

FIG. 28 illustrates utilizing the signal (a PPG signal) measured by a contact PPG device to select the advantageous timings for the camera to capture images that are useful for extracting an iPPG signal.

In one embodiment, the computer 568 is further configured to command the camera 564 to operate in a low-power mode for at least some of the time between the advantageous timings 565. Optionally, capturing the images 566 according to the advantageous timings 565 reduces duty cycle of the camera 564 to below half compared to duty cycle with a fixed frame rate to achieve essentially the same iPPG quality level. Optionally, the computer 568 is further configured to detect a physiological response based on the iPPG signals.

In some embodiments, the contact sensor 562 and the camera 564 are head-mounted, and the computer 568 is further configured to command the camera 564 to capture a second set of images that are interlaced between the images 566. Optionally, the images 566 are captured with a first level of binning, and the second set of images are captured with a second level of binning that is higher than the first level of binning.

In one embodiment, the computer 568 is further configured to reduce impairment of the iPPG signals by incident light by calculating normalized AC/DC ratios base on the images and the second set of images. Optionally, the computer 568 is further configured to utilize the second set of images to average noise affecting the iPPG signals. Optionally, the second level of binning results in at least four times reduction in image resolution compared to the first level of binning, and a number of images captured with the second level of binning equals or greater than a number of images captured with the first level of binning.

One example of a method to calculate the iPPG signals include the following steps: In step 1, extracting the blood perfusion signals at sub-regions of the region by spatially averaging the images. In step 2, extracting the AC components of the blood perfusion signals using a band-pass filter (such as 0.5 Hz to 5 Hz) that receives either the images or the images and the second set of images. In step 3, extracting the DC components of the blood perfusion signals using a low-pass filter (such as 0.3 Hz cutoff) that receives either the images or the images and the second set of images. And in step 4, calculate the normalized AC/DC ratios at the sub-regions to reduce impairment to the iPPG signals by incident light. In another example, the contact sensor is a contact PPG device, and the iPPG signals are calculated utilizing a machine learning-based approach that includes the following steps: In step 1, generating feature values based on data comprising the images, the second set of images, and the PPG signal measured by the contact PPG device. And in step 2, utilizing a model to calculate, based on the feature values, a value indicative of the iPPG signals.

In one embodiment, the contact sensor 562 is mounted below the user's head, the camera 564 is head-mounted, and the computer 568 is further configured to command the camera 564 to capture a second set of images that are interlaced between the images 566. Optionally, the second set of images are captured with a lower resolution compared to the images 566.

In one embodiment, the computer 568 is further configured to set a sampling rate of the contact sensor in proportion to regularity of the user's heart rate. In one example, the more regulated the user's heart rate is, the lower the sampling rate of the contact sensor can be, because it is easier for the computer 568 to predict the timing of the next pulse.

In one embodiment, the contact sensor 562 comprises a contact head-mounted photoplethysmography device, the signal is a photoplethysmogram signal (PPG signal), the camera 564 is head-mounted, and the advantageous timings 565 comprise times corresponding to occurrence of at least one of the following types of fiducial points in the PPG signal: systolic notches, systolic peaks, dicrotic notches, and diastolic peaks. Optionally, the computer 568 calculates a delay between the PPG signal and iPPG signals, and chooses the advantageous timings 565 while accounting for the delay.

Optionally, the computer is further configured to calculate a delay between the PPG signal and the iPPG signals, and to adjust the advantageous timings based on the delay. Because the contact sensor triggers the camera, it is usually preferred that the contact sensor be located at a location to which the pulse wave has a shorter delay compared to the location measured by the camera. When this is not the case, the computer may predict the timing of the next pulse wave at the camera's location based on the timing of the current pulse wave at the sensor's location.

Depending on the measured regions, the PPG and iPPG signals may not be temporally aligned due to the difference between the times of arrival of the pulse waves to the different skin regions. The computer may estimate the delay between the PPG and iPPG signals, and use the estimated delay for aligning signals. For example, the computer may estimate the delay by comparing the times of certain fiducial points in the PPG and iPPG waveforms and/or in the first derivatives of the PPG and iPPG waveforms.

In one embodiment, the camera 564 belongs to a battery-operated non-head-mounted mobile device located more than 10 cm from the region, the computer 568 comprises a head-mounted computer and a non-head-mounted computer that are configured to communicate over a wireless communication channel, the advantageous timings 565 include significantly more timings of images that are more informative compared to images that are less informative for the purpose of extracting the iPPG signals, and capturing the images 566 according to the advantageous timings 565 reduces duty cycle of the camera 562 to below half compared to duty cycle with a fixed frame rate to achieve essentially the same iPPG quality level.

In one embodiment, the camera 564 and the contact sensor 562 are mounted in a smartwatch, capturing the images 566 according to the advantageous timings 565 reduces duty cycle of the camera 564 to below half compared to duty cycle with a fixed frame rate to achieve essentially the same iPPG quality level, and the computer 568 is further configured to calculate blood pressure for the user based on a difference in pulse arrival times in the signal 563 and the iPPG signal.

Optionally, the contact sensor 562 comprises a contact head-mounted photoplethysmography device, the signal 563 is a photoplethysmogram signal (PPG signal), and the advantageous timings 565 comprise times corresponding to occurrence of at least one of the following types of fiducial points in the PPG signal: systolic notches, systolic peaks, dicrotic notches, and diastolic peaks. Optionally, the computer 568 calculates a delay between the PPG signal and iPPG signals, and to choose the advantageous timings 565 while accounting for the delay.

In one embodiment, the contact sensor 562 comprises an electrocardiograph, and the signal 563 is an electrocardiogram signal. Optionally, the computer 568 is calculates a delay between the electrocardiogram signal and the iPPG signals, and to choose the advantageous timings while accounting for the delay.

The delay between the ECG and iPPG signals may be calculated using various suitable methods, such as measuring the delays between dicrotic notches in the iPPG signals and R-peaks in the ECG signal, and/or measuring the delay between iPPG peaks and ECG R-peaks, and adding the delays to the iPPG signals.

The following is an additional embodiment of a method that may be used by systems modeled according to FIG. 27. The steps described below may be performed by running a computer program having instructions for implementing the method. Optionally, the instructions may be stored on a computer-readable medium, which may optionally be a non-transitory computer-readable medium. In response to execution by a system including a processor and memory, the instructions cause the system to perform the following steps:

In Step 1, capturing, by a camera, images of a region comprising skin on a user's head.

In Step 2, measuring, by a contact sensor, a signal indicative of cardiac activity of the user.

In Step 3, detecting, based on the signal, advantageous timings for capturing the images for a purpose of extracting imaging photoplethysmogram signals (iPPG signals) from the images.

And in Step 4, commanding the camera to capture the images according to the advantageous timings.

In one embodiment, the method optionally includes the a step of commanding the camera to operate in a low-power mode for at least some of the time between the advantageous timings. Optionally, capturing the images according to the advantageous timings reduces duty cycle of the camera to below half compared to duty cycle with a fixed frame rate to achieve essentially the same iPPG quality level.

In one embodiment, the contact sensor and the camera are head-mounted, and the method optionally includes a step of commanding the camera to capture a second set of images that are interlaced between the images. Optionally, the images are captured with a first level of binning, and the second set of images are captured with a second level of binning that is higher than the first level of binning.

In one embodiment, the method optionally includes a step of reducing impairment of the iPPG signals by incident light by calculating normalized AC/DC ratios base on the images and the second set of images, and/or utilizing the second set of images for averaging noise affecting the iPPG signals.

In one embodiment, the advantageous timings include significantly more timings of images that are more informative compared to images that are less informative for the purpose of extracting the iPPG signals, and capturing the images according to the advantageous timings in Step 4 reduces duty cycle of the camera to below half compared to duty cycle with a fixed frame rate to achieve essentially the same iPPG quality level.

In one embodiment, the contact sensor comprises an electrocardiograph, and the signal is an electrocardiogram signal. Optionally, the method includes a step of calculating a delay between the electrocardiogram signal and the iPPG signals, and choosing the advantageous timings while accounting for the delay.

This paragraph discloses claims that the Applicant may file in a continuation-in-part (CIP) patent application. 1. A system configured to operate a camera asynchronously, comprising: a camera configured to capture images of a region comprising skin on a user's head; a contact sensor configured to measure a signal indicative of cardiac activity of the user; and a computer configured to: detect, based on the signal, advantageous timings to capture the images for the purpose of extracting imaging photoplethysmogram signals (iPPG signals) from the images; and command the camera to capture the images according to the advantageous timings. 2. The system of claim 1, wherein the computer is further configured to command the camera to operate in a low-power mode for at least some of the time between the advantageous timings; whereby capturing the images according to the advantageous timings reduces duty cycle of the camera to below half compared to duty cycle with a fixed frame rate to achieve essentially the same iPPG quality level. 3. The system of claim 1, wherein the contact sensor and the camera are head-mounted, and the computer is further configured to command the camera to capture a second set of images that are interlaced between the images, wherein the images are captured with a first level of binning, and the second set of images are captured with a second level of binning that is higher than the first level of binning. 4. The system of claim 3, wherein the computer is further configured to reduce impairment of the iPPG signals by incident light by calculating normalized AC/DC ratios base on the images and the second set of images. 5. The system of claim 3, wherein the computer is further configured to utilize the second set of images to average noise affecting the iPPG signals. 6. The system of claim 3, wherein the second level of binning results in at least four times reduction in image resolution compared to the first level of binning, and a number of images captured with the second level of binning equals or greater than a number of images captured with the first level of binning. 7. The system of claim 1, wherein the contact sensor is mounted below the user's head, the camera is head-mounted, and the computer is further configured to command the camera to capture a second set of images that are interlaced between the images, wherein the second set of images are captured with a lower resolution compared to the images. 8. The system of claim 1, wherein the computer is further configured to set a sampling rate of the contact sensor in proportion to regularity of the user's heart rate. 9. The system of claim 1, wherein the contact sensor comprises a contact head-mounted photoplethysmography device, the signal is a photoplethysmogram signal (PPG signal), the camera is head-mounted, and the advantageous timings comprise times corresponding to occurrence of at least one of the following types of fiducial points in the PPG signal: systolic notches, systolic peaks, dicrotic notches, and diastolic peaks. 10. The system of claim 9, wherein the computer is further configured to calculate a delay between the PPG signal and iPPG signals, and to choose the advantageous timings while accounting for the delay. 11. The system of claim 1, wherein the camera belongs to a battery-operated non-head-mounted mobile device located more than 10 cm from the region, the computer comprises a head-mounted computer and a non-head-mounted computer that are configured to communicate over a wireless communication channel, the advantageous timings include significantly more timings of images that are more informative compared to images that are less informative for the purpose of extracting the iPPG signals, and capturing the images according to the advantageous timings reduces duty cycle of the camera to below half compared to duty cycle with a fixed frame rate to achieve essentially the same iPPG quality level. 12. The system of claim 1, wherein the camera and the contact sensor are mounted in a smartwatch, capturing the images according to the advantageous timings reduces duty cycle of the camera to below half compared to duty cycle with a fixed frame rate to achieve essentially the same iPPG quality level, and the computer is further configured to calculate blood pressure for the user based on a difference in pulse arrival times in the signal and the iPPG signal. 13. The system of claim 12, wherein the contact sensor comprises a contact head-mounted photoplethysmography device, the signal is a photoplethysmogram signal (PPG signal), and the advantageous timings comprise times corresponding to occurrence of at least one of the following types of fiducial points in the PPG signal: systolic notches, systolic peaks, dicrotic notches, and diastolic peaks; and wherein the computer is further configured to calculate a delay between the PPG signal and iPPG signals, and to choose the advantageous timings while accounting for the delay. 14. The system of claim 1, wherein the contact sensor comprises an electrocardiograph, and the signal is an electrocardiogram signal; and wherein the computer is further configured to calculate a delay between the electrocardiogram signal and the iPPG signals, and to choose the advantageous timings while accounting for the delay. 15. A method comprising: capturing, by a camera, images of a region comprising skin on a user's head; measuring, by a contact sensor, a signal indicative of cardiac activity of the user; detecting, based on the signal, advantageous timings for capturing the images for the purpose of extracting imaging photoplethysmogram signals (iPPG signals) from the images; and commanding the camera to capture the images according to the advantageous timings 16. The method of claim 15, further comprising commanding the camera to operate in a low-power mode for at least some of the time between the advantageous timings; whereby capturing the images according to the advantageous timings reduces duty cycle of the camera to below half compared to duty cycle with a fixed frame rate to achieve essentially the same iPPG quality level. 17. The method of claim 15, wherein the contact sensor and the camera are head-mounted, and further comprising commanding the camera to capture a second set of images that are interlaced between the images, wherein the images are captured with a first level of binning, and the second set of images are captured with a second level of binning that is higher than the first level of binning. 18. The method of claim 17, further comprising reducing impairment of the iPPG signals by incident light by calculating normalized AC/DC ratios base on the images and the second set of images, and/or utilizing the second set of images for averaging noise affecting the iPPG signals. 19. The method of claim 15, wherein the contact sensor comprises an electrocardiograph, and the signal is an electrocardiogram signal; and further comprising calculating a delay between the electrocardiogram signal and the iPPG signals, and choosing the advantageous timings while accounting for the delay. 20. A non-transitory computer readable medium storing one or more computer programs configured to cause a processor based system to execute steps comprising: capturing, by a camera, images of a region comprising skin on a user's head; measuring, by a contact sensor, a signal indicative of cardiac activity of the user; detecting, based on the signal, advantageous timings for capturing the images for a purpose of extracting imaging photoplethysmogram signals (iPPG signals) from the images; and commanding the camera to capture the images according to the advantageous timings.

Figure 29:
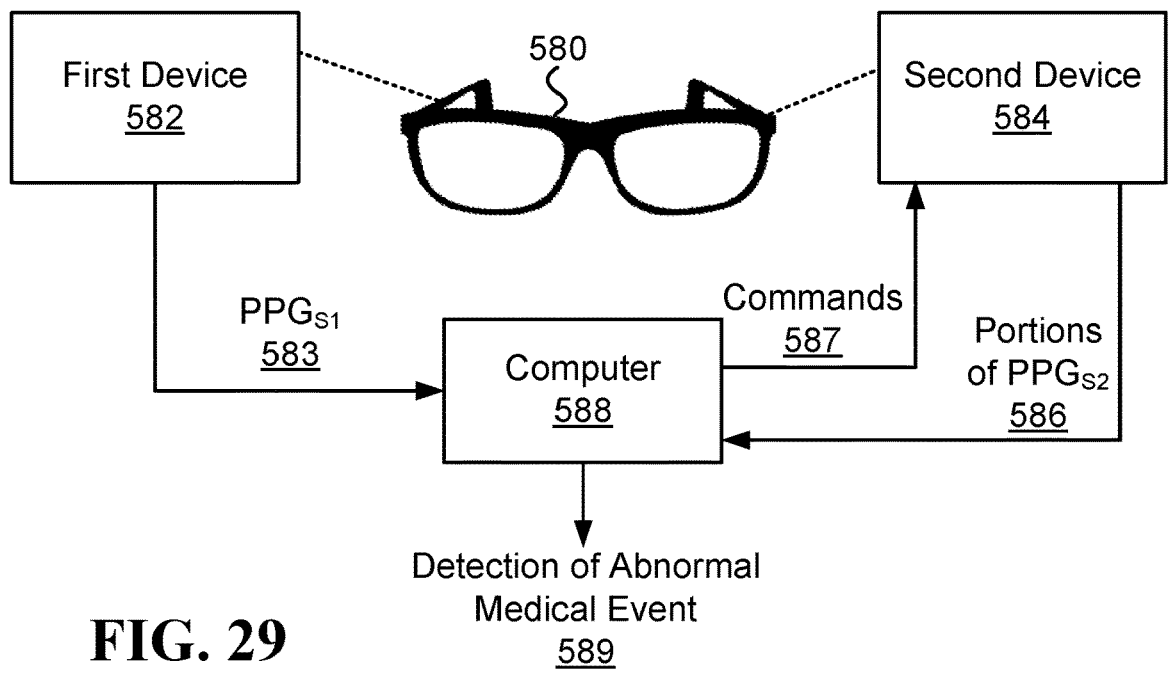
FIG. 29 illustrates an embodiment of a system configured to detect an abnormal medical event.

FIG. 29 illustrates an embodiment of a system configured to detect an abnormal medical event. The system includes a first device 582, which is configured to measure a first signal indicative of a photoplethysmogram signal ($PPG_{S1}$ 583) on a first region on a user's head, and second device 584, which is configured to measure a second signal indicative of a photoplethysmogram signal ($PPG_{S2}$ 586) on a second region on the user's head; with the first and second regions being on different sides of the user's head.

The system illustrated in FIG. 29 also includes a computer 588. In one embodiment, the computer 588 detects, based on the first signal, advantageous timings to measure the second signal for the purpose of reconstructing informative portions of $PPG_{S2}$. The computer 588 issues commands 587 to the second device 584 to measure the second signal during the advantageous timings. The computer 588 makes a detection of the abnormal medical event 589 based on an asymmetrical change to blood flow recognizable in $PPG_{S1}$ 583 and the informative portions of $PPG_{S2}$ 586.

Figure 30:
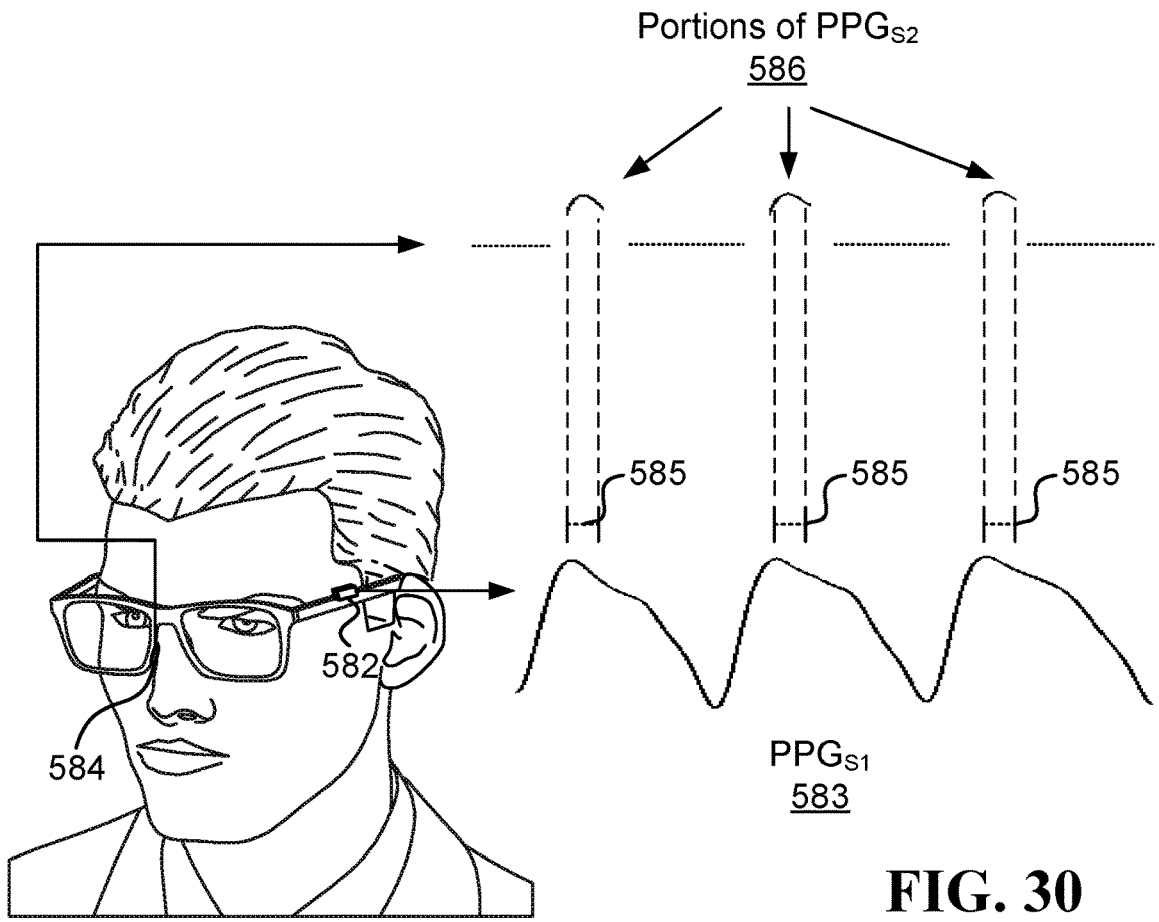
FIG. 30 illustrates utilization of a first PPG signal to determine when to measure a second PPG signal in a manner that can save power.

FIG. 30 illustrates utilization of $PPG_{S1}$ to determine when to utilize the second device in order to measure the second signal in order to reconstruct informative portions of $PPG_{S2}$.

Examples of medical conditions that may cause asymmetrical changes to blood flow (depending on the locations of the first and second regions) include ischemic stroke, a migraine, a headache, cellulitis, dermatitis, ear infection, and CHF exacerbation. However, the higher the sampling rate of each PPG device, the more power it consumes. In order to reduce the power consumption of the sensors, the more informative timings for sampling the PPG signal (referred to as advantageous timings) are estimated based on the first signal that is sampled at a higher rate compared to the second signal, and the second device (which is operated at a lower duty cycle) is triggered asynchronously to sample the PPG signal at the advantageous timings for discrete reconstruction. This reduces the power consumption of the second device by both reducing its average sampling rate and reducing the amount of signals to process.

It is noted that sentences in the form of "first and second regions on different sides of the head" refer to either (i) the first region on the right side of the head and the second region on the left side of the head, respectively, or (ii) the first region on the left side of the head and the second region on the right side of the head, respectively. The right and left sides are identified according to the vertical symmetry axis that divides a human face, which passes through the middle of the forehead and the tip of the nose.

In one example, the abnormal medical event is ischemic stroke, and the asymmetrical change to the blood flow recognizable in $PPG_{S1}$ and $PPG_{S2}$ involves an increase in asymmetry between blood flow on the different sides of the head, with respect to a baseline asymmetry between blood flow on the different sides of the head.

In one embodiment, the computer 588 is further configured to calculate first and second systolic blood pressure values based on $PPG_{S1}$ and $PPG_{S2}$, and the asymmetrical change to the blood flow recognizable in $PPG_{S1}$ and $PPG_{S2}$ involves an increase in a difference between the first and second systolic blood pressure values that exceeds a threshold.

In one example, the abnormal medical event is migraine, and the asymmetrical change to the blood flow recognizable in $PPG_{S1}$ and $PPG_{S2}$ is indicative of a pattern of a certain change to facial blood flow, which is associated with at least one previous migraine attack, determined based on data comprising previous $PPG_{S1}$ and $PPG_{S2}$, which were measured more than 5 minutes before the previous migraine attack.

In another example, the abnormal medical event is headache, and the asymmetrical change to the blood flow recognizable in $PPG_{S1}$ and $PPG_{S2}$ is indicative of at least one of: a change in directionality of facial blood flow, and reduction in blood flow to one side of the face.

In some embodiments, the first and second devices are embedded in smartglasses 580, $PPG_{S1}$ arrives at the first region before $PPG_{S2}$ arrives at the second region, and the asymmetrical change to the blood flow corresponds to a deviation of $PPG_{S1}$ and $PPG_{S2}$ compared to a baseline based on previous measurements of $PPG_{S1}$ and $PPG_{S2}$ taken before the abnormal medical event.

In some embodiments, the computer 586 is further configured to (a) generate feature values based on data comprising $PPG_{S1}$, $PPG_{S2}$, and the previous measurements of $PPG_{S1}$ and $PPG_{S2}$, and (b) utilize a model to calculate, based on the feature values, a value indicative of whether the user is experiencing the abnormal medical event. Optionally, at least one of the feature values is indicative of at least one of the following: a difference in maximal amplitudes between $PPG_{S1}$ and $PPG_{S2}$ relative to a difference in maximal amplitudes between the previous measurements of $PPG_{S1}$ and $PPG_{S2}$, and a difference in a pulse arrival time between $PPG_{S1}$ and $PPG_{S2}$ relative to a pulse arrival time between the previous measurements of $PPG_{S1}$ and $PPG_{S2}$.

In some embodiments, a sum of the periods during which the second device measures the second signal according to the advantageous timings is less than half a sum of periods during which the first device measures the first signal. Optionally, the first and second devices are contact PPG devices, and the sum of the periods is less than 10% the sum of periods during which the first device measures the first signal.

In some embodiments, the system illustrated in FIG. 29 also includes a head-mounted movement sensor configured to measure a signal indicative of movements of the user's body (movements signal), whereby the movement can change the user's blood pressure that changes the delay between $PPG_{S1}$ and $PPG_{S2}$. Optionally, the computer 588 is further configured to adjust the advantageous timings as a function of the movement signal.

In one embodiment, the system illustrated in FIG. 29 also includes a photoplethysmography device configured to be mounted on a limb on a limb of the user, to communicate with the computer 588 over a wireless communication link, and to take measurements during the advantageous timings plus a delay that is a function of delay between pulse arrival times to the first region and the limb. The computer 588 may reconstruct the PPG signal from the limb based on the timed measurements, and in this embodiment, is further configured to detect a medical condition based on an asymmetrical change to blood flow recognizable in the measurements, and/or a change to the pulse arrival times recognizable in the measurements. Examples of optional wireless communication links include Bluetooth Low Energy or ZigBee. In addition, because head-mounted PPG devices usually provide a higher-quality PPG signal compared to wrist/leg mounted PPG devices, timing the limb based PPG device according to the head-mounted PPG device may provide the benefit of timing the asynchronous samples based on the higher-quality signal.

In one embodiment, the second device 584 comprises an inward-facing head-mounted camera having more than 30 pixels, configured to capture images of a region covering a skin area greater than 2 cm^2, and located more than 5 mm from the second region. $PPG_{S2}$ in this embodiment may be recognizable from color changes in the images. In one example, the second region is located on a cheek of the user and/or above one of the user's eyes.

In one embodiment, the first and second devices comprise first and second head-mounted contact photoplethysmography devices ($PPG_1$, $PPG_2$, respectively) configured to communicate with the computer 588 over wired communication links, and the informative portions of $PPG_{S2}$ comprise occurrences of at least one of the following fiducial points: systolic notch, systolic peak, dicrotic notch, and diastolic peak.

Optionally, a sum of the periods during which the second device measures the second signal according to the advantageous timings is less than half a sum of periods during which the first device measures the first signal.

In one embodiment, the first device 582 comprises a head-mounted contact photoplethysmography devices ($PPG_1$), the second device comprises an ear-mounted contact photoplethysmography devices ($PPG_2$), and the informative portions of $PPG_{S2}$ comprise occurrences of at least one of the following fiducial points: systolic notch, systolic peak, dicrotic notch, and diastolic peak. Optionally, the computer 588 is further configured to estimate a delay between $PPG_{S1}$ and $PPG_{S2}$, and to adjust the advantageous timings based on the delay. Some smartglasses designs support larger batteries compared to earbuds. As a result, the combination of a first head-mounted sensor (operating at a higher duty cycle) and a second ear-mounted sensor may provide the benefit of extending the earbud's operation time (until draining its battery), and maybe even reduce the manufacturing cost of the earbud by reducing its hardware requirement specification as a result of the asynchronous sampling.

In some embodiments, the advantageous timings 585 include significantly more timings for measuring the second signal that are more informative than measuring the second signal at a fixed rate for the purpose of reconstructing the informative portions of $PPG_{S2}$ versus timings for measuring the second signal that are less informative than measuring the second signal at the fixed rate for the purpose of reconstructing the informative portions of $PPG_{S2}$. Optionally, measuring the second signal according to the advantageous timings reduces duty cycle of the second device to below half compared to duty cycle with a fixed sampling rate to achieve essentially the same quality level.

The following is an additional embodiment of a method that may be used by systems modeled according to FIG. 29. The steps described below may be performed by running a computer program having instructions for implementing the method. Optionally, the instructions may be stored on a computer-readable medium, which may optionally be a non-transitory computer-readable medium. In response to execution by a system including a processor and memory, the instructions cause the system to perform the following steps:

In Step 1, measuring, by first and second devices, first and second signals indicative of photoplethysmogram signals ($PPG_{S1}$ and $PPG_{S2}$, respectively) at first and second regions on different sides of a user's head.

In Step 2, detecting, based on the first signal, advantageous timings for measuring the second signal for the purpose of reconstructing informative portions of $PPG_{S2}$.

In Step 3, commanding the second device to measure the second signal during the advantageous timings.

And in Step 4, detecting the abnormal medical event based on an asymmetrical change to blood flow recognizable in $PPG_{S1}$ and the informative portions of $PPG_{S2}$.

In one embodiment, the abnormal medical event is ischemic stroke, and detecting the asymmetrical change comprises detecting an increase in asymmetry between blood flow on the different sides of the head, with respect to a baseline asymmetry between blood flow on the different sides of the head.

In one embodiment, the method optionally includes the following comprising calculating first and second systolic blood pressure values based on $PPG_{S1}$ and $PPG_{S2}$, and detecting the asymmetrical change comprises detecting an increase in a difference between the first and second systolic blood pressure values that exceeds a threshold.

In one embodiment, the abnormal medical event is migraine, and detecting the asymmetrical change comprises detecting a pattern of a certain change to facial blood flow, which is associated with at least one previous migraine attack, determined based on data comprising previous $PPG_{S1}$ and $PPG_{S2}$, which were measured more than 5 minutes before the previous migraine attack.

In one embodiment, the abnormal medical event is headache, and detecting the asymmetrical change comprises detecting at least one of: a change in directionality of facial blood flow, and reduction in blood flow to one side of the face.

In one embodiment, the method may optionally include the following steps: (i) generating feature values based on data comprising $PPG_{S1}$, $PPG_{S2}$, and the previous measurements of $PPG_{S1}$ and $PPG_{S2}$, and (ii) utilizing a model for calculating, based on the feature values, a value indicative of whether the user is experiencing the abnormal medical event. Optionally, at least one of the feature values is indicative of at least one of the following: a difference in maximal amplitudes between $PPG_{S1}$ and $PPG_{S2}$ relative to a difference in maximal amplitudes between the previous measurements of $PPG_{S1}$ and $PPG_{S2}$, and a difference in a pulse arrival time between $PPG_{S1}$ and $PPG_{S2}$ relative to a pulse arrival time between the previous measurements of $PPG_{S1}$ and $PPG_{S2}$.

This paragraph discloses claims that the Applicant may file in a continuation-in-part (CIP) patent application. 1. A system configured to detect an abnormal medical event, comprising: first and second devices configured to measure first and second signals indicative of photoplethysmogram signals (PPGS1 and PPGS2, respectively) at first and second regions on different sides of a user's head; and a computer configured to: detect, based on the first signal, advantageous timings to measure the second signal for the purpose of reconstructing informative portions of PPGS2; command the second device to measure the second signal during the advantageous timings; and detect the abnormal medical event based on an asymmetrical change to blood flow recognizable in PPGS1 and the informative portions of PPGS2. 2. The system of claim 1, wherein the abnormal medical event is ischemic stroke, and the asymmetrical change to the blood flow recognizable in PPGS1 and PPGS2 involves an increase in asymmetry between blood flow on the different sides of the head, with respect to a baseline asymmetry between blood flow on the different sides of the head. 3. The system of claim 1, wherein the computer is further configured to calculate first and second systolic blood pressure values based on PPGS1 and PPGS2, and the asymmetrical change to the blood flow recognizable in PPGS1 and PPGS2 involves an increase in a difference between the first and second systolic blood pressure values that exceeds a threshold. 4. The system of claim 1, wherein the abnormal medical event is migraine, and the asymmetrical change to the blood flow recognizable in PPGS1 and PPGS2 is indicative of a pattern of a certain change to facial blood flow, which is associated with at least one previous migraine attack, determined based on data comprising previous PPGS1 and PPGS2, which were measured more than 5 minutes before the previous migraine attack. 5. The system of claim 1, wherein the abnormal medical event is headache, and the asymmetrical change to the blood flow recognizable in PPGS1 and PPGS2 is indicative of at least one of: a change in directionality of facial blood flow, and reduction in blood flow to one side of the face. 6. The system of claim 1, wherein the first and second devices are embedded in smartglasses, PPGS1 arrives at the first region before PPGS2 arrives at the second region, and the asymmetrical change to the blood flow corresponds to a deviation of PPGS1 and PPGS2 compared to a baseline based on previous measurements of PPGS1 and PPGS2 taken before the abnormal medical event. 7. The system of claim 6, wherein the computer is further configured to (a) generate feature values based on data comprising PPGS1, PPGS2, and the previous measurements of PPGS1 and PPGS2, and (b) utilize a model to calculate, based on the feature values, a value indicative of whether the user is experiencing the abnormal medical event; wherein at least one of the feature values is indicative of at least one of the following: a difference in maximal amplitudes between PPGS1 and PPGS2 relative to a difference in maximal amplitudes between the previous measurements of PPGS1 and PPGS2, and a difference in a pulse arrival time between PPGS1 and PPGS2 relative to a pulse arrival time between the previous measurements of PPGS1 and PPGS2. 8. The system of claim 6, wherein a sum of the periods during which the second device measures the second signal according to the advantageous timings is less than half a sum of periods during which the first device measures the first signal. 9. The system of claim 1, further comprising a head-mounted movement sensor configured to measure a signal indicative of movements of the user's body (movements signal), whereby the movement can change the user's blood pressure that changes the delay between PPGS1 and PPGS2; and wherein the computer is further configured to adjust the advantageous timings as a function of the movement signal. 10. The system of claim 1, further comprising a photoplethysmography device configured to be mounted on a limb on a limb of the user, to communicate with the computer over a wireless communication link, and to take measurements during the advantageous timings plus a delay that is a function of delay between pulse arrival times to the first region and the limb. 11. The system of claim 1, wherein the second device comprises an inward-facing head-mounted camera having more than 30 pixels, configured to capture images of a region covering a skin area greater than 2 cm^2, and located more than 5 mm from the second region; and wherein PPGS2 is recognizable from color changes in the images. 12. The system of claim 1, wherein the first and second devices comprise first and second head-mounted contact photoplethysmography devices (PPG1, PPG2, respectively) configured to communicate with the computer over wired communication links, the informative portions of PPGS2 comprise occurrences of at least one of the following fiducial points: systolic notch, systolic peak, dicrotic notch, and diastolic peak, and a sum of the periods during which the second device measures the second signal according to the advantageous timings is less than half a sum of periods during which the first device measures the first signal. 13. The system of claim 1, wherein the first device comprises a head-mounted contact photoplethysmography devices (PPG1), the second device comprises an ear-mounted contact photoplethysmography devices (PPG2), and the informative portions of PPGS2 comprise occurrences of at least one of the following fiducial points: systolic notch, systolic peak, dicrotic notch, and diastolic peak; and wherein the computer is further configured to estimate a delay between PPGS1 and PPGS2, and to adjust the advantageous timings based on the delay. 14. The system of claim 1, wherein the advantageous timings include significantly more timings for measuring the second signal that are more informative than measuring the second signal at a fixed rate for the purpose of reconstructing the informative portions of PPGS2 versus timings for measuring the second signal that are less informative than measuring the second signal at the fixed rate for the purpose of reconstructing the informative portions of PPGS2; and wherein measuring the second signal according to the advantageous timings reduces duty cycle of the second device to below half compared to duty cycle with a fixed sampling rate to achieve essentially the same quality level. 15. A method comprising: measuring, by first and second devices, first and second signals indicative of photoplethysmogram signals (PPGS1 and PPGS2, respectively) at first and second regions on different sides of a user's head; detecting, based on the first signal, advantageous timings for measuring the second signal for the purpose of reconstructing informative portions of PPGS2; commanding the second device to measure the second signal during the advantageous timings; and detecting the abnormal medical event based on an asymmetrical change to blood flow recognizable in PPGS1 and the informative portions of PPGS2. 16. The method of claim 15, wherein the abnormal medical event is ischemic stroke, and detecting the asymmetrical change comprises detecting an increase in asymmetry between blood flow on the different sides of the head, with respect to a baseline asymmetry between blood flow on the different sides of the head. 17. The method of claim 15, further comprising calculating first and second systolic blood pressure values based on PPGS1 and PPGS2, and detecting the asymmetrical change comprises detecting an increase in a difference between the first and second systolic blood pressure values that exceeds a threshold. 18. The method of claim 15, wherein the abnormal medical event is headache, and detecting the asymmetrical change comprises detecting at least one of: a change in directionality of facial blood flow, and reduction in blood flow to one side of the face. 19. The method of claim 15, further comprising (i) generating feature values based on data comprising PPGS1, PPGS2, and the previous measurements of PPGS1 and PPGS2, and (ii) utilizing a model for calculating, based on the feature values, a value indicative of whether the user is experiencing the abnormal medical event; wherein at least one of the feature values is indicative of at least one of the following: a difference in maximal amplitudes between PPGS1 and PPGS2 relative to a difference in maximal amplitudes between the previous measurements of PPGS1 and PPGS2, and a difference in a pulse arrival time between PPGS1 and PPGS2 relative to a pulse arrival time between the previous measurements of PPGS1 and PPGS2. 20. A non-transitory computer readable medium storing one or more computer programs configured to cause a processor based system to execute steps comprising: measuring, by first and second devices, first and second signals indicative of photoplethysmogram signals (PPGS1 and PPGS2, respectively) at first and second regions on different sides of a user's head; detecting, based on the first signal, advantageous timings for measuring the second signal for the purpose of reconstructing informative portions of PPGS2; commanding the second device to measure the second signal during the advantageous timings; and detecting the abnormal medical event based on an asymmetrical change to blood flow recognizable in PPGS1 and the informative portions of PPGS2.

When processing iPPG signals, most pixel values come from a surface reflection component (including specular reflections) and sub-surface reflection component, which are not modulated by the blood pulsation. As a result, the weak pulsatile iPPG signal is buried in a strong background signal composed primarily of surface reflections, and this problem worsens in low lighting conditions and with darker skin tones.

One embodiment of the invention uses the observation that surface reflections depend more on the illumination angle compared to the skin absorption; thus feeding the iPPG calculator with images taken with different illumination angles can help filtering some of the surface reflections, which increases the quality of the calculated PPG signal. Additionally, when using multiple wavelengths, the skin absorption depends heavily on the wavelength (e.g., the PPG signal shows a strong peak around 550 nm and a dip around 650 nm), while the surface reflections are almost independent of the wavelength; thus feeding the iPPG algorithm with multi-color images taken with different illumination angles should further improve the quality of the calculated iPPG signal.

Figure 31:
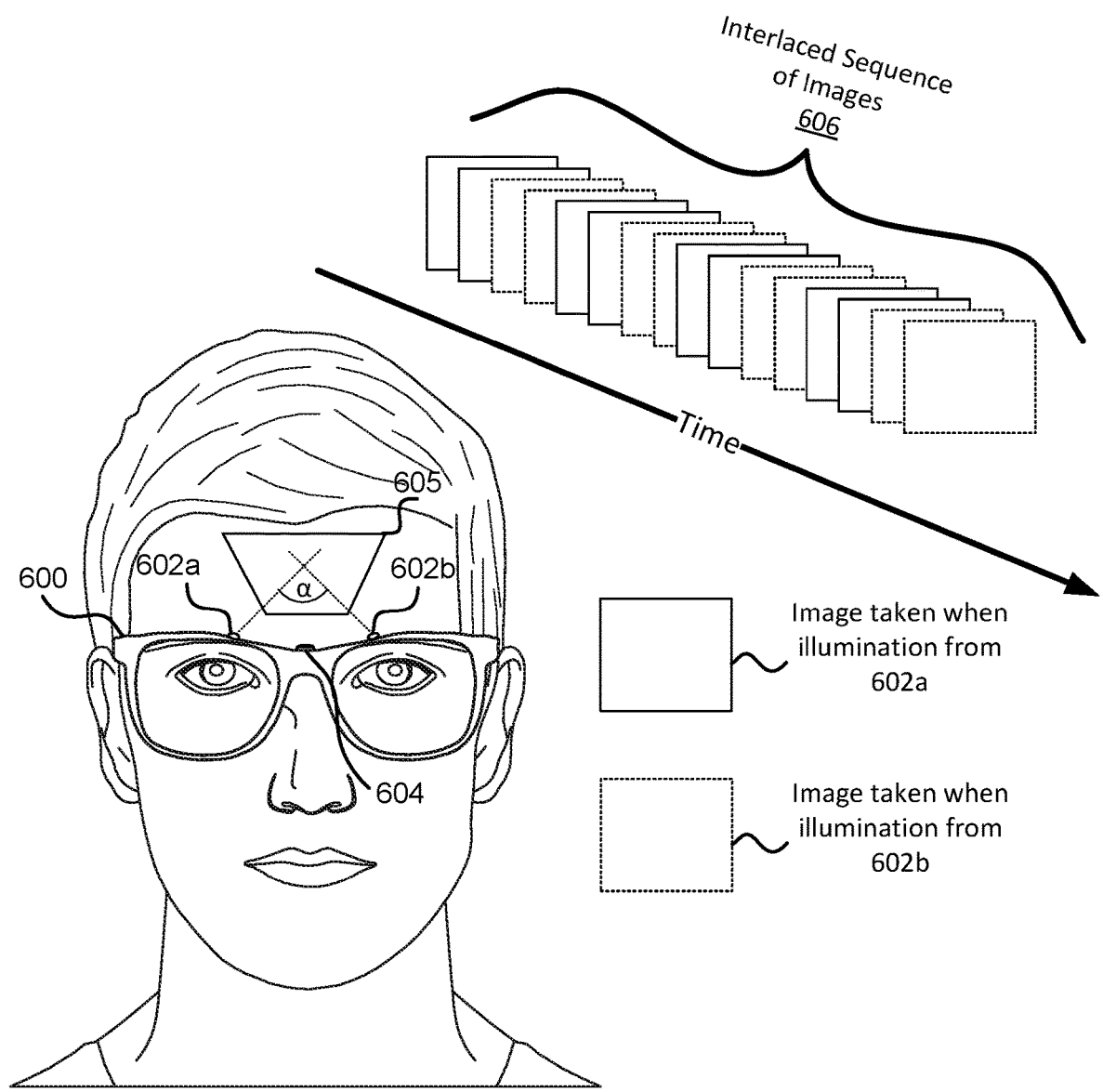
FIG. 31 illustrates an embodiment of a system in which head-mounted light sources illuminate portions of the head from different angles.

FIG. 31 illustrates an embodiment of a system in which head-mounted light sources illuminate portions of the head from different angles. In one embodiment, the system includes at least an inward-facing head-mounted camera that captures images of a region comprising skin on a user's head, and first and second head-mounted light sources configured to illuminate at least a portion of the region from different illumination angles differing by at least 10°. Optionally, the illumination angles differ by more than 40°.

The system also includes a computer configured to synchronize operations of the light sources and the camera, such that the camera captures an interlaced sequence of images comprising: a first sequence of images captured while illumination of the region by the first light source is more intense than illumination of the region by the second light source, and a second sequence of images captured while the illumination of the region by the second light source is more intense than the illumination of the region by the first light source. Optionally, the computer is further configured to detect a physiological response based on imaging photoplethysmogram signals recognizable in the interlaced sequence of images.

The "illumination angle" refers to the angle between an outward normal to the skin and a vector from the skin intersection point to the light source (assuming both are unit vectors).

The first and second sequences of images may be interlaced with variable segment sizes that may be optimized according to the performance of the algorithm that processes the images. For example, assuming the first sequence of images is [a,b,c,d,e,f] and the second sequence of images is [1,2,3,4,5,6,7,8,9], the images may be interlaced successively to form the interlaced sequence [a,1,b,2,c,3,d,4, ... ]. In a second example, the images may be interlaced dynamically, such as [1,a,2,3,b,4,5,c,6 ... ] or [a,b,1,2,3,c,d,4,5,6, ... ], according to quality of iPPG signals extracted from the interlaced sequence of images.

In one embodiment, the computer is further configured to calculate imaging photoplethysmogram signals based on the interlaced sequence of images. Optionally, to calculate the imaging photoplethysmogram signals the computer is configured to utilize an algorithm configured to suppress some surface reflections embedded in the images based on differences between images taken with the different illumination angles.

In one embodiment, the system includes a head-mounted movement sensor, and the computer is further configured to suppress some of the surface reflections embedded in the images after detecting a movement above a threshold.

In another embodiment, the system includes a head-mounted movement sensor, and the computer is further configured to reduce rate of suppressing of some of the surface reflections embedded in the images after measuring movement below a threshold for a second certain duration.

The following is an example of an iPPG algorithm adapted to suppress some of the surface reflections embedded in the images based on differences between images taken with the different illumination angles. For simplicity, the algorithm describes one color and can be extended to multiple colors. The channels of the selected color from each frame are divided into grids of pixels (such as 1×1, 4×4, 10×10). The grids confining the face region are the Regions of Interest (ROIs). Optionally, these ROIs are tracked across frames with a motion tracker (some head-mounted setups do not require such a tracker). The spatial average of the intensity of the pixel $y_i^L(t)$ within $ROI_i$, when it is illuminated by illumination L, at time t, is modeled as:

$$y_i^L(t)=I_i^L(\alpha_i^L \cdot p^L(t)+b_i^L)+q_i^L(t)$$

The illumination L may have different values based on the way of operating the light sources and the number of light sources. For example, when there are two light sources that are operated interchangeably, then L has two states. When the computer operates the light sources in more than two combinations then L shall have additional states. Assuming there are two light sources operating interchangeably, $I_i^L$ is the incident light intensity in $ROI_i$ when illuminated by light source L. $\alpha_i^L$ is the strength of blood perfusion in $ROI_i$ when illuminated by light source L, $b_i^L$ is the surface reflectance from the skin in $ROI_i$ when illuminated by light source L, and $q_i^L(t)$ is the camera quantization noise.

When incident illumination $I_i^L$ falls on skin $ROI_i$, there is a small difference between $\alpha_i^1$ and $\alpha_i^2$ (which are captured within a small delay), while there is a much bigger difference between $b_i^1$ and $b_i^2$ (which is the surface reflection that does not contain the iPPG signal) resulting from the difference in the illumination angles between the light sources.

Some part of the incident light penetrates beneath the skin surface, and gets modulated by the pulsatile pulse wave $p^L$(t), due to light absorption, before being back-scattered. $\alpha_i^L$ represents the strength of modulation of light back-scattered from the subsurface due to the pulse wave change, and primarily depends on the average blood perfusion in the selected $ROI_i$, and depend on the wavelength of the incident light. When using multiple colors $\alpha_i^L$ would depend also on the wavelength, which is in contrast with $b_i^L$ that essentially does not depend on the wavelength, and thus should further improve the result.

Then $y_i^L(t)$ may be temporally filtered using a bandpass filter, such as [0.5 Hz,5 Hz], to reject the out of band component of the skin surface reflection ($I_i^L \cdot b_i^L$) and other noise outside the band of interest to obtain $\hat{y}_i^L(t)=A_i^L p^L(t)+w_i^L$. When the pulse rate is known (such as when received from a contact PPG), then the bandpass filter can be much narrower. $A_i^L$ denote the strength of the underlying PPG signal in region $ROI_i$ and is determined both by the strength of modulation $\alpha_i^L$ and the incident light illumination $I_i^L$. $w_i^L$ denote the noise component due to the camera quantization, unfiltered surface reflection and motion artifacts. Then $\hat{y}_i^L$ (t) for i=1, ... , n are combined using a weighted average to receive the iPPG signal. For example, the weights for each $\hat{y}_i^L$ may be determined based on maximum ratio diversity if there are no delays between the PPG signals extracted from the different ROIs. Maximum ratio diversity assigns weights are proportional to the root-mean-squared (RMS) value of the signal component, and inversely proportional to the mean-squared noise in $\hat{y}_i^L$, in order to maximize the signal-to-noise ratio of the overall calculated iPPG signal.

In one embodiment, the first and second light sources emit essentially at the same spectrum band. Optionally, each of the first and second light sources comprises another emitter configured to emit at a second spectrum band that is different from the spectrum band. Optionally, the first and second light sources emit interchangeably.

In another embodiment, the first and second light sources emit at different spectrum bands. Optionally, the computer is further configured to calculate signal to noise ratios for the different spectrum bands, and to capture more images with the higher signal to noise illumination.

In one embodiment, the computer is further configured to calculate an avatar for the user based on the interlaced sequence of images. Being able to better estimate the extents of surface reflections, based on the interlaced sequence of images, may help the computer to render a better avatar that suffers less from inaccuracies due to inaccurate facial models and/or due to not being able to differentiate between specular and diffuse reflections.

When polarized light hits the skin surface without penetrating the skin, the polarization is retained. However, when the polarized light penetrates the skin, the light loses its polarization. This difference enables the polarized camera to differentiate between penetrating and non-penetrating reflections. In one embodiment, the first and second light sources feature cross polarization. Optionally, the computer is further configured to better differentiate between penetrating and non-penetrating reflections based on the polarization.

In one embodiment, the first and second light sources feature structured illuminations. Optionally, the computer is further configured to better differentiate between penetrating and non-penetrating reflections based on analyzing skin areas that are directly lighted and skin areas that are not directly lighted.

In one example of structured illumination, high-frequency binary pattern is projected onto the skin from at least one of the first and second head-mounted light sources. The skin areas that are directly lighted contain the surface reflections, while the skin areas that are not directly lighted contain both the global component and direct component of light. Because the direct reflections act as an all-pass filter while the sub-surface scattering act as a low pass filter, the computer can differentiate between the penetrating and non-penetrating reflections.

The following is an additional embodiment of a method that may be used by systems modeled according to FIG. 31. The steps described below may be performed by running a computer program having instructions for implementing the method. Optionally, the instructions may be stored on a computer-readable medium, which may optionally be a non-transitory computer-readable medium. In response to execution by a system including a processor and memory, the instructions cause the system to perform the following steps:

In Step 1, capturing, by an inward-facing head-mounted camera, images of a region comprising skin on a user's head.

In Step 2, illuminating, by first and second head-mounted light sources, at least a portion of the region from different illumination angles differing by at least 10°.

And in Step 3, synchronizing operations of the light sources and the camera, such that the camera captures an interlaced sequence of images comprising: a first sequence of images captured while illumination of the region by the first light source is more intense than illumination of the region by the second light source, and a second sequence of images captured while the illumination of the region by the second light source is more intense than the illumination of the region by the first light source.

In one embodiment, the method optionally includes a step of calculating imaging photoplethysmogram signals based on the interlaced sequence of images. Optionally, the method further involves utilizing an algorithm configured to suppress some surface reflections embedded in the images, for calculating the imaging photoplethysmogram signals, based on differences between images taken with the different illumination angles.

In one embodiment, the first and second light sources emit at different spectrum bands, and the method optionally includes the following steps: calculating signal to noise ratios for the different spectrum bands, and capturing more images with the higher signal to noise illumination.

This paragraph discloses claims that the Applicant may file in a continuation-in-part (CIP) patent application. 1. A system comprising: an inward-facing head-mounted camera configured to capture images of a region comprising skin on a user's head; and first and second head-mounted light sources configured to illuminate at least a portion of the region from different illumination angles differing by at least 10°; and a computer configured to synchronize operations of the light sources and the camera, such that the camera captures an interlaced sequence of images comprising: a first sequence of images captured while illumination of the region by the first light source is more intense than illumination of the region by the second light source, and a second sequence of images captured while the illumination of the region by the second light source is more intense than the illumination of the region by the first light source. 2. The system of claim 1, wherein the computer is further configured to calculate imaging photoplethysmogram signals based on the interlaced sequence of images. 3. The system of claim 2, wherein for calculating the imaging photoplethysmogram signals the computer is configured to utilize an algorithm configured to suppress some of surface reflections embedded in the images based on differences between images taken with the different illumination angles. 4. The system of claim 3, further comprising a head-mounted movement sensor, and the computer is further configured to suppress some of the surface reflections embedded in the images after detecting a movement above a threshold. 5. The system of claim 3, further comprising a head-mounted movement sensor, and the computer is further configured to reduce rate of suppressing some of the surface reflections embedded in the images after measuring movement below a threshold for a second certain duration. 6. The system of claim 1, wherein the illumination angles differ by more than 40°. 7. The system of claim 1, wherein the first and second light sources emit essentially at the same spectrum band. 8. The system of claim 7, wherein each of the first and second light sources comprises another emitter configured to emit at a second spectrum band that is different from the spectrum band. 9. The system of claim 1, wherein the first and second light sources emit interchangeably. 10. The system of claim 1, wherein the first and second light sources emit at different spectrum bands. 11. The system of claim 10, wherein the computer is further configured to calculate signal to noise ratios for the different spectrum bands, and to capture more images with the higher signal to noise illumination. 12. The system of claim 1, wherein the computer is further configured to detect a physiological response based on imaging photoplethysmogram signals recognizable in the interlaced sequence of images. 13.

The system of claim 1, wherein the computer is further configured to calculate an avatar for the user based on the interlaced sequence of images. 14. The system of claim 1, wherein the first and second light sources feature cross polarization, whereby the computer is further configured to better differentiate between penetrating and non-penetrating reflections based on the polarization. 15. The system of claim 1, wherein the first and second light sources feature structured illuminations, whereby the computer is further configured to better differentiate between penetrating and non-penetrating reflections based on analyzing skin areas that are directly lighted and skin areas that are not directly lighted. 16. A method comprising: capturing, by an inward-facing head-mounted camera, images of a region comprising skin on a user's head; illuminating, by first and second head-mounted light sources, at least a portion of the region from different illumination angles differing by at least 10°; and synchronizing operations of the light sources and the camera, such that the camera captures an interlaced sequence of images comprising: a first sequence of images captured while illumination of the region by the first light source is more intense than illumination of the region by the second light source, and a second sequence of images captured while the illumination of the region by the second light source is more intense than the illumination of the region by the first light source. 17. The method of claim 16, further comprising calculating imaging photoplethysmogram signals based on the interlaced sequence of images. 18. The method of claim 17, further comprising utilizing an algorithm configured to suppress some surface reflections embedded in the images, for calculating the imaging photoplethysmogram signals, based on differences between images taken with the different illumination angles. 19. The method of claim 16, wherein the first and second light sources emit at different spectrum bands, and further comprising calculating signal to noise ratios for the different spectrum bands, and capturing more images with the higher signal to noise illumination. 20. A non-transitory computer readable medium storing one or more computer programs configured to cause a processor based system to execute steps comprising: capturing, by an inward-facing head-mounted camera, images of a region comprising skin on a user's head; illuminating, by first and second head-mounted light sources, at least a portion of the region from different illumination angles differing by at least 10°; and synchronizing operations of the light sources and the camera, such that the camera captures an interlaced sequence of images comprising: a first sequence of images captured while illumination of the region by the first light source is more intense than illumination of the region by the second light source, and a second sequence of images captured while the illumination of the region by the second light source is more intense than the illumination of the region by the first light source.

In environments like retirement homes it is not expected to be uncommon to see one senior showing to another senior how to calibrate smartglasses with a cuff-based blood pressure device or a spirometer. Because the two seniors may be next to each other there is a chance that the system will associate the measurements taken by the first demonstrating senior with smartglasses of the second senior, which would lead to an erroneous calibration. Therefore, there is a need for an automatic verification to identify when the calibration measurements are taken by the wearer of the glasses.

Figure 32:
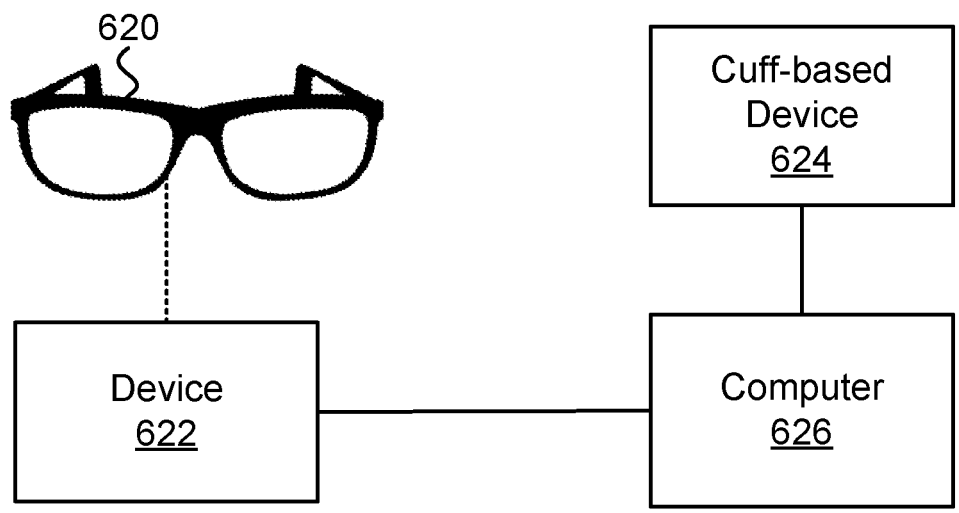
FIG. 32 illustrates an embodiment of a system configured to acquire blood pressure calibration measurements.

FIG. 32 illustrates an embodiment of a system configured to acquire blood pressure calibration measurements. In one embodiment, a head-mounted system (HMS) includes a device 622, which is configured to measure values indicative of photoplethysmogram signal (PPG signal) of a user wearing the HMS. A computer 626 receives, from a cuff-based blood pressure monitor (cuff-monitor 624), calibration measurements comprising: a first average pulse rate, a systolic blood pressure value, and a diastolic blood pressure value. The computer 626 calculates a physical distance between the HMS and the cuff-monitor 624 at a time the values and the calibration measurements were measured. The computer 626 also calculates, based on the values, a second average pulse rate. Responsive to the physical distance being below a first threshold and the difference between the first and second average pulse rates being below a second threshold, utilize the values and the calibration measurements for calibration in calculations of blood pressure values based on additional signals indicative of PPG signals measured by the HMS.

In one embodiment, responsive to the difference being above the second threshold, the computer 626 is further configured to request the user to bring the HMS closer to the cuff-monitor, and then to take additional calibration measurements. Optionally, requesting the user to bring the HMS closer to the cuff-monitor 624 can assist a confused user to identify a scenario in which the HMS and the cuff-monitor measure different people.

Requesting the user to remove the HMS and re-wear it may provide various benefits in certain scenarios, such as improving the contact of a contact PPG sensor embedded in the HMS, changing a bit the location of an inward-facing camera relative to the face, and helping a confused person to identify a scenario in which the HMS and the cuff-monitor measure different people.

In one embodiment, the request to bring the HMS closer to the cuff-monitor 624 comprises requesting the user to remove the HMS from the head, to bring it closer to the cuff-monitor, and to wear the HMS before taking the additional calibration measurements.

In another embodiment, the request to bring the HMS closer to the cuff-monitor 624 comprises requesting the user to remove the HMS from the head, to make the HMS come in physical contact with the cuff-monitor, and to wear the HMS before taking the additional calibration measurements.

In one embodiment, the computer 626 is further configured to calculate the physical distance based on communications between at least two of the following: the HMS, the cuff-monitor, and the computer. Optionally, the first threshold is 150 cm, the second threshold is 5 beats per minute, and the device 622 comprises a contact photoplethysmogram device.

In another embodiment, the computer 626 is further configured to calculate the physical distance based on communications between at least two of the following: the HMS, the cuff-monitor, and the computer. Optionally, the first threshold is 100 cm, the second threshold is 8 beats per minute, and the device comprises a camera configured to capture images from which the imaging photoplethysmogram signals are extracted.

A sentence in the form of "calculate the physical distance based on communications between at least two of the following: the HMS, the cuff-monitor, and the computer" may be interpreted in two ways, based on the location of the computer used to calculate the physical distance: (i) when the computer is located in the HMS and/or in the cuff-monitor, the physical distance between the HMS and the cuff-monitor is calculated based on communications between the HMS and the cuff-monitor, and (ii) when the computer is located in a third device that is not physically connected to the HMS or the cuff-monitor (such as when the computer is located in a smartphone or a laptop), the physical distance between the HMS and the cuff-monitor is calculated based on first communications between the third device and the HMS, and second communications between the third device and the cuff-monitor.

The HMS' device configured to measure the values may be a contact PPG device and/or a head-mounted camera that captures images from which the iPPG signal is extracted.

In one embodiment, the computer 626 is further configured to calculate heart rate variability (HRV) based on the values, and responsive to detecting a change greater than a third threshold in the HRV while taking the calibration measurements, utilize the values and the calibration measurements for calibration of the model.

Optionally, the change in the HRV is a reduction in the HRV that indicates an increase in stress. Optionally, if the computer 626 does not detect said reduction in the HRV while taking the calibration measurements, the computer 626 does not utilize the values and the calibration measurements for the calibration in the calculations of the blood pressure values.

In one embodiment, the values and the calibration measurements are taken during overlapping periods, and the calibration measurements do not include time series of the pulses, which means that the computer 626 cannot calculate a correlation between the first average pulse rate and the values.

In one embodiment, the computer 626 is further configured to receive additional calibration measurements comprising stroke volume and/or cardiac output values, and to utilize the stroke volume and/or cardiac output values for calibration in a calculation in analysis of measurements of the user taken with the HMS, responsive to the physical distance being below the first threshold and the difference between the first and second average pulse rates being below the second threshold.

In one embodiment, the HMS further comprises a movement sensor configured to measure a signal indicative of movements of the user's head (head-movement signal), and the computer 626 is further configured not to utilize the values and the calibration measurements for the calibration in the calculations of the blood pressure values, responsive to the head-movement signal being above a third threshold, and to utilize the values and the calibration measurements for the calibration in the calculations of the blood pressure values responsive to the head-movement signal being below the third threshold.

In one embodiment, when the head-movement signal reaches the third threshold the user may be moving too much for the calibration sample to be accurate, so the system may discard this sample or mark it as a sample taken while the user was moving above the third threshold.

The system may need to identify scenarios where the calibration measurements are not taken by the user. Requesting the user to say the calibration measurements, and authenticating the user's speech while saying, adds another layer of protection to reduce mistakes.

In one embodiment, the computer 626 is further configured to: instruct the user to say out loud at least one of the values of the calibration measurements, and authenticate the user based on a recording of the speech. Optionally, the computer 626 is further configured to utilize the values and the calibration measurements for the calibration in the calculations of the blood pressure values, responsive to both (i) the user being authenticated successfully based on said saying, and (ii) the spoken value matching the value received by the computer.

In one embodiment, the computer 626 is further configured not to utilize the values and the calibration measurements for the calibration in the calculations of the blood pressure values if the authentication failed and/or the spoken value does not match the value received by the computer.

In one embodiment, the HMS is smartglasses 620, each of the smartglasses 620 and the cuff-monitor 624 comprises a wireless transceiver, and the physical distance is calculated based on direct communications between the smartglasses 620 and the cuff-monitor 624.

In another embodiment, the HMS is smartglasses 620, and further comprising a second device configured to wirelessly communicate with the smartglasses 620 and the cuff-monitor 624, and to calculate the physical distance based its communications with the smartglasses 620 and the cuff-monitor 624.

In one embodiment, the computer 626 is further configured to request the user to take relaxing breaths before taking the calibration measurements. The computer 626 may then proceed to take the calibration measurements after measuring a reduction below a third threshold in the user's heart rate as a result of the relaxing breaths.

In one embodiment, a system configured to acquire blood pressure calibration measurements includes the head-mounted system (HMS) comprising the device 622 configured to measure values indicative of photoplethysmogram signal (PPG signal) of a user wearing the HMS, and the computer 626. In this embodiment, the computer 626 receives, from a blood pressure monitor, calibration measurements comprising: a first series of pulse rates, a systolic blood pressure value, and a diastolic blood pressure value. The computer calculates a physical distance between the HMS and the blood pressure monitor at a time the values and the calibration measurements were taken. The computer 626 also calculates, based on the values, a second series of pulse rates. Responsive to (i) the physical distance being below a first threshold, and (ii) a correlation between the first and second series of pulse rates being above a second threshold, the computer 626 utilizes the values and the calibration measurements for calibration in calculations of blood pressure values based on additional signals indicative of PPG signals measured by the HMS.

An adjustment to the software of the cuff-based device may be needed to enable the cuff-based device to supply the system a series of pulses (with time stamps) to enable automatic verification that the HMS and the cuff-based device measure the same person by detecting that the correlation between the first and second series of pulse rates being above the second threshold. In one embodiment, the first series of pulse rates comprises at least 5 consecutive pulse measurements.

In one embodiment, responsive to the correlation being below the second threshold, the computer 626 is further configured to request the user to bring the HMS closer to the blood pressure monitor, and then to take additional calibration measurements.

In another embodiment, responsive to the physical distance being above the first threshold, the computer 626 is further configured not to utilize the values and the calibration measurements for the calibration in the calculations of the blood pressure values.

This paragraph discloses claims that the Applicant may file in a continuation-in-part (CIP) patent application. 1. A system configured to acquire blood pressure calibration measurements, comprising: a head-mounted system (HMS) comprising a device configured to measure values indicative of photoplethysmogram signal (PPG signal) of a user wearing the HMS; and a computer configured to: receive, from a cuff-based blood pressure monitor (cuff-monitor), calibration measurements comprising: a first average pulse rate, a systolic blood pressure value, and a diastolic blood pressure value; calculate a physical distance between the HMS and the cuff-monitor at a time the values and the calibration measurements were measured; calculate, based on the values, a second average pulse rate; and responsive to the physical distance being below a first threshold and the difference between the first and second average pulse rates being below a second threshold, utilize the values and the calibration measurements for calibration in calculations of blood pressure values based on additional signals indicative of PPG signals measured by the HMS. 2. The system of claim 1, wherein, responsive to the difference being above the second threshold, the computer is further configured to request the user to bring the HMS closer to the cuff-monitor, and then to take additional calibration measurements; whereby requesting the user to bring the HMS closer to the cuff-monitor can assist a confused user to identify a scenario in which the HMS and the cuff-monitor measure different people. 3. The system of claim 2, wherein the request to bring the HMS closer to the cuff-monitor comprises requesting the user to remove the HMS from the head, to bring it closer to the cuff-monitor, and to wear the HMS before taking the additional calibration measurements. 4. The system of claim 2, wherein the request to bring the HMS closer to the cuff-monitor comprises requesting the user to remove the HMS from the head, to make the HMS come in physical contact with the cuff-monitor, and to wear the HMS before taking the additional calibration measurements. 5. The system of claim 1, wherein the computer is further configured to calculate the physical distance based on communications between at least two of the following: the HMS, the cuff-monitor, and the computer; and wherein the first threshold is 150 cm, the second threshold is 5 beats per minute, and the device comprises a contact photoplethysmogram device. 6. The system of claim 1, wherein the computer is further configured to calculate the physical distance based on communications between at least two of the following: the HMS, the cuff-monitor, and the computer; and wherein the first threshold is 100 cm, the second threshold is 8 beats per minute, and the device comprises a camera configured to capture images from which the imaging photoplethysmogram signals are extracted. 7. The system of claim 1, wherein the computer is further configured to calculate heart rate variability (HRV) based on the values, and responsive to detecting a change greater than a third threshold in the HRV while taking the calibration measurements, utilize the values and the calibration measurements for calibration of the model. 8. The system of claim 1, wherein the values and the calibration measurements are taken during overlapping periods, and the calibration measurements do not include time series of the pulses, which means that the computer cannot calculate a correlation between the first average pulse rate and the values. 9. The system of claim 1, wherein the computer is further configured to receive additional calibration measurements comprising stroke volume and/or cardiac output values, and to utilize the stroke volume and/or cardiac output values for calibration in a calculation in analysis of measurements of the user taken with the HMS, responsive to the physical distance being below the first threshold and the difference between the first and second average pulse rates being below the second threshold. 10. The system of claim 1, wherein the HMS further comprises a movement sensor configured to measure a signal indicative of movements of the user's head (head-movement signal), and the computer is further configured not to utilize the values and the calibration measurements for the calibration in the calculations of the blood pressure values, responsive to the head-movement signal being above a third threshold, and to utilize the values and the calibration measurements for the calibration in the calculations of the blood pressure values responsive to the head-movement signal being below the third threshold. 11. The system of claim 1, wherein the computer is further configured to: instruct the user to say out loud at least one of the values of the calibration measurements, and authenticate the user based on a recording of the speech; and wherein the computer is further configured to utilize the values and the calibration measurements for the calibration in the calculations of the blood pressure values, responsive to both (i) the user being authenticated successfully based on said saying, and (ii) the spoken value matching the value received by the computer. 12.

The system of claim 11, wherein the computer is further configured not to utilize the values and the calibration measurements for the calibration in the calculations of the blood pressure values if the authentication failed and/or the spoken value does not match the value received by the computer. 13. The system of claim 1, wherein the HMS is smartglasses, each of the smartglasses and the cuff-monitor comprises a wireless transceiver, and the physical distance is calculated based on direct communications between the smartglasses and the cuff-monitor. 14. The system of claim 1, wherein the HMS is smartglasses, and further comprising a second device configured to wirelessly communicate with the smartglasses and the cuff-monitor, and to calculate the physical distance based its communications with the smartglasses and the cuff-monitor. 15. The system of claim 1, wherein the computer is further configured to request the user to take relaxing breathes before taking the calibration measurements, and further comprising taking the calibration measurements after measuring a reduction below a third threshold in the user's heart rate as a result of the relaxing breathes. 16. A method comprising: measuring, by a head-mounted system (HMS), values indicative of photoplethysmogram signal (PPG signal) of a user wearing the HMS; receiving, from a cuff-based blood pressure monitor (cuff-monitor), calibration measurements comprising: a first average pulse rate, a systolic blood pressure value, and a diastolic blood pressure value; calculating a physical distance between the HMS and the cuff-monitor at a time the values and the calibration measurements were measured; calculating, based on the values, a second average pulse rate; and responsive to the physical distance being below a first threshold and the difference between the first and second average pulse rates being below a second threshold, utilizing the values and the calibration measurements for calibration in calculations of blood pressure values based on additional signals indicative of PPG signals measured by the HMS. 17. A system configured to acquire blood pressure calibration measurements, comprising: a head-mounted system (HMS) comprising a device configured to measure values indicative of photoplethysmogram signal (PPG signal) of a user wearing the HMS; and a computer configured to: receive, from a blood pressure monitor, calibration measurements comprising: a first series of pulse rates, a systolic blood pressure value, and a diastolic blood pressure value; calculate a physical distance between the HMS and the blood pressure monitor at a time the values and the calibration measurements were taken; calculate, based on the values, a second series of pulse rates; and responsive to (i) the physical distance being below a first threshold, and (ii) a correlation between the first and second series of pulse rates being above a second threshold, utilize the values and the calibration measurements for calibration in calculations of blood pressure values based on additional signals indicative of PPG signals measured by the HMS. 18. The system of claim 17, wherein the first series of pulse rates comprises at least 5 consecutive pulse measurements. 19. The system of claim 17, wherein, responsive to the correlation being below the second threshold, the computer is further configured to request the user to bring the HMS closer to the blood pressure monitor, and then to take additional calibration measurements. 20. The system of claim 17, wherein, responsive to the physical distance being above the first threshold, the computer is further configured not to utilize the values and the calibration measurements for the calibration in the calculations of the blood pressure values.

Figure 33:
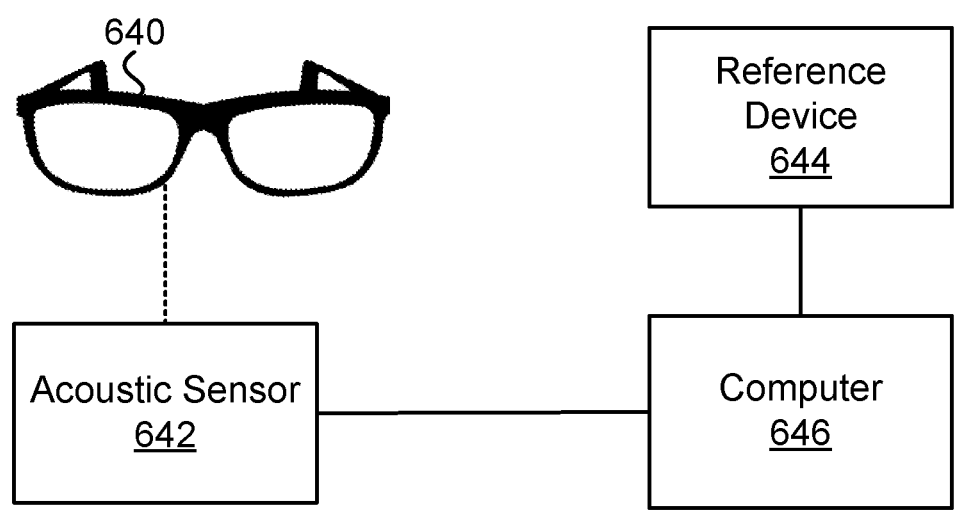
FIG. 33 illustrates an embodiment of a system configured to acquire calibration measurements for calculating respiratory volume from audio recordings.

FIG. 33 illustrates an embodiment of a system configured to acquire calibration measurements for calculating respiratory volume from audio recordings. The system includes at last a head-mounted system (HMS 640) comprising an acoustic sensor 642 that is configured take audio recordings, and a computer 646. In one embodiment, the computer 646 calculates, based on the audio recordings taken during a certain period, a first array of respiration timings of a user wearing the HMS. The computer 646 receives, from the reference device 644, a respiratory signal of the user indicative of: (i) a second array of respiration timings of the user during the certain period, and (ii) a respiratory volume during the certain period. The computer 646 calculates a distance between the first and second arrays of respiration timings. Responsive to the distance being above a threshold, the computer 646 utilizes the audio recordings and the respiratory volume as calibration values to calculate an additional respiratory volume of the user based on additional audio recordings of the user measured by the acoustic sensor 644 during an additional period.

In one embodiment, the distance is calculated utilizing correlation, and the respiratory volume is indicative of one or more of the following values: a tidal volume, and minute ventilation.

In one embodiment, the reference device 644 is configured to be attached to the user's chest and to measure chest wall movements.

In one embodiment, the HMS further comprises a device configured to measure a signal indicative of photoplethysmogram signal (PPG signal) of the user wearing the HMS, and the computer 646 is further configured to calculate heart rate variability (HRV) based on the PPG signal, and responsive to detecting a change greater than a second threshold within a minute from attaching the reference device on the user's chest, utilize the audio recordings and the respiratory volume as calibration values to calculate the additional respiratory volume. Optionally, the change in the HRV is a reduction in the HRV that indicates an increase in stress as a result of attaching the reference device on the user chest. Optionally, if the computer 646 does not detect said reduction in the HRV, the computer does not utilize the respiratory signal for the calibration.

In one embodiment, the reference device 644 is a non-contact respiration measurement device configured to measure respiration-related movements of at least one of the user's chest wall, abdomen, and shoulders, utilizing a radar-based detection method or an optical imaging-based detection method.

The reference respiration measurement device may be a contact or non-contact device. Examples of known contact respiration measurement devices include respiratory inductive plethysmography that uses one or more inductive belts placed around the abdomen and/or the ribcage, transthoracic impedance measurements that uses electrodes on the torso, and strain sensors placed on the abdomen and the ribcage. Additional contact devices for measuring the respiration are discussed in the reference Massaroni Carlo et al. "Contact-based methods for measuring respiratory rate" Sensors 19.4 (2019): 908. Examples of known noncontact respiration measurement devices include: (i) radar-based detection of chest movements induced by breathing utilizing frequency-modulated waves, ultrawideband, or Doppler, (ii) optical imaging-based methods to monitor respiratory activities, such as measuring the motion of the chest wall and/or abdomen with a camera, tracking the shoulder movement associated with breathing, applying optical flow algorithms to detect respiratory activities, estimating volume changes from 3D and/or depth camera measurements, using projector-camera systems for tracking chest surface deformations during breathing, and/or optoelectronic plethysmography for monitoring reflective markers placed on the torso.

In some embodiment, the second array of respiration timings is indicative of inspirations and/or expirations timings during the certain period.

In one embodiment, the computer 646 is further configured to calculate a physical distance between the HMS and the reference device 644 during the certain period, and to utilize the audio recordings as the calibration values responsive to the physical distance being below a second threshold.

In another embodiment, the computer 646 is further configured to calculate a physical distance between the HMS and the reference device 644 during the certain period, and not to utilize the audio recordings as the calibration values responsive to the physical distance being above a second threshold.

In one embodiment, the computer 646 is further configured not to utilize the audio recordings and the respiratory volume as the calibration values if the distance is not above the threshold.

In one embodiment, the HMS 640 further comprises a first movement sensor configured to measure first movements, the reference device 644 further comprises a second movement sensor configured to measure second movements, and the computer 646 is further configured to: calculate a second distance between the first and second movements during the certain period, utilize the audio recordings as the calibration values responsive to the second distance being below a second threshold, and not utilize the audio recordings as the calibration values responsive to the second distance being below the second threshold.

Because the user wears both the HMS 640 and the reference device 644, the first and second movements should be similar when worn by the same user for a long duration, even though the movements measured by a reference device 644 on the torso are somewhat different from the measurements measured by the HMS 640 on the head. Optionally, the second distance is measured using correlation between the first and second movements.

In one embodiment, the computer 646 is further configured to (i) receive, from the reference device 644, indications of coughing of the user during the certain period, (ii) detect coughing in the audio recordings during the certain period, (iii) calculate correlation between the coughing received from the reference device and the coughing detected in the audio recordings, and (iv) not to utilize the audio recordings and the respiratory volume as calibration values to calculate the additional respiratory volume of the user based on additional audio recordings if the correlation is not above the second threshold.

In one embodiment, a system configured to acquire respiratory calibration measurements includes the head-mounted system (HMS 640) comprising the acoustic sensor 642, which is configured take audio recordings, and the computer 646. In this embodiment, the computer 646 calculates, based on the audio recordings taken during a certain period, a first set of respiration rates (RRs) of a user wearing the HMS 640. The computer 646, receives, from the reference device 644, data comprising: (i) a second set of RRs of the user during the certain period, and (ii) respiratory volumes (RVs) during the certain period. The computer 646 calculates a distance between the first and second sets of RRs. Responsive to distance being above a threshold, the computer 646 utilizes the audio recordings and the RVs as calibration values to calculate an additional RV of the user based on additional audio recording of the user measured by the acoustic sensor 642 during an additional period.

In one embodiment, the distance is calculated utilizing correlation, the certain period spans at least 30 minutes, and each of the first and second sets of RRs includes at least 5 averaged respiration rates.

In one embodiment, the computer 646 is further configured to calculate a physical distance between the HMS and the reference device 644 during the certain period, and to utilize the audio recordings for the calibration in the calculation of the additional respiratory volume of the user based on the additional audio recordings, responsive to the physical distance being below a second threshold.

In one embodiment, the computer 646 is further configured to calculate a physical distance between the HMS and the reference device during the certain period, and not to utilize the audio recordings for the calibration in the calculation of the additional respiratory volume of the user based on the additional audio recordings, responsive to the physical distance being above a second threshold.

In one embodiment, the computer 646 is further configured not to utilize the audio recordings and the respiratory volume as calibration values to calculate the additional respiratory volume of the user based on additional audio recordings if the distance is not above the threshold.

PPG is a non-invasive electro-optical method to measure blood oxygenation. The PPG signal reflects the pulsative actions of the arteries through the interaction of the oxygenized hemoglobin and photons. Because different people have different hemodynamics and cardiovascular parameters, the PPG signal, which captures these unique characteristics, is suitable for biometric authentication.

However, movements and drastic temperature changes affect the PPG signal, and the known hardware setups do not provide a reliable user authentication for real-life scenarios. Thus, there is a need for a new hardware setup that would be able to provide a reliable user authentication while the user is having a physical exercise and while waking from a cold/hot environment to a hot/cold environment, such as when walking out of a warm office into a cold street.

In one embodiment, a system configured to perform biometric authentication includes a wearable device configured to measure: a first signal indicative of a photoplethysmogram signal (PPG signal) of a user wearing the wearable device, and a second signal indicative of skin temperature ($T_{skin}$) of the user. The system also includes a computer that is configured to generate feature values based on the PPG signal and $T_{skin}$ and utilize a model to biometrically authenticate the user based on the feature values. Optionally, the model was trained based on data comprising a first set of measurements of the PPG signal of the user taken over multiple days while $T_{skin}$ was in a first temperature range, and a second set of measurements of the PPG signal of the user taken over multiple days while $T_{skin}$ was in a second temperature range. Optionally, the first and second ranges do not overlap, and the second range starts at least 5° C. higher than the first range. Optionally, the second range starts at least 15° C. higher than the first range.

In one embodiment, the wearable device is a head-mounted wearable device, the PPG signal is measured at a first region comprising skin on the user's head, and $T_{skin}$ is measured at a second region comprising skin on the user's head. Optionally, the first and second regions may or may not overlap.

In one embodiment, the wearable device is worn on the wrist, the PPG signal is measured at a first region comprising skin on the user's wrist, and $T_{skin}$ is measured at a second region comprising skin on the user's wrist.

In one embodiment, the PPG signal is measured at a first region comprising skin on the user's body, $T_{skin}$ is measured at a second region comprising skin on the user's body, and the distance between middles of the first and second regions is below 10 cm.

In one embodiment, the wearable device is further configured to measure a third signal indicative of movements of the user (movement signal), and the computer is further configured to generate additional feature values based on the movement signal, and to utilize the model to calculate the biometric authentication score also based on the additional feature values. Optionally, the model was further trained on data comprising a third PPG signal of the user taken while the movement signal was indicative of the user being sedentary for at least 10 minutes, and a fourth PPG signal of the user taken at most 3 minutes after the movement signal was indicative of the user had exercised for at least 10 minutes.

In one embodiment, the system configured to perform biometric authentication includes a non-wearable device comprising a camera configured to take video of the user's head. Optionally, the computer is further configured to authenticate that the user is using the non-wearable device by checking whether a correlation between the PPG signal and imaging photoplethysmogram reaches a threshold that indicates, above a predetermined certainty, that the PPG signal and the imaging photoplethysmogram were taken from the same person. Optionally, the imaging photoplethysmogram is extracted from video of the user's face. Optionally, the non-wearable device is selected from a group comprising: a smartphone, a tablet, a laptop, a workstation, a vending machine, an automatic teller machine, and a non-wearable Internet of things (IoT) device.

In one example, the thresholds are selected according to the required probability that the person being captured by the camera is the user who was biometrically authenticated by the HMS. The HMS can be used to authenticate non-wearable devices that measure the user for shorted durations (relative to the wearable device), such as smartphones, laptops, tablets, automatic teller machines, and any other non-wearable device that requires user authentication. For example, when the user authenticates a payment via smartphone using fingerprint, and assuming that the HMS provide a better authentication compared to the fingerprint reader because the HMS are worn by the user for long durations, this embodiment improves the authentication probability of the user who is paying through the smartphone.

In one embodiment, the system configured to perform biometric authentication includes a fourth head-mounted sensor configured to measure a signal indicative of movements of an eye of the user (eye movements). Optionally, the computer is further configured to extract additional feature values from the eye movements, and to feed also the additional feature values into the model in order to calculate the biometric authentication score for the user.

In one embodiment, a system configured to perform a reliable user authentication includes a first head-mounted sensor configured to measure a signal indicative of a photoplethysmogram signal at a region comprising skin on the user's head (PPG signal). the system also includes a second head-mounted sensor configured to measure a signal indicative of movements of the user's head (head movements), and a third head-mounted sensor configured to measure temperature of a second region comprising skin on the user's head ($T_{skin}$). The system includes a computer that is configured to perform the following: extract feature values from the PPG signal, the head movements, and $T_{skin}$. The computer uses a first set of the feature values, taken while the user was sitting, as a first input to train a machine learning-based model (model) for the user. Where the model is designed to be utilized to calculate a biometric authentication score based on the feature values. The computer uses a second set of the feature values, taken while the user was having a physical exercise for more than a few minutes, as a second input to train the model. The computer utilizes the model to calculate, based on following feature values, a following biometric authentication score, while taking into account the effect of the physical exercise on the PPG signal.

In one embodiment, the system described above also includes a non-wearable device comprising a camera configured to take video of the user's head. Optionally, the computer is further configured to authenticate that the user is using the non-wearable device by checking whether a correlation between the PPG signal and iPPG signal extracted from the video reaches a threshold that indicates, above a predetermined certainty, that the PPG signal and iPPG signal were taken from the same person.

In another embodiment, the system described above also includes a non-wearable device comprising a camera configured to take video of the user's head. Optionally, the computer is further configured to authenticate that the user is using the non-wearable device by checking whether a correlation between the PPG signal and iPPG signal extracted from the video reaches a threshold that indicates, above a predetermined certainty, that the PPG signal and iPPG signal were taken from the same person.

We claim:

1. Untethered smartglasses with wireless connectivity, comprising:
    a front element configured to support lenses;
    two temples coupled to the front element through hinges that enable folding and unfolding, wherein at least one of the temples comprises:
    a first portion, coupled to the front element, comprising first electronic components;
    a second portion, coupled to the first portion, comprising electric wires; and
    a third portion, coupled to the second portion, comprising second electronic components;
    wherein the second portion is designed to be bent around a human ear to improve the untethered smartglasses' fit, the first and third portions are not designed to be bent to improve the untethered smartglasses' fit, and the second portion is marked by markings showing boundaries of where it is safe to apply pressure to bend the second portion for fitting the untethered smartglasses to its wearer.

2. The untethered smartglasses of claim 1, wherein the first electronic components are mounted in a first hollow mechanical structure, the electric wires are mounted in a second hollow mechanical structure, and dominant materials of the first and second hollow mechanical structures are different.

3. The untethered smartglasses of claim 1, wherein the electric wires are mounted in a first hollow mechanical structure, the second electronic components are mounted in a second hollow mechanical structure, and dominant materials of the first and second hollow mechanical structures are different.

4. The untethered smartglasses of claim 1, wherein the first electronic components are mounted in a first hollow mechanical structure, the electric wires are mounted in a second hollow mechanical structure, the second electronic components are mounted in a third hollow mechanical structure, and a dominant material of the second hollow mechanical structure is different from a dominant material of the first and third hollow mechanical structures.

5. The untethered smartglasses of claim 4, wherein the second hollow mechanical structure is colored with a different color than the first and third hollow mechanical structures.

6. The untethered smartglasses of claim 1, wherein the first electronic components, the second electronic components, and the electric wires are mounted in a hollow mechanical structure that is made of material comprising at least one of: cellulose acetate, cellulose acetate propionate, and blended nylon.

7. The untethered smartglasses of claim 1, wherein the first electronic components, the second electronic components, and the electric wires are mounted in a hollow mechanical structure that is made of a material designed to be bent after being warmed, and the first and third portions also comprise strengthening bars to prevent accidental bending, while the second portion does not include a strengthening bar.

8. The untethered smartglasses of claim 1, wherein the first electronic components, the second electronic components, and the electric wires are mounted in a hollow mechanical structure that is made of metal; wherein the hollow mechanical structure spans the first, second, and third portions, and the hollow mechanical structure is thinner in the second portion than it is in each of in the first and third portions; whereby being thinner in the second portion makes it easier to bend the hollow mechanical structure at the second portion compared to effort of bending the hollow mechanical structure at each of the first and third portions.

9. The untethered smartglasses of claim 8, wherein the hollow mechanical structure is at least twice as thin in the second portion than it is in each of the first and third portions.

10. The untethered smartglasses of claim 8, wherein the hollow mechanical structure is made of material comprising at least one of: aluminum, stainless steel, titanium, and monel.

11. The untethered smartglasses of claim 1, wherein the second electronic components comprise a battery, and the first and third portions, which are not designed to be bent, are stiffer than the second portion that is designed to be bent to improve the untethered smartglasses' fit.

12. The untethered smartglasses of claim 1, further comprising a first dismountable cover to be placed over the first electronic components, and a second dismountable cover to be placed over the second electronic components; wherein the electric wires are wired in the second portion without having a dismountable cover placed over the second portion; and further comprising a modular weight designed to be connected to the third portion in order to balance extra weight of the front element.

13. The untethered smartglasses of claim 1, wherein the most heat-sensitive electrical component stored in the second portion is less sensitive to heat than the most heat-sensitive electrical component stored in the first or third portions.

14. The untethered smartglasses of claim 1, wherein the second portion is further designed to be bent inwards, towards the skull of a person wearing the untethered smartglasses, to improve the untethered smartglasses' fit.

15. Untethered smartglasses with wireless connectivity, comprising:
    a front element configured to support lenses;
    two temples coupled to the front element through hinges that enable folding and unfolding, wherein at least one of the temples comprises:
    a first portion, coupled to the front element, comprising first electronic components;
    a second portion, coupled to the first portion, comprising electric wires;
    a third portion, coupled to the second portion, comprising second electronic components;
    wherein the second portion is designed to be bent around a human ear to improve the untethered smartglasses' fit, and the first and third portions are not designed to be bent to improve the untethered smartglasses' fit; and
    wherein the first electronic components, the second electronic components, and the electric wires are mounted in a hollow mechanical structure that is made of a material designed to be bent after being warmed; wherein at the second portion, the hollow mechanical structure is thinner than it is at each of the first and third portions; whereby being thinner in the second portion makes it easier to bend the hollow mechanical structure at the second portion compared to effort involved in bending the hollow mechanical structure at each of the first and third portions.

16. Untethered smartglasses with wireless connectivity, comprising:

a front element configured to support lenses and first electronic components; wherein the first electronic components comprise a microphone, a contact photoplethysmography device in a nose pad of the front element, and a temperature sensor;

two temples, each coupled to the front element through a hinge that enables folding and unfolding, wherein at least one of the temples comprises:

a first portion, coupled to the front element, comprising electric wires; wherein a section of the first portion is designed to be bent around a human ear to improve the untethered smartglasses' fit; and a second portion, coupled to the first portion, comprising second electronic components; wherein the second portion is not designed to be bent to improve the untethered smartglasses' fit.

17. The untethered smartglasses of claim 16, wherein the electric wires are mounted in a first hollow mechanical structure, the second electronic components are mounted in a second hollow mechanical structure, and dominant materials of the first and second hollow mechanical structures are different.

18. The untethered smartglasses of claim 16, wherein the first electronic components comprise an inward-facing sensor configured to measure a person wearing the untethered smartglasses, and the first portion is flexible.

* * * * *